(12) United States Patent
Hicks et al.

(10) Patent No.: US 12,072,779 B2
(45) Date of Patent: *Aug. 27, 2024

(54) GENERATION OF AN ISSUE RECOVERY COMMUNICATIONS EVALUATION REGARDING A SYSTEM ASPECT OF A SYSTEM

(71) Applicant: UncommonX Inc., Chicago, IL (US)

(72) Inventors: Raymond Hicks, Chicago, IL (US); Ryan Michael Pisani, Burlington, WI (US); Thomas James McNeela, Streamwood, IL (US)

(73) Assignee: UncommonX Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,042

(22) Filed: Jun. 13, 2023

(65) Prior Publication Data

US 2023/0325290 A1 Oct. 12, 2023

Related U.S. Application Data

(63) Continuation of application No. 18/162,540, filed on Jan. 31, 2023, now Pat. No. 11,899,548, which is a
(Continued)

(51) Int. Cl.
G06F 11/07 (2006.01)
G06F 11/26 (2006.01)
(Continued)

(52) U.S. Cl.
CPC .......... *G06F 11/26* (2013.01); *G06F 11/0709* (2013.01); *G06F 11/076* (2013.01);
(Continued)

(58) Field of Classification Search
CPC . G06F 11/0709; G06F 11/079; G06F 11/0793
See application file for complete search history.

(56) References Cited

U.S. PATENT DOCUMENTS 6,581,166 B1 6/2003 Hirst
7,934,253 B2 4/2011 Overcash
(Continued)

*Primary Examiner* — Jigar P Patel
(74) *Attorney, Agent, or Firm* — Garlick & Markison; Timothy W. Markison; Patricia M. Healy

(57) ABSTRACT

A method includes determining, by an analysis system, a system aspect of a system for an issue recovery communications evaluation. The method further includes determining, by the analysis system, at least one evaluation perspective and at least one evaluation viewpoint for use in performing the issue recovery communications evaluation on the system aspect. The method further includes obtaining, by the analysis system, issue recovery communications data regarding the system aspect in accordance with the at least one evaluation perspective and the at least one evaluation viewpoint. The method further includes calculating, by the analysis system, an issue recovery communications rating as a measure of system issue recovery communications maturity for the system aspect based on the issue recovery communications data, the at least one evaluation perspective, the at least one evaluation viewpoint, and at least one evaluation rating metric.

22 Claims, 113 Drawing Sheets

Related U.S. Application Data continuation of application No. 17/247,710, filed on Dec. 21, 2020, now Pat. No. 11,789,833.

(60) Provisional application No. 62/992,661, filed on Mar. 20, 2020.

(51) Int. Cl.
| | | |
|---|---|---|
| *G06F 11/30* | (2006.01) | |
| *G06F 11/34* | (2006.01) | |
| *G06F 11/36* | (2006.01) | |
| *G06F 16/23* | (2019.01) | |
| *G06F 21/57* | (2013.01) | |
| *G06Q 10/0639* | (2023.01) | |
| *H04L 9/40* | (2022.01) | |

(52) U.S. Cl.
CPC ........ *G06F 11/079* (2013.01); *G06F 11/0793* (2013.01); *G06F 11/3006* (2013.01); *G06F 11/3409* (2013.01); *G06F 11/3447* (2013.01); *G06F 11/3476* (2013.01); *G06F 11/3495* (2013.01); *G06F 11/3668* (2013.01); *G06F 16/2379* (2019.01); *G06F 21/577* (2013.01); *G06Q 10/06393* (2013.01); *H04L 63/1416* (2013.01); *H04L 63/1425* (2013.01); *H04L 63/1433* (2013.01); *H04L 63/20* (2013.01); *G06F 2221/034* (2013.01)

(56) References Cited

U.S. PATENT DOCUMENTS

| | | | |
|---|---|---|---|
| 8,145,428 B1 * | 3/2012 | Saleri | ............ E21B 43/00 702/9 |
| 9,699,208 B1 | 7/2017 | Francoeur | |
| 10,536,478 B2 | 1/2020 | Kirti | |
| 2008/0034425 A1 | 2/2008 | Overcash | |
| 2012/0304253 A1 | 11/2012 | Newman | |
| 2014/0207486 A1 | 7/2014 | Carty | |
| 2016/0212166 A1 | 7/2016 | Henry | |
| 2016/0335166 A1 * | 11/2016 | George | ............ G06F 11/3006 |
| 2017/0034700 A1 | 2/2017 | Cohen | |
| 2017/0063991 A1 * | 3/2017 | Dhuse | ............ G06F 3/067 |
| 2017/0070361 A1 | 3/2017 | Sundermeyer | |
| 2017/0270295 A1 | 9/2017 | Park | |
| 2017/0331839 A1 | 11/2017 | Park | |
| 2018/0107544 A1 * | 4/2018 | Resch | ............ G06F 11/0727 |
| 2019/0186920 A1 * | 6/2019 | Leach | ............ G01C 21/1652 |

\* cited by examiner computing device 40

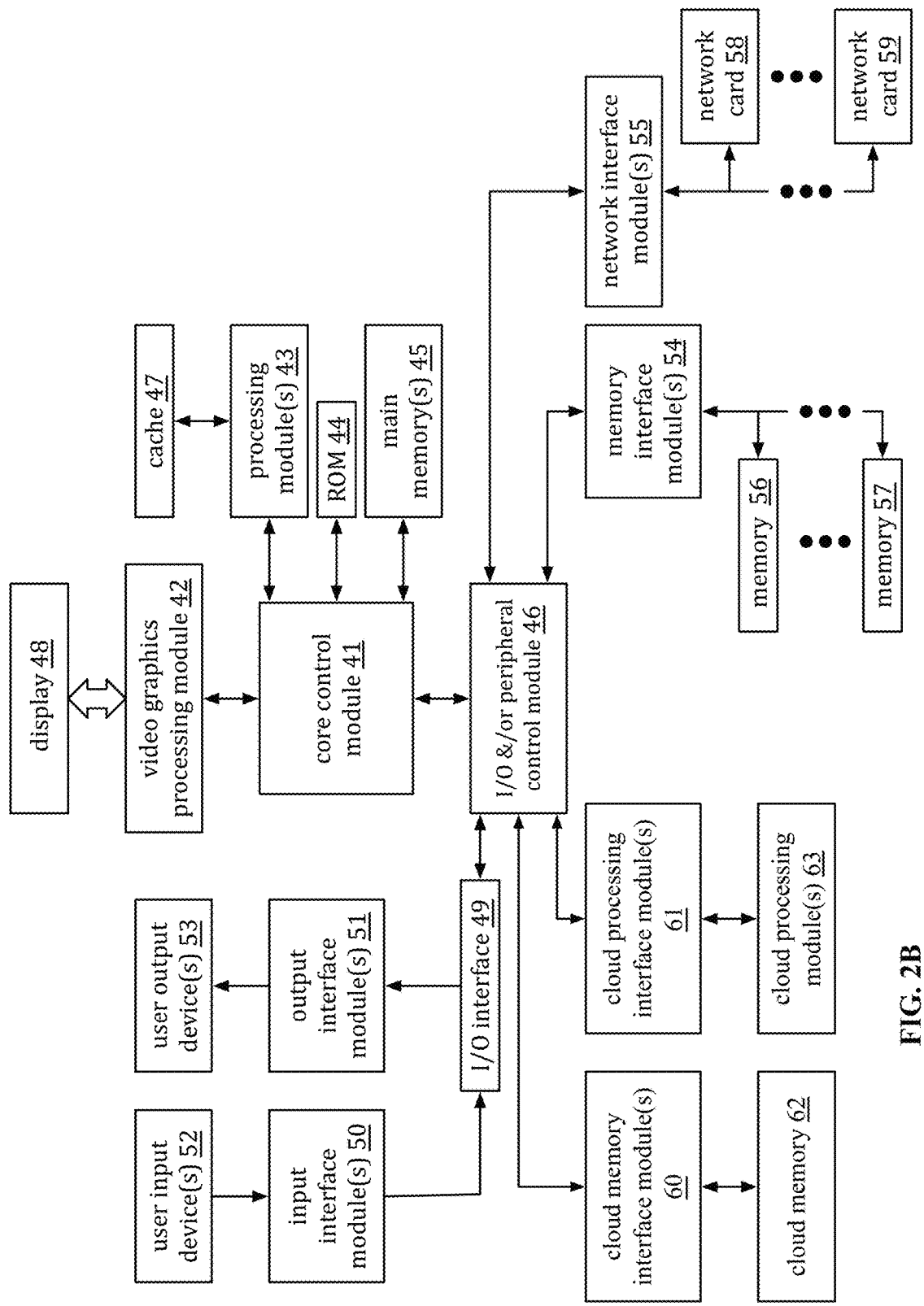

computing device 40 computing device 40

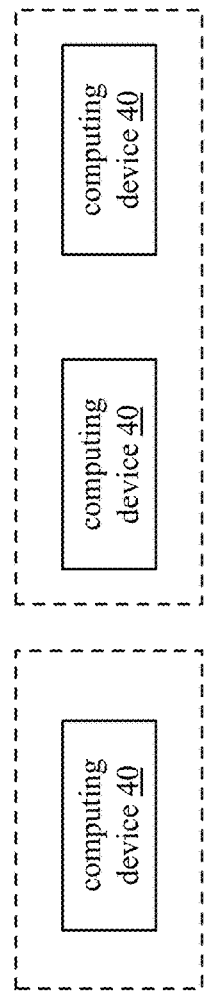
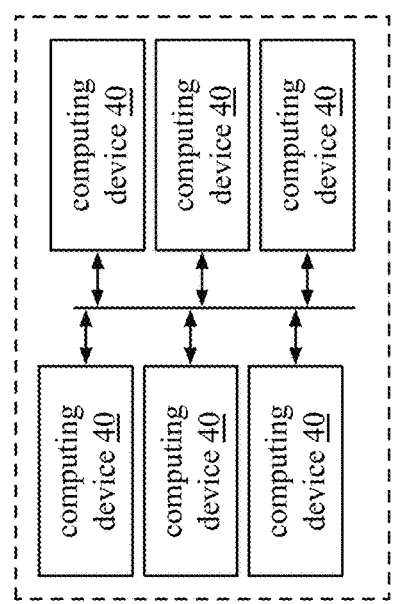
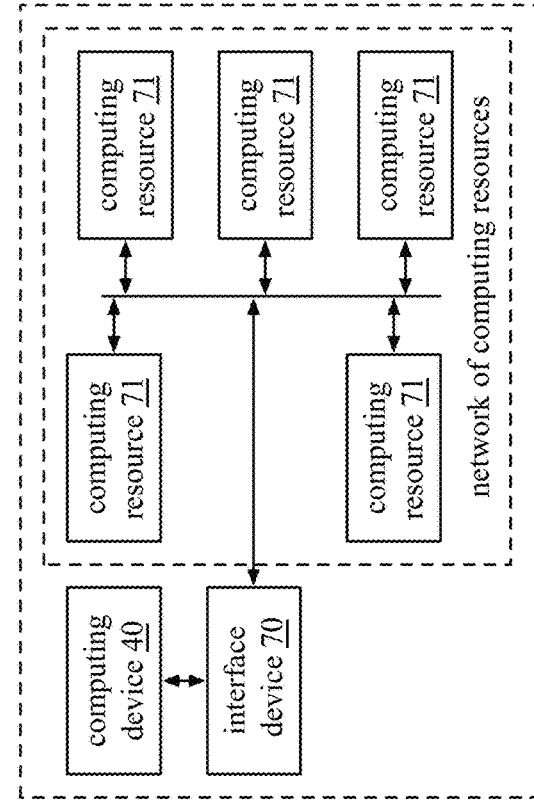
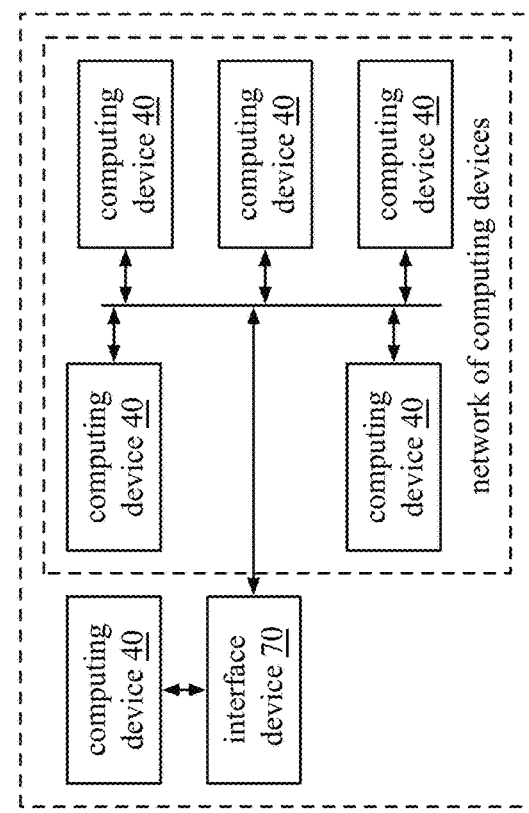

D = device
HW = hardware
SW = software

D = device
HW = hardware
SW = software

D = device
HW = hardware
SW = software system 11

FIG. 22 division 2 - 182

| marketing 190 | operations 191 | engineering 192 | manufacturing 193 | sales 194 | accounting 195 |
|---|---|---|---|---|---|
| devices | devices | devices | devices | devices | devices |
| software | software | software | software | software | software |
| security policies | security policies | security policies | security policies | security policies | security policies |
| security procedures | security procedures | security procedures | security procedures | security procedures | security procedures |
| business policies | business policies | business policies | business policies | business policies | business policies |
| business procedures | business procedures | business procedures | business procedures | business procedures | business procedures |
| data protection | data protection | data protection | data protection | data protection | data protection |
| data access | data access | data access | data access | data access | data access |
| data storage | data storage | data storage | data storage | data storage | data storage |
| personnel hierarchy | personnel hierarchy | personnel hierarchy | personnel hierarchy | personnel hierarchy | personnel hierarchy |
| local networking | local networking | local networking | local networking | local networking | local networking |
| external networking | external networking | external networking | external networking | external networking | external networking |

|  |  | system functions (independent and/or dependent) | | | | | | | |
|---|---|---|---|---|---|---|---|---|---|
|  |  | business operations | requirement compliance | data flow | data access | data integrity | data storage | data use | data dissemination |
| physical assets | user HW |  |  |  |  |  |  |  |  |
|  | user SW |  |  |  |  |  |  |  |  |
|  | networking HW |  |  |  |  |  |  |  |  |
|  | networking SW |  |  |  |  |  |  |  |  |
|  | system HW |  |  |  |  |  |  |  |  |
|  | system SW |  |  |  |  |  |  |  |  |
|  | security SW |  |  |  |  |  |  |  |  |
|  | security HW |  |  |  |  |  |  |  |  |
|  | system monitoring HW |  |  |  |  |  |  |  |  |
|  | system monitoring SW |  |  |  |  |  |  |  |  |
| conceptual assets | HW architecture |  |  |  |  |  |  |  |  |
|  | SW architecture |  |  |  |  |  |  |  |  |
|  | HW sub-architecture |  |  |  |  |  |  |  |  |
|  | SW sub-architecture |  |  |  |  |  |  |  |  |

FIG. 32

| | | system functions (independent and/or dependent) | | | | | | |
|---|---|---|---|---|---|---|---|---|
| | | business operations | requirement compliance | data flow | data access | data integrity | data storage | data use | data dissemination |
| security functions | threat detection | | | | | | | | |
| | threat avoidance | | | | | | | | |
| | threat resolution | | | | | | | | |
| | threat recovery | | | | | | | | |
| | threat assessment | | | | | | | | |
| | threat impact | | | | | | | | |
| | threat tolerance policies | | | | | | | | |
| | business security policies | | | | | | | | |
| | governance security policies | | | | | | | | |
| | data at rest protection | | | | | | | | |
| | data in transit protection | | | | | | | | |
| | data loss prevention | | | | | | | | |

FIG. 33

| | security functions | | | | | | | | | |
|---|---|---|---|---|---|---|---|---|---|---|
| | threat detection | threat avoidance | threat resolution | threat recovery | threat assessment | threat impact | threat tolerance policies | business security policies | governance security policies | data at rest protection | data in transit protection | data loss prevention |
| user HW | | | | | | | | | | | | |
| user SW | | | | | | | | | | | | |
| networking HW | | | | | | | | | | | | |
| networking SW | | | | | | | | | | | | |
| system HW | | | | | | | | | | | | |
| system SW | | | | | | | | | | | | |
| security SW | | | | | | | | | | | | |
| security HW | | | | | | | | | | | | |
| system monitoring HW | | | | | | | | | | | | |
| system monitoring SW | | | | | | | | | | | | |
| HW architecture | | | | | | | | | | | | |
| SW architecture | | | | | | | | | | | | |
| HW sub-architecture | | | | | | | | | | | | |
| SW sub-architecture | | | | | | | | | | | | |

FIG. 34 data analysis module 252 evaluation processing module 254

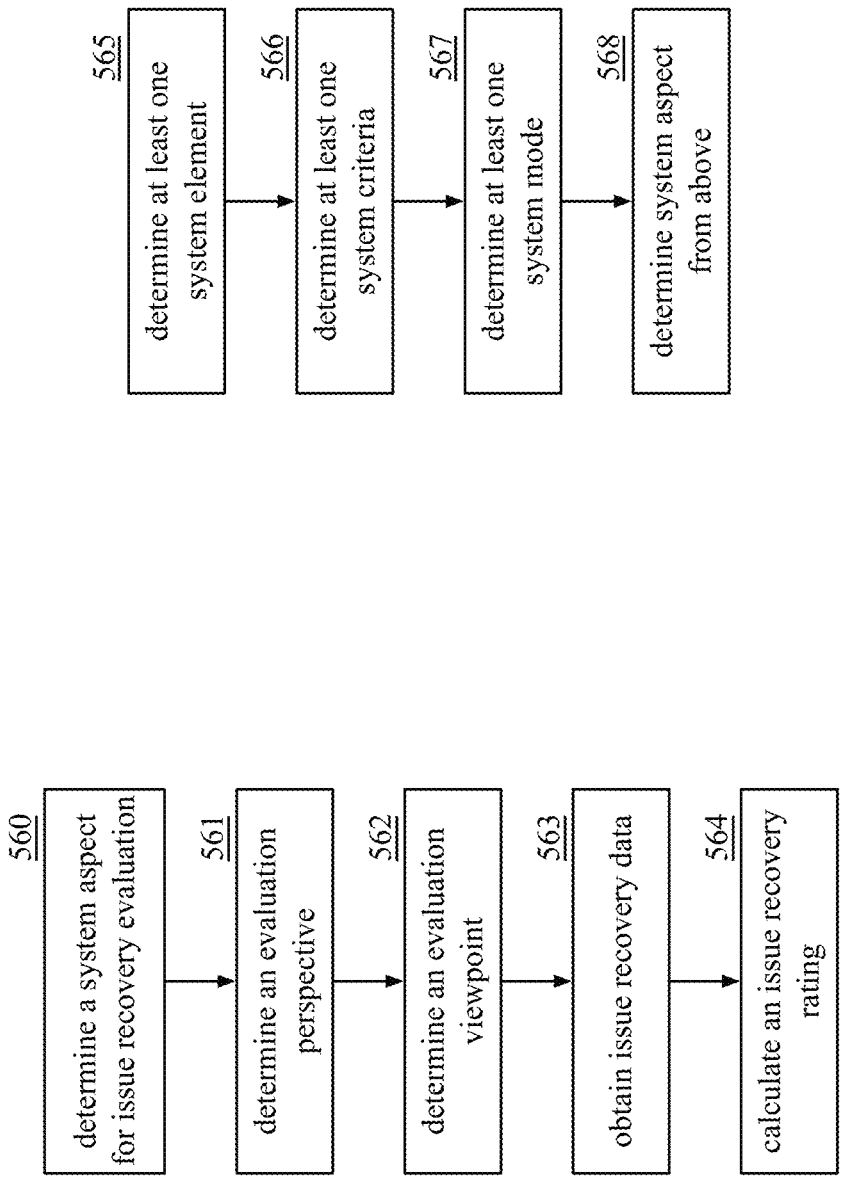

for the whole organization example:
system criteria = system build
system mode = security function
evaluation perspective = understanding
evaluation viewpoint = disclosed
evaluation rating metric = process, policy, procedure, documentation, certification, and automation

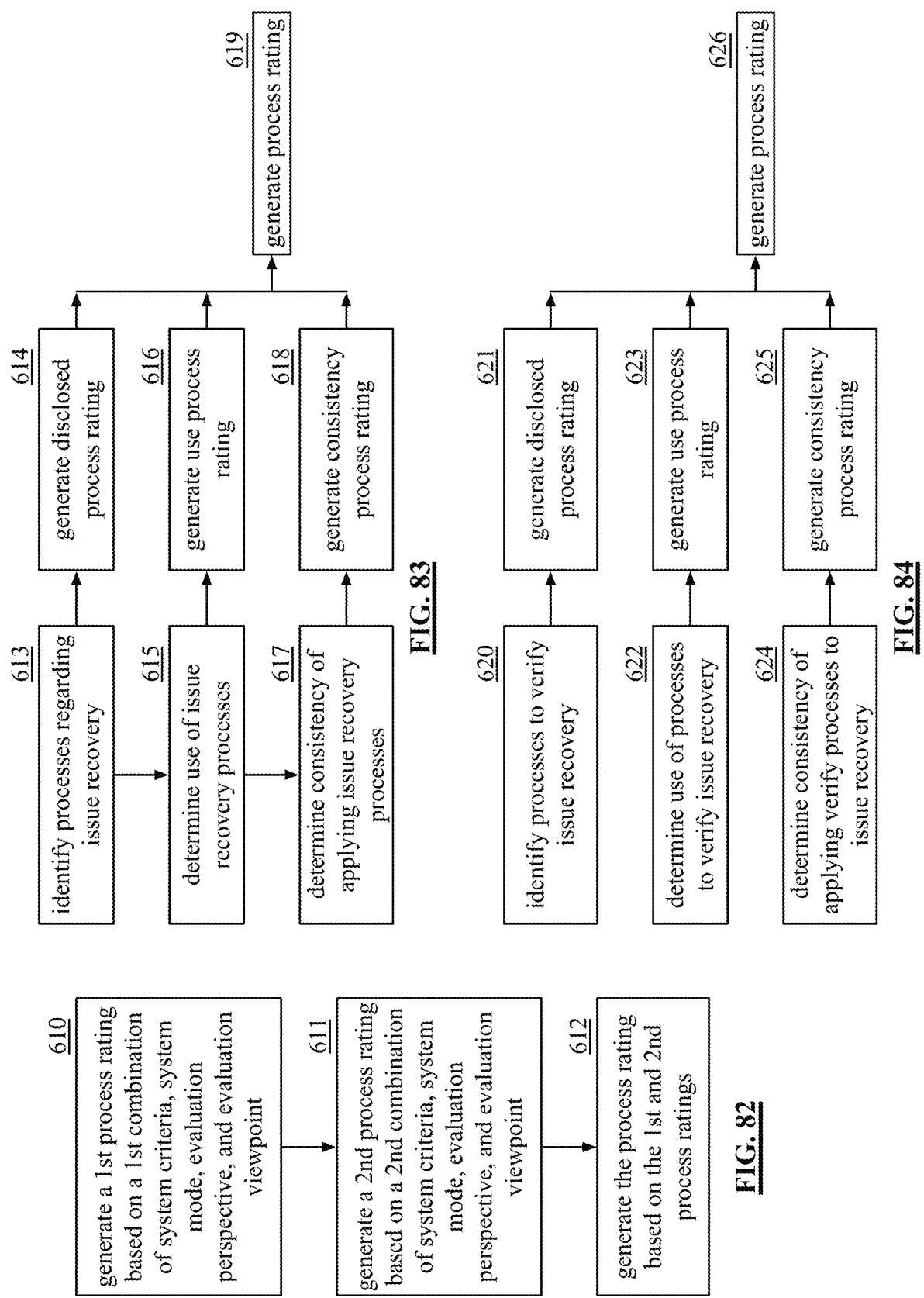

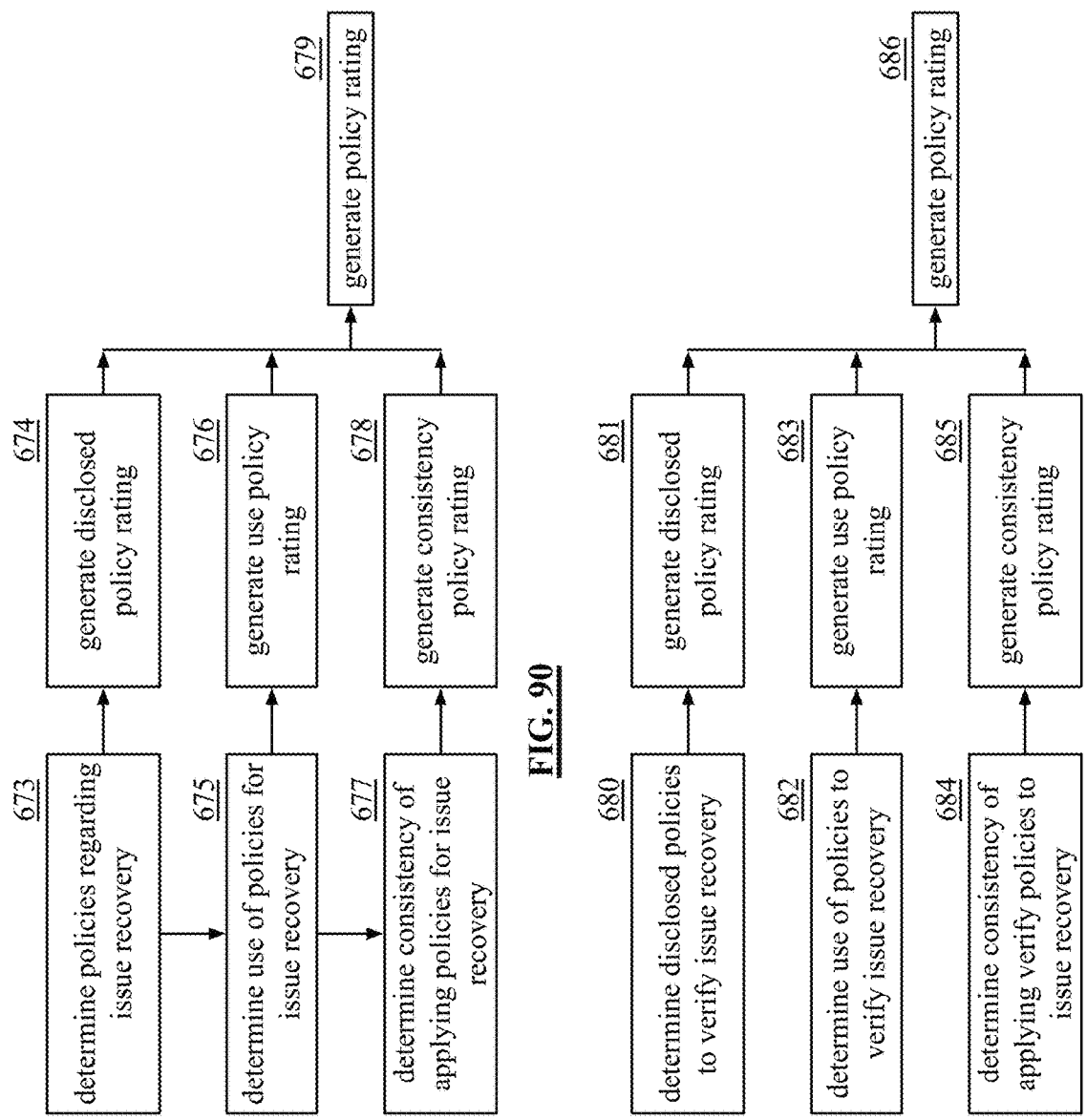
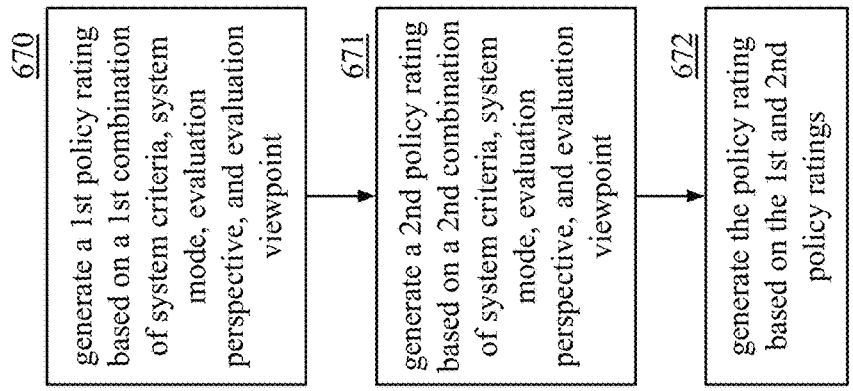

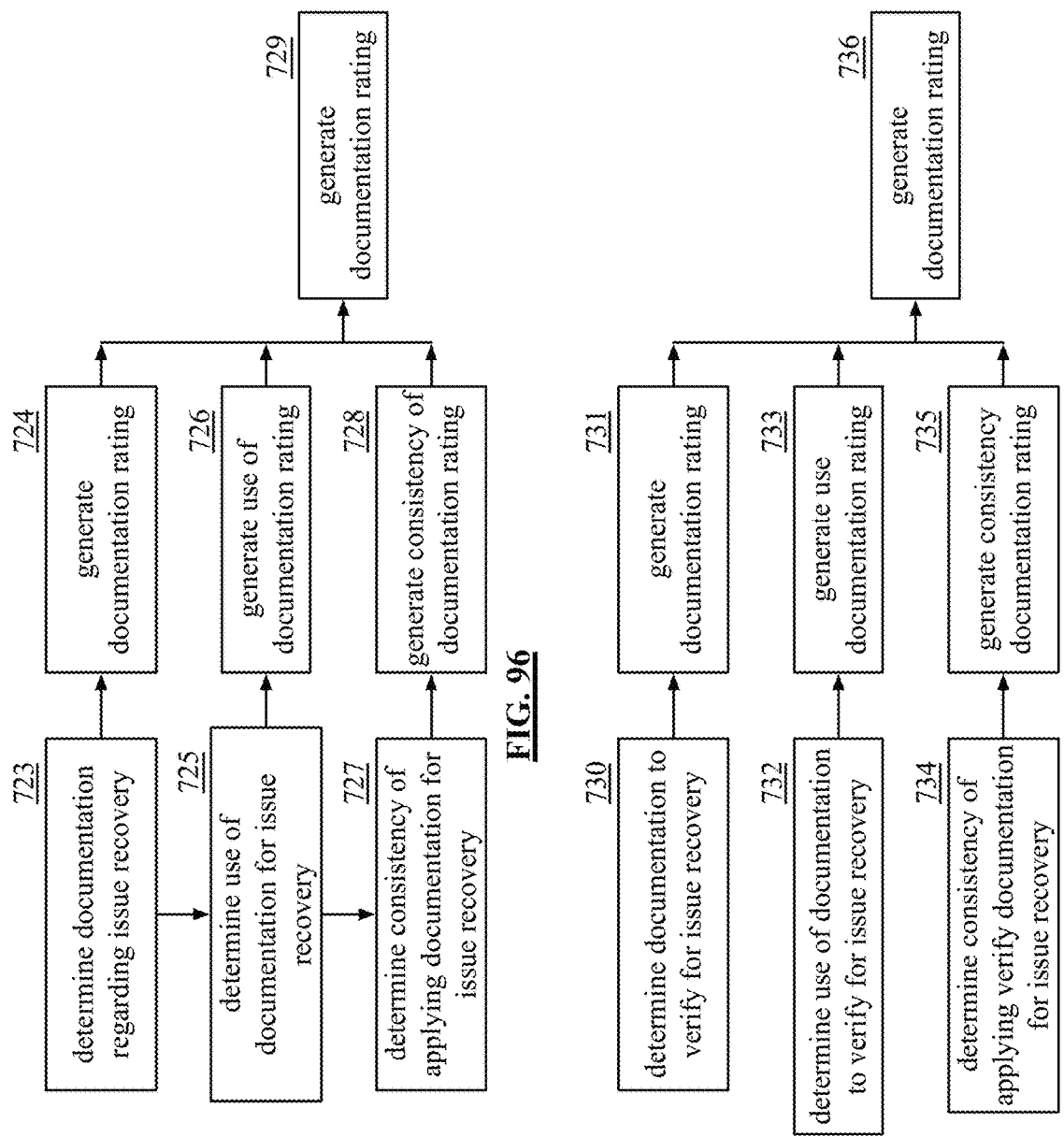
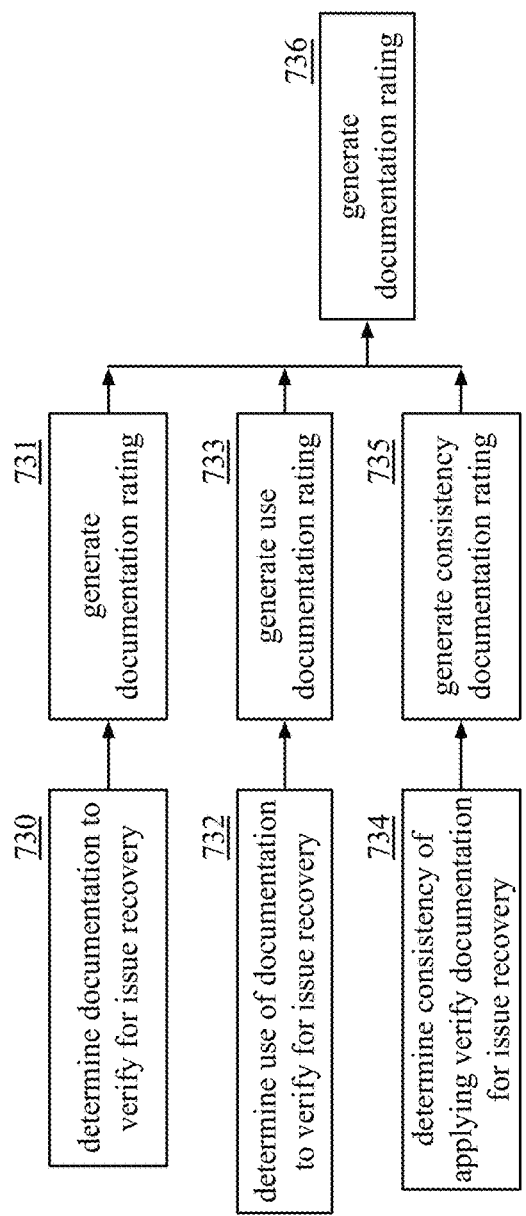
FIG. 96
FIG. 97
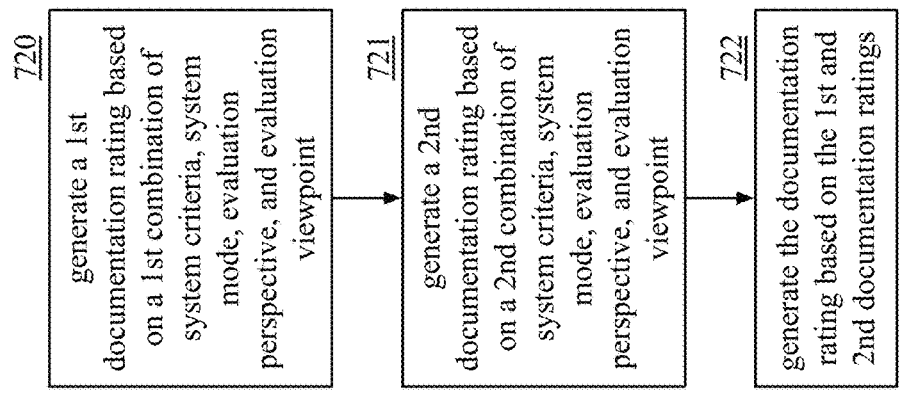
FIG. 95

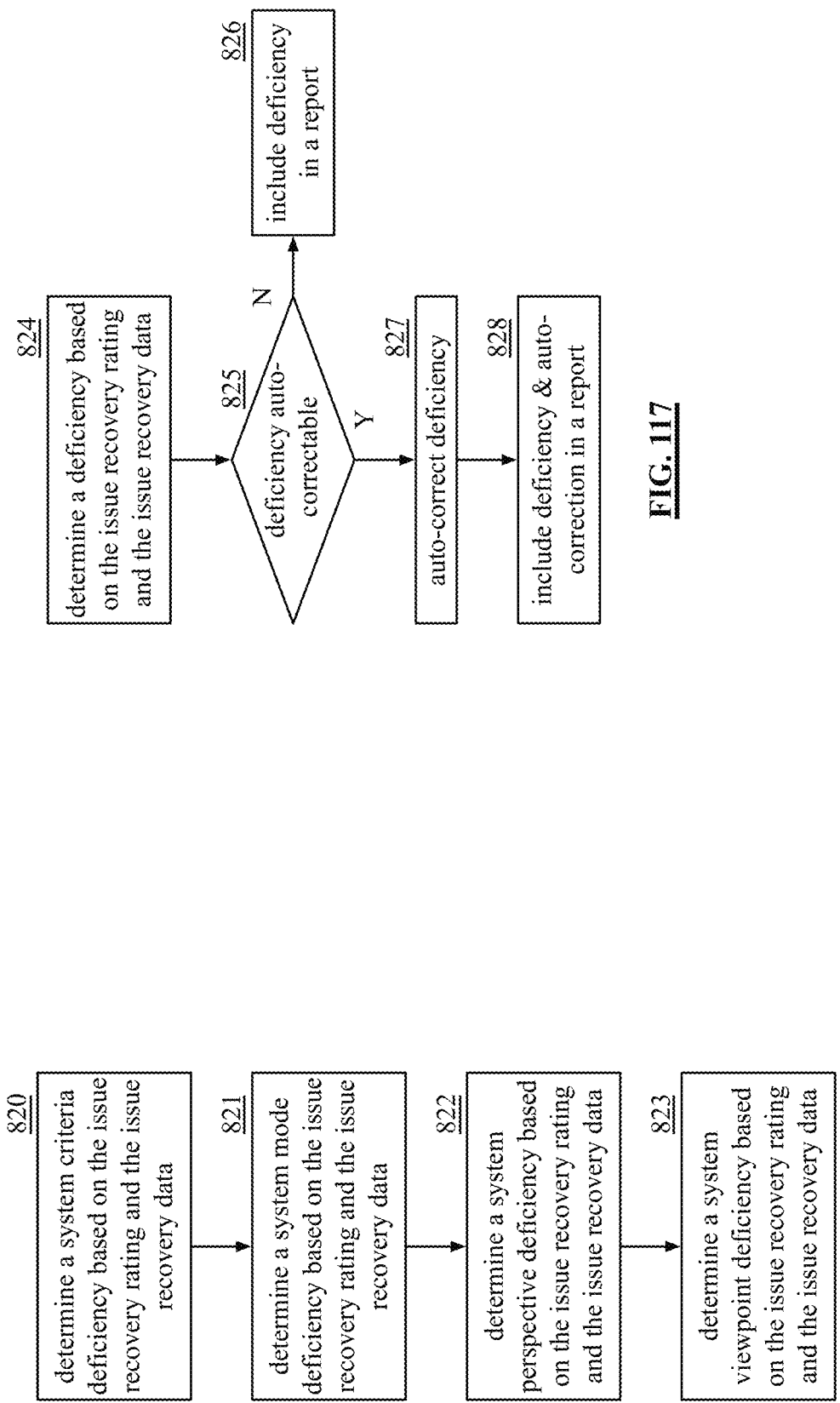

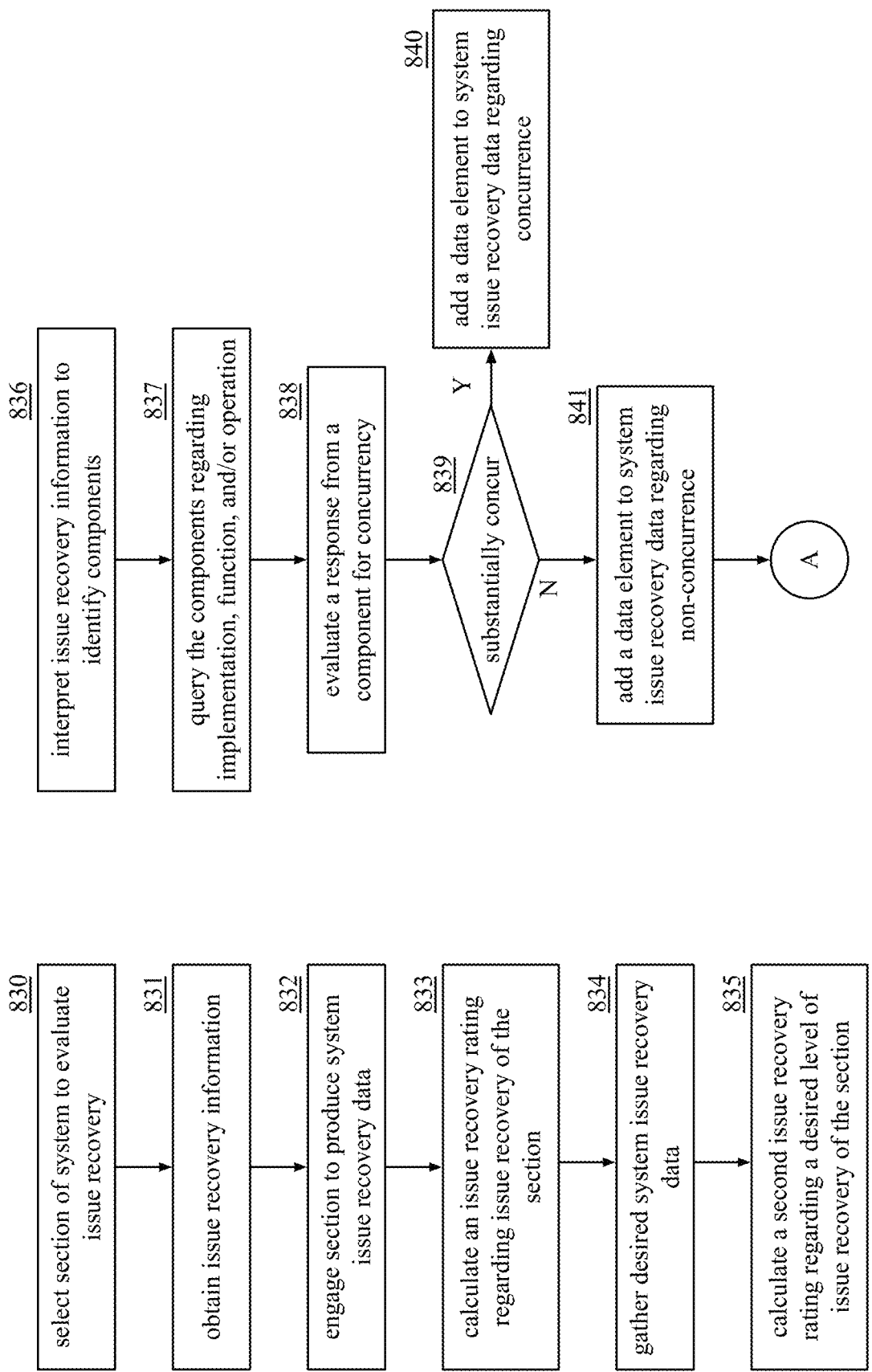

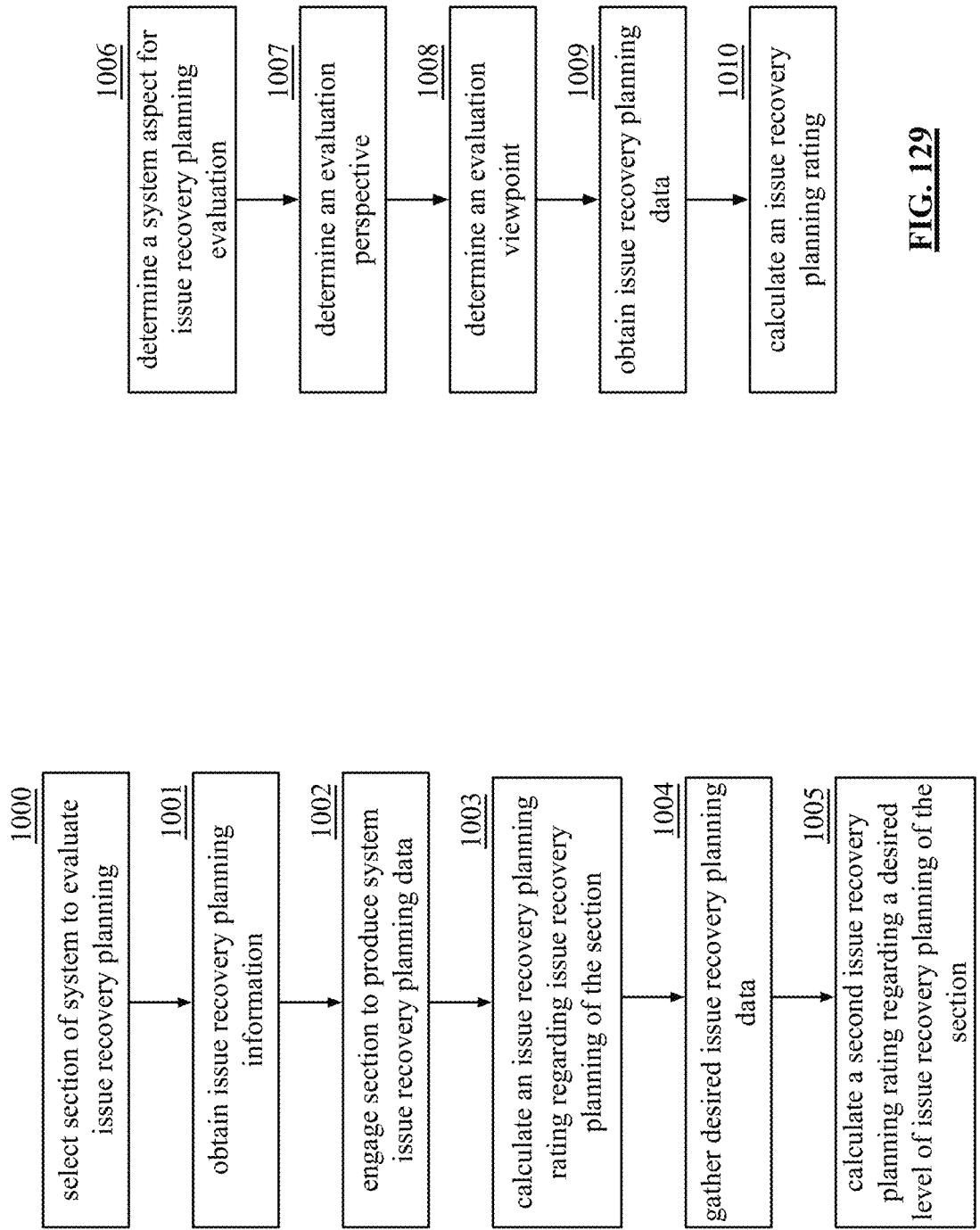

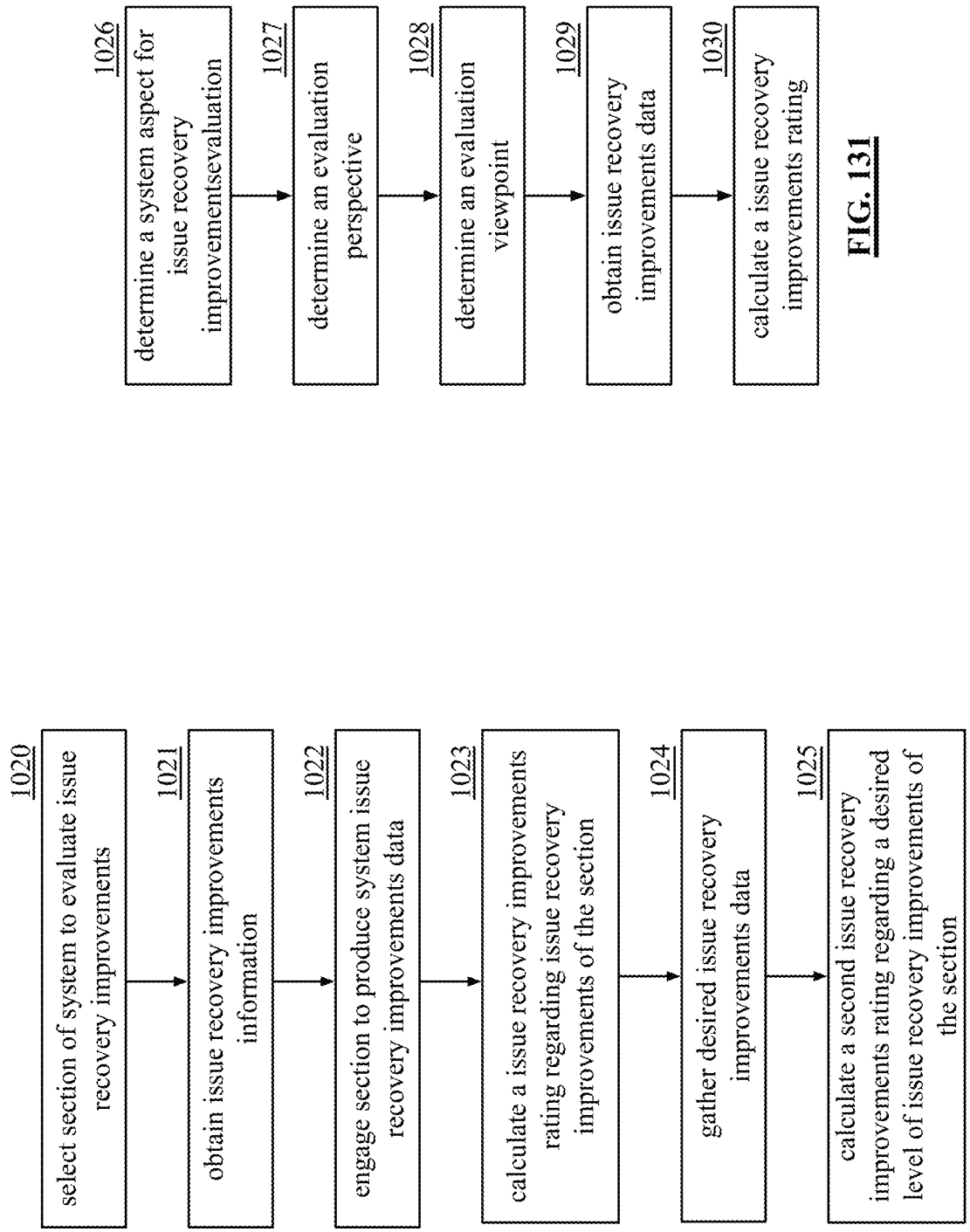

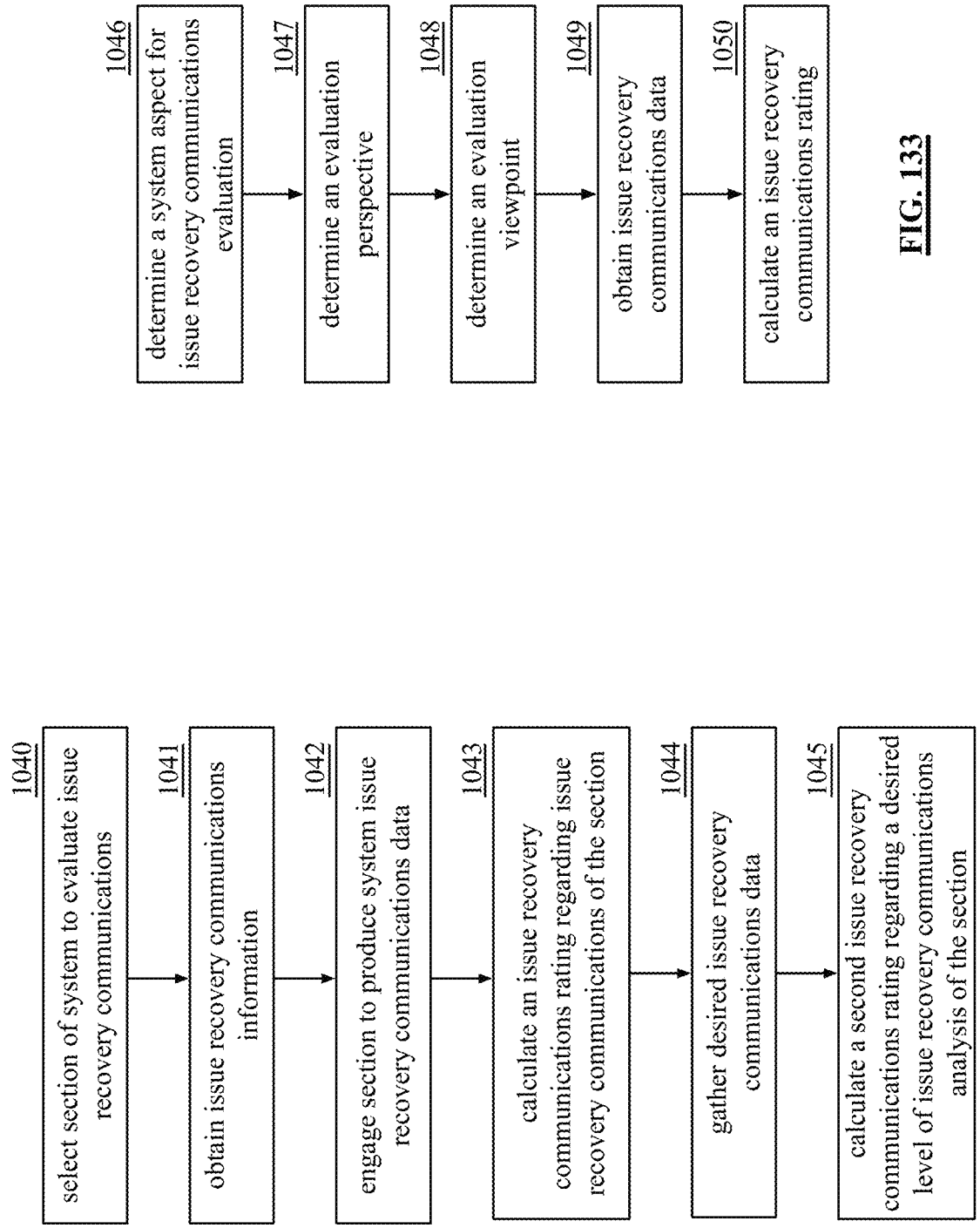

GENERATION OF AN ISSUE RECOVERY COMMUNICATIONS EVALUATION REGARDING A SYSTEM ASPECT OF A SYSTEM

CROSS-REFERENCE TO RELATED APPLICATIONS

The present U.S. Utility patent application claims priority pursuant to 35 U.S.C. § 120 as a continuation of U.S. Utility application Ser. No. 18/162,540, entitled "GENERATION OF AN ISSUE RECOVERY IMPROVEMENT EVALUATION REGARDING A SYSTEM ASPECT OF A SYSTEM," filed Jan. 31, 2023, which claims priority pursuant to 35 U.S.C. § 120 as a continuation of U.S. Utility application Ser. No. 17/247,710, entitled "GENERATION OF AN ISSUE RECOVERY EVALUATION REGARDING A SYSTEM ASPECT OF A SYSTEM," filed Dec. 21, 2020, which claims priority pursuant to 35 U.S.C. § 119(e) to U.S. Provisional Application No. 62/992,661, entitled "System Analysis System," filed Mar. 20, 2020, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates to computer systems and more particularly to evaluation of a computer system.

Description of Related Art

The structure and operation of the Internet and other publicly available networks are well known and support computer systems (systems) of multitudes of companies, organizations, and individuals. A typical system includes networking equipment, end point devices such as computer servers, user computers, storage devices, printing devices, security devices, and point of service devices, among other types of devices. The networking equipment includes routers, switches, edge devices, wireless access points, and other types of communication devices that intercouple in a wired or wireless fashion. The networking equipment facilitates the creation of one or more networks that are tasked to service all or a portion of a company's communication needs, e.g., Wide Area Networks, Local Area Networks, Virtual Private Networks, etc.

Each device within a system includes hardware components and software components. Hardware components degrade over time and eventually are incapable of performing their intended functions. Software components must be updated regularly to ensure their proper functionality. Some software components are simply replaced by newer and better software even though they remain operational within a system.

Many companies and larger organizations have their own Information Technology (IT) departments. Others outsource their IT needs to third party providers. The knowledge requirements for servicing a system typically outstrip the abilities of the IT department or third-party provider. Thus, hardware and software may not be functioning properly and can adversely affect the overall system.

Cyber-attacks are initiated by individuals or entities with the bad intent of stealing sensitive information such as login/password information, stealing proprietary information such as trade secrets or important new technology, interfering with the operation of a system, and/or holding the system hostage until a ransom is paid, among other improper purposes. A single cyber-attack can make a large system inoperable and cost the system owner many millions of dollars to restore and remedy.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIGS. 2A-2D are schematic block diagrams of embodiments of a computing device in accordance with the present disclosure;

FIGS. 3A-3E are schematic block diagrams of embodiments of a computing entity in accordance with the present disclosure;

FIG. 22 is a schematic block diagram of another embodiment of a division of a system having departments, which include system elements in accordance with the present disclosure;

FIG. 32 is a diagram of another example of evaluation options of an analysis system for evaluating a system element under test of a system in accordance with the present disclosure;

FIG. 33 is a diagram of another example of evaluation options of an analysis system for evaluating a system element under test of a system in accordance with the present disclosure;

FIG. 34 is a diagram of another example of evaluation options of an analysis system for evaluating a system element under test of a system in accordance with the present disclosure;

FIGS. 56 and 56A are a diagram of another specific example of system aspects, evaluation aspects, evaluation rating metrics, and analysis system output options of an analysis system for analyzing a section of a system in accordance with the present disclosure;

FIGS. 57 and 57A are a diagram of an example of identifying deficiencies and auto-corrections by an analysis system analyzing a section of a system in accordance with the present disclosure;

FIG. 68 is a logic diagram of an example of an analysis system determining an issue recovery rating for a section of a system in accordance with the present disclosure;

FIG. 69 is a logic diagram of a further example of an analysis system determining an issue recovery rating for a section of a system in accordance with the present disclosure;

FIG. 82 is a logic diagram of a further example of an analysis system determining an issue recovery rating for a section of a system in accordance with the present disclosure;

FIG. 83 is a logic diagram of a further example of generating a process rating for understanding of system build for issue recovery security functions of an organization in accordance with the present disclosure;

FIG. 84 is a logic diagram of a further example of generating a process rating for understanding of verifying issue recovery security functions of an organization in accordance with the present disclosure;

FIG. 89 is a logic diagram of a further example of an analysis system determining an issue recovery rating for a section of a system in accordance with the present disclosure;

FIG. 90 is a logic diagram of a further example of generating a policy rating for understanding of system build for issue recovery security functions of an organization in accordance with the present disclosure;

FIG. 91 is a logic diagram of a further example of generating a policy rating for understanding of verifying issue recovery security functions of an organization in accordance with the present disclosure;

FIG. 95 is a logic diagram of a further example of an analysis system determining an issue recovery rating for a section of a system in accordance with the present disclosure;

FIG. 96 is a logic diagram of a further example of generating a documentation rating for understanding of system build of issue recovery security functions of an organization in accordance with the present disclosure;

FIG. 97 is a logic diagram of a further example of generating a documentation rating for understanding of system build of issue recovery security functions of an organization in accordance with the present disclosure;

FIG. 116 is a logic diagram of a further example of an analysis system determining an issue recovery rating for a section of a system in accordance with the present disclosure;

FIG. 117 is a logic diagram of a further example of an analysis system determining an issue recovery rating for a section of a system in accordance with the present disclosure;

FIG. 118 is a logic diagram of another example of an analysis system determining an issue recovery rating for a section of a system in accordance with the present disclosure;

FIG. 119 is a logic diagram of a further example of an analysis system determining an issue recovery rating for a section of a system in accordance with the present disclosure;

FIG. 128 is a logic diagram of another example of an analysis system determining an issue recovery rating for a section of a system in accordance with the present disclosure;

FIG. 129 is a logic diagram of a further example of an analysis system determining an issue recovery rating for a section of a system in accordance with the present disclosure;

FIG. 130 is a logic diagram of another example of an analysis system determining an issue recovery rating for a section of a system in accordance with the present disclosure;

FIG. 131 is a logic diagram of an example of an analysis system determining an issue recovery improvements evaluation rating for a system with the present disclosure.

FIG. 132 is a logic diagram of a further example of an analysis system determining an issue recovery rating for a section of a system in accordance with the present disclosure; and FIG. 133 is a logic diagram of another example of an analysis system determining an issue recovery rating for a section of a system in accordance with the present disclosure.

DETAILED DESCRIPTION OF THE INVENTION

Figure 1:
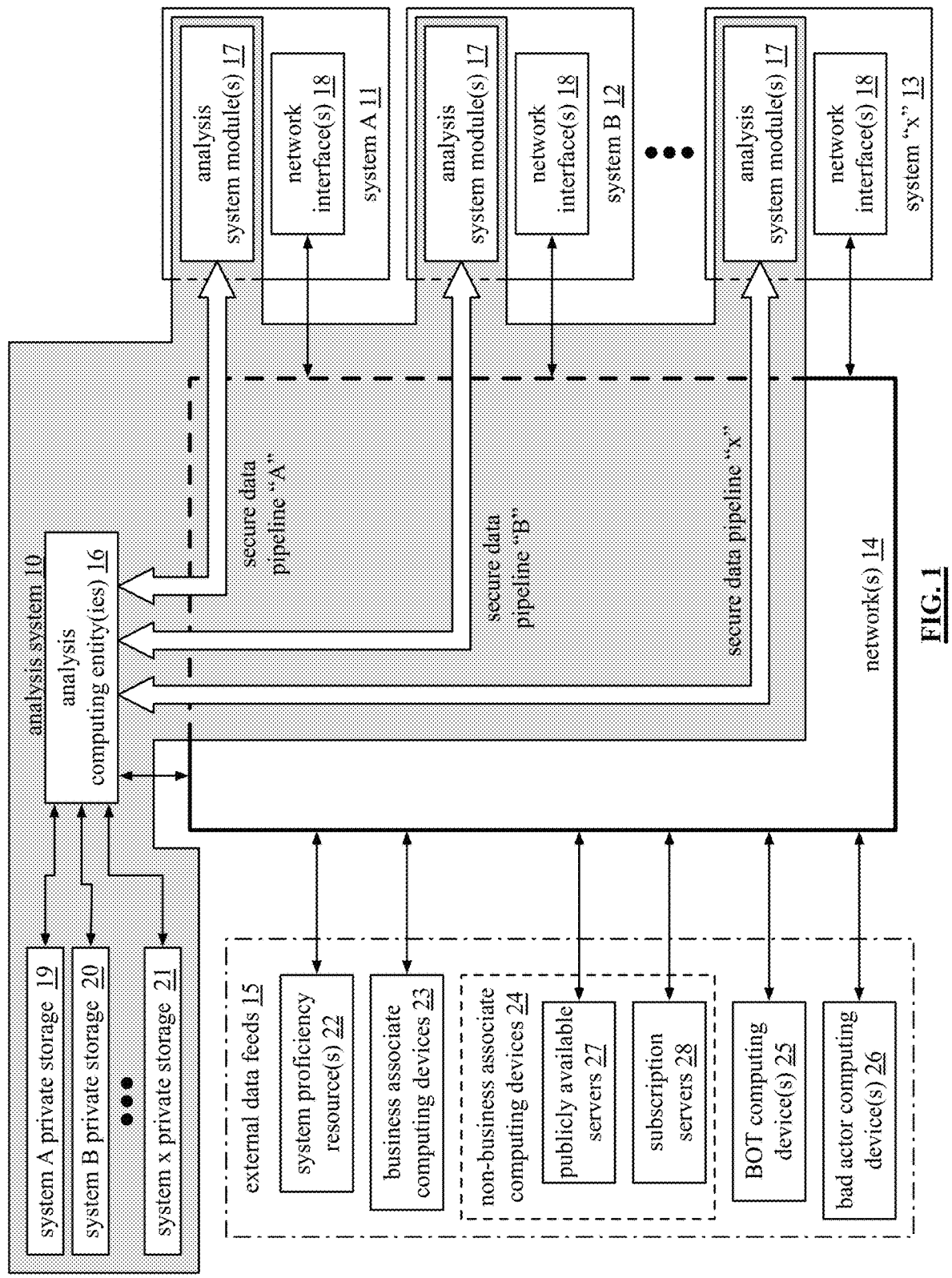
FIG. 1 is a schematic block diagram of an embodiment of a networked environment that includes systems coupled to an analysis system in accordance with the present disclosure.

FIG. 1 is a schematic block diagram of an embodiment of a networked environment that includes one or more networks 14, external data feeds sources 15, a plurality of systems 11-13, and an analysis system 10. The external data feed sources 15 includes one or more system proficiency resources 22, one or more business associated computing devices 23, one or more non-business associated computing devices 24 (e.g., publicly available servers 27 and subscription based servers 28), one or more BOT (i.e., internet robot) computing devices 25, and one or more bad actor computing devices 26. The analysis system 10 includes one or more analysis computing entities 16, a plurality of analysis system modules 17 (one or more in each of the systems 11-13), and a plurality of storage systems 19-21 (e.g., system A private storage 19, system B private storage 20, through system x private storage 21, and other storage). Each of the systems 11-13 includes one or more network interfaces 18 and many more elements not shown in FIG. 1.

A computing device may be implemented in a variety of ways. A few examples are shown in FIGS. 2A-2D. A computing entity may be implemented in a variety of ways. A few examples are shown in FIGS. 3A-3E.

A storage system 19-21 may be implemented in a variety of ways. For example, each storage system is a standalone database. As another example, the storage systems are implemented in a common database. A database is a centralized database, a distributed database, an operational database, a cloud database, an object-oriented database, and/or a relational database. A storage system 19-21 is coupled to the analysis system 10 using a secure data pipeline to limit and control access to the storage systems. The secure data pipeline may be implemented in a variety of ways. For example, the secure data pipeline is implemented on a provide network of the analysis system and/or of a system under test. As another example, the secure data pipeline is implemented via the network 14 using access control, using network controls, implementing access and control policies, using encryption, using data loss prevention tools, and/or using auditing tools.

The one or more networks 14 includes one or more wide area networks (WAN), one or more local area networks (LAN), one or more wireless LANs (WLAN), one or more cellular networks, one or more satellite networks, one or more virtual private networks (VPN), one or more campus area networks (CAN), one or more metropolitan area networks (MAN), one or more storage area networks (SAN), one or more enterprise private networks (EPN), and/or one or more other type of networks.

In general, a system proficiency resource 22 is a source for data regarding best-in-class practices (for system requirements, for system design, for system implementation, and/or for system operation), governmental and/or regulatory requirements, security risk awareness and/or risk remediation information, security risk avoidance, performance optimization information, system development guidelines, software development guideline, hardware requirements, networking requirements, networking guidelines, and/or other system proficiency guidance. "Framework for Improving Critical Instructure Cybersecurity", Version 1.1, Apr. 16, 2018 by the National Institute of Standards and Technology (NIST) is an example of a system proficiency in the form of a guideline for cybersecurity.

A business associated computing device 23 is one that is operated by a business associate of the system owner. Typically, the business associated computing device 23 has access to at least a limited portion of the system to which the general public does not have access. For example, the business associated computing device 23 is operated by a vendor of the organization operating the system and is granted limited access for order placement and/or fulfillment. As another example, the business associated computing device 23 is operated by a customer of the organization operating the system and is granted limited access for placing orders.

A non-business associated computing device 24 is a computing device operated by a person or entity that does not have a business relationship with the organization operating the system. Such non-business associated computing device 24 are not granted special access to the system. For example, a non-business associated computing device 24 is a publicly available server 27 to which a user computing device of the system may access. As another example, a non-business associated computing device 24 is a subscription based servers 28 to which a user computing device of the system may access if it is authorized by a system administrator of the system to have a subscription and has a valid subscription. As yet another example, the non-business associated computing device 24 is a computing device operated by a person or business that does not have an affiliation with the organization operating the system.

A bot (i.e., internet robot) computing device 25 is a computing device that runs, with little to no human interaction, to interact with a system and/or a computing device of a user via the internet or a network. There are a variety of types of bots. For example, there are social media bots, chatbots, bot crawlers, transaction bots, information bots, and entertainment bots (e.g., games, art, books, etc.).

A bad actor computing device 26 is a computing device operated by a person whose use of the computing device is for illegal and/or immoral purposes. The bad actor computing device 26 may employ a bot to execute an illegal and/or immoral purpose. In addition or in the alternative, the person may instruct the bad actor computing device to perform the illegal and/or immoral purpose, such as hacking, planting a worm, planting a virus, stealing data, uploading false data, and so on.

The analysis system 10 is operable to evaluate a system 11-13, or portion thereof, in a variety of ways. For example, the analysis system 10 evaluates system A 11, or a portion thereof, by testing the organization's understanding of its system, or portion thereof; by testing the organization's implementation of its system, or portion thereof; and/or by testing the system's, or portion thereof, operation. As a specific example, the analysis system 10 tests the organization's understanding of its system requirements for the implementation and/or operation of its system, or portion thereof. As another specific example, the analysis system 10 tests the organization's understanding of its software maintenance policies and/or procedures. As another specific example, the analysis system 10 tests the organization's understanding of its cybersecurity policies and/or procedures.

There is an almost endless combination of ways in which the analysis system 10 can evaluate a system 11-13, which may be a computer system, a computer network, an enterprise system, and/or other type of system that includes computing devices operating software. For example, the analysis system 10 evaluates a system aspect (e.g., the system or a portion of it) based on an evaluation aspect (e.g., options for how the system, or portion thereof, can be evaluated) in view of evaluation rating metrics (e.g., how the system, or portion thereof, is evaluated) to produce an analysis system output (e.g., an evaluation rating, deficiency identification, and/or deficiency auto-correction).

The system aspect (e.g., the system or a portion thereof) includes a selection of one or more system elements of the system, a selection of one or more system criteria, and/or a selection of one or more system modes. A system element of the system includes one or more system assets which is a physical asset of the system and/or a conceptual asset of the system. For example, a physical asset is a computing entity, a computing device, a user software application, a system software application (e.g., operating system, etc.), a software tool, a network software application, a security software application, a system monitoring software application, and the like. As another example, a conceptual asset is a hardware architectural layout, or portion thereof, and/or a software architectural layout, or portion thereof.

A system element and/or system asset may be identified in a variety of ways. For example, it is identifiably by its use and/or location within the organization. As a specific example, a system element and/or system asset is identified by an organizational identifier, a division of the organization identifier, a department of a division identifier, a group of a department identifier, and/or a sub-group of a group identifier. In this manner, if the entire system is to be evaluated, the organization identifier is used to select all of the system elements in the system. If a portion of the system is to be test based on business function, then a division, department, group, and/or sub-group identifier is used to select the desired portion of the system.

In addition or in the alternative, a system element and/or system asset is identifiable based on a serial number, an IP (internet protocol) address, a vendor name, a type of system element and/or system asset (e.g., computing entity, a particular user software application, etc.), registered user of the system element and/or system asset, and/or other identifying metric. In this manner, an individual system element and/or system asset can be evaluated and/or a type of system element and/or system asset can be evaluated (e.g., a particular user software application).

A system criteria is regarding a level of the system, or portion thereof, being evaluated. For example, the system criteria includes guidelines, system requirements, system design, system build, and resulting system. As a further example, the guidelines (e.g., business objectives, security objectives, NIST cybersecurity guidelines, system objectives, governmental and/or regulatory requirements, third party requirements, etc.) are used to develop the system requirements, which are used to design the system, which is used to the build the resulting system. As such, the system, or potion thereof, can be evaluated from a guideline level, a system requirements level, a design level, a build level, and/or a resulting system level.

A system mode is regarding a different level of the system, or portion thereof, being evaluated. For example, the system mode includes assets, system functions, and security functions. As such, the system can be evaluated from an assets level, a system function level, and/or a security function level.

The evaluation aspect (e.g., options for how the system, or portion thereof, can be evaluated) includes a selection of one or more evaluation perspectives, a selection of one or more evaluation viewpoints, and/or a selection of one or more evaluation categories, which may further includes sub-categories, and sub-categories of the sub-categories). An evaluation perspective is understanding of the system, or portion thereof; implementation (e.g., design and build) of the system, or portion thereof; operational performance of the system, or portion thereof; or self-analysis of the system, or portion thereof.

An evaluation viewpoint is disclosed information from the system, discovered information about the system by the analysis system, or desired information about the system obtained by the analysis system from system proficiency resources. The evaluation viewpoint complements the evaluation perspective to allow for more in-depth and/or detailed evaluations. For example, the analysis system 10 can evaluate how well the system is understood by comparing disclosed data with discovered data. As another example, the analysis system 10 can evaluate how well the system is actually implemented in comparison to a desired level of implementation.

The evaluation category includes an identify category, a protect category, a detect category, a respond category, and a recover category. Each evaluation category includes a plurality of sub-categories and, at least some of the sub-categories include their own sub-categories (e.g., a sub-sub category). For example, the identify category includes the sub-categories of asset management, business environment, governance, risk assessment, risk management, access control, awareness & training, and data security. As a further example, asset management includes the sub-categories of hardware inventory, software inventory, data flow maps, external system cataloged, resource prioritization, and security roles. The analysis system 10 can evaluate the system, or portion thereof, in light of one more evaluation categories, in light of an evaluation category and one or more sub-categories, or in light of an evaluation category, a sub-category, and one or more sub-sub-categories.

The evaluation rating metrics (e.g., how the system, or portion thereof, is evaluated) includes a selection of process, policy, procedure, certification, documentation, and/or automation. This allows the analysis system to quantify its evaluation. For example, the analysis system 10 can evaluate the processes a system, or portion thereof, has to generate an evaluation rating, to identify deficiencies, and/or to auto-correct deficiencies. As another example, the analysis system 10 can evaluate how well the system, or portion thereof, uses the process it has to generate an evaluation rating, to identify deficiencies, and/or to auto-correct deficiencies.

In an example, the analysis computing entity 16 (which includes one or more computing entities) sends a data gathering request to the analysis system module 17. The data gathering request is specific to the evaluation to be performed by the analysis system 10. For example, if the analysis system 10 is evaluating the understanding of the policies, processes, documentation, and automation regarding the assets built for the engineering department, then the data gathering request would be specific to policies, processes, documentation, and automation regarding the assets built for the engineering department.

The analysis system module 17 is loaded on the system 11-13 and obtained the requested data from the system. The obtaining of the data can be done in a variety of ways. For example, the data is disclosed by one or more system administrators. The disclosed data corresponds to the information the system administrator(s) has regarding the system. In essence, the disclosed data is a reflection of the knowledge the system administrator(s) has regarding the system.

As another example, the analysis system module 17 communicates with physical assets of the system to discover the data. The communication may be direct with an asset. For example, the analysis system module 17 sends a request to a particular computing device. Alternatively or in addition, the communication may be through one or more discovery tools of the system. For example, the analysis system module 17 communicates with one or more tools of the system to obtain data regarding data segregation & boundary, infrastructure management, exploit & malware protection, encryption, identity & access management, system monitoring, vulnerability management, and/or data protection.

A tool is a network monitoring tool, a network strategy and planning tool, a network managing tool, a Simple Network Management Protocol (SNMP) tool, a telephony monitoring tool, a firewall monitoring tool, a bandwidth monitoring tool, an IT asset inventory management tool, a network discovery tool, a network asset discovery tool, a software discovery tool, a security discovery tool, an infrastructure discovery tool, Security Information & Event Management (SIEM) tool, a data crawler tool, and/or other type of tool to assist in discovery of assets, functions, security issues, implementation of the system, and/or operation of the system. If the system does not have a particular tool, the analysis system module 17 engages one to discover a particular piece of data.

The analysis system module 17 provides the gathered data to the analysis computing entity 16, which stores the gathered data in a private storage 19-21 and processes it. The gathered data is processed alone, in combination with stored data (of the system being evaluated and/or another system's data), in combination with desired data (e.g., system proficiencies), in combination with analysis modeling (e.g., risk modeling, data flow modeling, security modeling, etc.), and/or in combination with stored analytic data (e.g., results of other evaluations). As a result of the processing, the analysis computing entity 16 produces an evaluation rating, to identify deficiencies, and/or to auto-correct deficiencies. The evaluation results are stored in a private storage and/or in another database.

The analysis system 10 is operable to evaluate a system and/or its eco-system at any level of granularity from the entire system to an individual asset over a wide spectrum of evaluation options. As an example, the evaluation is to test understanding of the system, to test the implementation of the system, and/or to test the operation of the system. As another example, the evaluation is to test the system's self-evaluation capabilities with respect to understanding, implementation, and/or operation. As yet another example, the evaluation is to test policies regarding software tools; to test which software tools are prescribed by policy; to test which software tools are prohibited by policy; to test the use of the software tools in accordance with policy, to test maintenance of software tools in accordance with policy; to test the sufficiency of the policies, to test the effectiveness of the policies; and/or to test compliancy with the policies.

The analysis system 10 takes an outside perspective to analyze the system. From within the system, it is often difficult to test the entire system, to test different combinations of system elements, to identify areas of vulnerabilities (assets and human operators), to identify areas of strength (assets and human operators), and to be proactive. Further, such evaluations are additional tasks the system has to perform, which means it consumes resources (human, physicals assets, and financial). Further, since system analysis is not the primary function of a system (supporting the organization is the system's primary purpose), the system analysis is not as thoroughly developed, implemented, and/or executed as is possible when its implemented in a stand-alone analysis system, like system 10.

The primary purpose of the analysis system is to analyze other systems to determine an evaluation rating, to identify deficiencies in the system, and, where it can, auto-correct the deficiencies. The evaluation rating can be regarding how well the system, or portion thereof, is understood, how well it is implemented, and/or how well it operates. The evaluation rating can be regarding how effective the system, or portion thereof, is believed (disclosed data) to support a business function; actually (discovered data) supports a business function; and/or should (desired data) support the business function.

The evaluation rating can be regarding how effective the system, or portion thereof, is believed (disclosed data) to mitigate security risks; actually (discovered data) supports mitigating security risks; and/or should (desired data) support mitigating security risks. The evaluation rating can be regarding how effective the system, or portion thereof, is believed (disclosed data) to respond to security risks; actually (discovered data) supports responding to security risks; and/or should (desired data) support responding security risks.

The evaluation rating can be regarding how effective the system, or portion thereof, is believed (disclosed data) to be used by people; is actually (discovered data) used by people; and/or should (desired data) be used by people. The evaluation rating can be regarding how effective the system, or portion thereof, is believed (disclosed data) to identify assets of the system; actually (discovered data) identifies assets of the system; and/or should (desired data) identify assets of the system.

There are a significant number of combinations in which the analysis system 10 can evaluate a system 11-13. A primary purpose the analysis system 10 is help the system 11-13 become more self-healing, more self-updating, more self-protecting, more self-recovering, more self-evaluating, more self-aware, more secure, more efficient, more adaptive, and/or more self-responding. By discovering the strengths, weaknesses, vulnerabilities, and other system limitations in a way that the system itself cannot do effectively, the analysis system 10 significantly improves the usefulness, security, and efficiency of systems 11-13.

Figure 2A:
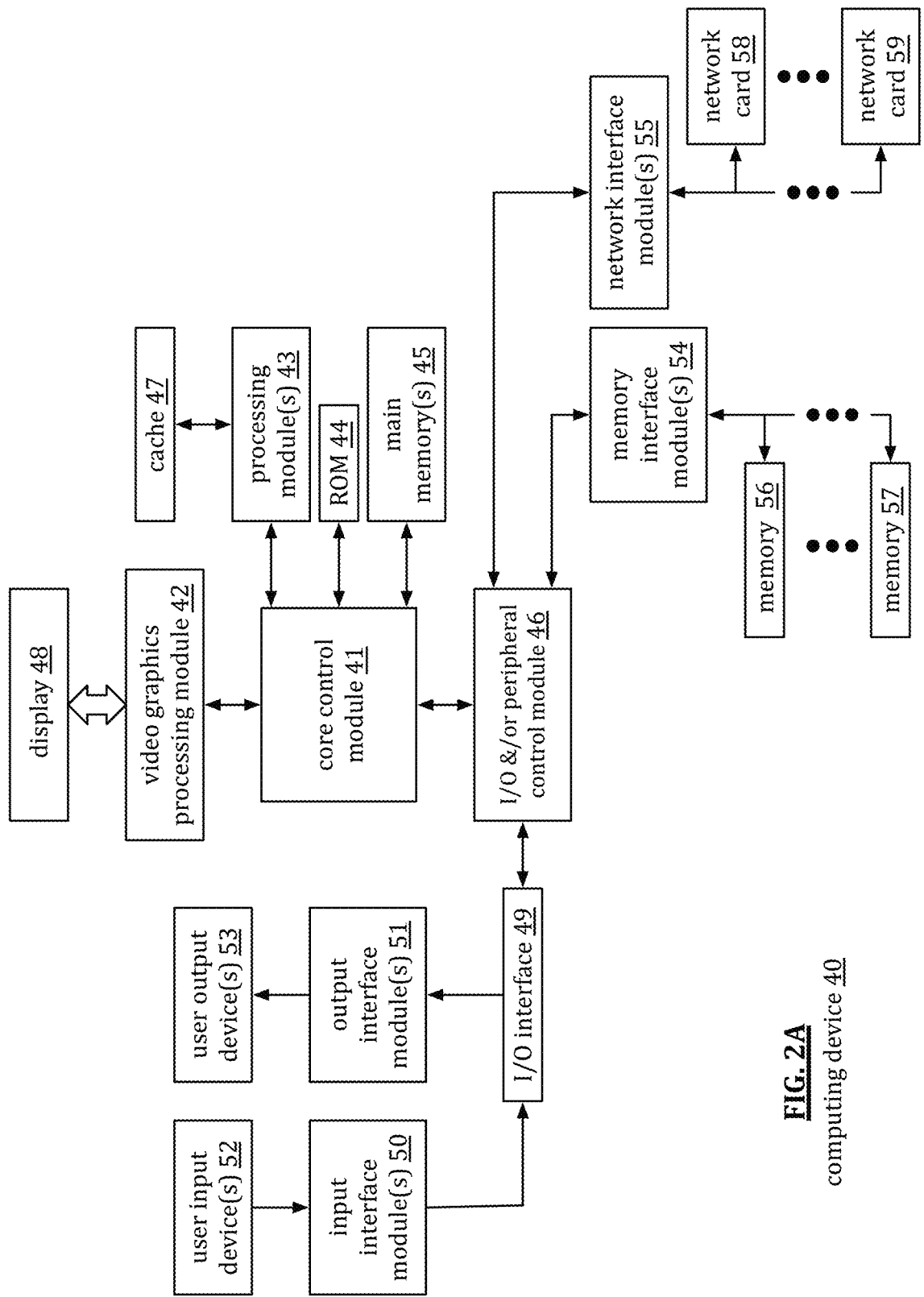

FIG. 2A is a schematic block diagram of an embodiment of a computing device 40 that includes a plurality of computing resources. The computing resource include a core control module 41, one or more processing modules 43, one or more main memories 45, a read only memory (ROM) 44 for a boot up sequence, cache memory 47, a video graphics processing module 42, a display 48 (optional), an Input-Output (I/O) peripheral control module 46, an I/O interface module 49 (which could be omitted), one or more input interface modules 50, one or more output interface modules 51, one or more network interface modules 55, and one or more memory interface modules 54. A processing module 43 is described in greater detail at the end of the detailed description of the invention section and, in an alternative embodiment, has a direction connection to the main memory 45. In an alternate embodiment, the core control module 41 and the I/O and/or peripheral control module 46 are one module, such as a chipset, a quick path interconnect (QPI), and/or an ultra-path interconnect (UPI).

Each of the main memories 45 includes one or more Random Access Memory (RAM) integrated circuits, or chips. For example, a main memory 45 includes four DDR4 ($4^{th}$ generation of double data rate) RAM chips, each running at a rate of 2,400 MHz. In general, the main memory 45 stores data and operational instructions most relevant for the processing module 43. For example, the core control module 41 coordinates the transfer of data and/or operational instructions between the main memory 45 and the memory 56-57. The data and/or operational instructions retrieve from memory 56-57 are the data and/or operational instructions requested by the processing module or will most likely be needed by the processing module. When the processing module is done with the data and/or operational instructions in main memory, the core control module 41 coordinates sending updated data to the memory 56-57 for storage.

The memory 56-57 includes one or more hard drives, one or more solid state memory chips, and/or one or more other large capacity storage devices that, in comparison to cache memory and main memory devices, is/are relatively inexpensive with respect to cost per amount of data stored. The memory 56-57 is coupled to the core control module 41 via the I/O and/or peripheral control module 46 and via one or more memory interface modules 54. In an embodiment, the I/O and/or peripheral control module 46 includes one or more Peripheral Component Interface (PCI) buses to which peripheral components connect to the core control module 41. A memory interface module 54 includes a software driver and a hardware connector for coupling a memory device to the I/O and/or peripheral control module 46. For example, a memory interface 54 is in accordance with a Serial Advanced Technology Attachment (SATA) port.

The core control module 41 coordinates data communications between the processing module(s) 43 and the network(s) 14 via the I/O and/or peripheral control module 46, the network interface module(s) 55, and a network card 58 or 59. A network card 58 or 59 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 55 includes a software driver and a hardware connector for coupling the network card to the I/O and/or peripheral control module 46. For example, the network interface module 55 is in accordance with one or more versions of IEEE 802.11, cellular telephone protocols, 10/100/1000 Gigabit LAN protocols, etc.

The core control module 41 coordinates data communications between the processing module(s) 43 and input device(s) 52 via the input interface module(s) 50, the I/O interface 49, and the I/O and/or peripheral control module 46. An input device 52 includes a keypad, a keyboard, control switches, a touchpad, a microphone, a camera, etc. An input interface module 50 includes a software driver and a hardware connector for coupling an input device to the I/O and/or peripheral control module 46. In an embodiment, an input interface module 50 is in accordance with one or more Universal Serial Bus (USB) protocols.

The core control module 41 coordinates data communications between the processing module(s) 43 and output device(s) 53 via the output interface module(s) 51 and the I/O and/or peripheral control module 46. An output device 53 includes a speaker, auxiliary memory, headphones, etc. An output interface module 51 includes a software driver and a hardware connector for coupling an output device to the I/O and/or peripheral control module 46. In an embodiment, an output interface module 46 is in accordance with one or more audio codec protocols.

The processing module 43 communicates directly with a video graphics processing module 42 to display data on the display 48. The display 48 includes an LED (light emitting diode) display, an LCD (liquid crystal display), and/or other type of display technology. The display has a resolution, an aspect ratio, and other features that affect the quality of the display. The video graphics processing module 42 receives data from the processing module 43, processes the data to produce rendered data in accordance with the characteristics of the display, and provides the rendered data to the display 48.

FIG. 2B is a schematic block diagram of an embodiment of a computing device 40 that includes a plurality of computing resources similar to the computing resources of FIG. 2A with the addition of one or more cloud memory interface modules 60, one or more cloud processing interface modules 61, cloud memory 62, and one or more cloud processing modules 63. The cloud memory 62 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 63 is similar to processing module 43 but is remoted from the core control module and is accessed via a network.

Figure 2C:
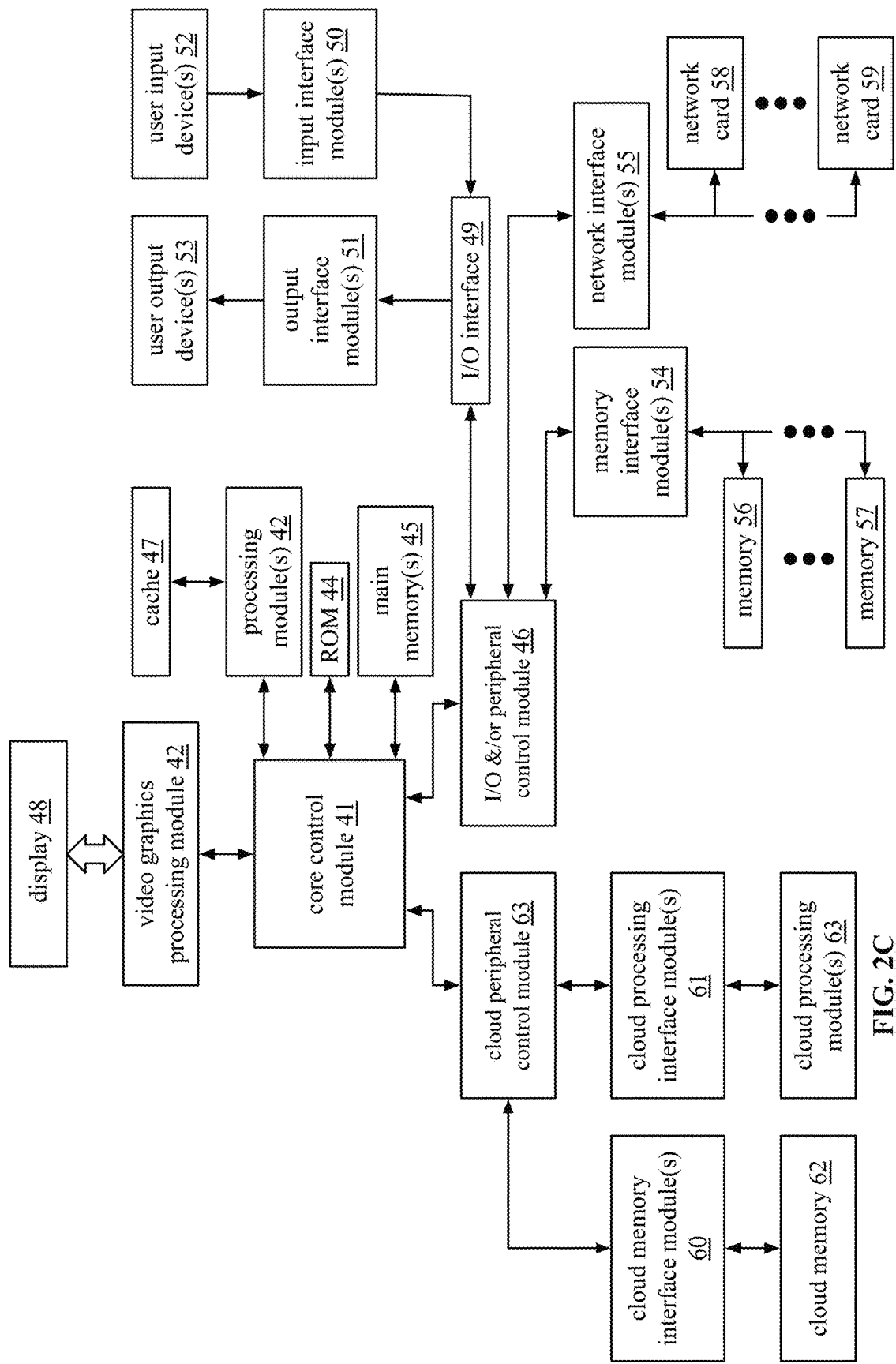

FIG. 2C is a schematic block diagram of an embodiment of a computing device 40 that includes a plurality of computing resources similar to the computing resources of FIG. 2B with a change in how the cloud memory interface module(s) 60 and the cloud processing interface module(s) 61 are coupled to the core control module 41. In this embodiment, the interface modules 60 and 61 are coupled to a cloud peripheral control module 63 that directly couples to the core control module 41.

Figure 2D:
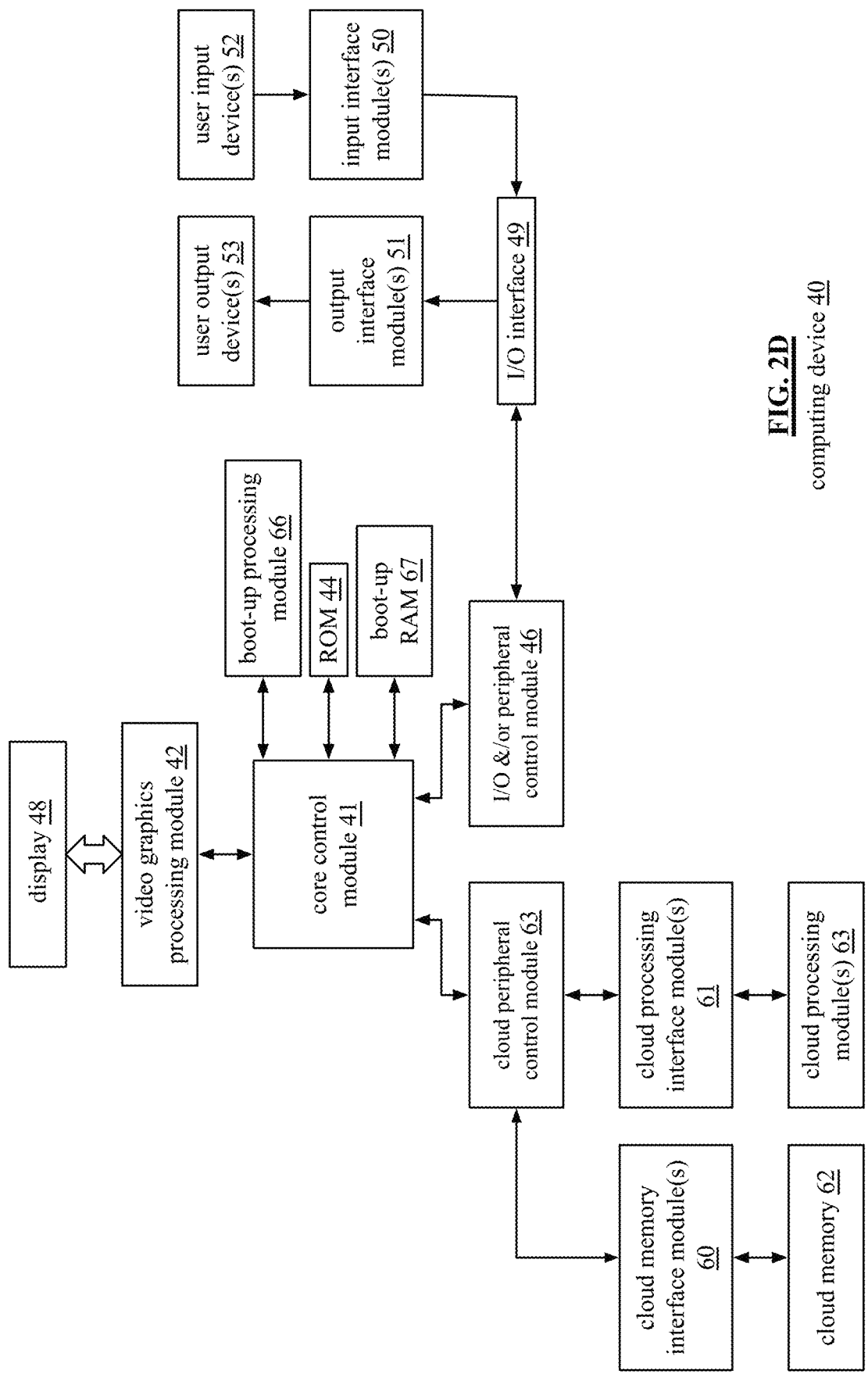

FIG. 2D is a schematic block diagram of an embodiment of a computing device 40 that includes a plurality of computing resources, which includes include a core control module 41, a boot up processing module 66, boot up RAM 67, a read only memory (ROM) 45, a video graphics processing module 42, a display 48 (optional), an Input-Output (I/O) peripheral control module 46, one or more input interface modules 50, one or more output interface modules 51, one or more cloud memory interface modules 60, one or more cloud processing interface modules 61, cloud memory 62, and cloud processing module(s) 63.

In this embodiment, the computing device 40 includes enough processing resources (e.g., module 66, ROM 44, and RAM 67) to boot up. Once booted up, the cloud memory 62 and the cloud processing module(s) 63 function as the computing device's memory (e.g., main and hard drive) and processing module.

FIG. 3A is schematic block diagram of an embodiment of a computing entity 16 that includes a computing device 40 (e.g., one of the embodiments of FIGS. 2A-2D). A computing device may function as a user computing device, a server, a system computing device, a data storage device, a data security device, a networking device, a user access device, a cell phone, a tablet, a laptop, a printer, a game console, a satellite control box, a cable box, etc.

FIG. 3B is schematic block diagram of an embodiment of a computing entity 16 that includes two or more computing devices 40 (e.g., two or more from any combination of the embodiments of FIGS. 2A-2D). The computing devices 40 perform the functions of a computing entity in a peer processing manner (e.g., coordinate together to perform the functions), in a master-slave manner (e.g., one computing device coordinates and the other support it), and/or in another manner.

FIG. 3C is schematic block diagram of an embodiment of a computing entity 16 that includes a network of computing devices 40 (e.g., two or more from any combination of the embodiments of FIGS. 2A-2D). The computing devices are coupled together via one or more network connections (e.g., WAN, LAN, cellular data, WLAN, etc.) and preform the functions of the computing entity.

FIG. 3D is schematic block diagram of an embodiment of a computing entity 16 that includes a primary computing device (e.g., any one of the computing devices of FIGS. 2A-2D), an interface device (e.g., a network connection), and a network of computing devices 40 (e.g., one or more from any combination of the embodiments of FIGS. 2A-2D). The primary computing device utilizes the other computing devices as co-processors to execute one or more the functions of the computing entity, as storage for data, for other data processing functions, and/or storage purposes.

FIG. 3E is schematic block diagram of an embodiment of a computing entity 16 that includes a primary computing device (e.g., any one of the computing devices of FIGS. 2A-2D), an interface device (e.g., a network connection) 70, and a network of computing resources 71 (e.g., two or more resources from any combination of the embodiments of FIGS. 2A-2D). The primary computing device utilizes the computing resources as co-processors to execute one or more the functions of the computing entity, as storage for data, for other data processing functions, and/or storage purposes.

Figure 4:
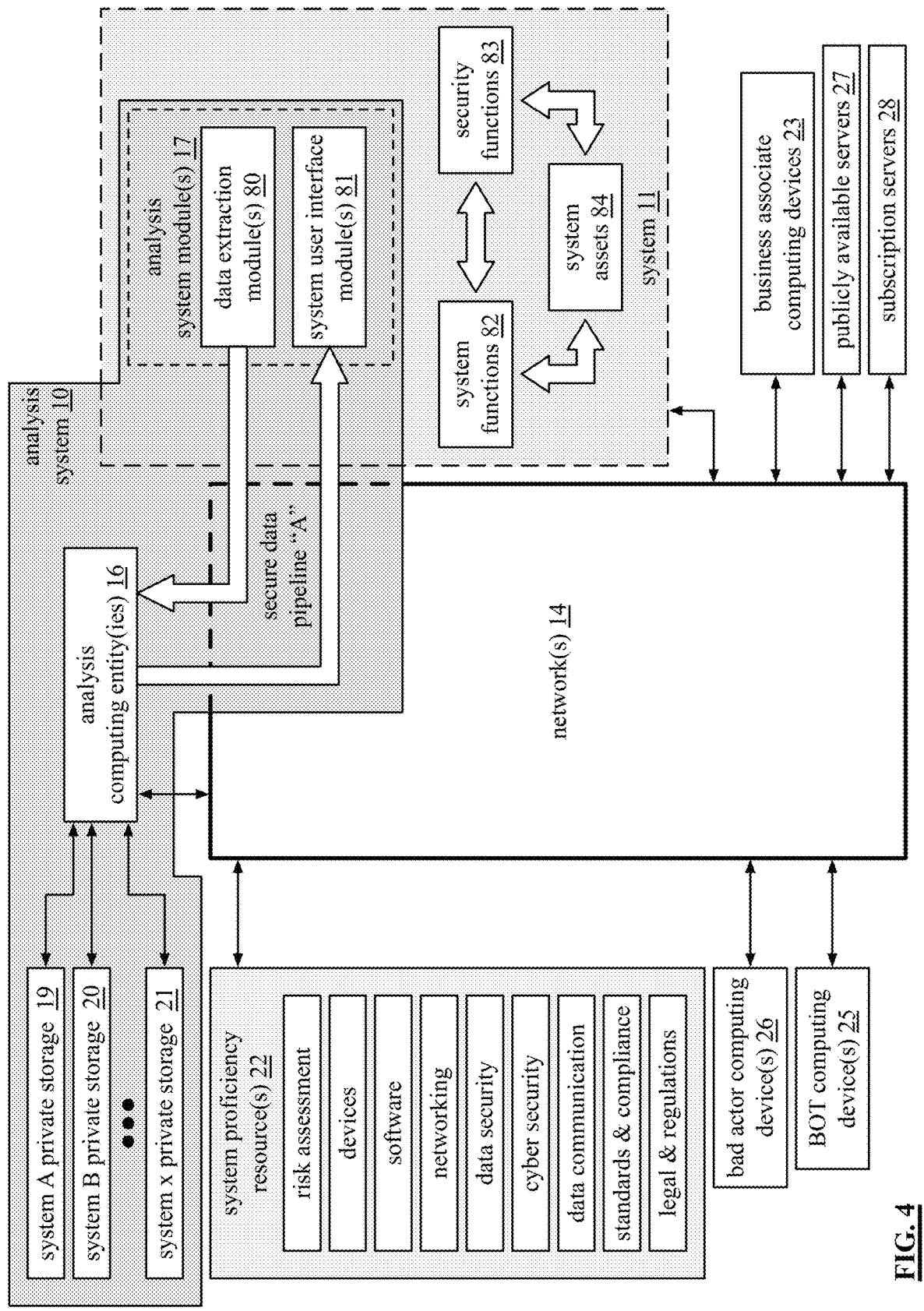
FIG. 4 is a schematic block diagram of another embodiment of a networked environment that includes a system coupled to an analysis system in accordance with the present disclosure.

FIG. 4 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 1 with the inclusion of detail within the system proficiency resource(s) 22, with inclusion of detail within the system 11, and with the inclusion of detail within the analysis system module 17.

In addition to the discussion with respect FIG. 1, a system proficiency resource 22 is a computing device that provides information regarding best-in-class assets, best-in-class practices, known protocols, leading edge information, and/or established guidelines regarding risk assessment, devices, software, networking, data security, cybersecurity, and/or data communication. A system proficiency resource 22 is a computing device that may also provide information regarding standards, information regarding compliance requirements, information regarding legal requirements, and/or information regarding regulatory requirements.

The system 11 is shown to include three inter-dependent modes: system functions 82, security functions 83, and system assets 84. System functions 82 correspond to the functions the system executes to support the organization's business requirements. Security functions 83 correspond to the functions the system executes to support the organization's security requirements. The system assets 84 are the hardware and/or software platforms that support system functions 82 and/or the security functions 83.

The analysis system module 17 includes one or more data extraction modules 80 and one or more system user interface modules 81. A data extraction module 80, which will be described in greater detail with reference to one or more subsequent figures, gathers data from the system for analysis by the analysis system 10. A system user interface module 81 provides a user interface between the system 11 and the analysis system 10 and functions to provide user information to the analysis system 10 and to receive output data from the analysis system. The system user interface module 81 will be described in greater detail with reference to one or more subsequent figures.

Figure 5:
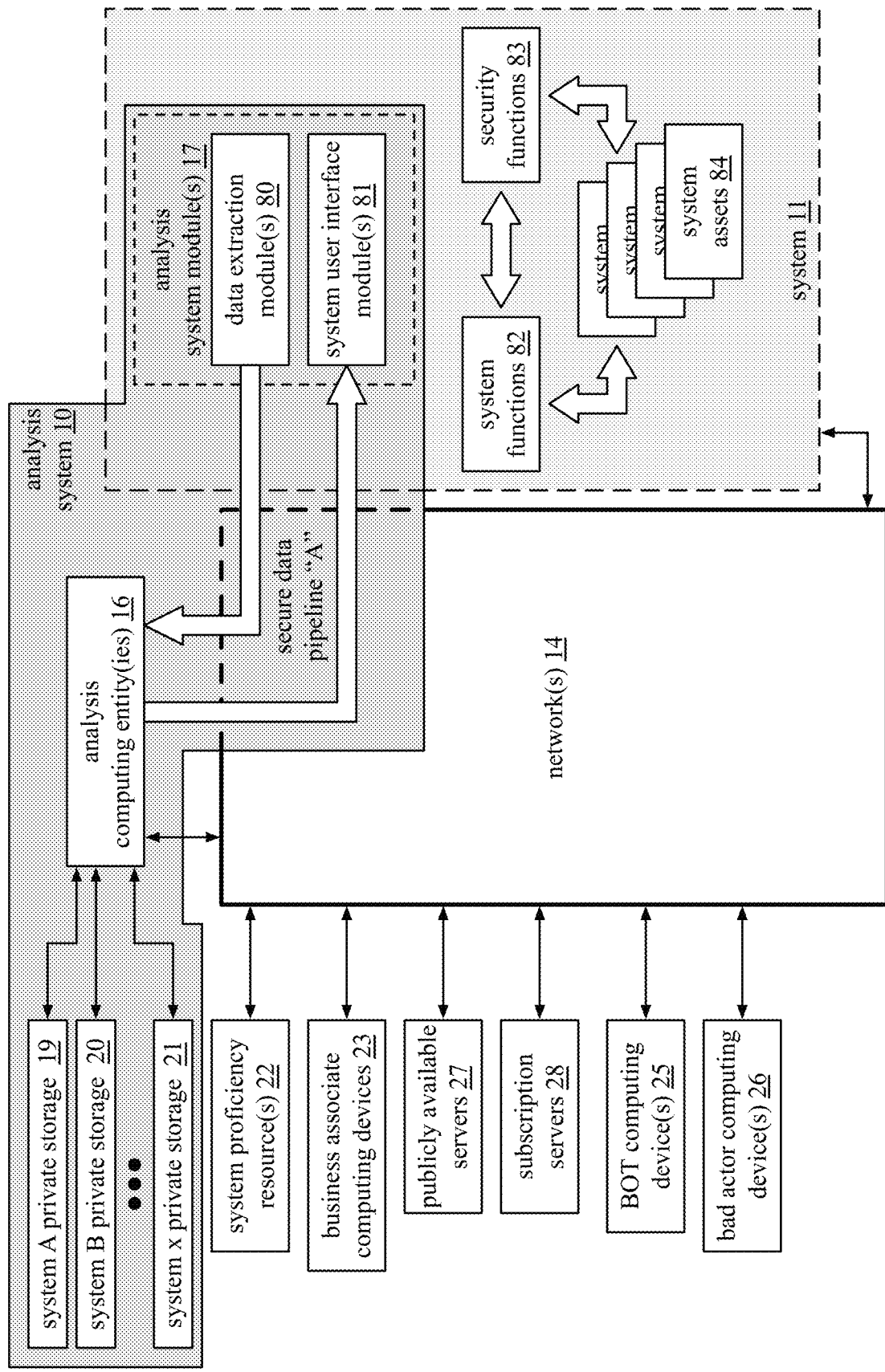
FIG. 5 is a schematic block diagram of another embodiment of a networked environment that includes a system coupled to an analysis system in accordance with the present disclosure.

FIG. 5 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 4 with the inclusion of additional detail within the system 11.

In this embodiment, the system 11 includes a plurality of sets of system assets to support the system functions 82 and/or the security functions 83. For example, a set of system assets supports the system functions 82 and/or security functions 83 for a particular business segment (e.g., a department within the organization). As another example, a second set of system assets supports the security functions 83 for a different business segment and a third set of system assets supports the system functions 82 for the different business segment.

Figure 6:
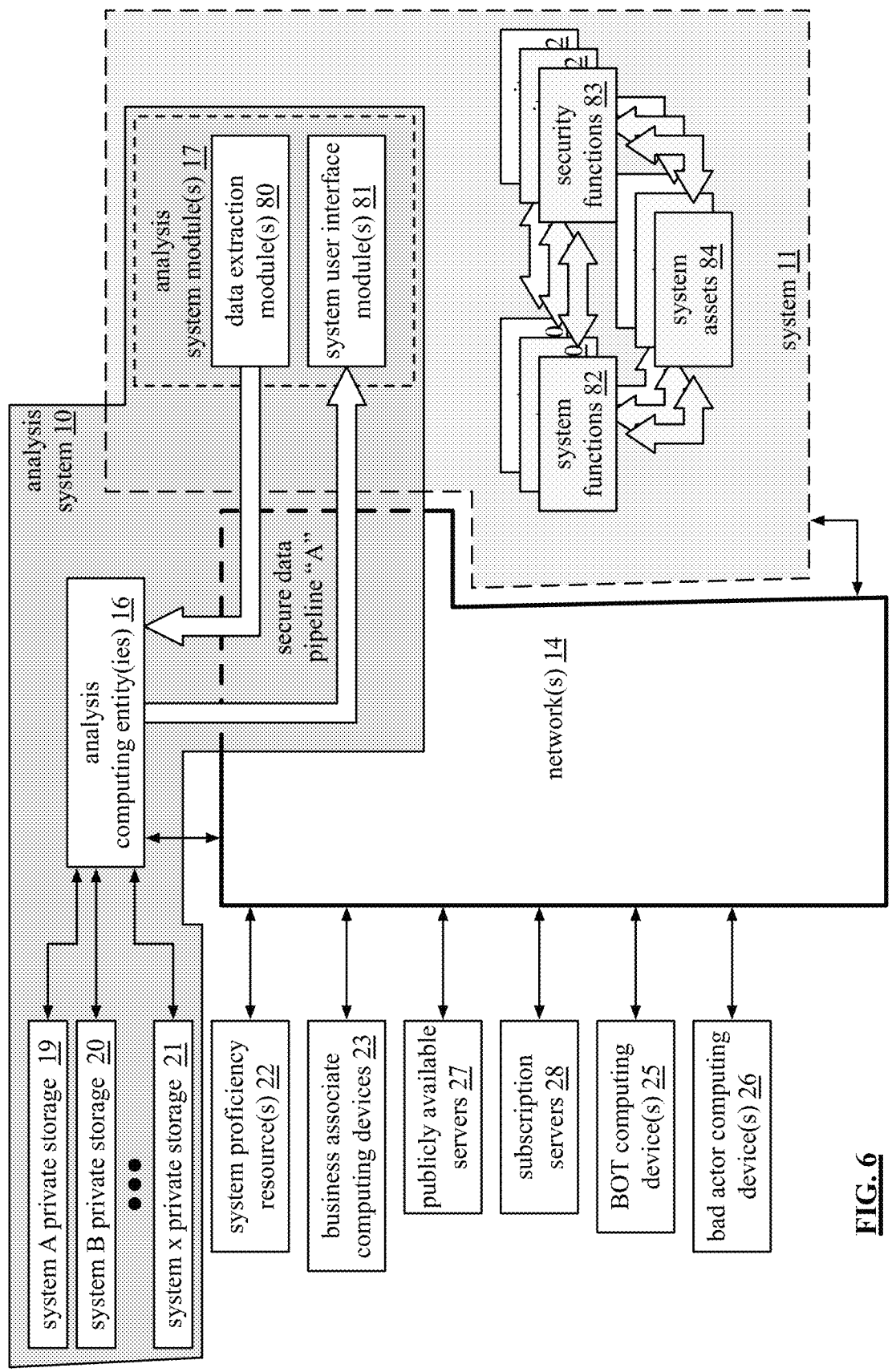
FIG. 6 is a schematic block diagram of another embodiment of a networked environment that includes a system coupled to an analysis system in accordance with the present disclosure.

FIG. 6 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 5 with the inclusion of additional detail within the system 11.

In this embodiment, the system 11 includes a plurality of sets of system assets 84, system functions 82, and security functions 83. For example, a set of system assets 84, system functions 82, and security functions 83 supports one department in an organization and a second set of system assets 84, system functions 82, and security functions 83 supports another department in the organization.

Figure 7:
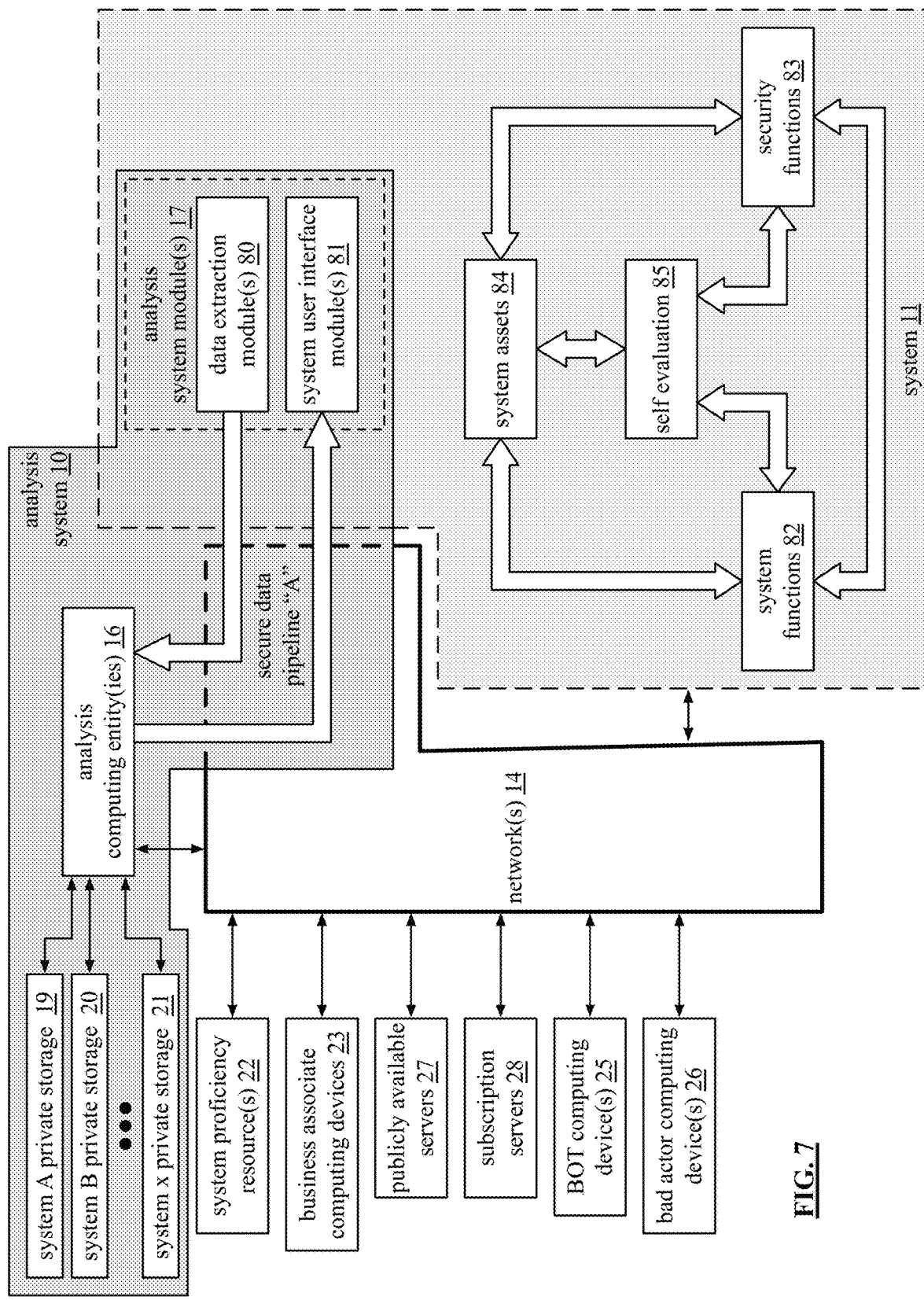
FIG. 7 is a schematic block diagram of another embodiment of a networked environment that includes a system coupled to an analysis system in accordance with the present disclosure.

FIG. 7 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 4 with the inclusion of additional detail within the system 11.

In this embodiment, the system 11 includes system assets 84, system functions 82, security functions 83, and self-evaluation functions 85. The self-evaluation functions 85 are supported by the system assets 84 and are used by the system to evaluate its assets, is system functions, and its security functions. In general, self-evaluates looks at system's ability to analyze itself for self-determining it's understanding (self-aware) of the system; self-determining the implementation of the system, and/or self-determining operation of the system. In addition, the self-evaluation may further consider the system's ability to self-heal, self-update, self-protect, self-recover, self-evaluate, and/or self-respond. The analysis system 10 can evaluate the understanding, implementation, and/or operation of the self-evaluation functions.

Figure 8:
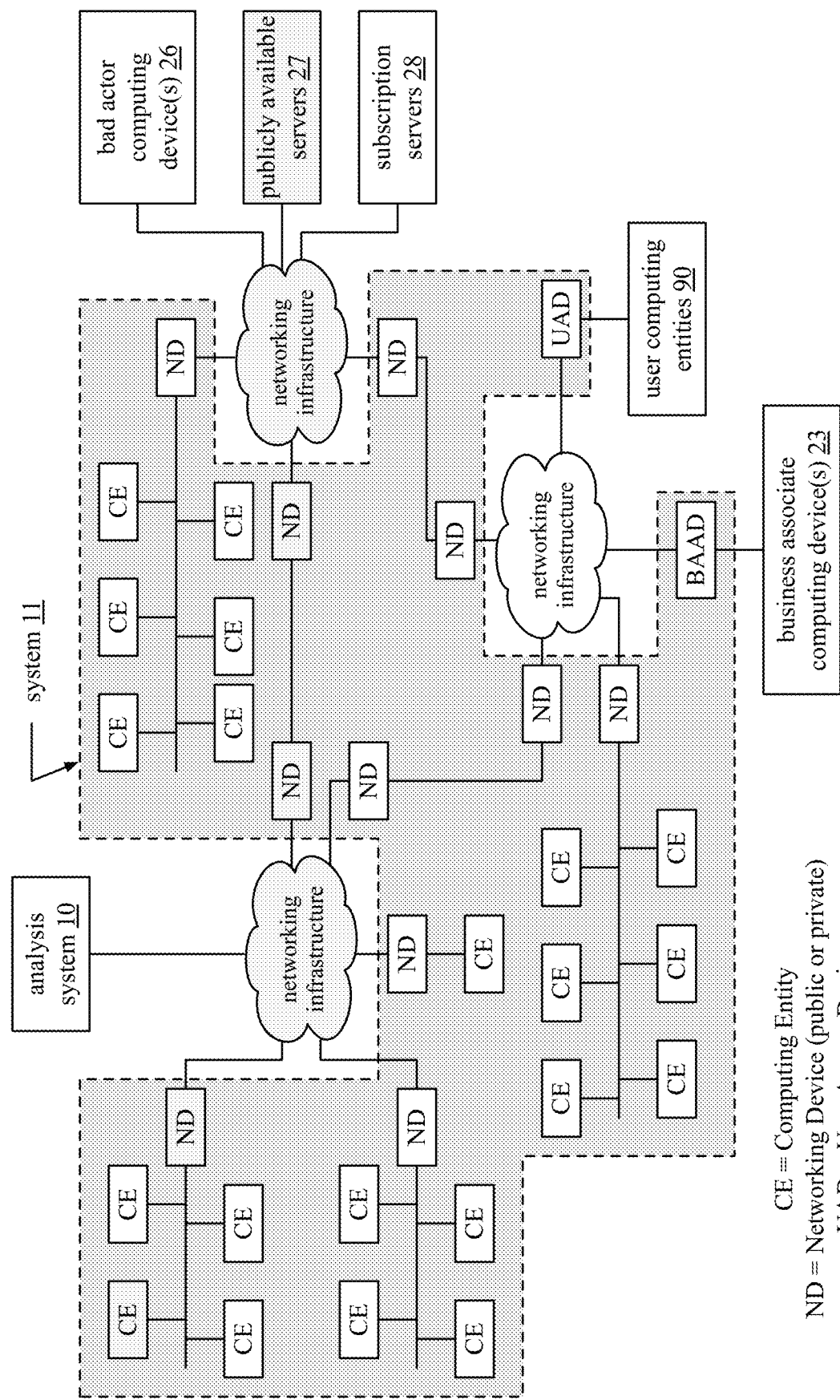
FIG. 8 is a schematic block diagram of another embodiment of a networked environment having a system that includes a plurality of system elements in accordance with the present disclosure.

FIG. 8 is a schematic block diagram of another embodiment of a networked environment having a system 11 (or system 12 or system 13), the analysis system 10, one or more networks represented by networking infrastructure, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of physical assets dispersed throughout a geographic region (e.g., a building, a town, a county, a state, a country). Each of the physical assets includes hardware and software to perform its respective functions within the system. A physical asset is a computing entity (CE), a public or provide networking device (ND), a user access device (UAD), or a business associate access device (BAAD).

A computing entity may be a user device, a system admin device, a server, a printer, a data storage device, etc. A network device may be a local area network device, a network card, a wide area network device, etc. A user access device is a portal that allows authorizes users of the system to remotely access the system. A business associated access device is a portal that allows authorized business associates of the system access the system.

Some of the computing entities are grouped via a common connection to a network device, which provides the group of computing entities access to other parts of the system and/or the internet. For example, the highlighted computing entity may access a publicly available server 25 via network devices coupled to the network infrastructure. The analysis system 10 can evaluation whether this is an appropriate access, the understanding of this access, the implementation to enable this access, and/or the operation of the system to support this access.

Figure 9:
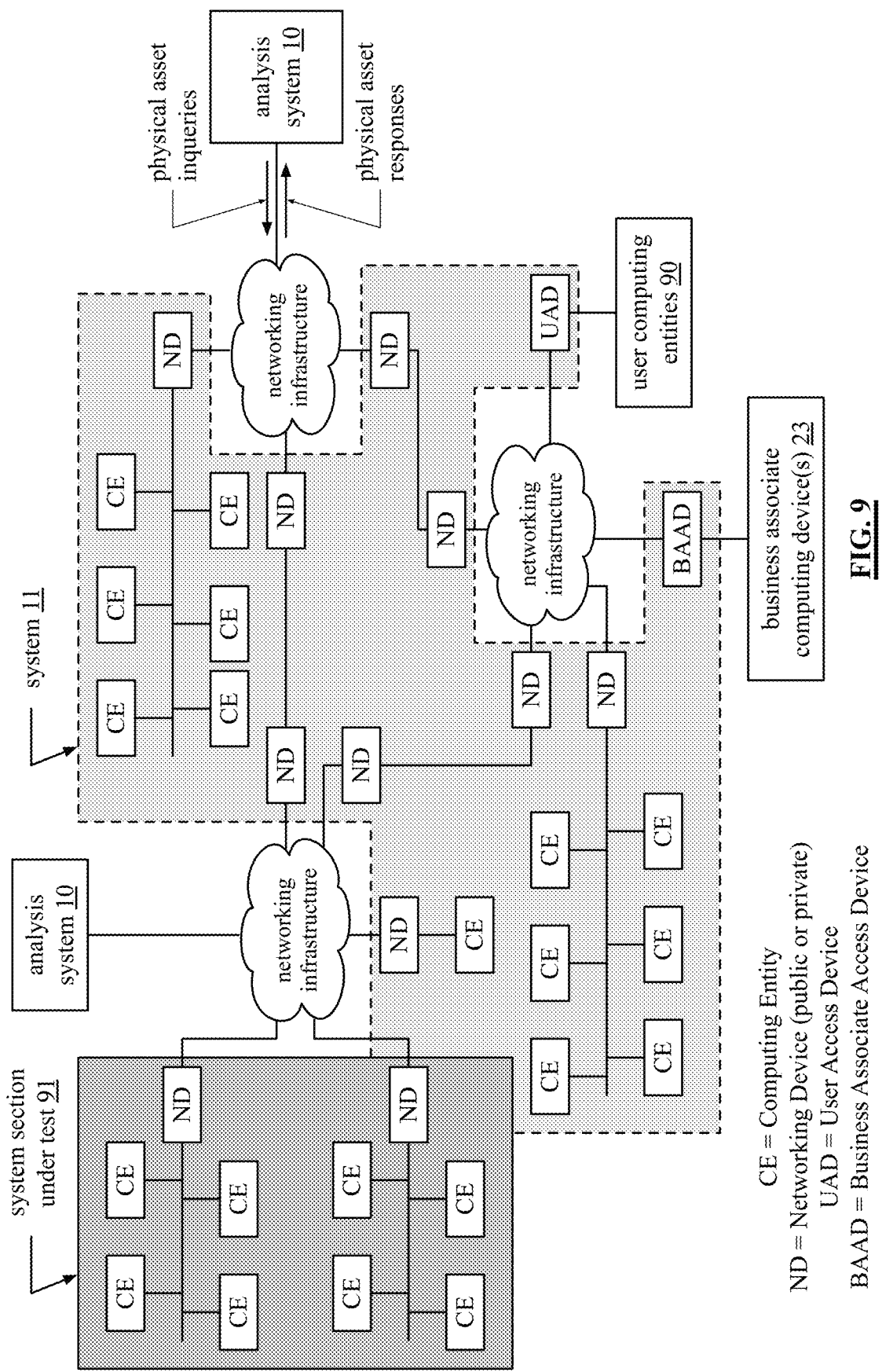
FIG. 9 is a schematic block diagram of an example of a system section of a system selected for evaluation in accordance with the present disclosure.

FIG. 9 is a schematic block diagram of an example of a system section of a system selected for evaluation similar to FIG. 8. In this example, only a portion of the system is being tested, i.e., system section under test 91. As such, the analysis system 10 only evaluates assets, system functions, and/or security functions related to assets within the system section under test 91.

Figure 10:
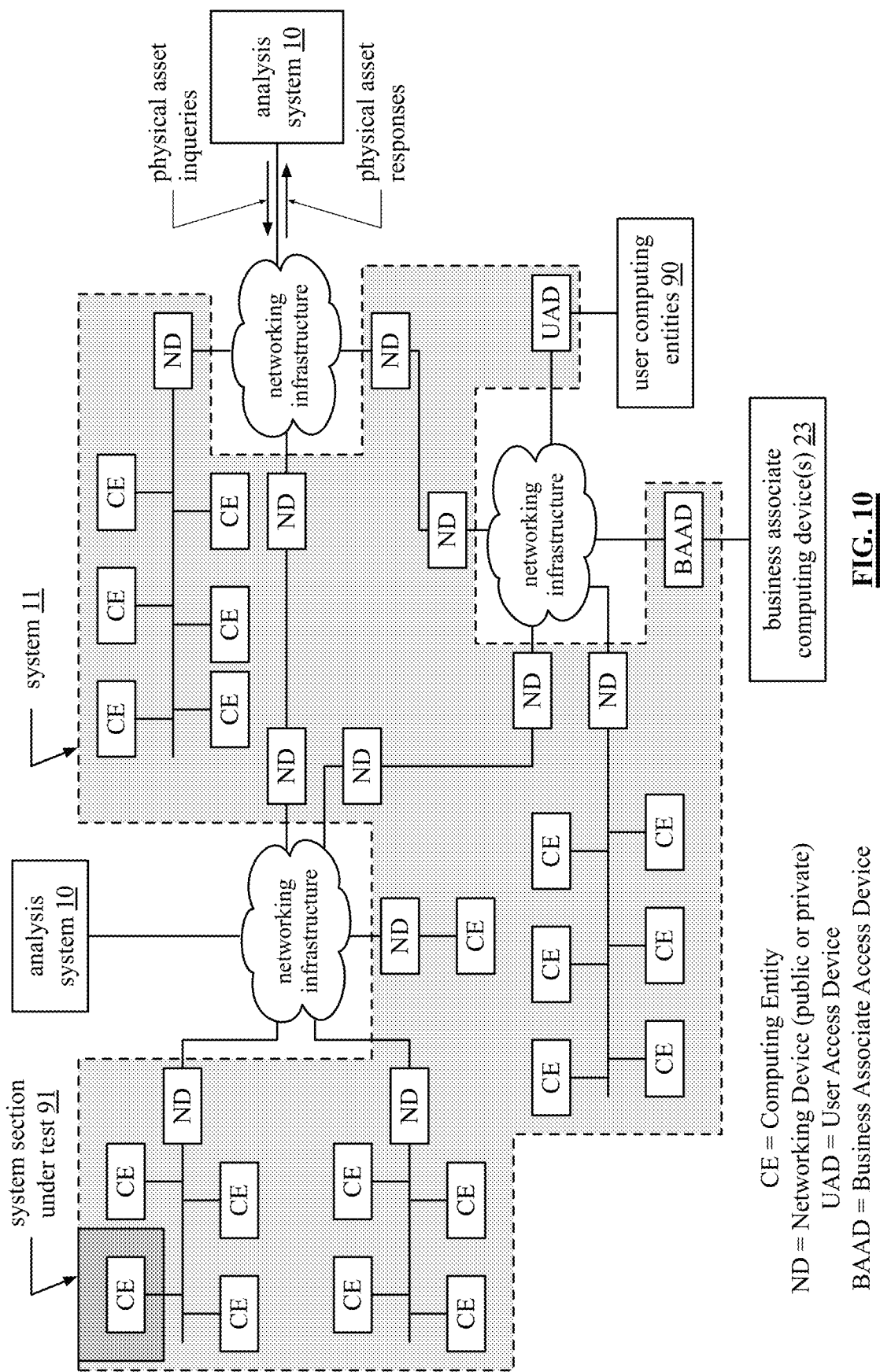
FIG. 10 is a schematic block diagram of another example of a system section of a system selected for evaluation in accordance with the present disclosure.

FIG. 10 is a schematic block diagram of another example of a system section of a system selected for evaluation similar to FIG. 9. In this example, a single computing entity (CE) is being tested, i.e., system section under test 91. As such, the analysis system 10 only evaluates assets, system functions, and/or security functions related to the selected computing entity.

Figure 11:
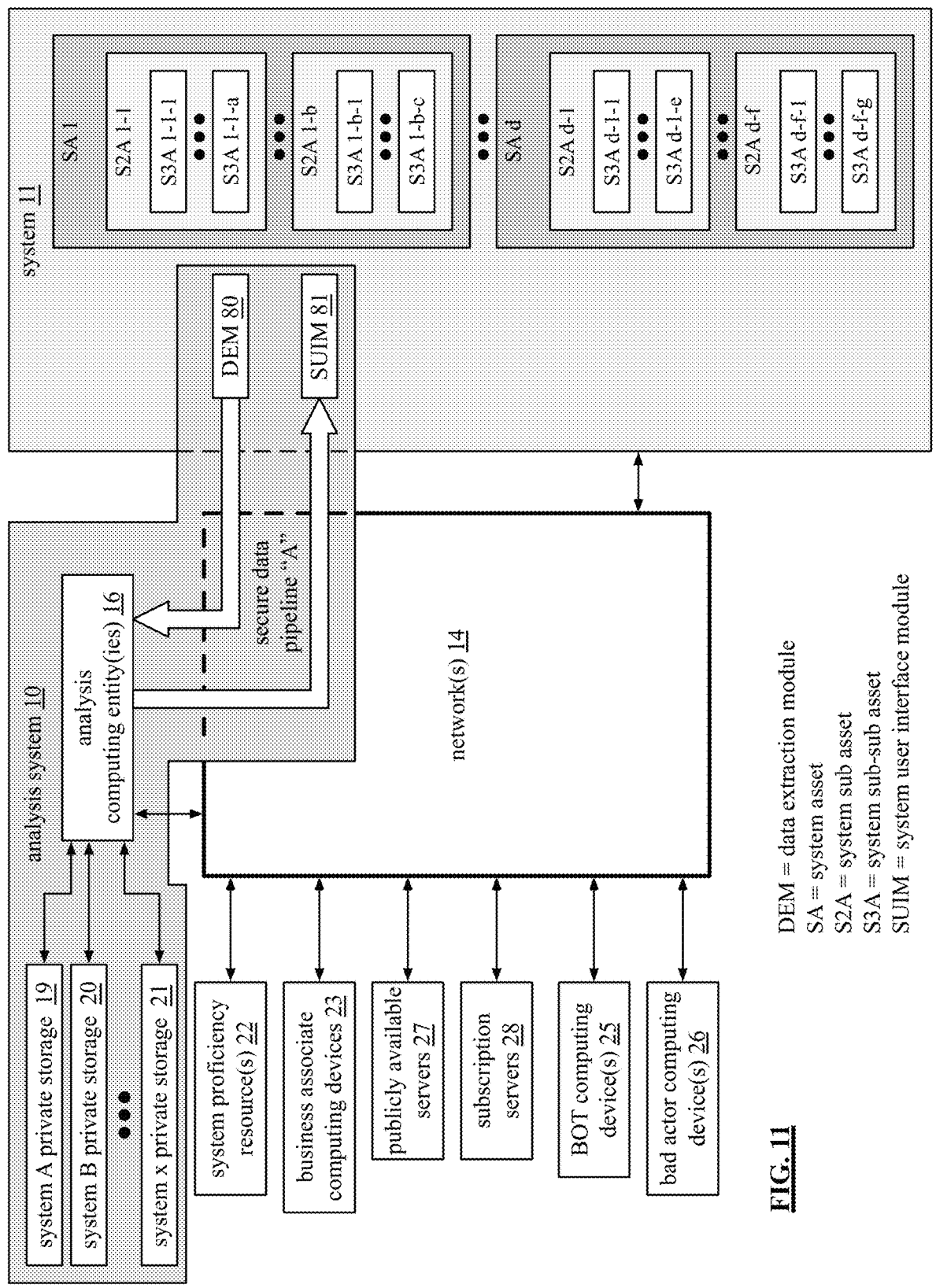
FIG. 11 is a schematic block diagram of an embodiment of a networked environment having a system that includes a plurality of system assets coupled to an analysis system in accordance with the present disclosure.

FIG. 11 is a schematic block diagram of an embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of system assets (SA). A system asset (SA) may include one or more system sub assets (S2A) and a system sub asset (S2A) may include one or more system sub-sub assets (S3A). While being a part of the analysis system 10, at least one data extraction module (DEM) 80 and at least one system user interface module (SUIM) 81 are installed on the system 11.

A system element includes one or more system assets. A system asset (SA) may be a physical asset or a conceptual asset as previously described. As an example, a system element includes a system asset of a computing device. The computing device, which is the SA, includes user applications and an operating system; each of which are sub assets of the computing device (S2A). In addition, the computing device includes a network card, memory devices, etc., which are sub assets of the computing device (S2A). Documents created from a word processing user application are sub assets of the word processing user application (S3A) and sub-sub assets of the computing device.

As another example, the system asset (SA) includes a plurality of computing devices, printers, servers, etc. of a department of the organization operating the system 11. In this example, a computing device is a sub asset of the system asset and the software and hardware of the computing devices are sub-sub assets.

The analysis system 10 may evaluate understanding, implementation, and/or operation of one or more system assets, one or more system sub assets, and/or one or more system sub-sub assets, as an asset, as it supports system functions 82, and/or as it supports security functions. The evaluation may be to produce an evaluation rating, to identify deficiencies, and/or to auto-correct deficiencies.

Figure 12:
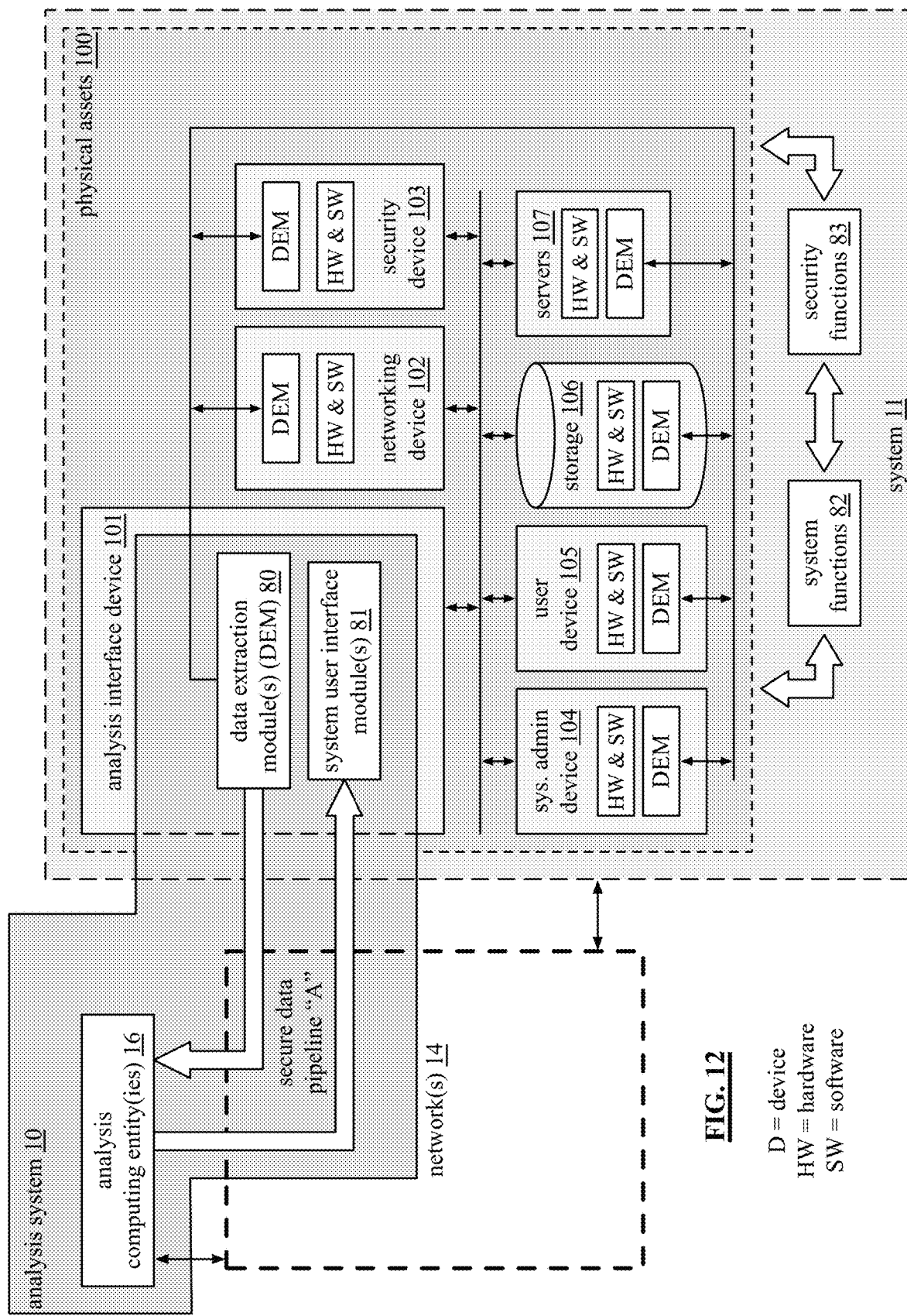
FIG. 12 is a schematic block diagram of an embodiment of a system that includes a plurality of physical assets coupled to an analysis system in accordance with the present disclosure.

FIG. 12 is a schematic block diagram of an embodiment of a system 11 that includes a plurality of physical assets 100 coupled to an analysis system 100. The physical assets 100 include an analysis interface device 101, one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, device, drivers, and/or system). A device may further include a data extraction module (DEM).

The analysis interface device 101 includes a data extraction module (DEM) 80 and the system user interface module 81 to provide connectivity to the analysis system 10. With the connectivity, the analysis system 10 is able to evaluate understanding, implementation, and/or operation of each device, or portion thereof, as an asset, as it supports system functions 82, and/or as it supports security functions. For example, the analysis system 10 evaluates the understanding of networking devices 102 as an asset. As a more specific example, the analysis system 10 evaluates how well the networking devices 102, its hardware, and its software are understood within the system and/or by the system administrators. The evaluation includes how well are the networking devices 102, its hardware, and its software documented; how well are they implemented based on system requirements; how well do they operate based on design and/or system requirements; how well are they maintained per system policies and/or procedures; how well are their deficiencies identified; and/or how well are their deficiencies auto-corrected.

Figure 13:
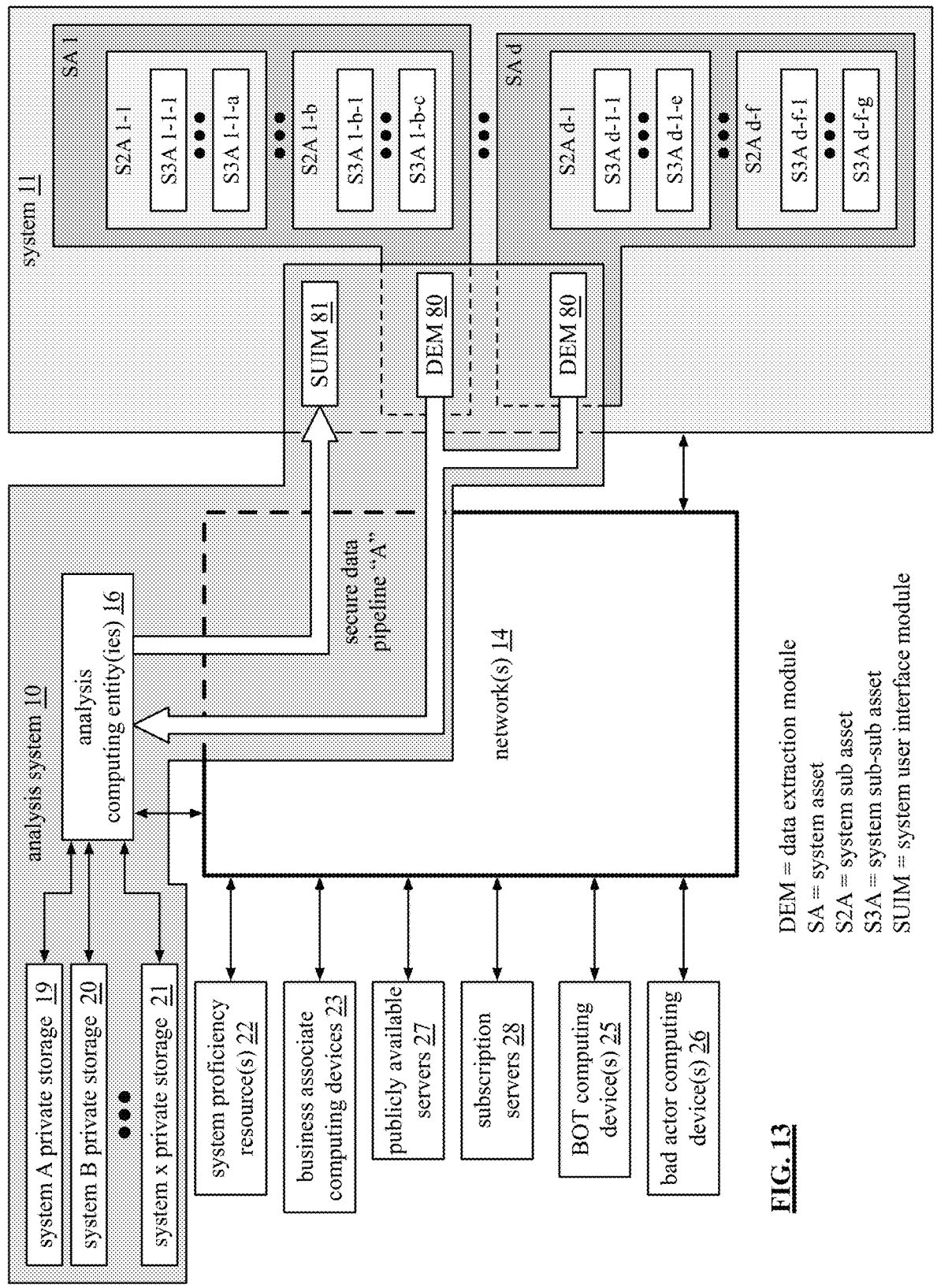
FIG. 13 is a schematic block diagram of another embodiment of a networked environment having a system that includes a plurality of system assets coupled to an analysis system in accordance with the present disclosure.

FIG. 13 is a schematic block diagram of another embodiment of a networked environment having a system 11 that includes a plurality of system assets coupled to an analysis system 10. This embodiment is similar to the embodiment of FIG. 11 with the addition of additional data extraction modules (DEM) 80. In this embodiment, each system asset (SA) is affiliated with its own DEM 80. This allows the analysis system 10 to extract data more efficiently than via a single DEM. A further extension of this embodiment is that each system sub asset (S2A) could have its own DEM 80. As yet a further extension, each system sub-sub asset (S3A) could have its own DEM 80.

Figure 14:
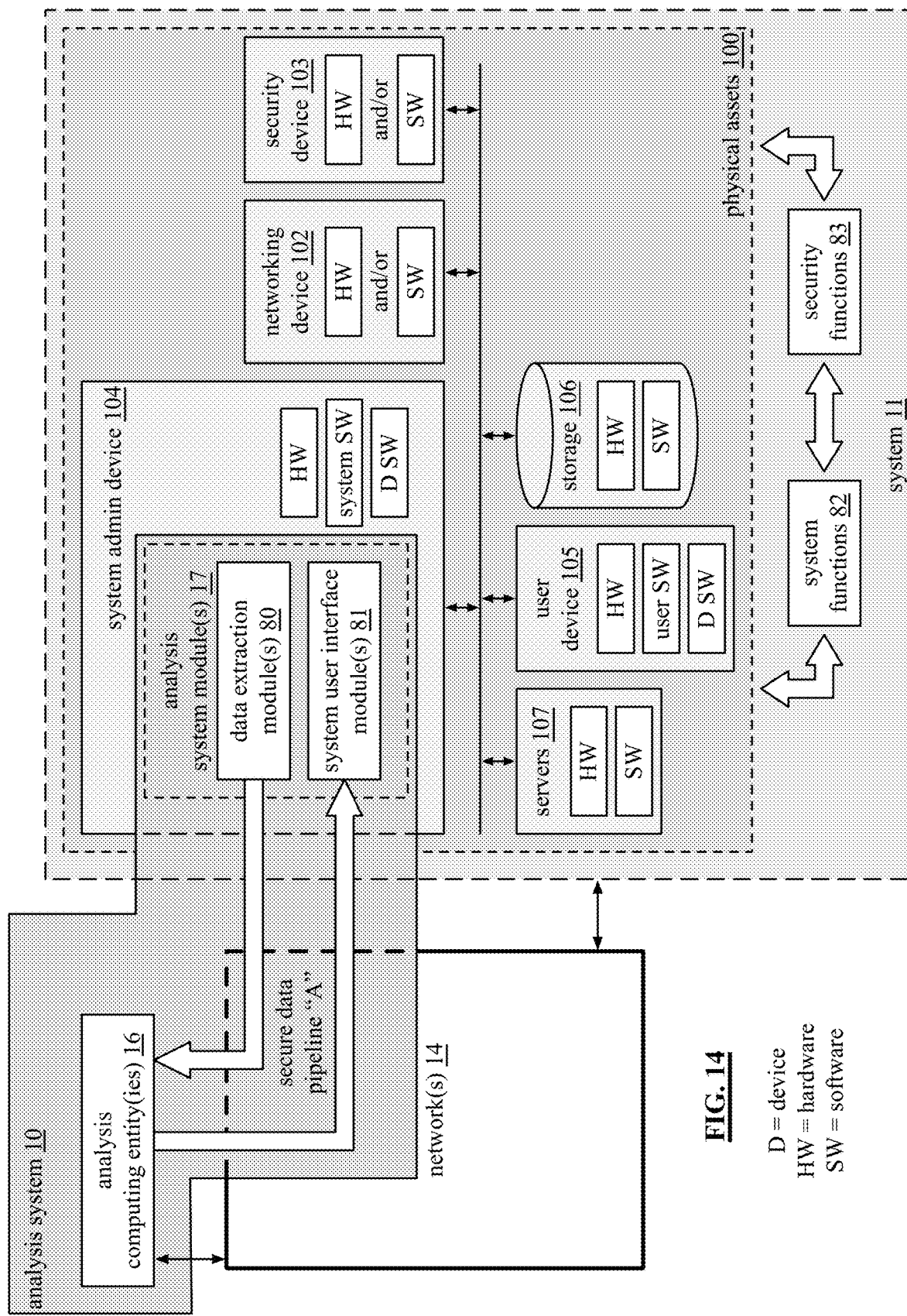
FIG. 14 is a schematic block diagram of another embodiment of a system that includes a plurality of physical assets coupled to an analysis system in accordance with the present disclosure.

FIG. 14 is a schematic block diagram of another embodiment of a system 11 physical assets 100 coupled to an analysis system 100. The physical assets 100 include one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, system, and/or device).

The system admin device 104 includes one or more analysis system modules 17, which includes a data extraction module (DEM) 80 and the system user interface module 81 to provide connectivity to the analysis system 10. With the connectivity, the analysis system 10 is able to evaluate understanding, implementation, and/or operation of each device, or portion thereof, as an asset, as it supports system functions 82, and/or as it supports security functions. For example, the analysis system 10 evaluates the implementation of networking devices 102 to support system functions. As a more specific example, the analysis system 10 evaluates how well the networking devices 102, its hardware, and its software are implemented within the system to support one or more system functions (e g, managing network traffic, controlling network access per business guidelines, policies, and/or processes, etc.). The evaluation includes how well is the implementation of the networking devices 102, its hardware, and its software documented to support the one or more system functions; how well does their implementation support the one or more system functions; how well have their implementation to support the one or more system functions been verified in accordance with policies, processes, etc.; how well are they updated per system policies and/or procedures; how well are their deficiencies in support of the one or more system functions identified; and/or how well are their deficiencies in support of the one or more system functions auto-corrected.

Figure 15:
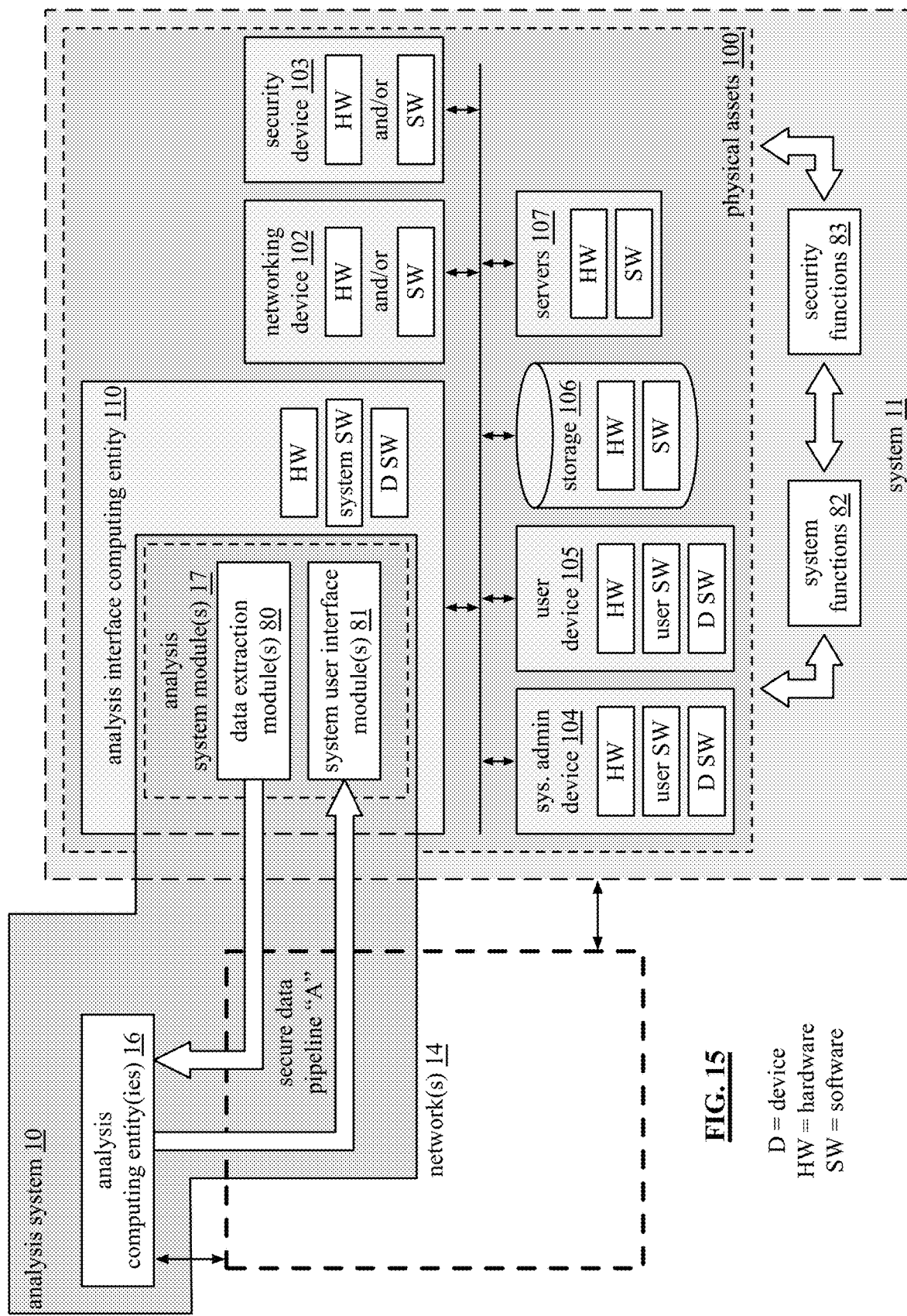
FIG. 15 is a schematic block diagram of another embodiment of a system that includes a plurality of physical assets coupled to an analysis system in accordance with the present disclosure.

FIG. 15 is a schematic block diagram of another embodiment of a system 11 that includes a plurality of physical assets 100 coupled to an analysis system 100. The physical assets 100 include an analysis interface device 101, one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, device, drivers, and/or system). This embodiment is similar to the embodiment of FIG. 12 with a difference being that the devices 102-107 do not include a data extraction module (DEM) as is shown in FIG. 12.

Figure 16:
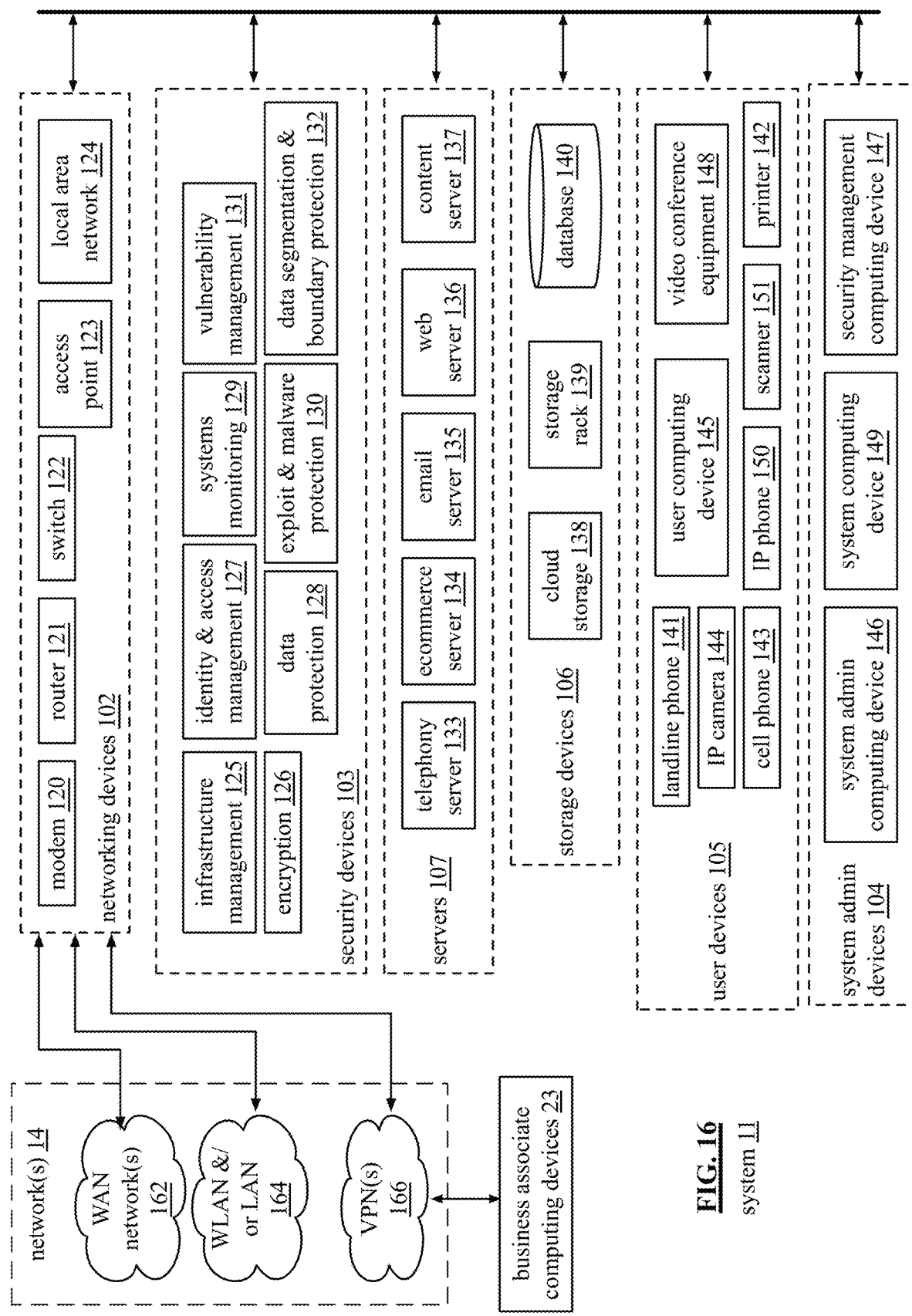
FIG. 16 is a schematic block diagram of another embodiment of a system that includes a plurality of physical assets in accordance with the present disclosure.

FIG. 16 is a schematic block diagram of another embodiment of a system 11 that includes networking devices 102, security devices 103, servers 107, storage devices 106, and user devices 105. The system 11 is coupled to the network 14, which provides connectivity to the busines associate computing device 23. The network 14 is shown to include one or more wide area networks (WAN) 162, one or more wireless LAN (WLAN) and/or LANs 164, one or more virtual private networks 166.

The networking devices 102 includes one or more modems 120, one or more routers 121, one or more switches 122, one or more access points 124, and/or one or more local area network cards 124. The analysis system 10 can evaluate the network devices 102 collectively as assets, as they support system functions, and/or as they support security functions. The analysis system 10 may also evaluate each network device individually as an asset, as it supports system functions, and/or as it supports security functions. The analysis system may further evaluate one or more network devices as part of the physical assets of a system aspect (e.g., the system or a portion thereof being evaluated with respect to one or more system criteria and one or more system modes).

The security devices 103 includes one or more infrastructure management tools 125, one or more encryption software programs 126, one or more identity and access management tools 127, one or more data protection software programs 128, one or more system monitoring tools 129, one or more exploit and malware protection tools 130, one or more vulnerability management tools 131, and/or one or more data segmentation and boundary tools 132. Note that a tool is a program that functions to develop, repair, and/or enhance other programs and/or hardware.

The analysis system 10 can evaluate the security devices 103 collectively as assets, as they support system functions, and/or as they support security functions. The analysis system 10 may also evaluate each security device individually as an asset, as it supports system functions, and/or as it supports security functions. The analysis system may further evaluate one or more security devices as part of the physical assets of a system aspect (e.g., the system or a portion thereof being evaluated with respect to one or more system criteria and one or more system modes).

The servers 107 include one or more telephony servers 133, one or more ecommerce servers 134, one or more email servers 135, one or more web servers 136, and/or one or more content servers 137. The analysis system 10 can evaluate the servers 103 collectively as assets, as they support system functions, and/or as they support security functions. The analysis system 10 may also evaluate each server individually as an asset, as it supports system functions, and/or as it supports security functions. The analysis system may further evaluate one or more servers as part of the physical assets of a system aspect (e.g., the system or a portion thereof being evaluated with respect to one or more system criteria and one or more system modes).

The storage devices includes one or more cloud storage devices 138, one or more storage racks 139 (e.g., a plurality of storage devices mounted in a rack), and/or one or more databases 140. The analysis system 10 can evaluate the storage devices 103 collectively as assets, as they support system functions, and/or as they support security functions. The analysis system 10 may also evaluate each storage device individually as an asset, as it supports system functions, and/or as it supports security functions. The analysis system may further evaluate one or more storage devices as part of the physical assets of a system aspect (e.g., the system or a portion thereof being evaluated with respect to one or more system criteria and one or more system modes).

The user devices 105 include one or more landline phones 141, one or more IP cameras 144, one or more cell phones 143, one or more user computing devices 145, one or more IP phones 150, one or more video conferencing equipment 148, one or more scanners 151, and/or one or more printers 142. The analysis system 10 can evaluate the use devices 103 collectively as assets, as they support system functions, and/or as they support security functions. The analysis system 10 may also evaluate each user device individually as an asset, as it supports system functions, and/or as it supports security functions. The analysis system may further evaluate one or more user devices as part of the physical assets of a system aspect (e.g., the system or a portion thereof being evaluated with respect to one or more system criteria and one or more system modes).

The system admin devices 104 includes one or more system admin computing devices 146, one or more system computing devices 194 (e.g., data management, access control, privileges, etc.), and/or one or more security management computing devices 147. The analysis system 10 can evaluate the system admin devices 103 collectively as assets, as they support system functions, and/or as they support security functions. The analysis system 10 may also evaluate each system admin device individually as an asset, as it supports system functions, and/or as it supports security functions. The analysis system may further evaluate one or more system admin devices as part of the physical assets of a system aspect (e.g., the system or a portion thereof being evaluated with respect to one or more system criteria and one or more system modes).

Figure 17:
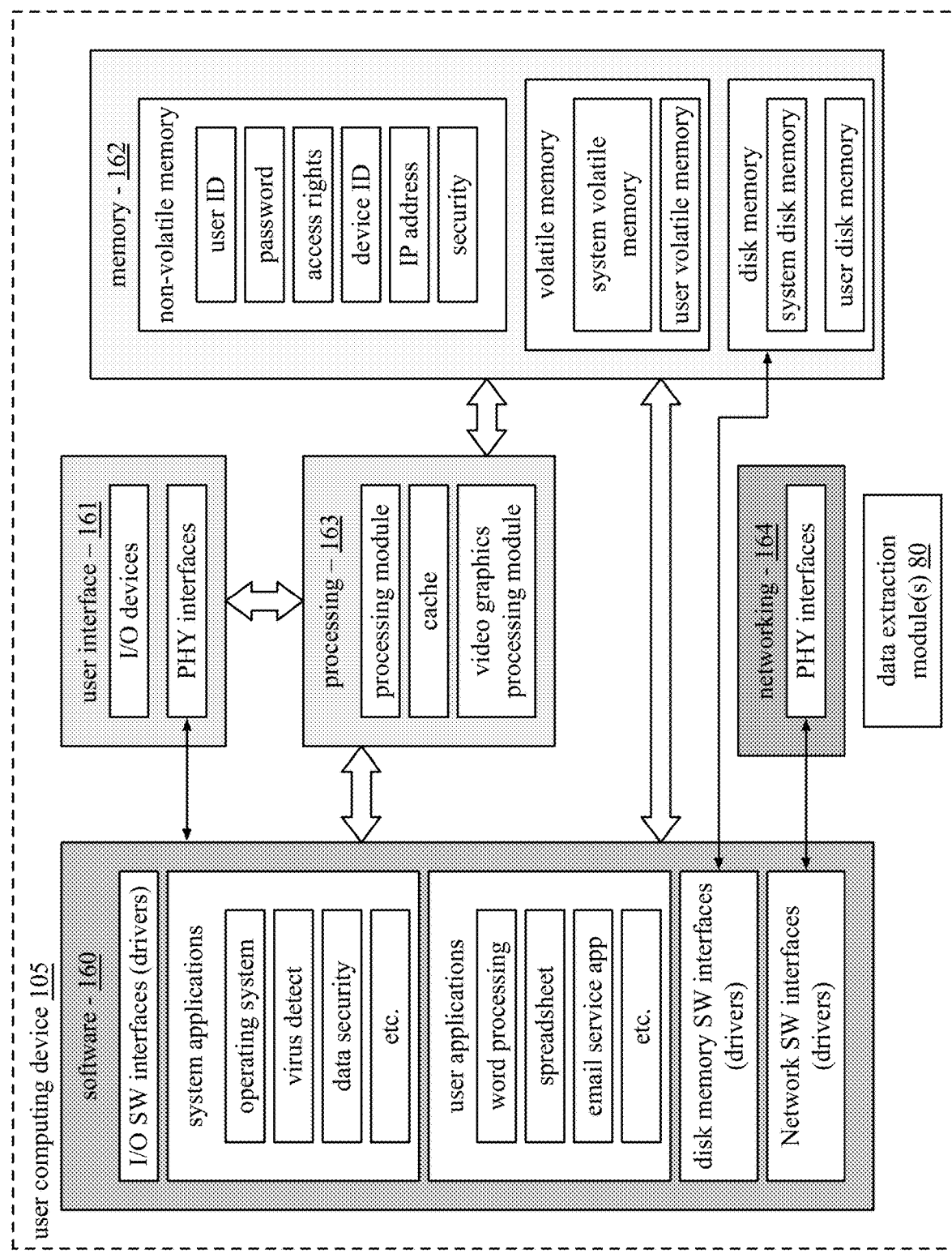
FIG. 17 is a schematic block diagram of an embodiment of a user computing device in accordance with the present disclosure.

FIG. 17 is a schematic block diagram of an embodiment of a user computing device 105 that includes software 160, a user interface 161, processing resources 163, memory 162 and one or more networking device 164. The processing resources 163 include one or more processing modules, cache memory, and a video graphics processing module.

The memory 162 includes non-volatile memory, volatile memory and/or disk memory. The non-volatile memory stores hardware IDs, user credentials, security data, user IDs, passwords, access rights data, device IDs, one or more IP addresses and security software. The volatile memory includes system volatile memory and user volatile memory. The disk memory includes system disk memory and user disk memory. User memory (volatile and/or disk) stores user data and user applications. System memory (volatile and/or disk) stores system applications and system data.

The user interface 104 includes one or more I/O (input/output) devices such as video displays, keyboards, mice, eye scanners, microphones, speakers, and other devices that interface with one or more users. The user interface 161 further includes one or more physical (PHY) interface with supporting software such that the user computing device can interface with peripheral devices.

The software 160 includes one or more I/O software interfaces (e.g., drivers) that enable the processing module to interface with other components. The software 160 also includes system applications, user applications, disk memory software interfaces (drivers) and network software interfaces (drivers).

The networking device 164 may be a network card or network interface that intercouples the user computing device 105 to devices external to the computing device 105 and includes one or more PHY interfaces. For example, the network card is a WLAN card. As another example, he network card is a cellular data network card. As yet another example, the network card is an ethernet card.

The user computing device may further include a data extraction module 80. This would allow the analysis system 10 to obtain data directly from the user computing device. Regardless of how the analysis system 10 obtains data regarding the user computing device, the analysis system 10 can evaluate the user computing device as an asset, as it supports one or more system functions, and/or as it supports one or more security functions. The analysis system 10 may also evaluate each element of the user computing device (e.g., each software application, each drive, each piece of hardware, etc.) individually as an asset, as it supports one or more system functions, and/or as it supports one or more security functions.

Figure 18:
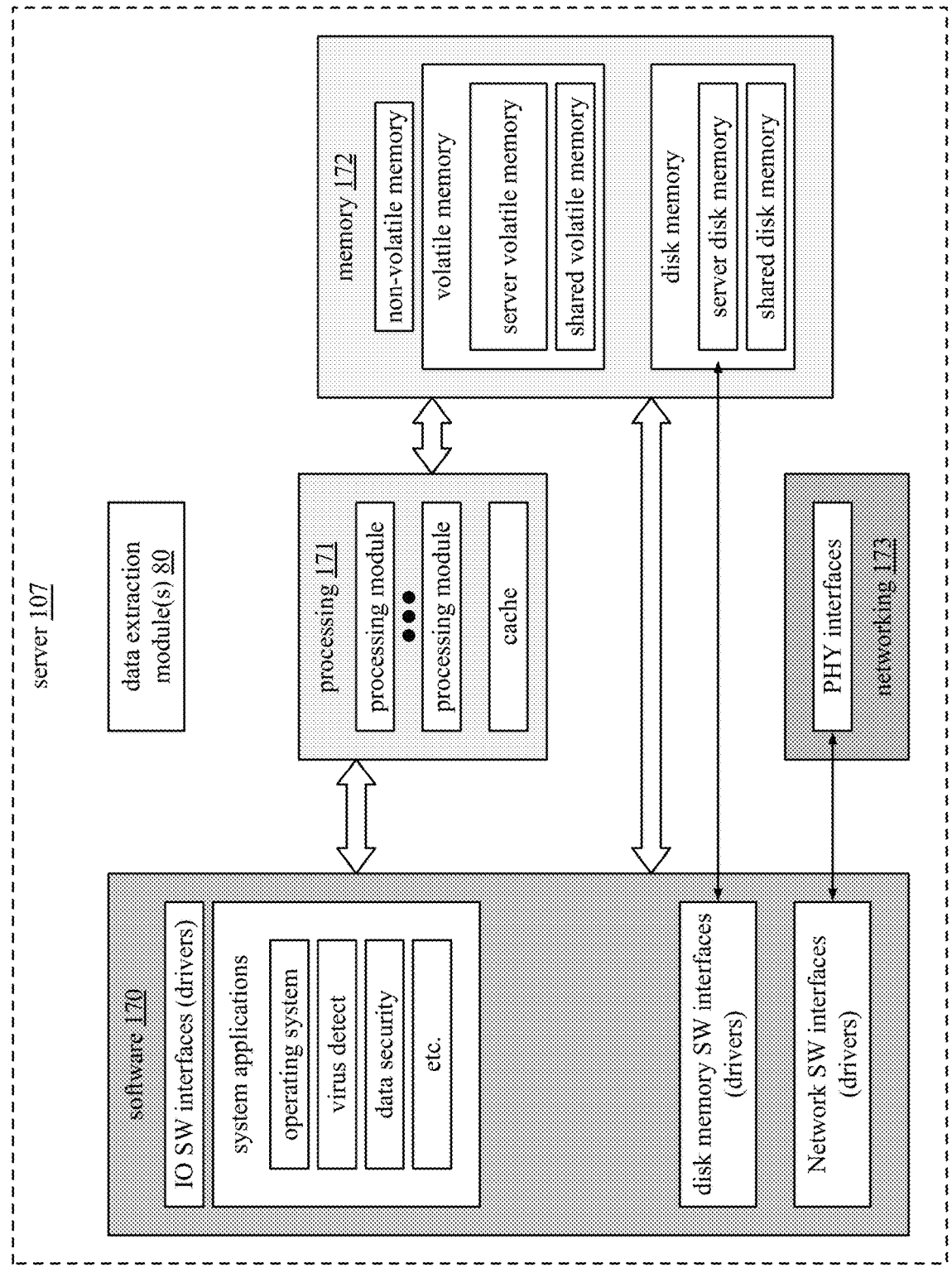
FIG. 18 is a schematic block diagram of an embodiment of a server in accordance with the present disclosure.

FIG. 18 is a schematic block diagram of an embodiment of a server 107 that includes software 170, processing resources 171, memory 172 and one or more networking resources 173. The processing resources 171 include one or more processing modules, cache memory, and a video graphics processing module. The memory 172 includes non-volatile memory, volatile memory, and/or disk memory. The non-volatile memory stores hardware IDs, user credentials, security data, user IDs, passwords, access rights data, device IDs, one or more IP addresses and security software. The volatile memory includes system volatile memory and shared volatile memory. The disk memory include server disk memory and shared disk memory.

The software 170 includes one or more I/O software interfaces (e.g., drivers) that enable the software 170 to interface with other components. The software 170 includes system applications, server applications, disk memory software interfaces (drivers), and network software interfaces (drivers). The networking resources 173 may be one or more network cards that provides a physical interface for the server to a network.

The server 107 may further include a data extraction module 80. This would allow the analysis system 10 to obtain data directly from the server. Regardless of how the analysis system 10 obtains data regarding the server, the analysis system 10 can evaluate the server as an asset, as it supports one or more system functions, and/or as it supports one or more security functions. The analysis system 10 may also evaluate each element of the server (e.g., each software application, each drive, each piece of hardware, etc.) individually as an asset, as it supports one or more system functions, and/or as it supports one or more security functions.

Figure 19:
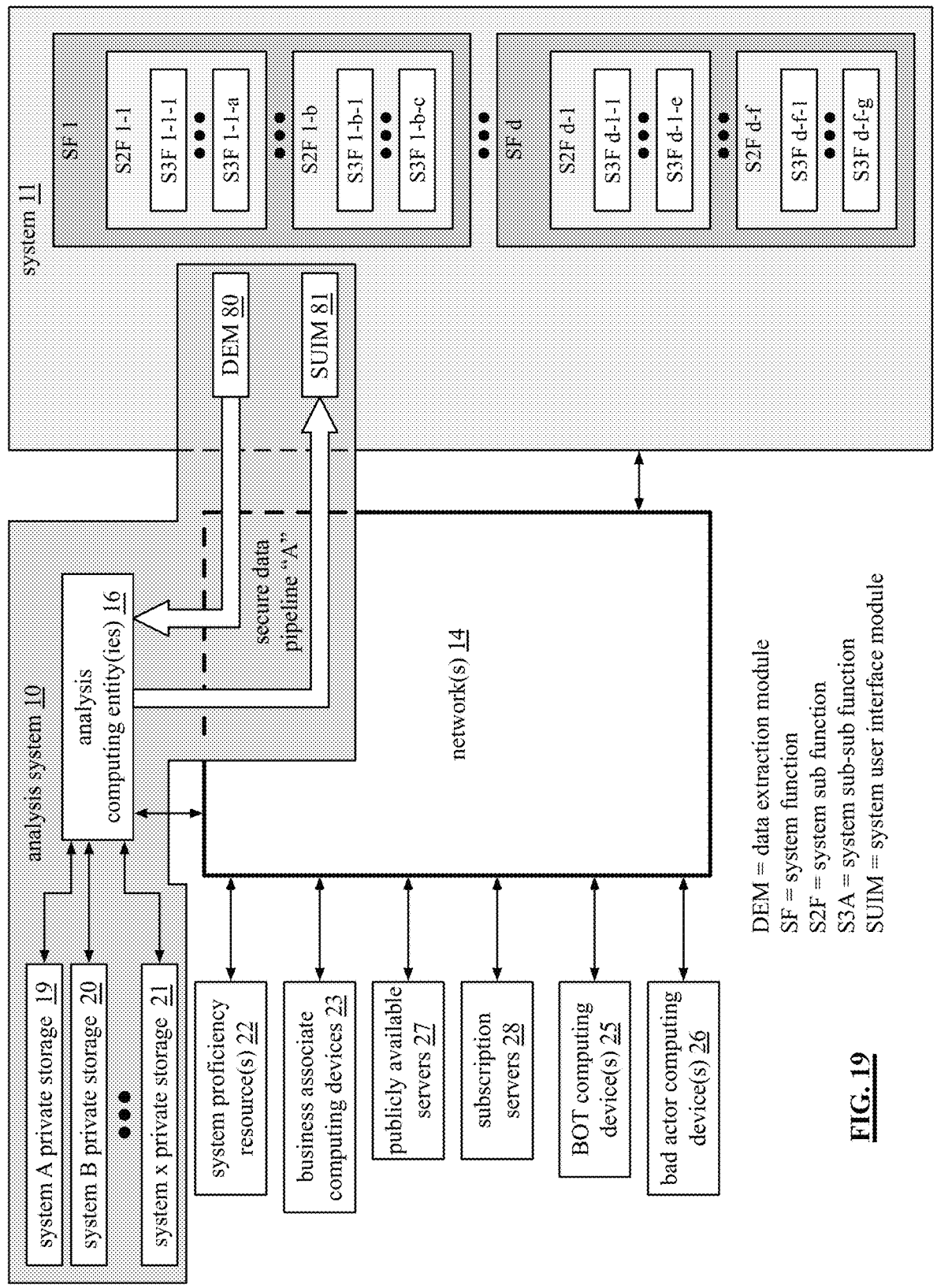
FIG. 19 is a schematic block diagram of another embodiment of a networked environment having a system that includes a plurality of system functions coupled to an analysis system in accordance with the present disclosure.

FIG. 19 is a schematic block diagram of another embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of system functions (SF). A system function (SF) may include one or more system sub functions (S2F) and a system sub function (S2F) may include one or more system sub-sub functions (S3F). While being a part of the analysis system 10, at least one data extraction module (DEM) 80 and at least one system user interface module (SUIM) 81 are installed on the system 11.

A system function (SF) includes one or more business operations, one or more compliance requirements, one or more data flow objectives, one or more data access control objectives, one or more data integrity objectives, one or more data storage objectives, one or more data use objectives, and/or one or more data dissemination objectives. Business operation system functions are the primary purpose for the system 11. The system 11 is designed and built to support the operations of the business, which vary from business to business.

In general, business operations include operations regarding critical business functions, support functions for core business, product and/or service functions, risk management objectives, business ecosystem objectives, and/or business contingency plans. The business operations may be divided into executive management operations, information technology operations, marketing operations, engineering operations, manufacturing operations, sales operations, accounting operations, human resource operations, legal operations, intellectual property operations, and/or finance operations. Each type of business operation includes sub-business operations, which, in turn may include its own sub-operations.

For example, engineering operations includes a system function of designing new products and/or product features. The design of a new product or feature involves sub-functions of creating design specifications, creating a design based on the design specification, and testing the design through simulation and/or prototyping. Each of these steps includes sub-steps. For example, for the design of a software program, the design process includes the sub-sub system functions of creating a high level design from the design specifications; creating a low level design from the high level design; and the creating code from the low level design.

A compliance requirement may be a regulatory compliance requirement, a standard compliance requirement, a statutory compliance requirement, and/or an organization compliance requirement. For example, there are a regulatory compliance requirements when the organization has governmental agencies as clients. An example of a standard compliance requirement, encryption protocols are often standardized. Data Encryption Standard (DES), Advanced Encryption Standard (AES), RSA (Rivest-Shamir-Adleman) encryption, and public-key infrastructure (PKI) are examples of encryption type standards. HIPAA (health Insurance Portability and Accountability Act) is an example of a statutory compliance requirement. Examples of organization compliance requirements include use of specific vendor hardware, use of specific vendor software, use of encryption, etc.

A data flow objective is regarding where data can flow, at what rate data can and should flow, the manner in which the data flow, and/or the means over which the data flows. As an example of a data flow objective, data for remote storage is to flow via a secure data pipeline using a particular encryption protocol. As another example of a data flow objective, ingesting of data should have the capacity to handle a data rate of 100 giga-bits per second.

A data access control objective established which type of personnel and/or type of assets can access specific types of data. For example, certain members of the corporate department and human resources department have access to employee personnel files, while all other members of the organization do not.

A data integrity objective establishes a reliability that, when data is retrieved, it is the data that was stored, i.e., it was not lost, damaged, or corrupted. An example of a data integrity protocol is Cyclic Redundancy Check (CRC). Another example of a data integrity protocol is a hash function.

A data storage objective establishes the manner in which data is to be stored. For example, a data storage objective is to store data in a RAID system; in particular, a RAID 6 system. As another example, a data storage objective is regarding archiving of data and the type of storage to use for archived data.

A data use objective establishes the manner in which data can be used. For example, if the data is for sale, then the data use objective would establish what type of data is for sale, at what price, and what is the target customer. As another example, a data use objective establishes read only privileges, editing privileges, creation privileges, and/or deleting privileges.

A data dissemination objective establishes how the data can be shared. For example, a data dissemination objective is regarding confidential information and indicates how the confidential information should be marked, who in can be shared with internally, and how it can be shared externally, if at all.

The analysis system 10 may evaluate understanding, implementation, and/or operation of one or more system functions, one or more system sub functions, and/or one or more system sub-sub functions. The evaluation may be to produce an evaluation rating, to identify deficiencies, and/or to auto-correct deficiencies. For example, the analysis system 10 evaluates the understanding of the software development policies and/or processes. As another example, the analysis system 10 evaluates the use of software development policies and/or processes to implement a software program. As yet another example, analysis system 10 evaluates the operation of the software program with respect to the business operation, the design specifications, and/or the design.

Figure 20:
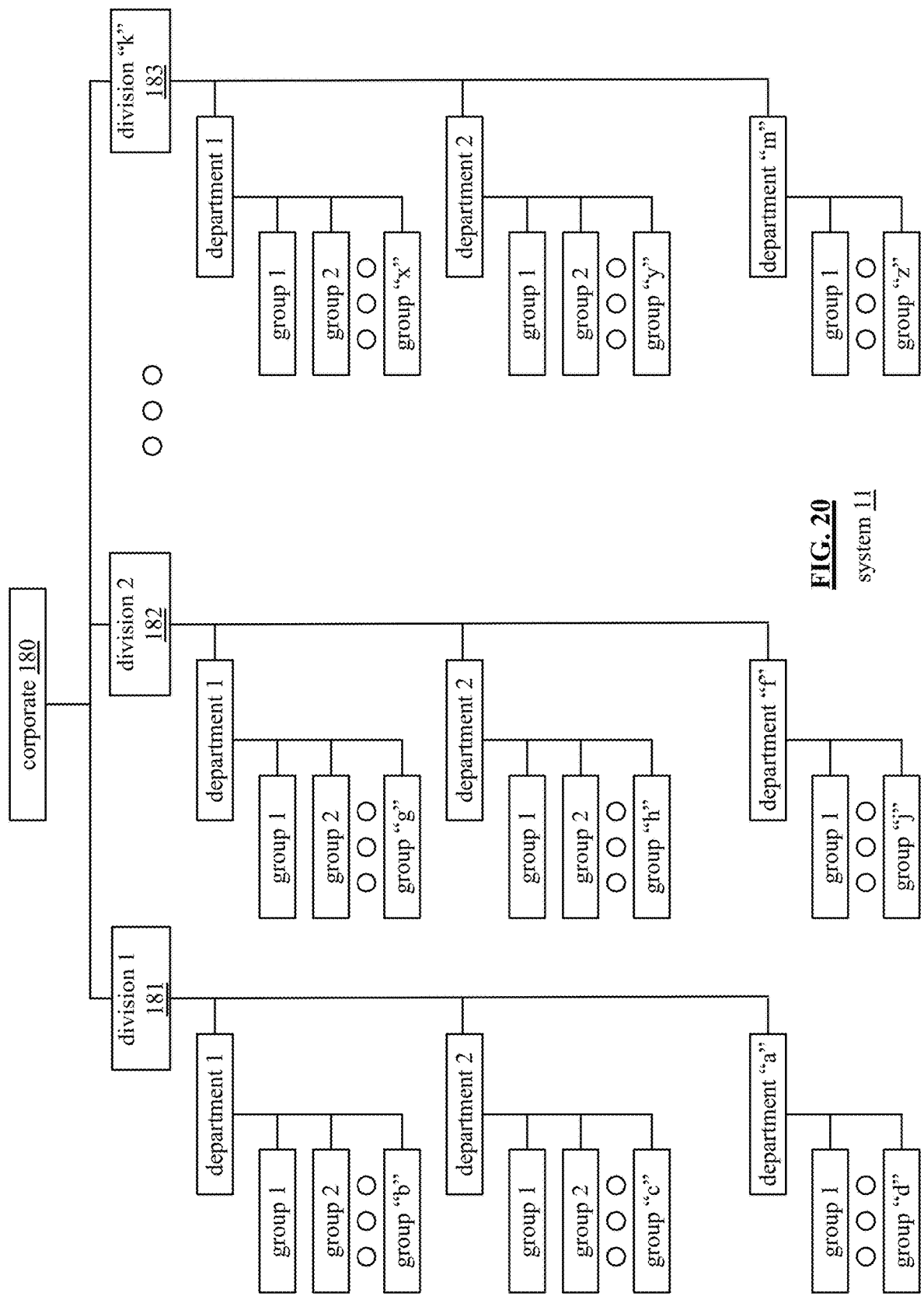
FIG. 20 is a schematic block diagram of another embodiment of a system that includes divisions, departments, and groups in accordance with the present disclosure.

FIG. 20 is a schematic block diagram of another embodiment of a system 11 that includes, from a business operations perspective, divisions 181-183, departments, and groups. The business structure of the system 11, as in most businesses, is governed by a corporate department 180. The corporate department may have its own sub-system with structures and software tailored to the corporate function of the system. Organized under the corporate department 180 are divisions, division 1 181, division 2 182, through division k 183. These divisions may be different business divisions of a multi-national conglomerate, may be different functional divisions of a business, e.g., finance, marketing, sales, legal, engineering, research and development, etc. Under each division 1081-183 include a plurality of departments. Under each department are a number of groups.

The business structure is generic and can be used to represent the structure of most conventional businesses and/or organizations. The analysis system 10 is able to use this generic structure to create and categorize the business structure of the system 11. The creation and categorization of the business structure is done in a number of ways. Firstly, the analysis system 10 accesses corporate organization documents for the business and receive feedback from one or more persons in the business and use these documents and data to initially determine at least partially the business structure. Secondly, the analysis system 10 determines the network structure of the other system, investigate identities of components of the network structure, and construct a sub-division of the other system. Then, based upon software used within the sub-division, data character, and usage character, the analysis system 10 identifies more specifically the function of the divisions, departments and groups. In doing so, the analysis system 10 uses information known of third-party systems to assist in the analysis.

With the abstraction of the business structure, differing portions of the business structure may have different levels of abstraction from a component/sub-component/sub-sub-component/system/sub-system/sub-sub-system level based upon characters of differing segments of the business. For example a more detailed level of abstraction for elements of the corporate and security departments of the business may be taken than for other departments of the business.

Figure 21:
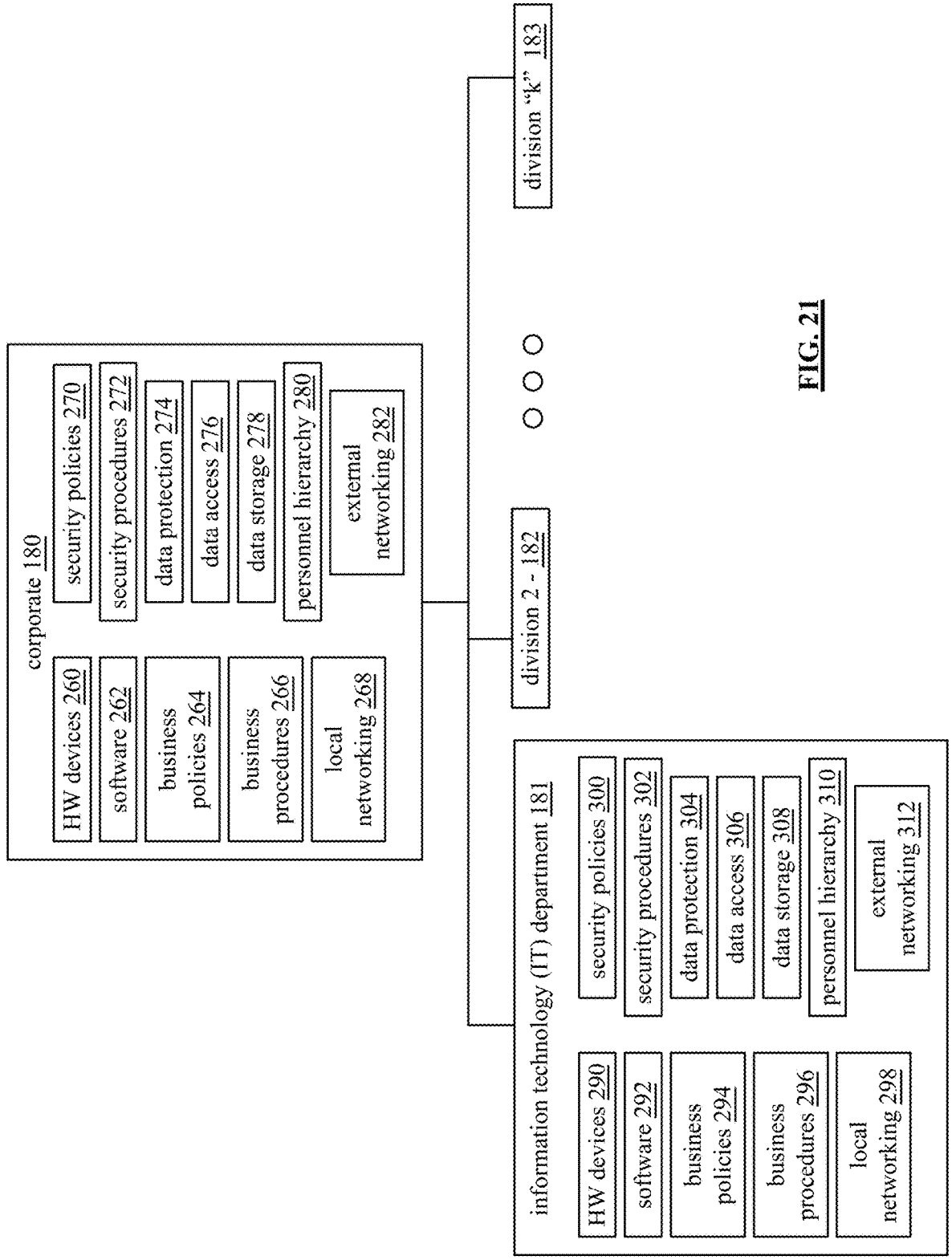
FIG. 21 is a schematic block diagram of another embodiment of a system that includes divisions and departments, which include system elements in accordance with the present disclosure.

FIG. 21 is a schematic block diagram of another embodiment of a business structure of the system 11. Shown are a corporate department 180, an IT department 181, division 2 182 through division "k" 183, where k is an integer equal to or greater than 3. The corporate department 180 includes a plurality of hardware devices 260, a plurality of software applications 262, a plurality of business policies 264, a plurality of business procedures 266, local networking 268, a plurality of security policies 270, a plurality of security procedures 272, data protection resources 272, data access resources 276, data storage devices 278, a personnel hierarchy 280, and external networking 282. Based upon an assessment of these assets of the corporate department 180, analysis system 10 may evaluate the understanding, implementation, and/or operation of the assets, system functions, and/or security functions of the corporate department from a number of different perspectives, as will be described further with reference to one or more the subsequent figures.

Likewise, the IT department 181 includes a plurality of hardware devices 290, a plurality of software applications 292, a plurality of business policies 294, a plurality of business procedures 296, local networking 298, a plurality of security policies 300, a plurality of security procedures 302, data protection resources 304, data access resources 306, data storage devices 308, a personnel hierarchy 310, and external networking 312. Based upon an assessment of these assets of the IT department 181, the analysis system 10 may evaluate the understanding, implementation, and/or operation of the assets, system functions, and/or security functions of the IT department from a number of different perspectives, as will be described further with reference to one or more of the subsequent figures.

FIG. 22 is a schematic block diagram of another embodiment of a division 182 of a system that includes multiple departments. The departments include a marketing department 190, an operations department 191, an engineering department 192, a manufacturing department 193, a sales department 194, and an accounting department 195. Each of the departments includes a plurality of components relevant to support the corresponding business functions and/or security functions of the division and of the department. In particular, the marketing department 190 includes a plurality of devices, software, security policies, security procedures, business policies, business procedures, data protection resources, data access resources, data storage resources, a personnel hierarchy, local network resources, and external network resources.

Likewise, each of the operations department 191, the engineering department 192, the manufacturing department 193, the sales department 194, and the accounting department 195 includes a plurality of devices, software, security policies, security procedures, business policies, business procedures, data protection resources, data access resources, data storage resources, a personnel hierarchy, local network resources, and external network resources.

Further, within the business structure, a service mesh may be established to more effectively protect important portions of the business from other portions of the business. The service mesh may have more restrictive safety and security mechanisms for one part of the business than another portion of the business, e.g., manufacturing department service mesh is more restrictive than the sales department service mesh.

The analysis system 10 may evaluate the understanding, implementation, and/or operation of the assets, system functions, and/or security functions of the division 182, of each department, of each type of system elements, and/or each system element. For example, the analysis system 10 evaluates the data access policies and procedures of each department. As another example, the analysis system 10 evaluates the data storage policies, procedures, design, implementation, and/or operation of data storage within the engineering department 192.

Figure 23:
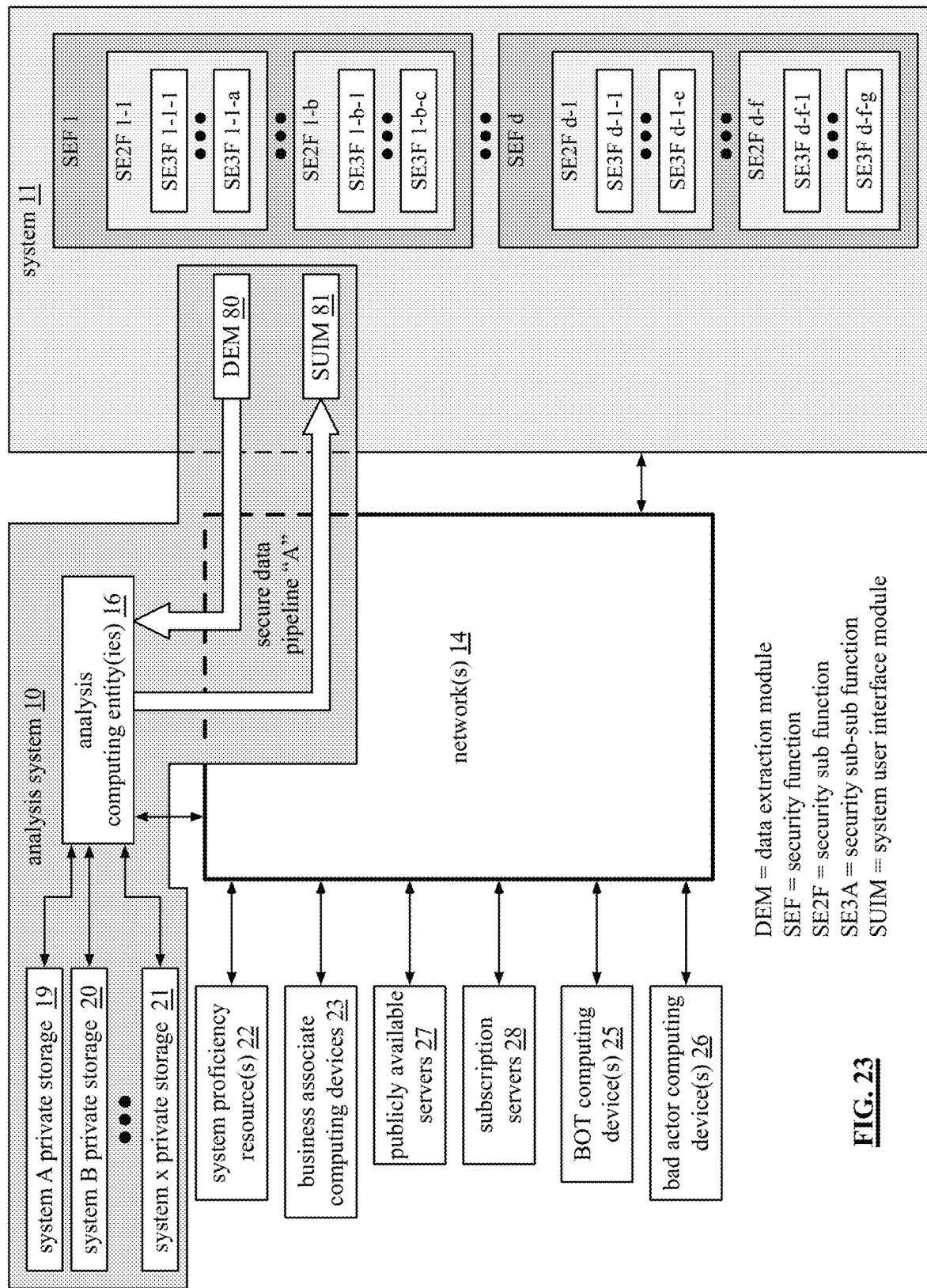
FIG. 23 is a schematic block diagram of another embodiment of a networked environment having a system that includes a plurality of security functions coupled to an analysis system in accordance with the present disclosure.

FIG. 23 is a schematic block diagram of another embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of security functions (SEF). A security function (SEF) may include one or more system sub security functions (SE2F) and a security sub function (SE2F) may include one or more security sub-sub functions (SE3F). While being a part of the analysis system 10, at least one data extraction module (DEM) 80 and at least one system user interface module (SUIM) 81 are installed on the system 11. As used herein, a security function includes a security operation, a security requirement, a security policy, and/or a security objective with respect to data, system access, system design, system operation, and/or system modifications (e.g., updates, expansion, part replacement, maintenance, etc.).

A security function (SF) includes one or more threat detection functions, one or more threat avoidance functions, one or more threat resolution functions, one or more threat recovery functions, one or more threat assessment functions, one or more threat impact functions, one or more threat tolerance functions, one or more business security functions, one or more governance security functions, one or more data at rest protection functions, one or more data in transit protection functions, and/or one or more data loss prevention functions.

A threat detection function includes detecting unauthorized system access; detecting unauthorized data access; detecting unauthorized data changes; detecting uploading of worms, viruses, and the like; and/or detecting bad actor attacks. A threat avoidance function includes avoiding unauthorized system access; avoiding unauthorized data access; avoiding unauthorized data changes; avoiding uploading of worms, viruses, and the like; and/or avoiding bad actor attacks.

A threat resolution function includes resolving unauthorized system access; resolving unauthorized data access; resolving unauthorized data changes; resolving uploading of worms, viruses, and the like; and/or resolving bad actor attacks. A threat recovery function includes recovering from an unauthorized system access; recovering from an unauthorized data access; recovering from an unauthorized data changes; recovering from an uploading of worms, viruses, and the like; and/or recovering from a bad actor attack.

A threat assessment function includes accessing the likelihood of and/or mechanisms for unauthorized system access; accessing the likelihood of and/or mechanisms for unauthorized data access; accessing the likelihood of and/or mechanisms for unauthorized data changes; accessing the likelihood of and/or mechanisms for uploading of worms, viruses, and the like; and/or accessing the likelihood of and/or mechanisms for bad actor attacks.

A threat impact function includes determining an impact on business operations from an unauthorized system access; resolving unauthorized data access; determining an impact on business operations from an unauthorized data changes; determining an impact on business operations from an uploading of worms, viruses, and the like; and/or determining an impact on business operations from an bad actor attacks.

A threat tolerance function includes determining a level of tolerance for an unauthorized system access; determining a level of tolerance for an unauthorized data access; determining a level of tolerance for an unauthorized data changes; determining a level of tolerance for an uploading of worms, viruses, and the like; and/or determining a level of tolerance for an bad actor attacks.

A business security function includes data encryption, handling of third party data, releasing data to the public, and so on. A governance security function includes HIPAA compliance; data creation, data use, data storage, and/or data dissemination for specific types of customers (e.g., governmental agency); and/or the like.

A data at rest protection function includes a data access protocol (e.g., user ID, password, etc.) to store data in and/or retrieve data from system data storage; data storage requirements, which include type of storage, location of storage, and storage capacity; and/or other data storage security functions.

A data in transit protection function includes using a specific data transportation protocol (e.g., TCP/IP); using an encryption function prior to data transmission; using an error encoding function for data transmission; using a specified data communication path for data transmission; and/or other means to protect data in transit. A data loss prevention function includes a storage encoding technique (e.g., single parity encoding, double parity encoding, erasure encoding, etc.); a storage backup technique (e.g., one or two backup copies, erasure encoding, etc.); hardware maintenance and replacement policies and processes; and/or other means to prevent loss of data.

The analysis system 10 may evaluate understanding, implementation, and/or operation of one or more security functions, one or more security sub functions, and/or one or more security sub-sub functions. The evaluation may be to produce an evaluation rating, to identify deficiencies, and/or to auto-correct deficiencies. For example, the analysis system 10 evaluates the understanding of the threat detection policies and/or processes. As another example, the analysis system 10 evaluates the use of threat detection policies and/or processes to implement a security assets. As yet another example, analysis system 10 evaluates the operation of the security assets with respect to the threat detection operation, the threat detection design specifications, and/or the threat detection design.

Figure 24:
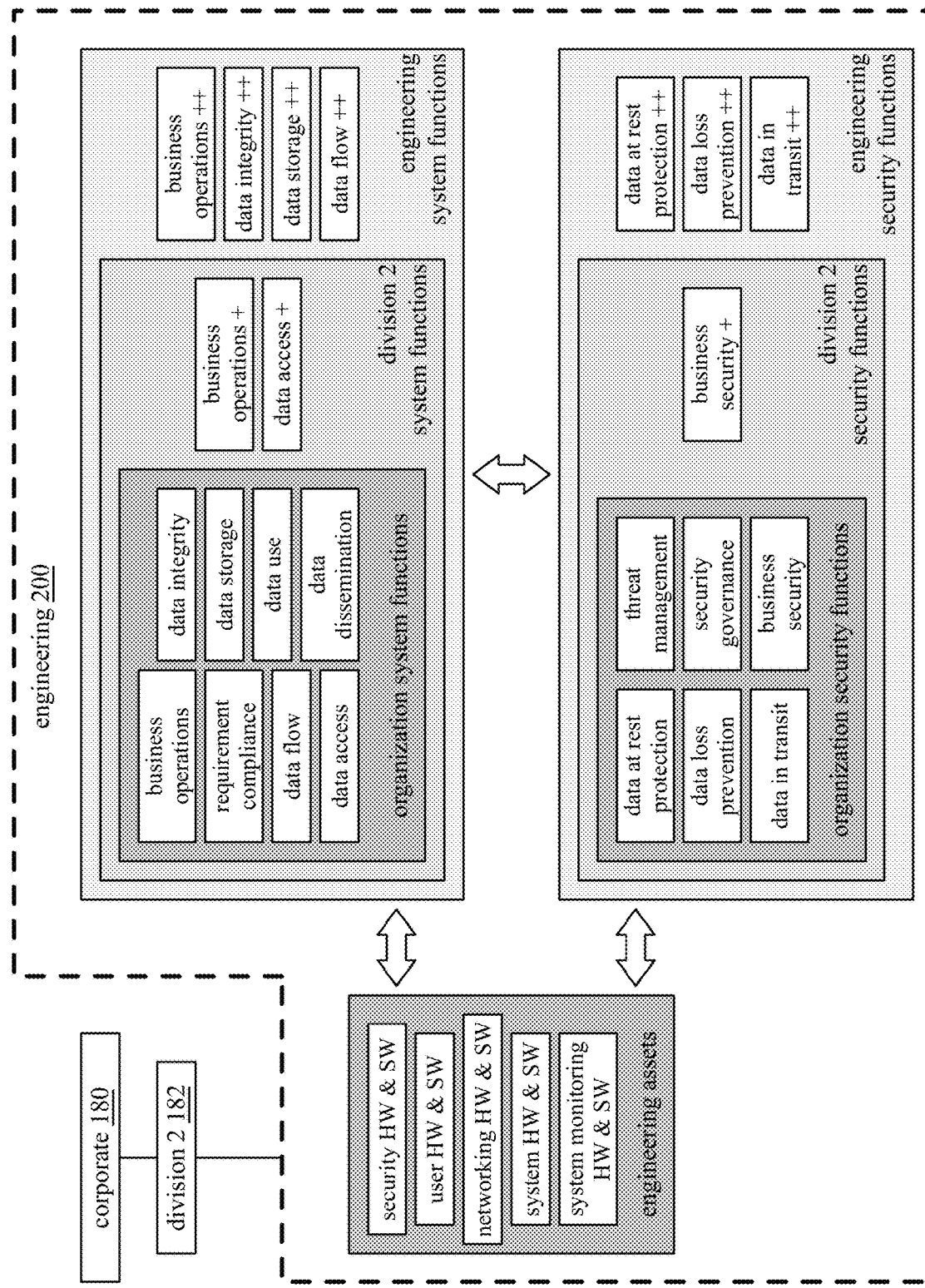
FIG. 24 is a schematic block diagram of an embodiment an engineering department of a division that reports to a corporate department of a system in accordance with the present disclosure.

FIG. 24 is a schematic block diagram of an embodiment of an engineering department 200 of a division 182 that reports to a corporate department 180 of a system 11. The engineering department 200 includes engineering assets, engineering system functions, and engineering security functions. The engineering assets include security HW & SW, user device HW & SW, networking HW & SW, system HW & SW, system monitoring HW & SW, and/or other devices that includes HW and/or SW.

In this example, the organization's system functions includes business operations, compliance requirements, data flow objectives, data access objectives, data integrity objectives, data storage objectives, data use objectives, and/or data dissemination objectives. These system functions apply throughout the system including throughout division 2 and for the engineering department 200 of division 2.

The division 182, however, can issues more restrictive, more secure, and/or more detailed system functions. In this example, the division has issued more restrictive, secure, and/or detailed business operations (business operations +) and more restrictive, secure, and/or detailed data access functions (data access +) Similarly, the engineering department 200 may issue more restrictive, more secure, and/or more detailed system functions than the organization and/or the division. In this example, the engineering department has issued more restrictive, secure, and/or detailed business operations (business operations ++) than the division; has issued more restrictive, secure, and/or detailed data flow functions (data flow ++) than the organization; has issued more restrictive, secure, and/or detailed data integrity functions (data integrity ++) than the organization; and has issued more restrictive, secure, and/or detailed data storage functions (data storage ++) than the organization.

For example, an organization level business operation regarding the design of new products and/or of new product features specifies high-level design and verify guidelines.

The division issued more detailed design and verify guidelines. The engineering department issued even more detailed design and verify guidelines.

The analysis system 10 can evaluate the compliance with the system functions for the various levels. In addition, the analysis system 10 can evaluate that the division issued system functions are compliant with the organization issued system functions and/or are more restrictive, more secure, and/or more detailed. Similarly, the analysis system 10 can evaluate that the engineering department issued system functions are compliant with the organization and the division issued system functions and/or are more restrictive, more secure, and/or more detailed.

As is further shown in this example, the organization security functions includes data at rest protection, data loss prevention, data in transit protection, threat management, security governance, and business security. The division has issued more restrictive, more secure, and/or more detailed busines security functions (business security +). The engineering department has issued more restrictive, more secure, and/or more detailed data at rest protection (data at rest protection ++), data loss prevention (data loss prevention ++), and data in transit protection (data in transit ++).

The analysis system 10 can evaluate the compliance with the security functions for the various levels. In addition, the analysis system 10 can evaluate that the division issued security functions are compliant with the organization issued security functions and/or are more restrictive, more secure, and/or more detailed. Similarly, the analysis system 10 can evaluate that the engineering department issued security functions are compliant with the organization and the division issued security functions and/or are more restrictive, more secure, and/or more detailed.

Figure 25:
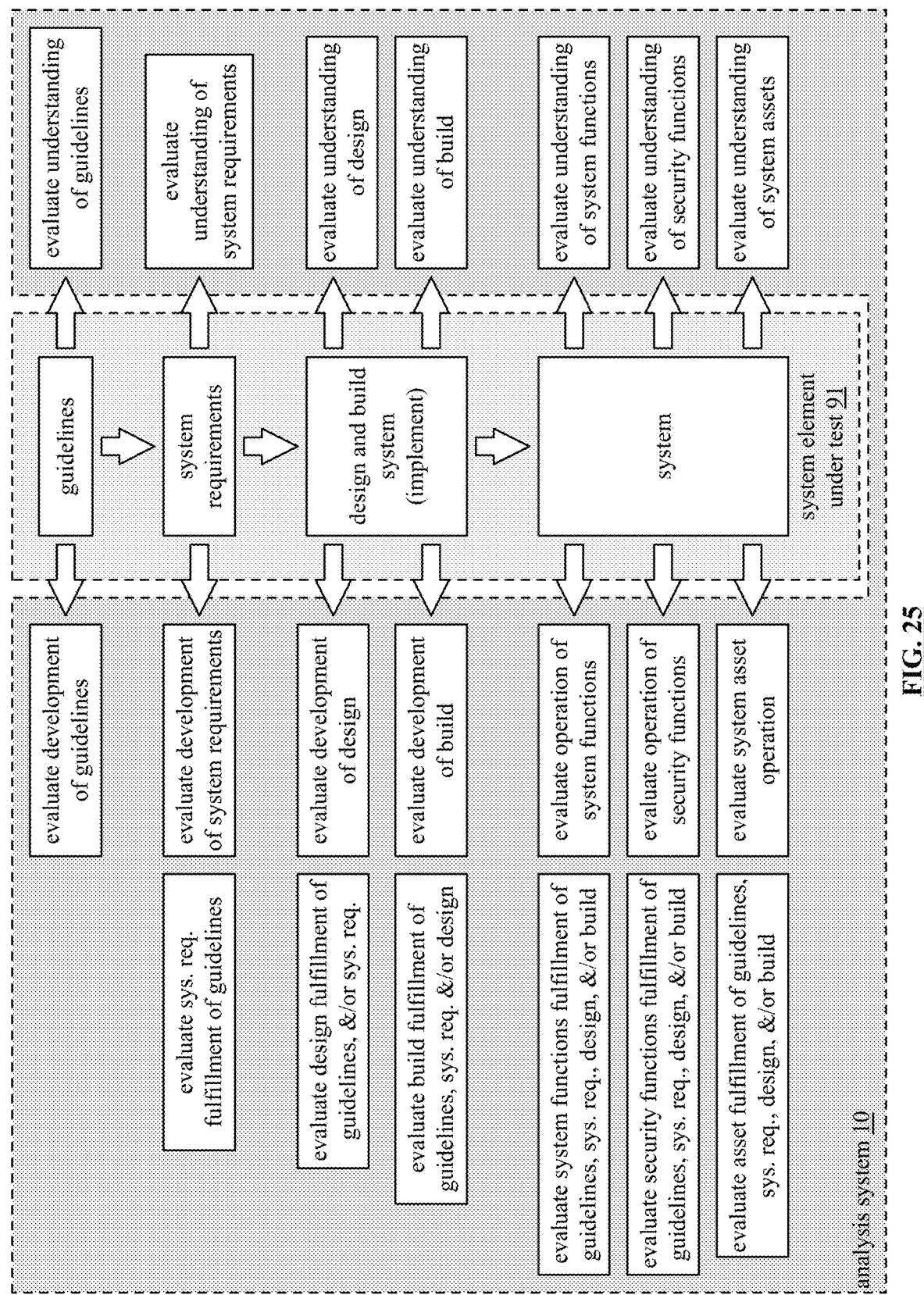
FIG. 25 is a schematic block diagram of an example of an analysis system evaluating a system element under test of a system in accordance with the present disclosure.

FIG. 25 is a schematic block diagram of an example of an analysis system 10 evaluating a system element under test 91 of a system 11. The system element under test 91 corresponds to a system aspect (or system sector), which includes one or more system elements, one or more system criteria, and one or more system modes.

In this example, the system criteria are shown to includes guidelines, system requirements, system design & system build (system implementation), and the resulting system. The analysis system 10 may evaluate the system, or portion thereof, during initial system requirement development, initial design of the system, initial build of the system, operation of the initial system, revisions to the system requirements, revisions to the system design, revisions to the system build, and/or operation of the revised system. A revision to a system includes adding assets, system functions, and/or security functions; deleting assets, system functions, and/or security functions; and/or modifying assets, system functions, and/or security functions.

The guidelines include one or more of business objectives, security objectives, NIST cybersecurity guidelines, system objectives, governmental and/or regulatory requirements, third party requirements, etc. and are used to help create the system requirements. System requirements outline the hardware requirements for the system, the software requirements for the system, the networking requirements for the system, the security requirements for the system, the logical data flow for the system, the hardware architecture for the system, the software architecture for the system, the logical inputs and outputs of the system, the system input requirements, the system output requirements, the system's storage requirements, the processing requirements for the system, system controls, system backup, data access parameters, and/or specification for other system features.

The system requirements are used to help create the system design. The system design includes a high level design (HDL), a low level design (LLD), a detailed level design (DLD), and/or other design levels. High level design is a general design of the system. It includes a description of system architecture; a database design; an outline of platforms, services, and processes the system will require; a description of relationships between the assets, system functions, and security functions; diagrams regarding data flow; flowcharts; data structures; and/or other documentation to enable more detailed design of the system.

Low level design is a component level design that is based on the HLD. It provides the details and definitions for every system component (e.g., HW and SW). In particular, LLD specifies the features of the system components and component specifications. Detailed level design describes the interaction of every component of the system.

The system is built based on the design to produce a resulting system (i.e., the implemented assets). The assets of system operate to perform the system functions and/or security functions.

The analysis system 10 can evaluate the understanding, implementation, operation and/or self-analysis of the system 11 at one or more system criteria level (e.g., guidelines, system requirements, system implementation (e.g., design and/or build), and system) in a variety of ways.

The analysis system 10 evaluates the understanding of the system (or portion thereof) by determining a knowledge level of the system and/or maturity level of system. For example, an understanding evaluation interprets what is known about the system and compares it to what should be known about the system.

As a more specific example, the analysis system evaluates the understanding of the guidelines. For instance, the analysis system 10 evaluates the policies, processes, procedures, automation, certifications, documentation, and/or other evaluation metric (e.g., evaluation metrics) regarding the thoroughness of the guidelines to facilitate the understanding of the guidelines. The more incomplete the data regarding the evaluation metrics, the more likely the guidelines are incomplete; which indicates a lack of understanding. The fewer numbers of and/or incompleteness of policies, processes, procedures, automation, documentation, certification, and/or other evaluation metric regarding the creation and/or use of the guidelines, the more likely the guidelines are not well understood (e.g., lower level of knowledge and/or of system maturity) resulting in a low evaluation rating.

As another more specific example of an understanding evaluation, the analysis system 10 evaluates the understanding of the system requirements. For instance, the analysis system 10 evaluates the policies, processes, procedures, automation, certifications, documentation, and/or other evaluation metric (e.g., evaluation metrics) regarding the thoroughness of the system requirements to facilitate the understanding of the system requirements. The more incomplete the data regarding the evaluation metrics, the more likely the system requirements are incomplete; which indicates a lack of understanding. The fewer numbers of and/or incompleteness of policies, processes, procedures, automation, documentation, certification, and/or other evaluation metric regarding the creation and/or use of the system requirements, the more likely the system requirements are not well understood (e.g., lower level of knowledge and/or of system maturity) resulting in a low evaluation rating.

As another more specific example of an understanding evaluation, the analysis system 10 evaluates the understanding of the system design. For instance, the analysis system 10 evaluates the policies, processes, procedures, automation, certifications, documentation, and/or other evaluation metric (e.g., evaluation metrics) regarding the thoroughness of the system design to facilitate the understanding of the system design. The more incomplete the data regarding the evaluation metrics, the more likely the system design is incomplete; which indicates a lack of understanding. The fewer numbers of and/or incompleteness of policies, processes, procedures, automation, documentation, certification, and/or other evaluation metric regarding the creation and/or use of the system design, the more likely the system design is not well understood (e.g., lower level of knowledge and/or of system maturity) resulting in a low evaluation rating.

As another more specific example of an understanding evaluation, the analysis system 10 evaluates the understanding of the system build. For instance, the analysis system 10 evaluates the policies, processes, procedures, automation, certifications, documentation, and/or other evaluation metric (e.g., evaluation metrics) regarding the thoroughness of the system build to facilitate the understanding of the system build. The more incomplete the data regarding the evaluation metrics, the more likely the system build is incomplete; which indicates a lack of understanding. The fewer numbers of and/or incompleteness of policies, processes, procedures, automation, documentation, certification, and/or other evaluation metric regarding the execution of and/or use of the system build, the more likely the system build is not well understood (e.g., lower level of knowledge and/or of system maturity) resulting in a low evaluation rating.

As another more specific example of an understanding evaluation, the analysis system 10 evaluates the understanding of the system functions. For instance, the analysis system 10 evaluates the policies, processes, procedures, automation, certifications, documentation, and/or other evaluation metric (e.g., evaluation metrics) regarding the thoroughness of the system build to facilitate the understanding of the system build. The more incomplete the data regarding the evaluation metrics, the more likely the system build is incomplete; which indicates a lack of understanding. The fewer numbers of and/or incompleteness of policies, processes, procedures, automation, documentation, certification, and/or other evaluation metric regarding the execution of and/or use of the system build, the more likely the system build is not well understood (e.g., lower level of knowledge and/or of system maturity) resulting in a low evaluation rating.

As another more specific example of an understanding evaluation, the analysis system 10 evaluates the understanding of the security functions. For instance, the analysis system 10 evaluates the policies, processes, procedures, automation, certifications, documentation, and/or other evaluation metric (e.g., evaluation metrics) regarding the thoroughness of the system functions to facilitate the understanding of the system functions. The more incomplete the data regarding the evaluation metrics, the more likely the system functions are incomplete; which indicates a lack of understanding. The fewer numbers of and/or incompleteness of policies, processes, procedures, automation, documentation, certification, and/or other evaluation metric regarding the execution of and/or use of the system functions, the more likely the system functions are not well understood (e.g., lower level of knowledge and/or of system maturity) resulting in a low evaluation rating.

As another more specific example of an understanding evaluation, the analysis system 10 evaluates the understanding of the system assets. For instance, the analysis system 10 evaluates the policies, processes, procedures, automation, certifications, documentation, and/or other evaluation metric (e.g., evaluation metrics) regarding the thoroughness of the system assets to facilitate the understanding of the system assets. The more incomplete the data regarding the evaluation metrics, the more likely the system assets are incomplete; which indicates a lack of understanding. The fewer numbers of and/or incompleteness of policies, processes, procedures, automation, documentation, certification, and/or other evaluation metric regarding the selection, identification, and/or use of the system assets, the more likely the system assets are not well understood (e.g., lower level of knowledge and/or of system maturity) resulting in a low evaluation rating.

The analysis system 10 also evaluates the implementation of the system (or portion thereof) by determining how well the system is being, was developed, and/or is being updated. For example, the analysis system 10 determines how well the assets, system functions, and/or security functions are being developed, have been developed, and/or are being updated based on the guidelines, the system requirements, the system design, and/or the system build.

As a more specific example of an implementation evaluation, the analysis system 10 evaluates the implementation of the guidelines. For instance, the analysis system 10 evaluates the policies, processes, procedures, automation, certifications, documentation, and/or other evaluation metric (e.g., evaluation metrics) regarding the development of the guidelines. The more incomplete the data regarding the evaluation metrics, the more likely the development of the guidelines is incomplete. The fewer numbers of and/or incompleteness of policies, processes, procedures, automation, documentation, certification, and/or other evaluation metric regarding the development of the guidelines, the more likely the guidelines are not well developed (e.g., lower level of system development maturity) resulting in a low evaluation rating.

As another more specific example of an implementation evaluation, the analysis system 10 evaluates the implementation of the system requirements. For instance, the analysis system 10 evaluates the policies, processes, procedures, automation, certifications, documentation, and/or other evaluation metric (e.g., evaluation metrics) regarding the development of the system requirements. The more incomplete the data regarding the evaluation metrics, the more likely the development of the system requirements is incomplete. The fewer numbers of and/or incompleteness of policies, processes, procedures, automation, documentation, certification, and/or other evaluation metric regarding the development of the system requirements, the more likely the system requirements are not well developed (e.g., lower level of system development maturity) resulting in a low evaluation rating.

As another more specific example of an implementation evaluation, the analysis system 10 evaluates the implementation of the system design. For instance, the analysis system 10 evaluates the policies, processes, procedures, automation, certifications, documentation, and/or other evaluation metric (e.g., evaluation metrics) regarding the development of the system design. The more incomplete the data regarding the evaluation metrics, the more likely the development of the system design is incomplete. The fewer numbers of and/or incompleteness of policies, processes, procedures, automation, documentation, certification, and/or other evaluation metric regarding the development of the system design, the more likely the system design is not well developed (e.g., lower level of system development maturity) resulting in a low evaluation rating.

As another more specific example of an implementation evaluation, the analysis system 10 evaluates the implementation of the system build. For instance, the analysis system 10 evaluates the policies, processes, procedures, automation, certifications, documentation, and/or other evaluation metric (e.g., evaluation metrics) regarding the development of the system build. The more incomplete the data regarding the evaluation metrics, the more likely the development of the system build is incomplete. The fewer numbers of and/or incompleteness of policies, processes, procedures, automation, documentation, certification, and/or other evaluation metric regarding the development of the system build, the more likely the system build is not well developed (e.g., lower level of system development maturity) resulting in a low evaluation rating.

As another more specific example of an implementation evaluation, the analysis system 10 evaluates the implementation of the system functions. For instance, the analysis system 10 evaluates the policies, processes, procedures, automation, certifications, documentation, and/or other evaluation metric (e.g., evaluation metrics) regarding the development of the system functions. The more incomplete the data regarding the evaluation metrics, the more likely the development of the system functions is incomplete. The fewer numbers of and/or incompleteness of policies, processes, procedures, automation, documentation, certification, and/or other evaluation metric regarding the development of the system functions, the more likely the system functions are not well developed (e.g., lower level of system development maturity) resulting in a low evaluation rating.

As another more specific example of an implementation evaluation, the analysis system 10 evaluates the implementation of the security functions. For instance, the analysis system 10 evaluates the policies, processes, procedures, automation, certifications, documentation, and/or other evaluation metric (e.g., evaluation metrics) regarding the development of the security functions. The more incomplete the data regarding the evaluation metrics, the more likely the development of the security functions is incomplete. The fewer numbers of and/or incompleteness of policies, processes, procedures, automation, documentation, certification, and/or other evaluation metric regarding the development of the security functions, the more likely the security functions are not well developed (e.g., lower level of system development maturity) resulting in a low evaluation rating.

As another more specific example of an implementation evaluation, the analysis system 10 evaluates the implementation of the system assets. For instance, the analysis system 10 evaluates the policies, processes, procedures, automation, certifications, documentation, and/or other evaluation metric (e.g., evaluation metrics) regarding the development of the system assets. The more incomplete the data regarding the evaluation metrics, the more likely the development of the system assets is incomplete. The fewer numbers of and/or incompleteness of policies, processes, procedures, automation, documentation, certification, and/or other evaluation metric regarding the development of the system assets, the more likely the system assets are not well developed (e.g., lower level of system development maturity) resulting in a low evaluation rating.

The analysis system 10 also evaluates the operation of the system (or portion thereof) by determining how well the system fulfills its objectives. For example, the analysis system 10 determines how well the assets, system functions, and/or security functions to fulfill the guidelines, the system requirements, the system design, the system build, the objectives of the system, and/or other purpose of the system.

As a more specific example of an operation evaluation, the analysis system 10 evaluates the operation (i.e., fulfillment) of the guidelines by the system requirements. For instance, the analysis system 10 evaluates the policies, processes, procedures, automation, certifications, documentation, and/or other evaluation metric (e.g., evaluation metrics) regarding the fulfillment of the guidelines by the system requirements. The more incomplete the data regarding the evaluation metrics, the more likely the fulfillment of the guidelines by the system requirements is incomplete. The fewer numbers of and/or incompleteness of policies, processes, procedures, automation, documentation, certification, and/or other evaluation metric regarding the fulfillment of the guidelines by the system requirements, the more likely the system requirements does not adequately fulfill the guidelines (e.g., lower level of system development maturity) resulting in a low evaluation rating.

As another more specific example of an operation evaluation, the analysis system 10 evaluates the operation (i.e., fulfillment) of the guidelines and/or the system requirements by the system design. For instance, the analysis system 10 evaluates the policies, processes, procedures, automation, certifications, documentation, and/or other evaluation metric (e.g., evaluation metrics) regarding the fulfillment of the guidelines and/or the system requirements by the system design. The more incomplete the data regarding the evaluation metrics, the more likely the fulfillment of the guidelines and/or the system requirements by the system design is incomplete. The fewer numbers of and/or incompleteness of policies, processes, procedures, automation, documentation, certification, and/or other evaluation metric regarding the fulfillment of the guidelines and/or the system requirements by the system design, the more likely the system design does not adequately fulfill the guidelines and/or the system requirements (e.g., lower level of system operation maturity) resulting in a low evaluation rating.

As another more specific example of an operation evaluation, the analysis system 10 evaluates the operation (i.e., fulfillment) of the guidelines, the system requirements, and/or the system design by the system build. For instance, the analysis system 10 evaluates the policies, processes, procedures, automation, certifications, documentation, and/or other evaluation metric (e.g., evaluation metrics) regarding the fulfillment of the guidelines, the system requirements, and/or the system design by the system build. The more incomplete the data regarding the evaluation metrics, the more likely the fulfillment of the guidelines, the system requirements, and/or the system design by the system build is incomplete. The fewer numbers of and/or incompleteness of policies, processes, procedures, automation, documentation, certification, and/or other evaluation metric regarding the fulfillment of the guidelines, the system requirements, and/or the system design by the system build, the more likely the system build does not adequately fulfill the guidelines, the system requirements, and/or the system design (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system in performing the system functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the system functions by the system. The more incomplete the data regarding the evaluation metrics, the more likely the fulfillment of the guidelines, the system requirements, the system design, the system, and/or the objectives regarding the system functions is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system does not adequately fulfill the guidelines, the system requirements, the system design, the system build, and/or the objectives regarding the system functions (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system in performing the security functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the security functions by the system. The more incomplete the data regarding the evaluation metrics, the more likely the fulfillment of the guidelines, the system requirements, the system design, the system, and/or the objectives regarding the security functions is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system does not adequately fulfill the guidelines, the system requirements, the system design, the system build, and/or the objectives regarding the security functions (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the system assets. The more incomplete the data regarding the evaluation metrics, the more likely the fulfillment of the guidelines, the system requirements, the system design, the system, and/or the objectives regarding the system assets is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system assets do not adequately fulfill the guidelines, the system requirements, the system design, the system build, and/or the objectives (e.g., lower level of system operation maturity) resulting in a low evaluation rating.

The analysis system 10 also evaluates the self-analysis capabilities of the system (or portion thereof) by determining how well the self-analysis functions are implemented and how they subsequently fulfill the self-analysis objectives. In an example, the self-analysis capabilities of the system are a self-analysis system that overlies the system. Accordingly, the overlaid self-analysis system can be evaluated by the analysis system 10 in a similar manner as the system under test 91. For example, the understanding, implementation, and/or operation of the overlaid self-analysis system can be evaluated with respect to self-analysis guidelines, self-analysis requirements, design of the self-analysis system, build of the self-analysis system, and/or operation of the self-analysis system As part of the evaluation process, the analysis system 10 may identify deficiencies and, when appropriate, auto-correct a deficiency. For example, the analysis system 10 identifies deficiencies in the understanding, implementation, and/or operation of the guidelines, the system requirements, the system design, the system build, the resulting system, and/or the system objectives. For example, the analysis system 10 obtains addition information from the system via a data gathering process (e.g., producing discovered data) and/or from a system proficiency resource (e.g., producing desired data). The analysis system 10 uses the discovered data and/or desired data to identify the deficiencies. When possible, the analysis system 10 auto-corrects the deficiencies. For example, when a software tool that aides in the creation of guidelines and/or system requirements is missing from the system's tool set, the analysis system 10 can automatically obtain a copy of the missing software tool for the system.

Figure 26:
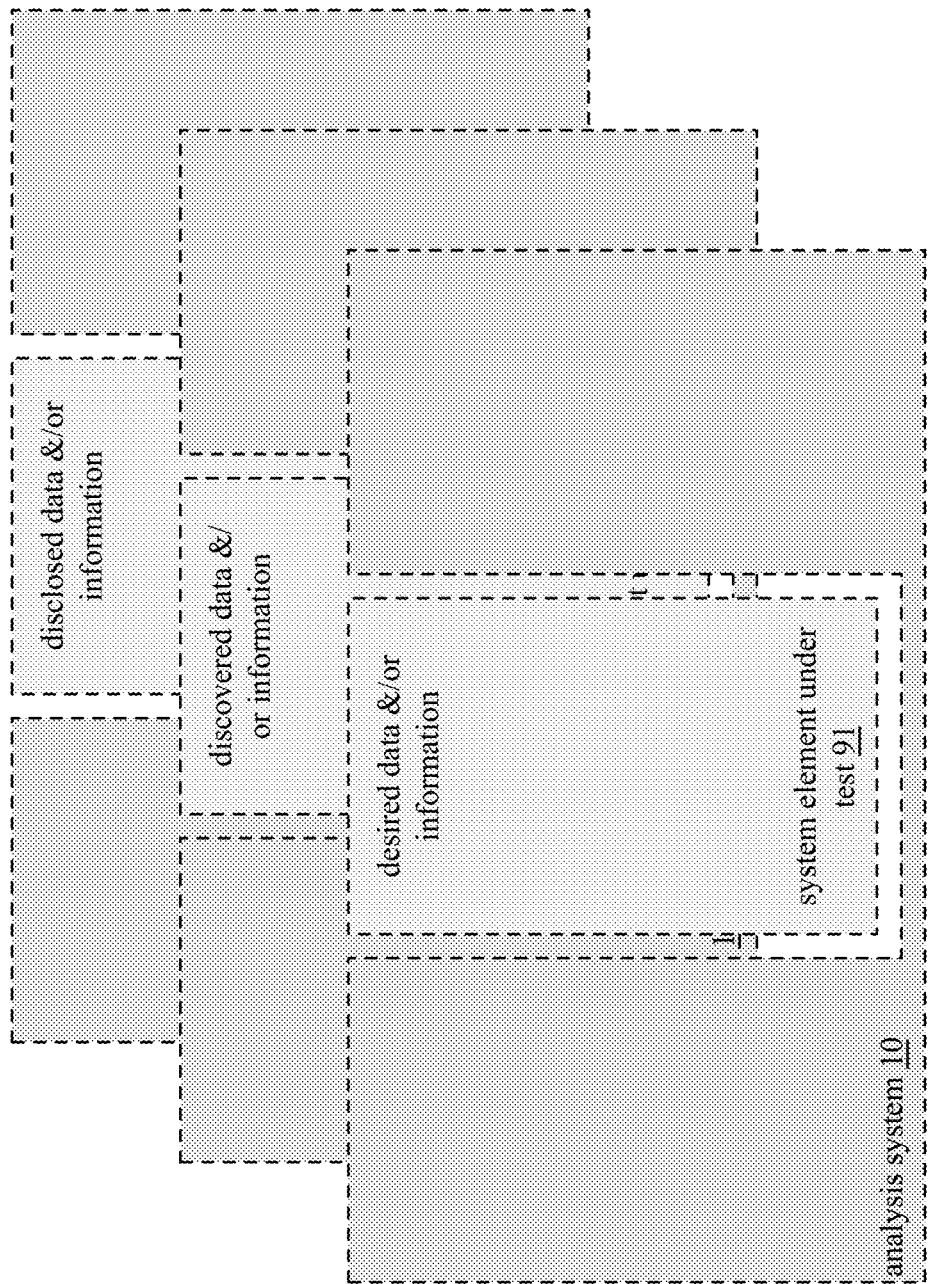
FIG. 26 is a schematic block diagram of another example of an analysis system evaluating a system element under test of a system in accordance with the present disclosure.

FIG. 26 is a schematic block diagram of another example of an analysis system 10 evaluating a system element under test 91. In this example, the analysis system 10 is evaluating the system element under test 91 from three evaluation viewpoints: disclosed data, discovered data, and desired data. Disclosed data is the known data of the system at the outset of an analysis, which is typically supplied by a system administrator and/or is obtained from data files of the system. Discovered data is the data discovered about the system from the by the analysis system 10 during the analysis. Desired data is the data obtained by the analysis system 10 from system proficiency resources regarding desired guidelines, system requirements, system design, system build, and/or system operation.

The evaluation from the three evaluation viewpoints may be done serially, in parallel, and/or in a parallel-serial combination to produce three sets of evaluation ratings. One set for disclosed data, one set for discovered data, and one set for desired data.

A set of evaluation ratings includes one or more of: an evaluation rating regarding the understanding of the guidelines; an evaluation rating regarding the understanding of the system requirements; an evaluation rating regarding the understanding of the system design; an evaluation rating regarding the understanding of the system build; an evaluation rating regarding the understanding of the system operation; an evaluation rating regarding the development of the system requirements from the guidelines; an evaluation rating regarding the design from the system requirements; an evaluation rating regarding the system build from the design; an evaluation rating regarding the system operation based on the system design and/or system build; an evaluation rating regarding the guidelines; an evaluation rating regarding the system requirements; an evaluation rating regarding the system design; an evaluation rating regarding the system build; and/or an evaluation rating regarding the system operation.

Figure 27:
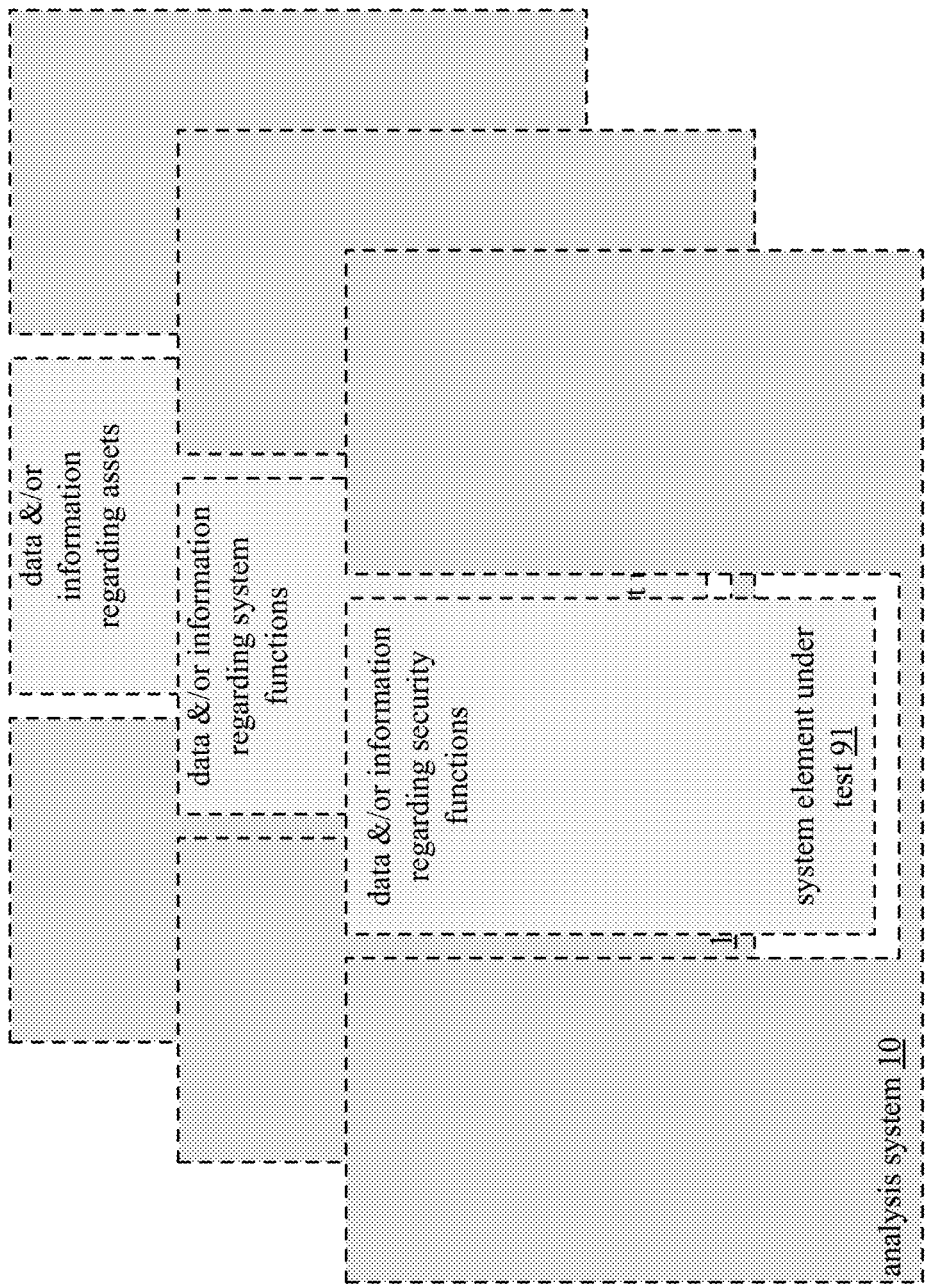
FIG. 27 is a schematic block diagram of another example of an analysis system evaluating a system element under test of a system in accordance with the present disclosure.

FIG. 27 is a schematic block diagram of another example of an analysis system 10 evaluating a system element under test 91. In this example, the analysis system 10 is evaluating the system element under test 91 from three evaluation viewpoints: disclosed data, discovered data, and desired data with regard to security functions. The evaluation from the three evaluation viewpoints for the security functions may be done serially, in parallel, and/or in a parallel-serial combination to produce three sets of evaluation ratings with respect to security functions: one for disclosed data, one for discovered data, and one for desired data.

Figure 28:
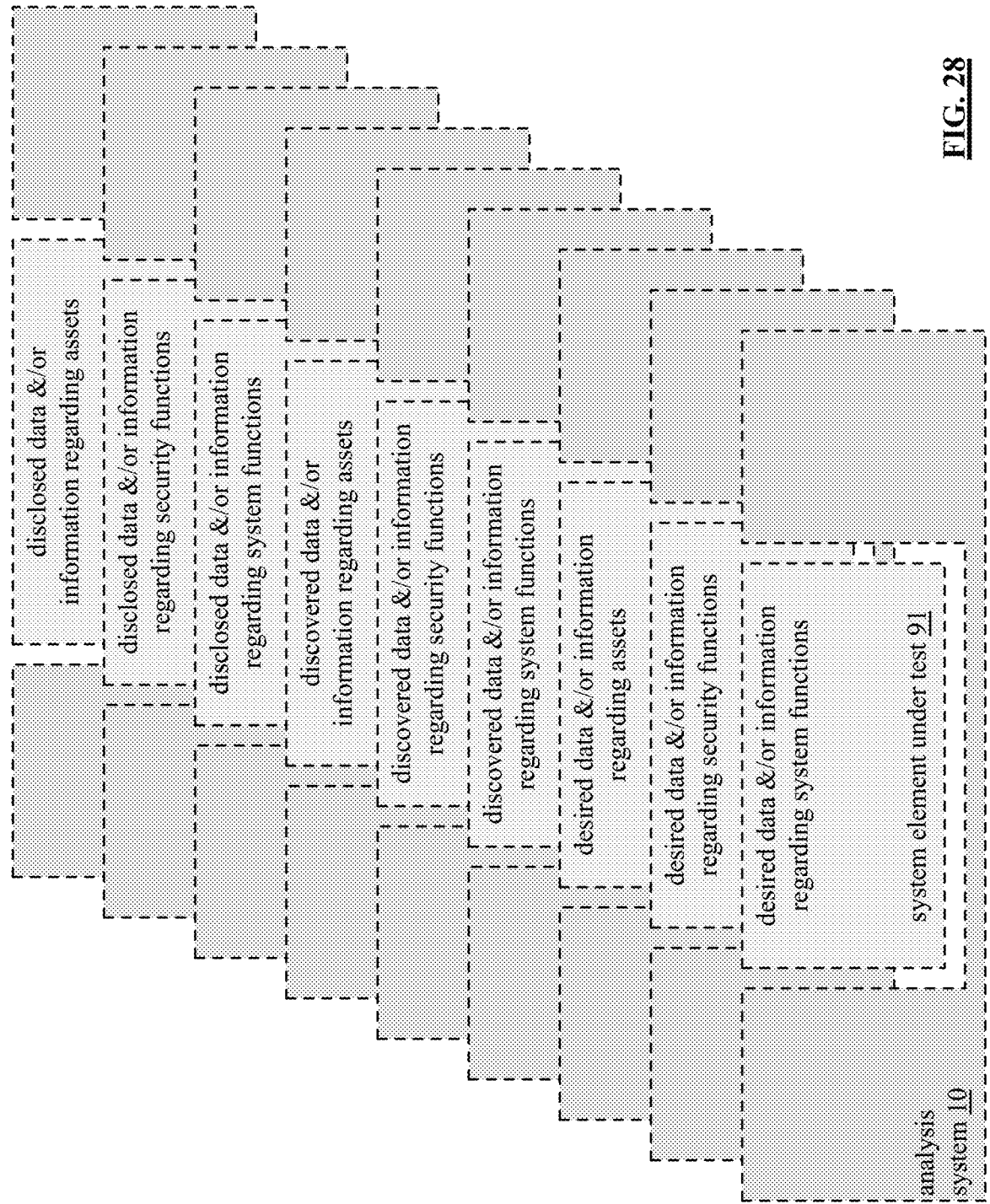
FIG. 28 is a schematic block diagram of another example of an analysis system evaluating a system element under test of a system in accordance with the present disclosure.

FIG. 28 is a schematic block diagram of another example of an analysis system 10 evaluating a system element under test 91. In this example, the analysis system 10 is evaluating the system element under test 91 from three evaluation viewpoints and from three evaluation modes. For example, disclosed data regarding assets, discovered data regarding assets, desired data regarding assets, disclosed data regarding system functions, discovered data regarding system functions, desired data regarding system functions, disclosed data regarding security functions, discovered data regarding security functions, and desired data regarding security functions.

The evaluation from the nine evaluation viewpoints & evaluation mode combinations may be done serially, in parallel, and/or in a parallel-serial combination to produce nine sets of evaluation ratings one for disclosed data regarding assets, one for discovered data regarding assets, one for desired data regarding assets, one for disclosed data regarding system functions, one for discovered data regarding system functions, one for desired data regarding functions, one for disclosed data regarding security functions, one for discovered data regarding security functions, and one for desired data regarding security functions.

Figure 29:
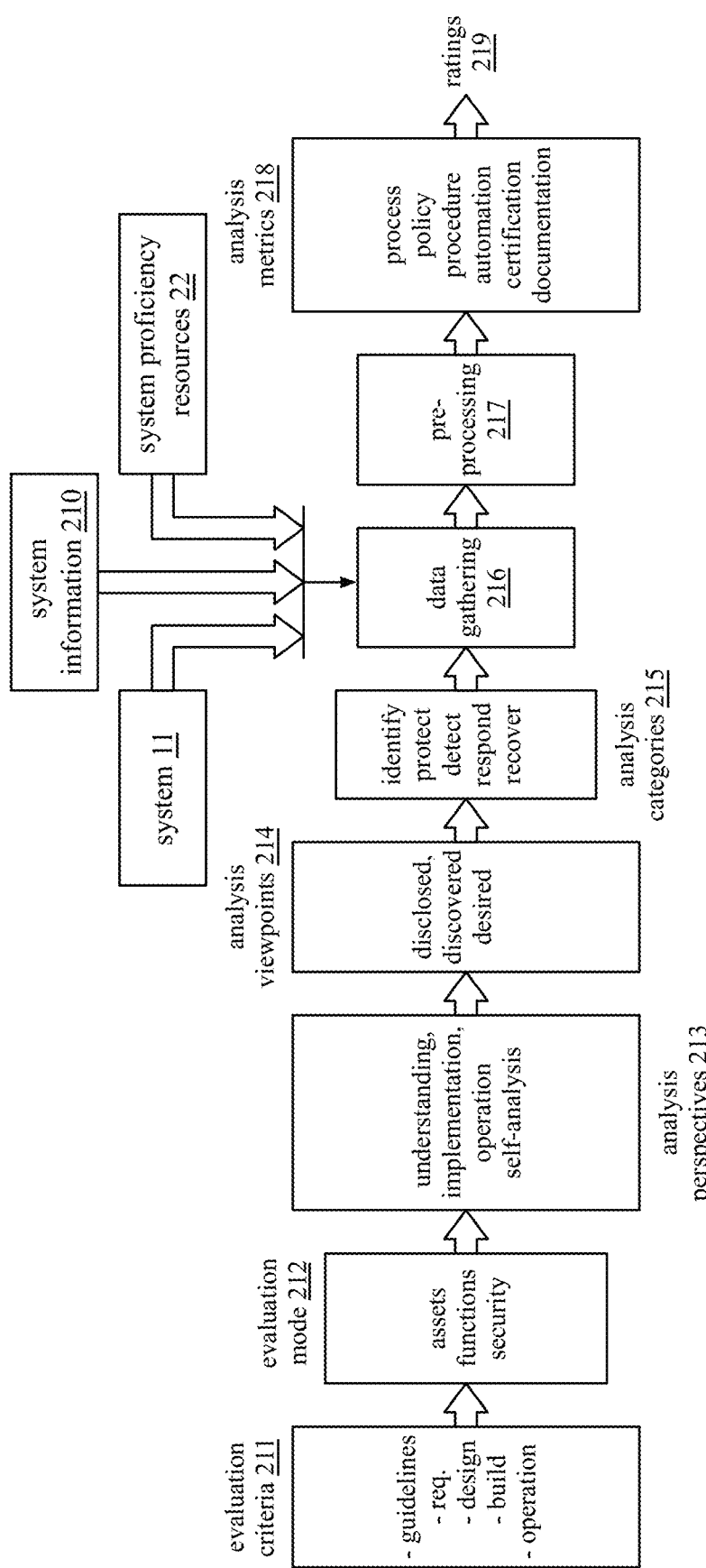
FIG. 29 is a schematic block diagram of an example of the functioning of an analysis system evaluating a system element under test of a system in accordance with the present disclosure.

FIG. 29 is a schematic block diagram of an example of the functioning of an analysis system 10 evaluating a system element under test 91. Functionally, the analysis system 10 includes evaluation criteria 211, evaluation mode 212, analysis perspective 213, analysis viewpoint 214, analysis categories 215, data gathering 216, pre-processing 217, and analysis metrics 218 to produce one or more ratings 219. The evaluation criteria 211 includes guidelines, system requirements, system design, system build, and system operation. The evaluation mode 212 includes assets, system functions, and security functions. The evaluation criteria 211 and the evaluation mode 212 are part of the system aspect, which corresponds to the system, or portion thereof, being evaluated.

The analysis perspective 213 includes understanding, implementation, operation, and self-analysis. The analysis viewpoint includes disclosed, discovered, and desired. The analysis categories 215 include identify, protect, detect, respond, and recover. The analysis perspective 213, the analysis viewpoint 214, and the analysis categories correspond to how the system, or portion thereof, will be evaluated. For example, the system, or portion thereof, is being evaluated regarding the understanding of the system's ability to identify assets, system functions, and/or security functions from discovered data.

The analysis metrics 218 includes process, policy, procedure, automation, certification, and documentation. The analysis metric 218 and the pre-processing 217 corresponds to manner of evaluation. For example, the policies regarding system's ability to identify assets, system functions, and/or security functions from discovered data of the system, or portion thereof, are evaluated to produce an understanding evaluation rating.

In an example of operation, the analysis system 10 determines what portion of the system is evaluated (i.e., a system aspect). As such, the analysis system 10 determines one or more system elements (e.g., including one or more system assets which are physical assets and/or conceptual assets), one or more system criteria (e.g., guidelines, system requirements, system design, system build, and/or system operation), and one or more system modes (e.g., assets, system functions, and security functions). The analysis system 10 may determine the system aspect in a variety of ways. For example, the analysis system 10 receives an input identifying the system aspect from an authorized operator of the system (e.g., IT personnel, executive personnel, etc.). As another example, the analysis system determines the system aspect in a systematic manner to evaluate various combinations of system aspects as part of an overall system evaluation. The overall system evaluation may be done one time, periodically, or continuously. As yet another example, the analysis system determines the system aspect as part of a systematic analysis of a section of the system, which may be done one time, periodically, or continuously.

The analysis system then determines how the system aspect is to be evaluated by selecting one or more analysis perspectives (understanding, implementation, operation, and self-analysis), one or more analysis viewpoints (disclosed, discovered, and desired), and one or more analysis categories (identify, protect, detect, respond, and recover). The analysis system 10 may determine how the system aspect is to be evaluated in a variety of ways. For example, the analysis system 10 receives an input identifying how the system aspect is to be evaluated from an authorized operator of the system (e.g., IT personnel, executive personnel, etc.). As another example, the analysis system determines how the system aspect is to be evaluated in a systematic manner to evaluate the system aspect in various combinations of analysis perspectives, analysis viewpoints, and analysis categories as part of an overall system evaluation. The overall system evaluation may be done one time, periodically, or continuously. As yet another example, the analysis system determines how the system aspect is to be evaluated as part of a systematic analysis of a section of the system, which may be done one time, periodically, or continuously.

The analysis system 10 also determines one or more analysis metrics (e.g., process, policy, procedure, automation, certification, and documentation) regarding the manner for evaluating the system aspect in accordance with how it's to be evaluated. A policy sets out a strategic direction and includes high-level rules or contracts regarding issues and/or matters. For example, all software shall be a most recent version of the software. A process is a set of actions for generating outputs from inputs and includes one or more directives for generating outputs from inputs. For example, a process regarding the software policy is that software updates are to be performed by the IT department and all software shall be updated within one month of the release of the new version of software.

A procedure is the working instructions to complete an action as may be outlined by a process. For example, the IT department handling software updates includes a procedure that describes the steps for updating the software, verifying that the updated software works, and recording the updating and verification in a software update log. Automation is in regard to the level of automation the system includes for handling actions, issues, and/or matters of policies, processes, and/or procedures. Documentation is in regard to the level of documentation the system has regard guidelines, system requirements, system design, system build, system operation, system assets, system functions, security functions, system understanding, system implementation, operation of the system, policies, processes, procedures, etc. Certification is in regard to certifications of the system, such as maintenance certification, regulatory certifications, etc.

In an example, the analysis system 10 receives an input identifying manner in which to evaluate the system aspect from an authorized operator of the system (e.g., IT personnel, executive personnel, etc.). As another example, the analysis system determines the manner in which to evaluate the system aspect in a systematic manner to evaluate the system aspect in various combinations of analysis metrics as part of an overall system evaluation. The overall system evaluation may be done one time, periodically, or continuously. As yet another example, the analysis system determines the manner in which to evaluate the system aspect as part of a systematic analysis of a section of the system, which may be done one time, periodically, or continuously.

Once the analysis system has determined the system aspect, how it is to be evaluated, and the manner for evaluation, the data gathering function 216 gathers data relevant to the system aspect, how it's to be evaluated, and the manner of evaluation from the system 11, from resources that store system information 210 (e.g., from the system, from a private storage of the analysis system, etc.), and/or from one or more system proficiency resources 22. For example, a current evaluation is regarding an understanding (analysis perspective) of policies (analysis metric) to identify (analysis category) assets (evaluation mode) of an engineering department (system elements) regarding operations (evaluation criteria) that the assets perform based on discovered data (analysis viewpoint). As such, the data gathering function 216 gathers data regarding policies to identify assets of the engineering department and the operations they perform using one or more data discovery tools.

The pre-processing function 217 processes the gathered data by normalizing the data, parsing the data, tagging the data, and/or de-duplicating the data. The analysis system evaluations the processed data in accordance with the selected analysis metric to produce one or more ratings 219. For example, the analysis system would produce a rating regarding the understanding of policies to identify assets of an engineering department regarding operations that the assets perform based on discovered data. The rating 219 is on a scale from low to high. In this example, a low rating indicates issues with the understanding and a high rating indicates no issues with the understanding.

Figure 30:
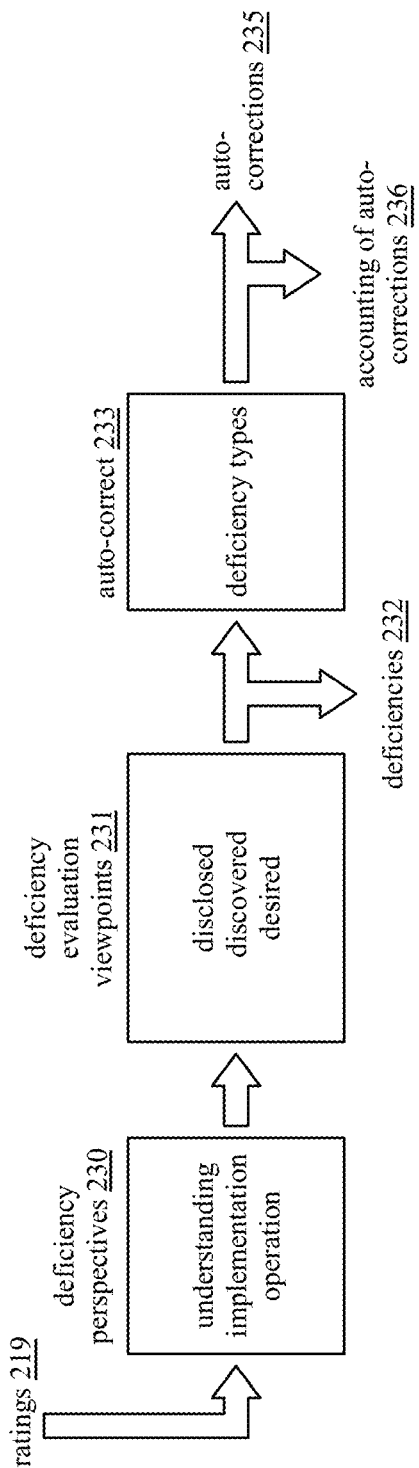
FIG. 30 is a schematic block diagram of another example of the functioning of an analysis system evaluating a system element under test of a system in accordance with the present disclosure.

FIG. 30 is a schematic block diagram of another example of the functioning of an analysis system 10 evaluating a system element under test 91. The functioning of the analysis system includes a deficiency perspective function 230, a deficiency evaluation viewpoint function 31, and an auto-correction function 233.

The deficiency perspective function 230 receives one or more ratings 219 and may also receive the data used to generate the ratings 219. From these inputs, the deficiency perspective function 230 determines whether there is an understanding issue, an implementation issue, and/or an operation issue. For example, an understanding (analysis perspective) issue relates to a low understanding evaluation rating for a specific evaluation regarding policies (analysis metric) to identify (analysis category) assets (evaluation mode) of an engineering department (system elements) regarding operations (evaluation criteria) that the assets perform based on discovered data (analysis viewpoint).

As another example, an implementation (analysis perspective) issue relates to a low implementation evaluation rating for a specific evaluation regarding implementation and/or use of policies (analysis metric) to identify (analysis category) assets (evaluation mode) of an engineering department (system elements) regarding operations (evaluation criteria) that the assets perform based on discovered data (analysis viewpoint). As yet another example, an operation (analysis perspective) issue relates to a low operation evaluation rating for a specific evaluation regarding consistent, reliable, and/or accurate mechanism(s) to identify (analysis category) assets (evaluation mode) of an engineering department (system elements) regarding operations (evaluation criteria) that the assets perform based on discovered data (analysis viewpoint) and on policies (analysis metric).

When an understanding, implementation, and/or operation issue is identified, the deficiency evaluation viewpoint function 231 determines whether the issue(s) is based on disclosed data, discovered data, and/or desired data. For example, an understanding issue may be based on a difference between disclosed data and discovered data. As a specific example, the disclosed data includes a policy outline how to identify (analysis category) assets (evaluation mode) of an engineering department (system elements) regarding operations (evaluation criteria) that the assets perform, which is listed as version 1.12 and a last revision date of Oct. 2, 2020. In this specific example, the discovered data includes the same policy, but is has been updated to version 1.14 and the last revision date as Nov. 13, 2020. As such, the deficiency evaluation viewpoint function identifies a deficiency 232 in the disclosed data as being an outdated policy.

As another specific example, the disclosed data includes a policy outline how to identify (analysis category) assets (evaluation mode) of an engineering department (system elements) regarding operations (evaluation criteria) that the assets perform. The disclosed data also shows an inconsistent use and/or application of the policy resulting one or more assets not being properly identified. In this instance, the deficiency evaluation viewpoint function identifies a deficiency 232 in the disclosed data as being inconsistent use and/or application of the policy.

The auto-correct function 233 receives a deficiency 232 and interprets it to determine a deficiency type, i.e., a nature of the understanding issue, the implementation issue, and/or the operation issues. Continuing with the outdated policy example, the nature of the understanding issue is that there is a newer version of the policy. Since there is a newer version available, the auto-correct function 233 can update the policy to the newer version for the system (e.g., an auto-correction). In addition to making the auto-correction 235, the analysis system creates an accounting 236 of the auto-correction (e.g., creates a record). The record includes an identity of the deficiency, date information, what auto-correction was done, how it was done, verification that it was done, and/or more or less data as may be desired for recording auto-corrections.

As another specific example, a deficiency 232 is discovered that an asset exists in the engineering department that was not included in the disclosed data. This deficiency may include one or more related deficiencies. For example, a deficiency of design, a deficiency of build, a deficiency is oversight of asset installation, etc. The deficiencies of design, build, and/or installation oversight can be auto-corrected; the deficiency of an extra asset cannot. With regard to the deficiency of the extra asset, the analysis system generates a report regarding the extra asset and the related deficiencies.

Figure 31:
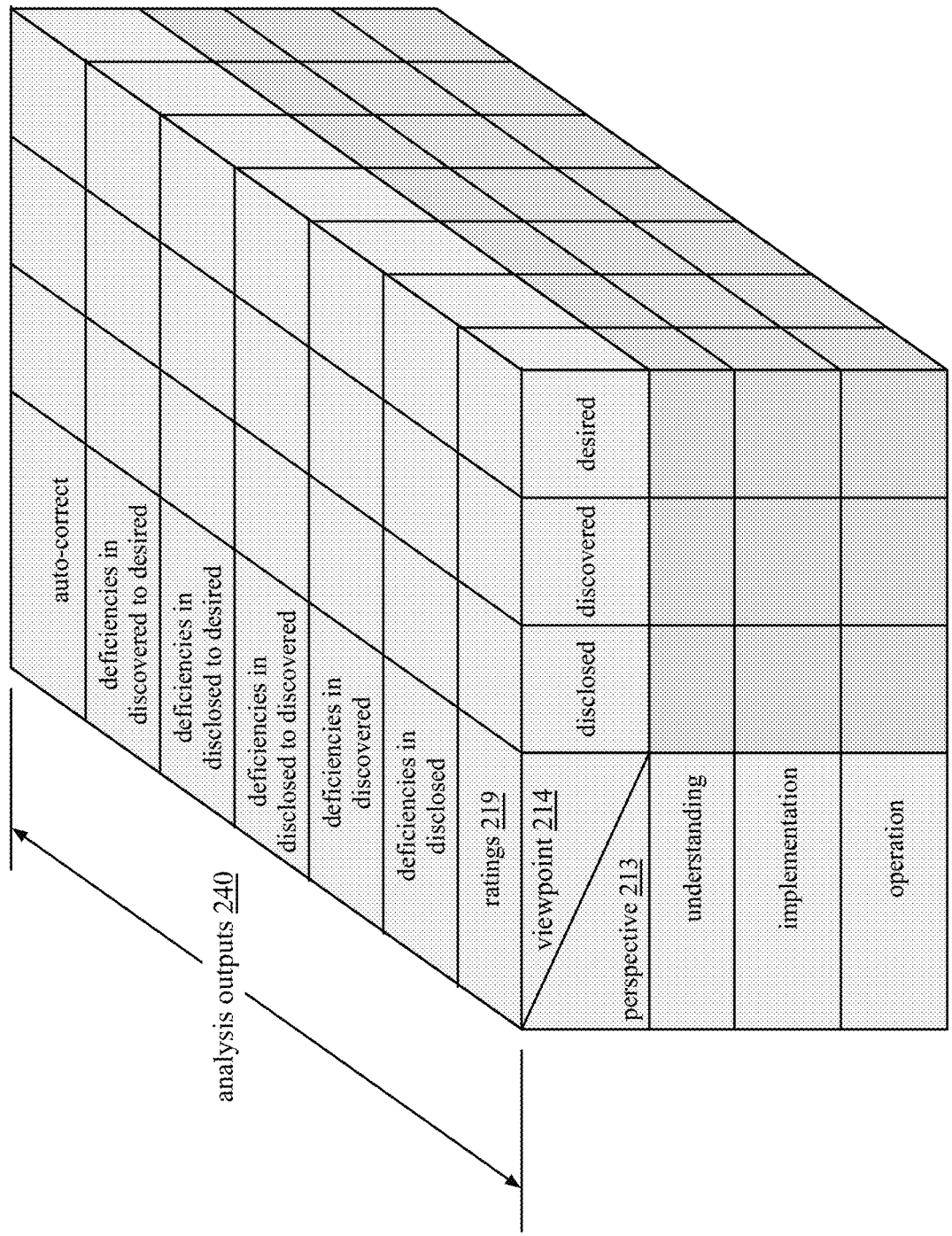
FIG. 31 is a diagram of an example of evaluation options of an analysis system for evaluating a system element under test of a system in accordance with the present disclosure.

FIG. 31 is a diagram of an example of evaluation options of an analysis system 10 for evaluating a system element under test 91. The evaluation options are shown in a three-dimensional tabular form. The rows include analysis perspective 213 options (e.g., understanding, implementation, and operation). The columns includes analysis viewpoint 214 option (e.g., disclosed, discovered, and desired). The third dimension includes analysis output 240 options (e.g., ratings 219, deficiencies in disclosed data, deficiencies in discovered data, deficiencies in disclosed to discovered data, deficiencies in disclosed to desired data, deficiencies in discovered to desired data, and auto-correct.

The analysis system 10 can evaluate the system element under test 91 (e.g., system aspect) in one or more combinations of a row selection, a column selection, and/or a third dimension selection. For example, the analysis system performs an evaluation from an understanding perspective, a disclosed data viewpoint, and a ratings output. As another example, the analysis system performs an evaluation from an understanding perspective, all viewpoints, and a ratings output.

FIG. 32 is a diagram of another example of evaluation options of an analysis system 10 for evaluating a system element under test 91 (e.g., system aspect). The evaluation options are shown in the form of a table. The rows are assets (physical and conceptual) and the columns are system functions. The analysis system 10 can evaluate the system element under test 91 (e.g., system aspect) in one or more combinations of a row selection and a column selection.

For example, the analysis system 10 can evaluate user HW with respect to business operations. As another example, the analysis system 10 can evaluate physical assets with respect to data flow. As another example, the analysis system 10 can evaluate user SW with respect to all system functions.

FIG. 33 is a diagram of another example of evaluation options of an analysis system 10 for evaluating a system element under test 91 (e.g., system aspect). The evaluation options are shown in the form of a table. The rows are security functions and the columns are system functions. The analysis system 10 can evaluate the system element under test 91 (e.g., system aspect) in one or more combinations of a row selection and a column selection.

For example, the analysis system 10 can evaluate threat detection with respect to business operations. As another example, the analysis system 10 can evaluate all security functions with respect to data flow. As another example, the analysis system 10 can evaluate threat avoidance with respect to all system functions.

FIG. 34 is a diagram of another example of evaluation options of an analysis system 10 for evaluating a system element under test 91 (e.g., system aspect). The evaluation options are shown in the form of a table. The rows are assets (physical and conceptual) and the columns are security functions. The analysis system 10 can evaluate the system element under test 91 (e.g., system aspect) in one or more combinations of a row selection and a column selection.

For example, the analysis system 10 can evaluate user HW with respect to threat recovery. As another example, the analysis system 10 can evaluate physical assets with respect to threat resolution. As another example, the analysis system 10 can evaluate user SW with respect to all security functions.

Figure 35:
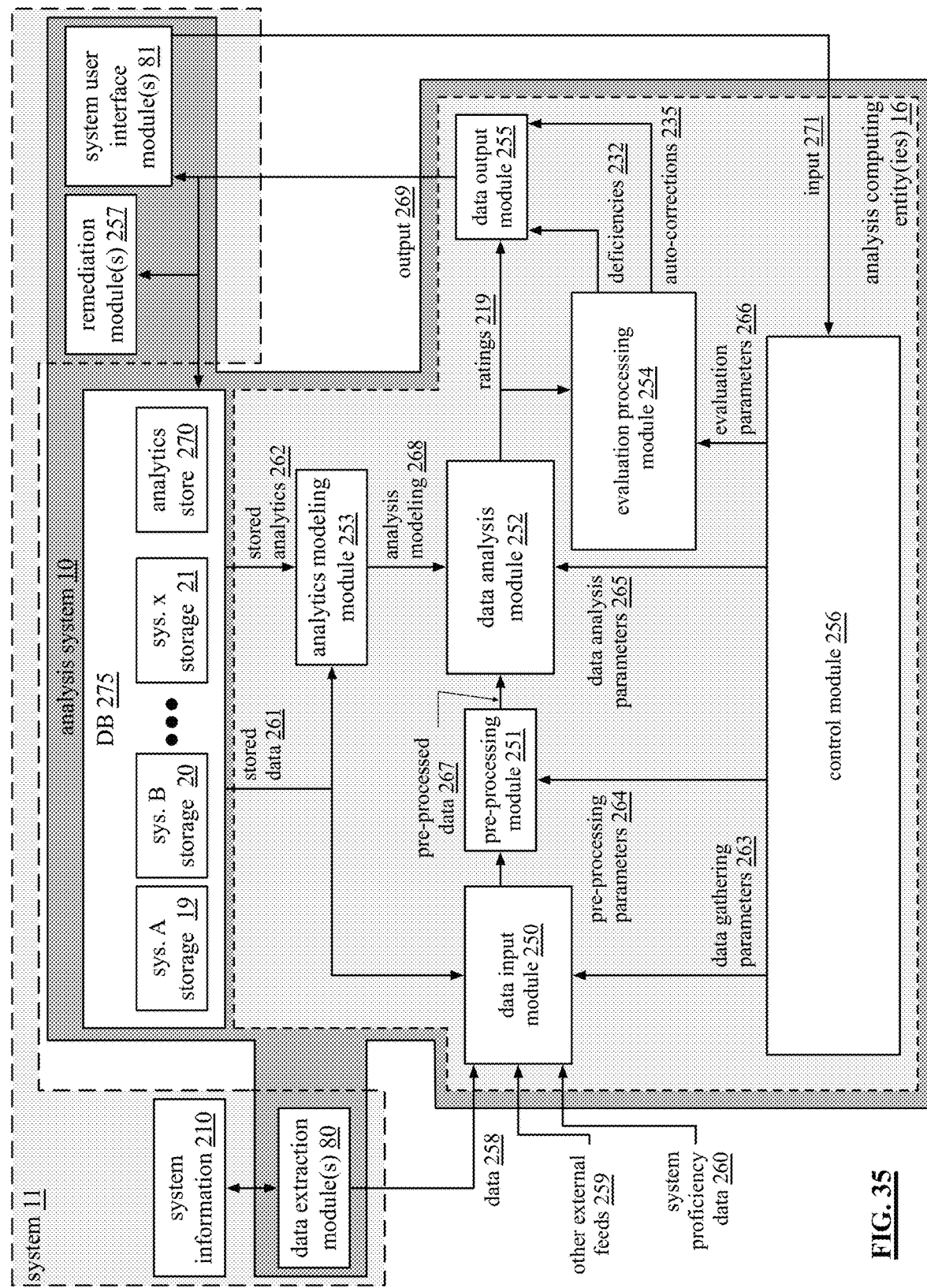
FIG. 35 is a schematic block diagram of an embodiment of an analysis system coupled to a system in accordance with the present disclosure.

FIG. 35 is a schematic block diagram of an embodiment of an analysis system 10 that includes one or more computing entities 16, one or more databases 275, one or more data extraction modules 80, one or more system user interface modules 81, and one or more remediation modules 257. The computing entity(ies) 16 is configured to include a data input module 250, a pre-processing module 251, a data analysis module 252, an analytics modeling module 253, an evaluation processing module 254, a data output module 255, and a control module 256. The database 275, which includes one or more databases, stores the private data for a plurality of systems (e.g., systems A-x) and stores analytical data 270 of the analysis system 10.

In an example, the system 11 provides input 271 to the analysis system 10 via the system user interface module 80. The system user interface module 80 provides a user interface for an administrator of the system 11 and provides a s secure end-point of a secure data pipeline between the system 11 and the analysis system 10. While the system user interface module 81 is part of the analysis system, it is loaded on and is executed on the system 11.

Via the system user interface module 81, the administrator makes selections as to how the system is to be evaluated and the desired output from the evaluation. For example, the administrator selects evaluate system, which instructs the analysis system 10 to evaluate the system from most every, if not every, combination of system aspect (e.g., system element, system criteria, and system mode), evaluation aspect (e.g., evaluation perspective, evaluation viewpoint, and evaluation category), evaluation metric (e.g., process, policy, procedure, automation, documentation, and certification), and analysis output (e.g., an evaluation rating, deficiencies identified, and auto-correction of deficiencies). As another example, the administrator selects one or more system aspects, one or more evaluation aspects, one or more evaluation metrics, and/or one or more analysis outputs.

The analysis system 10 receives the evaluation selections as part of the input 271. A control module 256 interprets the input 271 to determine what part of the system is to be evaluated (e.g., system aspects), how the system is to be evaluated (e.g., evaluation aspects), the manner in which the system is to be evaluated (e.g., evaluation metrics), and/or the resulting evaluation output (e.g., an evaluation rating, a deficiency report, and/or auto-correction). From the interpretation of the input, the control module 256 generates data gathering parameters 263, pre-processing parameters 264, data analysis parameters 265, and evaluation parameters 266.

The control module 256 provides the data gathering parameters 263 to the data input module 250. The data input module 250 interprets the data gathering parameters 263 to determine data to gather. For example, the data gathering parameters 263 are specific to the evaluation to be performed by the analysis system 10. As a more specific example, if the analysis system 10 is evaluating the understanding of the policies, processes, documentation, and automation regarding the assets built for an engineering department, then the data gathering parameters 263 would prescribe gathering data related to policies, processes, documentation, and automation regarding the assets built for the engineering department.

The data input module 250 may gather (e.g., retrieve, request, etc.) from a variety of sources. For example, the data input module 250 gathers data 258 from the data extraction module 80. In this example, the data input module 250 provides instructions to the data extraction module 80 regarding the data being requested. The data extraction module 80 pulls the requested data from system information 210, which may be centralized data of the system, system administration data, and/or data from assets of the system.

As another example, the data input module 250 gathers data from one or more external data feeds 259. A source of an external data feed includes one or more business associate computing devices 23, one or more publicly available servers 27, and/or one or more subscriber servers 28. Other sources of external data feeds 259 includes bot computing devices 25, and/or bad actor computing devices 26. Typically, the data input module 250 does not seek data inputs from bot computing devices 25 and/or bad actor computing devices 26 except under certain circumstances involving specific types of cybersecurity risks.

As another example, the data input module 250 gathers system proficiency data 260 from one or more system proficiency resources 22. As a specific example, for a data request that includes desired data, the data input module 250 addresses one or more system proficiencies resources 22 to obtain the desired system proficiency data 260. For example, system proficiency data 260 includes information regarding best-in-class practices (for system requirements, for system design, for system implementation, and/or for system operation), governmental and/or regulatory requirements, security risk awareness and/or risk remediation information, security risk avoidance, performance optimization information, system development guidelines, software development guideline, hardware requirements, networking requirements, networking guidelines, and/or other system proficiency guidance.

As another example, the data input module 250 gathers stored data 261 from the database 275. The stored data 261 is previously stored data that is unique to the system 11, is data from other systems, is previously processed data, is previously stored system proficiency data, and/or is previously stored data that assists in the current evaluation of the system.

The data input module 250 provides the gathered data to the pre-processing module 251. Based on the pre-processing parameters 264 (e.g., normalize, parse, tag, de-duplication, sort, filter, etc.), the pre-processing module 251 processes the gathered data to produce pre-processed data 267. The pre-processed data 267 may be stored in the database 275 and later retrieved as stored data 261.

The analysis modeling module 253 retrieves stored data 261 and/or stored analytics 262 from the database 275. The analysis modeling module 253 operates to increase the artificial intelligence of the analysis system 10. For example, the analysis modeling module 253 evaluates stored data from one or more systems in a variety of ways to test the evaluation processes of the analysis system. As a more specific example, the analysis modeling module 253 models the evaluation of understanding of the policies, processes, documentation, and automation regarding the assets built for an engineering department across multiple systems to identify commonalities and/or deviations. The analysis modeling module 253 interprets the commonalities and/or deviations to adjust parameters of the evaluation of understanding and models how the adjustments affect the evaluation of understanding. If the adjustments have a positive effect, the analysis modeling module 253 stores them as analytics 262 and/or analysis modeling 268 in the database 275.

The data analysis module 252 receives the pre-processed data 267, the data analysis parameters 265 and may further receive optional analysis modeling data 268. The data analysis parameters 265 includes identify of selected evaluation categories (e.g., identify, protect, detect, respond, and recover), identity of selected evaluation sub-categories, identify of selected evaluation sub-sub categories, identity of selected analysis metrics (e.g., process, policy, procedure, automation, certification, and documentation), grading parameters for the selected analysis metrics (e.g., a scoring scale for each type of analysis metric), identity of selected analysis perspective (e.g., understanding, implementation, operation, and self-analysis), and/or identity of selected analysis viewpoint (e.g., disclosed, discovered, and desired).

The data analysis module 252 generates one or more ratings 219 for the pre-processed data 267 based on the data analysis parameters 265. The data analysis module 252 may adjust the generation of the one or more rating 219 based on the analysis modeling data 268. For example, the data analysis module 252 evaluates the understanding of the policies, processes, documentation, and automation regarding the assets built for an engineering department based on the pre-processed data 267 to produce at least one evaluation rating 219.

Continuing with this example, the analysis modeling 268 is regarding the evaluation of understanding of the policies, processes, documentation, and automation regarding the assets built for an engineering department of a plurality of different organizations operating on a plurality of different systems. The modeling indicates that if processes are well understood, the understanding of the policies is less significant in the overall understanding. In this instance, the data analysis module 252 may adjusts its evaluation rating of the understanding to a more favorably rating if the pre-processed data 267 correlates with the modeling (e.g., good understanding of processes).

The data analysis module 252 provides the rating(s) 219 to the data output module 255 and to the evaluation processing module 254. The data output module 255 provides the rating(s) 219 as an output 269 to the system user interface module 81. The system user interface module 81 provides a graphical rendering of the rating(s) 219.

The evaluation processing module 254 processes the rating(s) 219 based on the evaluation parameters 266 to identify deficiencies 232 and/or to determine auto-corrections 235. The evaluation parameters 266 provide guidance on how to evaluate the rating(s) 219 and whether to obtain data (e.g., pre-processed data, stored data, etc.) to assist in the evaluation. The evaluation guidance includes how deficiencies are to be identified. For example, identify the deficiencies based on the disclosed data, based on the discovered data, based on a differences between the disclosed and discovered data, based on a differences between the disclosed and desired data, and/or based on a differences between the discovered and desired data. The evaluation guidance further includes whether auto-correction is enabled. The evaluation parameters 266 may further includes deficiency parameters, which provide a level of tolerance between the disclosed, discovered, and/or desired data when determining deficiencies.

The evaluation processing module 254 provides deficiencies 232 and/or the auto-corrections 235 to the data output module 255. The data output module 255 provides the deficiencies 232 and/or the auto-corrections 235 as an output 269 to the system user interface module 81 and to the remediation module 257. The system user interface module 81 provides a graphical rendering of the deficiencies 232 and/or the auto-corrections 235.

The remediation module 257 interprets the deficiencies 232 and the auto-corrections 235 to identify auto-corrections to be performed within the system. For example, if a deficiency is a computing device having an outdated user software application, the remediation module 257 coordinates obtaining a current copy of the user software application, uploading it on the computing device, and updating maintenance logs.

Figure 36:
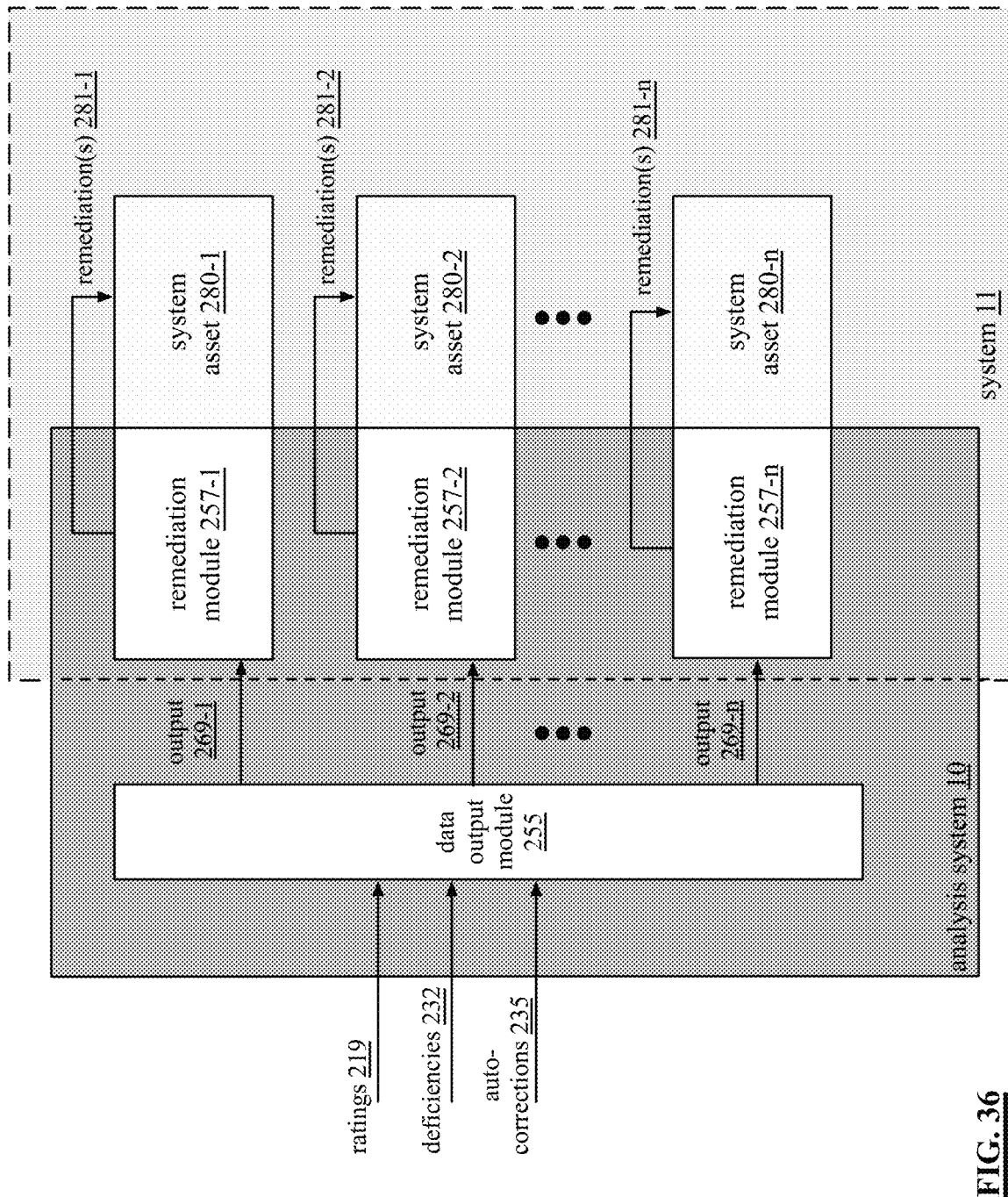
FIG. 36 is a schematic block diagram of an embodiment of a portion of an analysis system coupled to a system in accordance with the present disclosure.

FIG. 36 is a schematic block diagram of an embodiment of a portion of an analysis system 10 coupled to a portion of the system 11. In particular, the data output module 255 of the analysis system 10 is coupled to a plurality of remediation modules 257-1 through 257-n. Each remediation module 257 is coupled to one or more system assets 280-1 through 280-n.

A remediation module 257 receives a corresponding portion of the output 269. For example, remediation module 257-1 receives output 269-1, which is regarding an evaluation rating, deficiency, and/or an auto-correction of system asset 280-1. Remediation module 257-1 may auto-correct a deficiency of the system asset or a system element thereof. Alternatively or in addition, the remediation module 257-1 may quarantine the system asset or system element thereof if the deficiency cannot be auto-corrected and the deficiency exposes the system to undesired risks, undesired liability, and/or undesired performance degradation.

Figure 37:
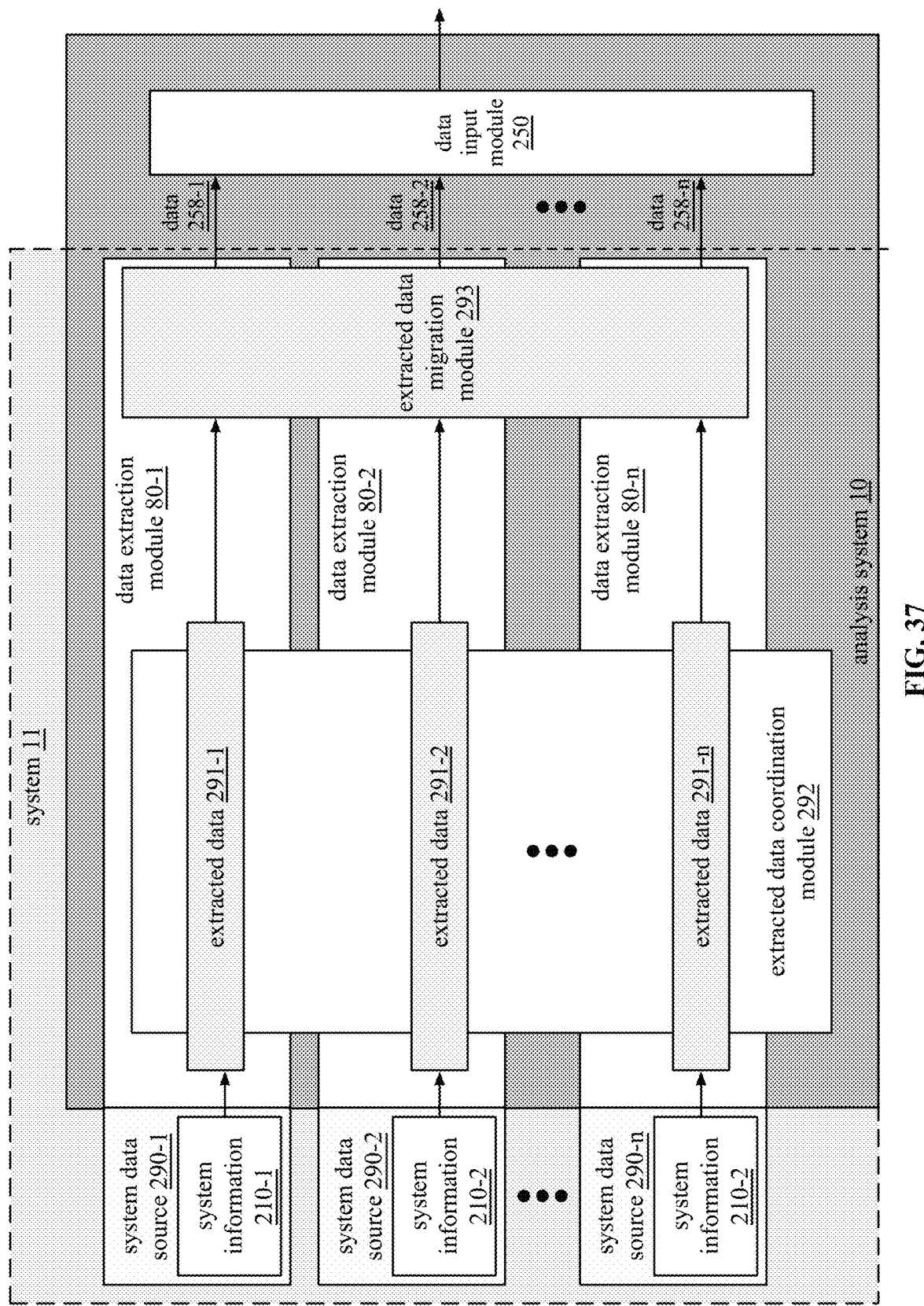
FIG. 37 is a schematic block diagram of another embodiment of a portion of an analysis system coupled to a system in accordance with the present disclosure.

FIG. 37 is a schematic block diagram of another embodiment of a portion of an analysis system 10 coupled to a portion of the system 11. In particular, the data input module 250 of the analysis system 10 is coupled to a plurality of data extraction modules 80-1 through 80-n. Each data extraction module 80 is coupled to a system data source 290 of the system 11. Each of the system data sources produce system information 210 regarding a corresponding portion of the system. A system data source 290-1 through 290-n may be an Azure EventHub, Cisco Advanced Malware Protection (AMP), Cisco Email Security Appliance (ESA), Cisco Umbrella, NetFlow, and/or Syslog. In addition, a system data source may be a system asset, a system element, and/or a storage device storing system information 210.

An extraction data migration module 293 coordinates the collection of system information 210 as extracted data 291-1 through 291-n. An extraction data coordination module 292 coordinates the forwarding of the extracted data 291 as data 258 to the data input module 250.

Figure 38:
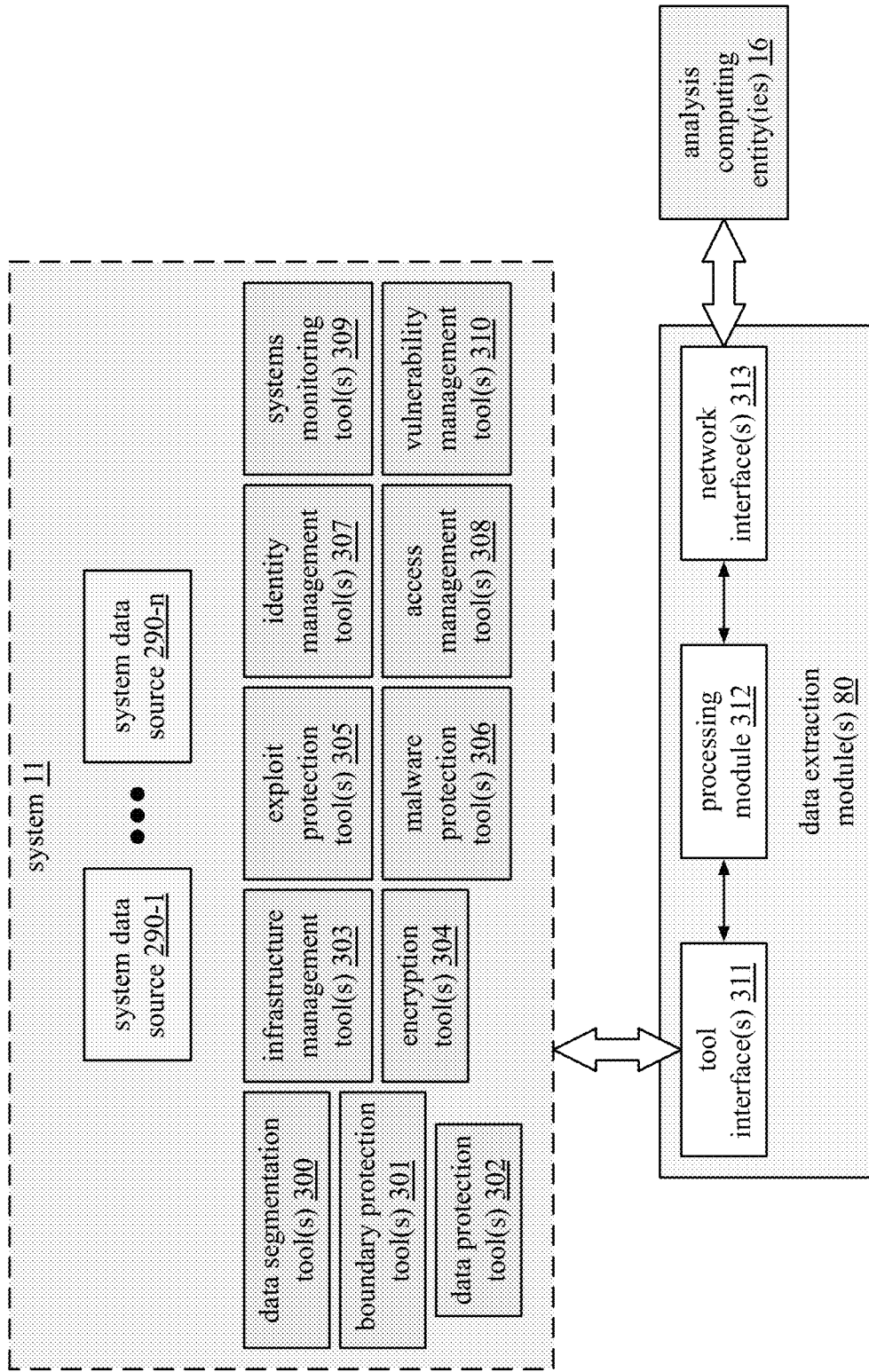
FIG. 38 is a schematic block diagram of an embodiment of a data extraction module of an analysis system coupled to a system in accordance with the present disclosure.

FIG. 38 is a schematic block diagram of an embodiment of a data extraction module 80 of an analysis system 10 coupled to a system 11. The data extraction module 80 includes a tool one or more interface modules 311, one or more processing module 312, and one or more network interfaces 313. The network interface 313 provides a network connections that allows the data extraction module 80 to be coupled to the one or more computing entities 16 of the analysis system 10. The tool interface 311 allows the data extraction module 80 to interact with tools of the system 11 to obtain system information from system data sources 290.

The system 11 includes one or more tools that can be accessed by the data extraction module 80 to obtain system information from one or more data sources 290-1 through 290-n. The tools include one or more data segmentation tools 300, one or more boundary detection tools 301, one or more data protection tools 302, one or more infrastructure management tools 303, one or more encryption tools 304, one or more exploit protection tools 305, one or more malware protection tools 306, one or more identity management tools 307, one or more access management tools 308, one or more system monitoring tools, and/or one or more vulnerability management tools 310.

A system tool may also be an infrastructure management tool, a network monitoring tool, a network strategy and planning tool, a network managing tool, a Simple Network Management Protocol (SNMP) tool, a telephony monitoring tool, a firewall monitoring tool, a bandwidth monitoring tool, an IT asset inventory management tool, a network discovery tool, a network asset discovery tool, a software discovery tool, a security discovery tool, an infrastructure discovery tool, Security Information & Event Management (SIEM) tool, a data crawler tool, and/or other type of tool to assist in discovery of assets, functions, security issues, implementation of the system, and/or operation of the system.

Depending on the data gathering parameters, the tool interface 311 engages a system tool to retrieve system information. For example, the tool interface 311 engages the identity management tool to identify assets in the engineering department. The processing module 312 coordinates requests from the analysis system 10 and responses to the analysis system 10.

Figure 39:
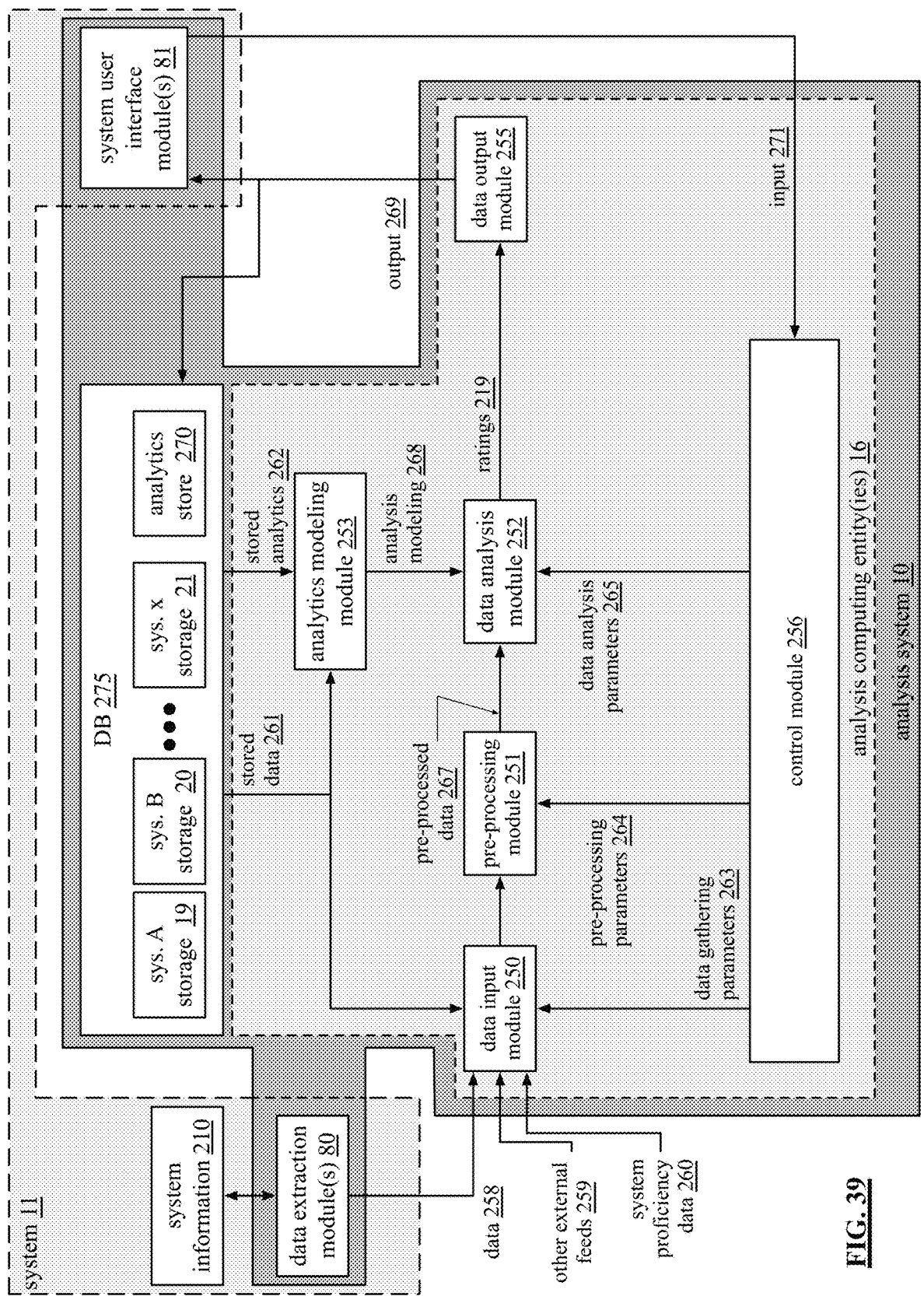
FIG. 39 is a schematic block diagram of another embodiment of an analysis system coupled to a system in accordance with the present disclosure.

FIG. 39 is a schematic block diagram of another embodiment of an analysis system 10 that includes one or more computing entities 16, one or more databases 275, one or more data extraction modules 80, and one or more system user interface modules 81. The computing entity(ies) 16 is configured to include a data input module 250, a pre-processing module 251, a data analysis module 252, an analytics modeling module 253, a data output module 255, and a control module 256. The database 275, which includes one or more databases, stores the private data for a plurality of systems (e.g., systems A-x) and stores analytical data 270 of the analysis system 10.

This embodiment operates similarly to the embodiment of FIG. 35 with the removal of the evaluation module 254, which produces deficiencies 232 and auto-corrections 235, and the removal of the remediation modules 257. As such, this analysis system 10 produces evaluation ratings 219 as the output 269.

Figure 40:
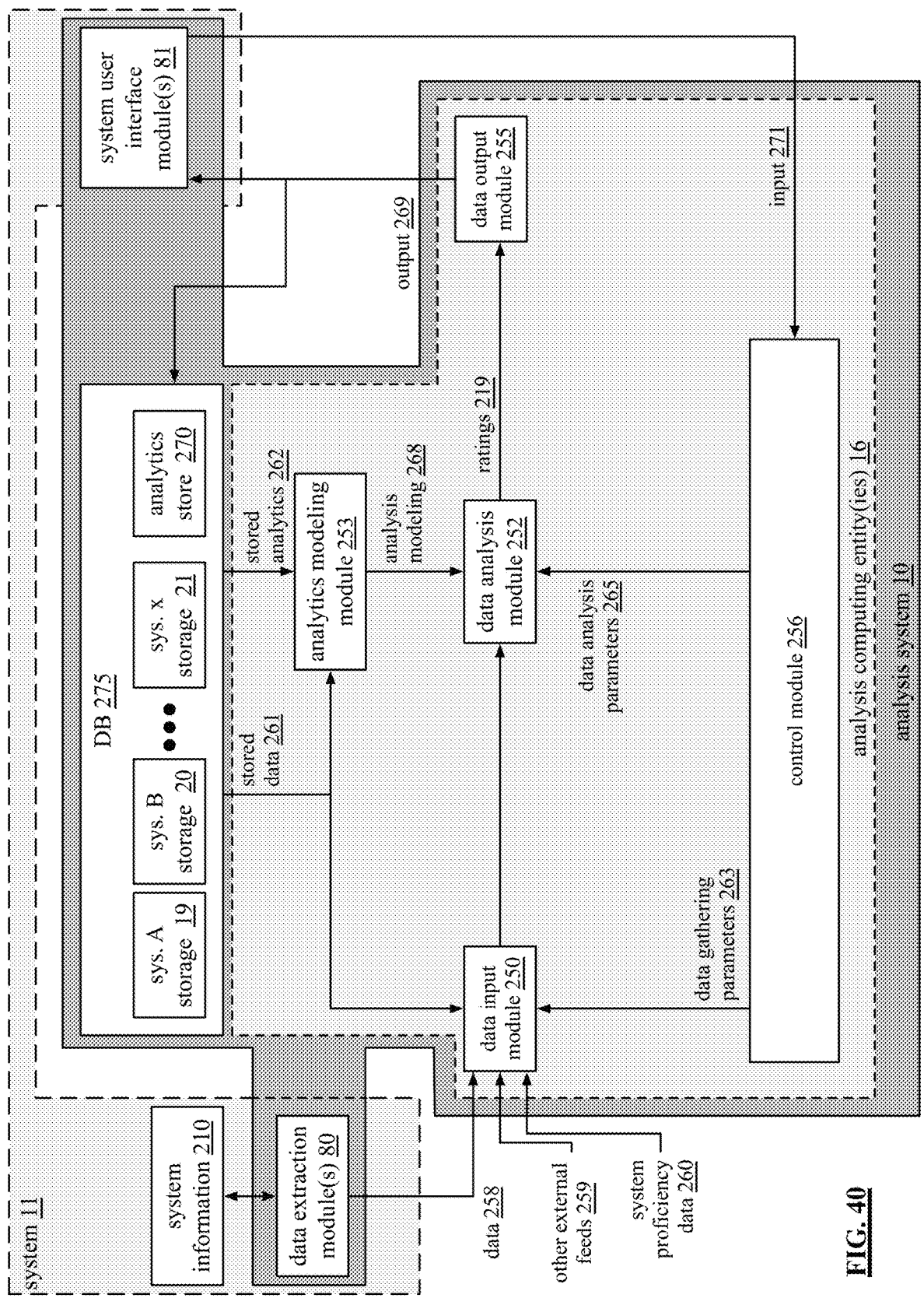
FIG. 40 is a schematic block diagram of another embodiment of an analysis system coupled to a system in accordance with the present disclosure.

FIG. 40 is a schematic block diagram of another embodiment of an analysis system 10 that is similar to the embodiment of FIG. 39. This embodiment does not include a pre-processing module 251. As such, the data collected by the data input module 250 is provided directly to the data analysis module 252.

Figure 41:
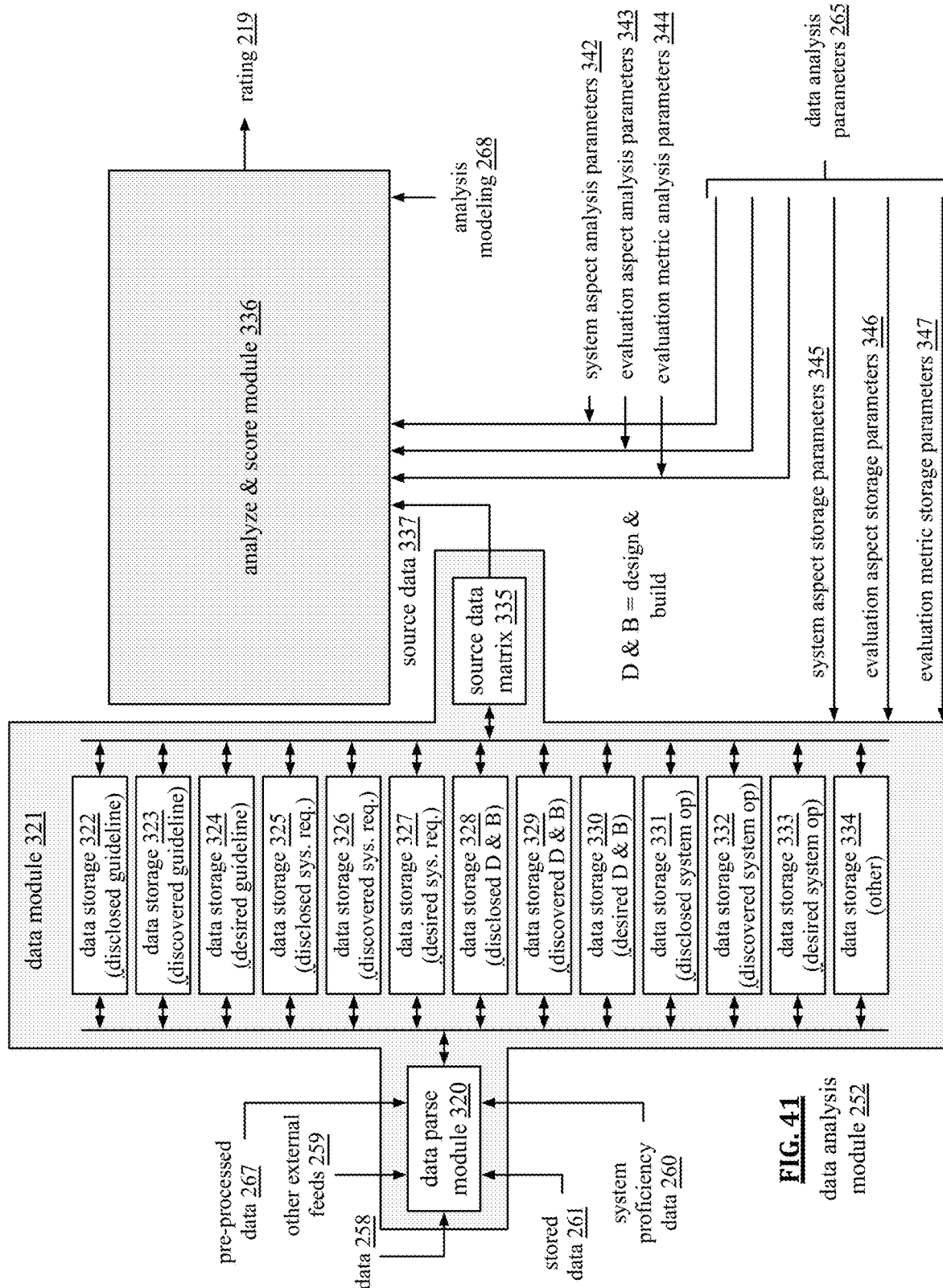
FIG. 41 is a schematic block diagram of an embodiment of a data analysis module of an analysis system in accordance with the present disclosure.

FIG. 41 is a schematic block diagram of an embodiment of a data analysis module 252 of an analysis system 10. The data analysis module 252 includes a data module 321 and an analysis & score module 336. The data module 321 includes a data parse module 320, one or more data storage modules 322-334, and a source data matrix 335. A data storage module 322-334 may be implemented in a variety of ways. For example, a data storage module is a buffer. As another example, a data storage module is a section of memory (45, 56, 57, and/or 62 of the FIG. 2 series) of a computing device (e.g., an allocated, or ad hoc, addressable section of memory). As another example, a data storage module is a storage unit (e.g., a computing device used primarily for storage). As yet another example, a data storage module is a section of a database (e.g., an allocated, or ad hoc, addressable section of a database).

The data module 321 operates to provide the analyze & score module 336 with source data 337 selected from incoming data based on one or more data analysis parameters 265. The data analysis parameter(s) 265 indicate(s) how the incoming data is to be parsed (if at all) and how it is to be stored within the data storage modules 322-334. A data analysis parameter 265 includes system aspect storage parameters 345, evaluation aspect storage parameters 346, and evaluation metric storage parameters 347. A system aspect storage parameter 345 may be null or includes information to identify one or more system aspects (e.g., system element, system criteria, and system mode), how the data relating to system aspects is to be parsed, and how the system aspect parsed data is to be stored.

An evaluation aspect storage parameter 346 may be null or includes information to identify one or more evaluation aspects (e.g., evaluation perspective, evaluation viewpoint, and evaluation category), how the data relating to evaluation aspects is to be parsed, and how the evaluation aspect parsed data is to be stored. An evaluation metric storage parameter 347 may be null or includes information to identify one or more evaluation metrics (e.g., process, policy, procedure, certification, documentation, and automation), how the data relating to evaluation metrics is to be parsed, and how the evaluation metric parsed data is to be stored. Note that the data module 321 interprets the data analysis parameters 265 collectively such that parsing, and storage are consistent with the parameters.

The data parsing module 320 parses incoming data in accordance with the system aspect storage parameters 345, evaluation aspect storage parameters 346, and evaluation metric storage parameters 347, which generally correspond to what part of the system is being evaluation, how the system is being evaluated, the manner of evaluation, and/or a desired analysis output. As such, incoming data may be parsed in a variety of ways. The data storage modules 322-334 are assigned to store parsed data in accordance with the storage parameters 345-347. For example, the incoming data, which includes pre-processed data 267, other external feed data 259, data 258 received via a data extraction module, stored data 261, and/or system proficiency data 260, is parsed based on system criteria (of the system aspect) and evaluation viewpoint (of the evaluation aspect). As a more specific example, the incoming data is parsed into, and stored, as follows:

disclosed guideline data that is stored in a disclosed guideline data storage module 322;
  discovered guideline data that is stored in a discovered guideline data storage module 323;
  desired guideline data that is stored in a desired guideline data storage module 324;
  disclosed system requirement (sys. req.) data that is stored in a disclosed system requirement data storage module 325;
  discovered system requirement (sys. req.) data that is stored in a discovered system requirement data storage module 326;
  desired system requirement (sys. req.) data that is stored in a desired system requirement data storage module 327;
  disclosed design and/or build data that is stored in a disclosed design and/or build data storage module 328;
  discovered design and/or build data that is stored in a discovered design and/or build data storage module 329;
  desired design and/or build data that is stored in a desired design and/or build data storage module 330;
  disclosed system operation data that is stored in a disclosed system operation data storage module 331;
  discovered system operation data that is stored in a discovered system operation data storage module 332;
  desired system operation data that is stored in a desired system operation data storage module 333; and/or
  other data that is stored in another data storage module 334.

As another example of parsing, the incoming data is parsed based on a combination of one or more system aspects (e.g., system elements, system criteria, and system mode) or sub-system aspects thereof, one or more evaluation aspects (e.g., evaluation perspective, evaluation viewpoint, and evaluation category) or sub-evaluation aspects thereof, and/or one or more evaluation rating metrics (e.g., process, policy, procedure, certification, documentation, and automation) or sub-evaluation rating metrics thereof. As a specific example, the incoming data is parsed based on the evaluation rating metrics, creating processed parsed data, policy parsed data, procedure parsed data, certification parsed data, documentation parsed data, and automation parsed data. As another specific example, the incoming data is parsed based on the evaluation category of identify and its sub-categories of asset management, business environment, governance, risk assessment, risk management, access control, awareness &, training, and/or data security.

As another example of parsing, the incoming data is not parsed, or is minimally parsed. As a specific example, the data is parsed based on timestamps: data from one time period (e.g., a day) is parsed from data of another time period (e.g., a different day).

The source data matrix 335, which may be a configured processing module, retrieves source data 337 from the data storage modules 322-334. The selection corresponds to the analysis being performed by the analyze & score module 336. For example, if the analyze & score module 336 is evaluating the understanding of the policies, processes, documentation, and automation regarding the assets built for the engineering department, then the source data 337 would be data specific to policies, processes, documentation, and automation regarding the assets built for the engineering department.

The analyze & score module 336 generates one or more ratings 219 for the source data 337 in accordance with the data analysis parameters 265 and analysis modeling 268. The data analysis parameters 265 includes system aspect analysis parameters 342, evaluation aspect analysis parameters 343, and evaluation metric analysis parameters 344. The analyze & score module 336 is discussed in greater detail with reference to FIG. 42.

Figure 42:
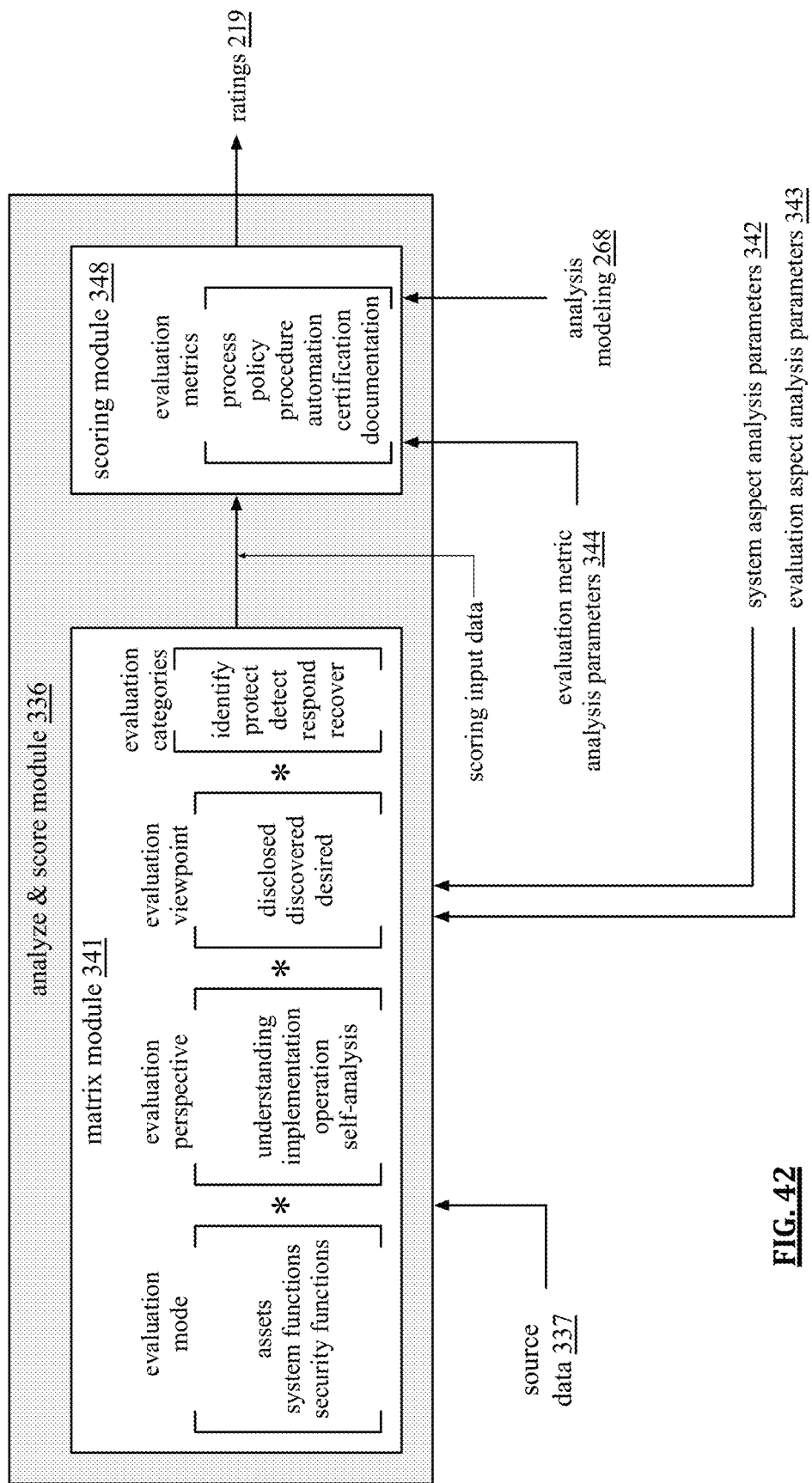
FIG. 42 is a schematic block diagram of an embodiment of an analyze and score module of an analysis system in accordance with the present disclosure.

FIG. 42 is a schematic block diagram of an embodiment of an analyze and score module 336 includes a matrix module 341 and a scoring module 348. The matrix module 341 processes an evaluation mode matrix, an evaluation perspective matrix, an evaluation viewpoint matrix, and an evaluation categories matrix to produce a scoring input. The scoring module 348 includes an evaluation metric matrix to process the scoring input data in accordance with the analysis modeling 268 to produce the rating(s) 219.

For example, the matrix module 341 configures the matrixes based on the system aspect analysis parameters 342 and the evaluation aspect analysis parameters 343 to process the source data 337 to produce the scoring input data. As a specific example, the system aspect analysis parameters 342 and the evaluation aspect analysis parameters 343 indicate assets as the evaluation mode, understanding as the evaluation perspective, discovered as the evaluation viewpoint, and the identify as the evaluation category.

Accordingly, the matrix module 341 communicates with the source data matrix module 335 of the data module 321 to obtain source data 337 relevant to assets, understanding, discovered, and identify. The matrix module 341 may organize the source data 337 using an organization scheme (e.g., by asset type, by evaluation metric type, by evaluation sub-categories, etc.) or keep the source data 337 as a collection of data. The matrix module 341 provides the scoring input data 344 as a collection of data or as organized data to the scoring module 348.

Continuing with the example, the scoring module 248 receives the scoring input data 348 and evaluates in accordance with the evaluation metric analysis parameters 344 and the analysis modeling 268 to produce the rating(s) 219. As a specific example, the evaluation metric analysis parameters 344 indicate analyzing the scoring input data with respect to processes. In this instance, the analysis modeling 268 provides a scoring mechanism for evaluating the scoring input data with respect to processes to the scoring module 248. For instance, the analysis modeling 268 includes six levels regarding processes and a corresponding numerical rating: none (e.g., 0), inconsistent (e.g., 10), repeatable (e.g., 20), standardized (e.g., 30), measured (e.g., 40), and optimized (e.g., 50).

In addition, the analysis modeling 268 includes analysis protocols for interpreting the scoring input data to determine its level and corresponding rating. For example, if there are no processes regarding identifying assess of the discovered data, then an understanding level of processes would be none (e.g., 0), since there are no processes. As another example, if there are some processes regarding identifying assess of the discovered data, but there are gaps in the processes (e.g., identifies some assets, but not all, do not produce consistent results), then an understanding level of processes would be inconsistent (e.g., 10). To determine if there are gaps in the processes, the score module 248 executes the processes of the discovered data to identify assets. The scoring module 248 also executes one or more asset discovery tools to identify assets and then compares the two results. If there are inconsistencies in the identified assets, then there are gaps in the processes.

As a further example, the processes regarding identifying assess of the discovered data are repeatable (e.g., produces consistent results, but there are variations in the processes from process to process, and/or the processes are not all regulated) but not standardized (e.g., produces consistent results, but there are no appreciable variations in the processes from process to process, and/or the processes are regulated). If the processes are repeatable but not standardized, the scoring module establishes an understanding level of the processes as repeatable (e.g., 20).

If the processes are standardized, the scoring module then determines whether the processes are measured (e.g., precise, exact, and/or calculated to the task of identifying assets). If not, the scoring module establishes an understanding level of the processes as standardized (e.g., 30).

If the processes are measured, the scoring module then determines whether the processes are optimized (e.g., up-to-date and improvement assessed on a regular basis as part of system protocols). If not, the scoring module establishes an understanding level of the processes as measured (e.g., 40). If so, the scoring module establishes an understanding level of the processes as optimized (e.g., 50).

Figure 43:
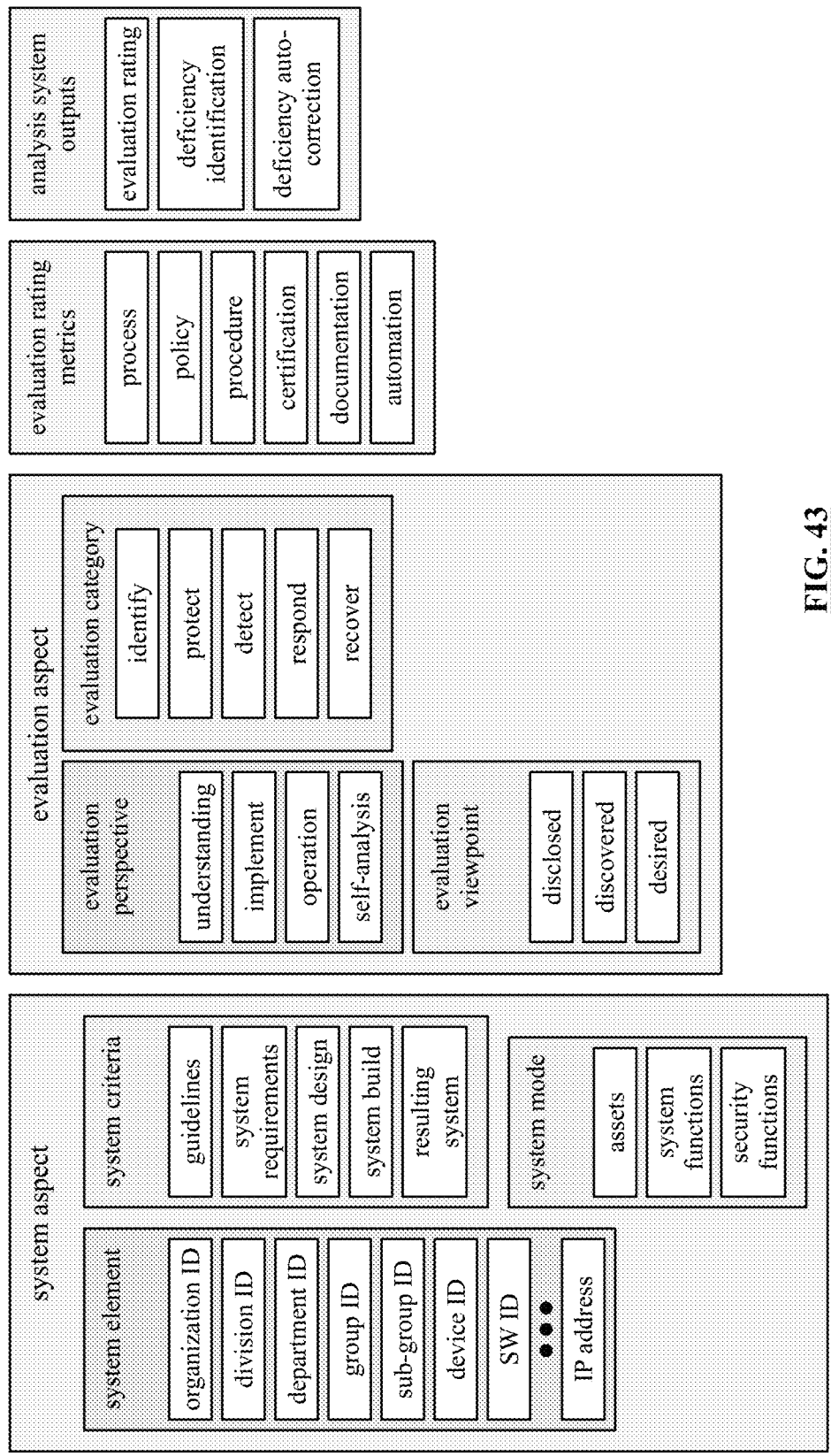
FIG. 43 is a diagram of an example of system aspects, evaluation aspects, evaluation rating metrics, and analysis system output options of an analysis system for analyzing a section of a system in accordance with the present disclosure.

FIG. 43 is a diagram of an example of system aspect, evaluation aspect, evaluation rating metric, and analysis system output options of an analysis system 10 for analyzing a system 11, or portion thereof. The system aspect corresponds to what part of the system is to be evaluated by the analysis system. The evaluation aspect indicates how the system aspect is to be evaluation. The evaluation rating metric indicates the manner of evaluation of the system aspect in accordance with the evaluation aspect. The analysis system output indicates the type of output to be produced by the analysis system based on the evaluation of the system aspect in accordance with the evaluation aspect as per the evaluation rating metric.

The system aspect includes system elements, system criteria, and system modes. A system element includes one or more system assets which is a physical asset and/or a conceptual asset. For example, a physical asset is a computing entity, a computing device, a user software application, a system software application (e.g., operating system, etc.), a software tool, a network software application, a security software application, a system monitoring software application, and the like. As another example, a conception asset is a hardware architecture (e.g., identification of a system's physical components, their capabilities, and their relationship to each other) and/or sub-architectures thereof and a software architecture (e.g., fundamental structures for the system's software, their requirements, and inter-relational operations) and sub-architectures thereof.

A system element and/or system asset is identifiable in a variety of ways. For example, it can be identified by an organization identifier (ID), which would be associated with most, if not all, system elements of a system. As another example, a system element and/or system asset can be identified by a division ID, where the division is one of a plurality of divisions in the organization. As another example, a system element and/or system asset can be identified by a department ID, where the department is one of a plurality of departments in a division. As yet another example, a system element and/or system asset can be identified by a department ID, where the department is one of a plurality of departments in a division. As a further example, a system element and/or system asset can be identified by a group ID, where the department is one of a plurality of groups in a department. As a still further example, a system element and/or system asset can be identified by a sub-group ID, where the department is one of a plurality of sub-groups in a group. With this type of identifier, a collection of system elements and/or system assets can be selected for evaluation by using an organization ID, a division ID, a department ID, a group ID, or a sub-group ID.

A system element and/or system asset may also be identified based on a user ID, a serial number, vendor data, an IP address, etc. For example, a computing device has a serial number and vendor data. As such, the computing device can be identified for evaluation by its serial number and/or the vendor data. As another example, a software application has a serial number and vendor data. As such, the software application can be identified for evaluation by its serial number and/or the vendor data.

In addition, an identifier of one system element and/or system asset may link to one or more other system elements and/or system assets. For example, computing device has a device ID, a user ID, and/or a serial number to identify it. The computing device also includes a plurality of software applications, each with its own serial number. In this example, the software identifiers are linked to the computing device identifier since the software is loaded on the computing device. This type of an identifier allows a single system asset to be identified for evaluation.

The system criteria includes information regarding the development, operation, and/or maintenance of the system 11. For example, a system criteria is a guideline, a system requirement, a system design component, a system build component, the system, and system operation. Guidelines, system requirements, system design, system build, and system operation were discussed with reference to FIG. 25.

The system mode indicates the assets of the system, the system functions of the system, and/or the security functions of the system are to be evaluated. Assets, system functions, and security functions have been previously discussed with reference to one or more of FIGS. 7-24 and 32-34.

The evaluation aspect, which indicates how the system aspect is to be evaluated, includes evaluation perspective, evaluation viewpoint, and evaluation category. The evaluation perspective includes understanding (e.g., how well the system is known, should be known, etc.); implementation, which includes design and/or build, (e.g., how well is the system designed, how well should it be designed); system performance, and/or system operation (e.g., how well does the system perform and/or operate, how well should it perform and/or operate); and self-analysis (e.g., how self-aware is the system, how self-healing is the system, how self-updating is the system).

The evaluation viewpoint includes disclosed data, discovered data, and desired data. Disclosed data is the known data of the system at the outset of an analysis, which is typically supplied by a system administrator and/or is obtained from data files of the system. Discovered data is the data discovered about the system by the analysis system during the analysis. Desired data is the data obtained by the analysis system from system proficiency resources regarding desired guidelines, system requirements, system design, system build, and/or system operation. Differences in disclosed, discovered, and desired data are evaluated to support generating an evaluation rating, to identify deficiencies, and/or to determine and provide auto-corrections.

The evaluation category includes an identify category, a protect category, a detect category, a respond category, and a recover category. In general, the identify category is regarding identifying assets, system functions, and/or security functions of the system; the protect category is regarding protecting assets, system functions, and/or security functions of the system from issues that may adversely affect; the detect category is regarding detecting issues that may, or have, adversely affect assets, system functions, and/or security functions of the system; the respond category is regarding responding to issues that may, or have, adversely affect assets, system functions, and/or security functions of the system; and the recover category is regarding recovering from issues that have adversely affect assets, system functions, and/or security functions of the system. Each category includes one or more sub-categories and each sub-category may include one or more sub-sub categories as discussed with reference to FIGS. 44-49.

The evaluation rating metric includes process, policy, procedure, certification, documentation, and automation. The evaluation rating metric may include more or less topics. The analysis system output options include evaluation rating, deficiency identification, and deficiency auto-correction.

With such a significant number of options with the system aspect, the evaluation aspect, the evaluation rating metrics, and analysis system output options, the analysis system can analyze a system in thousands, or more, combinations. For example, the analysis system 10 could provide an evaluation rating for the entire system with respect to its vulnerability to cyber-attacks. The analysis system 10 could also identify deficiencies in the system's cybersecurity processes, policies, documentation, implementation, operation, assets, and/or security functions based on the evaluation rating. The analysis system 10 could further auto-correct at least some of the deficiencies in the system's cybersecurity processes, policies, documentation, implementation, operation, assets, and/or security functions.

As another example, the analysis system 10 could evaluates the system's requirements for proper use of software (e.g., authorized to use, valid copy, current version) by analyzing every computing device in the system as to the system's software use requirements. From this analysis, the analysis system generates an evaluation rating. The analysis system 10 could also identify deficiencies in the compliance with the system's software use requirements (e.g., unauthorized use, invalid copy, outdated copy). The analysis system 10 could further auto-correct at least some of the deficiencies in compliance with the system's software use requirements (e.g., remove invalid copies, update outdated copies).

Figure 44:
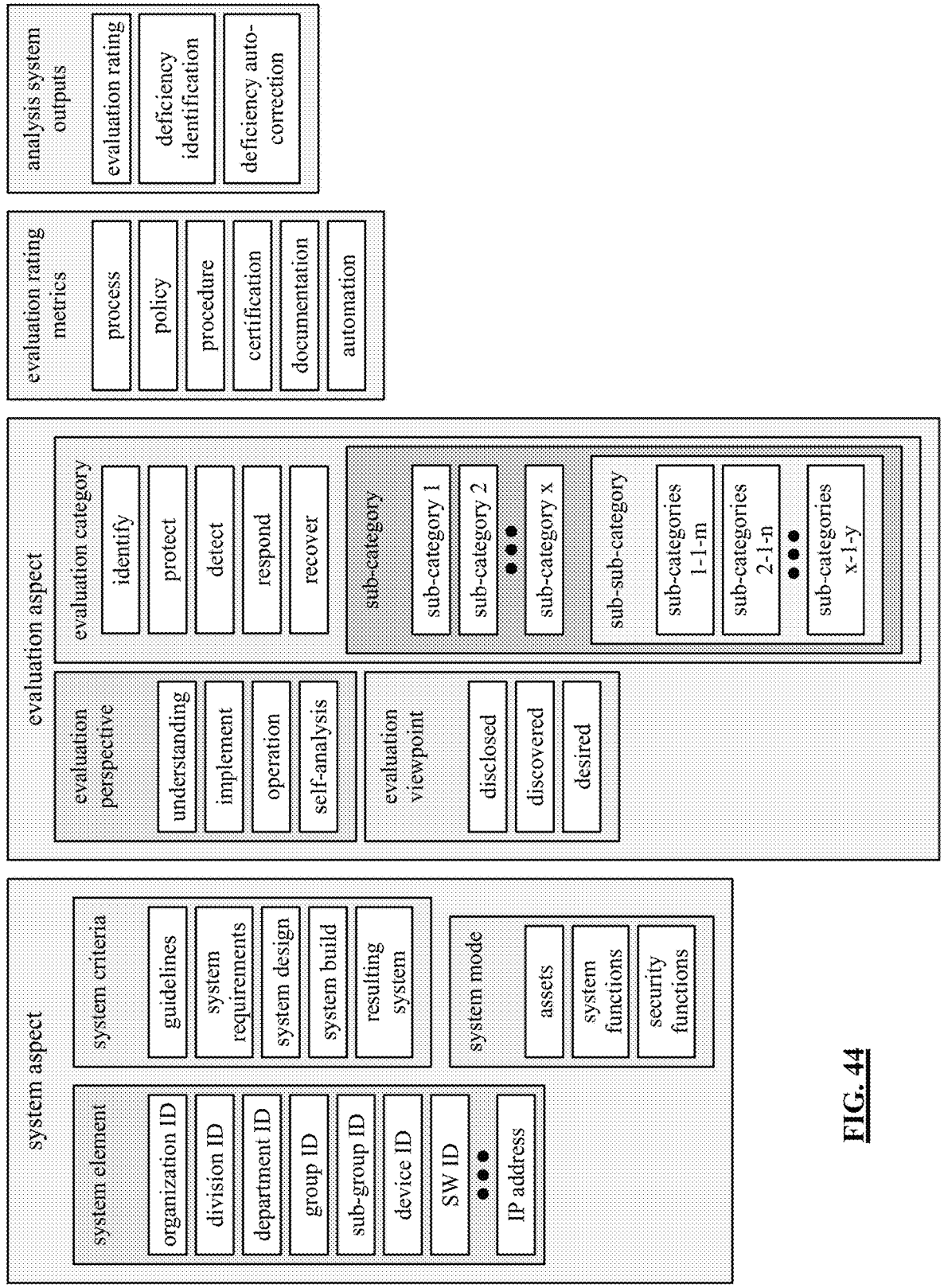
FIG. 44 is a diagram of another example of system aspects, evaluation aspects, evaluation rating metrics, and analysis system output options of an analysis system for analyzing a section of a system in accordance with the present disclosure.

FIG. 44 is a diagram of another example of system aspects, evaluation aspects, evaluation rating metrics, and analysis system output options of an analysis system 11. This diagram is similar to FIG. 43 with the exception that this figure illustrates sub-categories and sub-sub categories. Each evaluation category includes sub-categories, which, in turn, include their own sub-sub categories. The various categories, sub-categories, and sub-sub categories corresponds to the categories, sub-categories, and sub-sub categories identified in the "Framework for Improving Critical Instructure Cybersecurity", Version 1.1, Apr. 16, 2018 by the National Institute of Standards and Technology (NIST).

Figure 45:
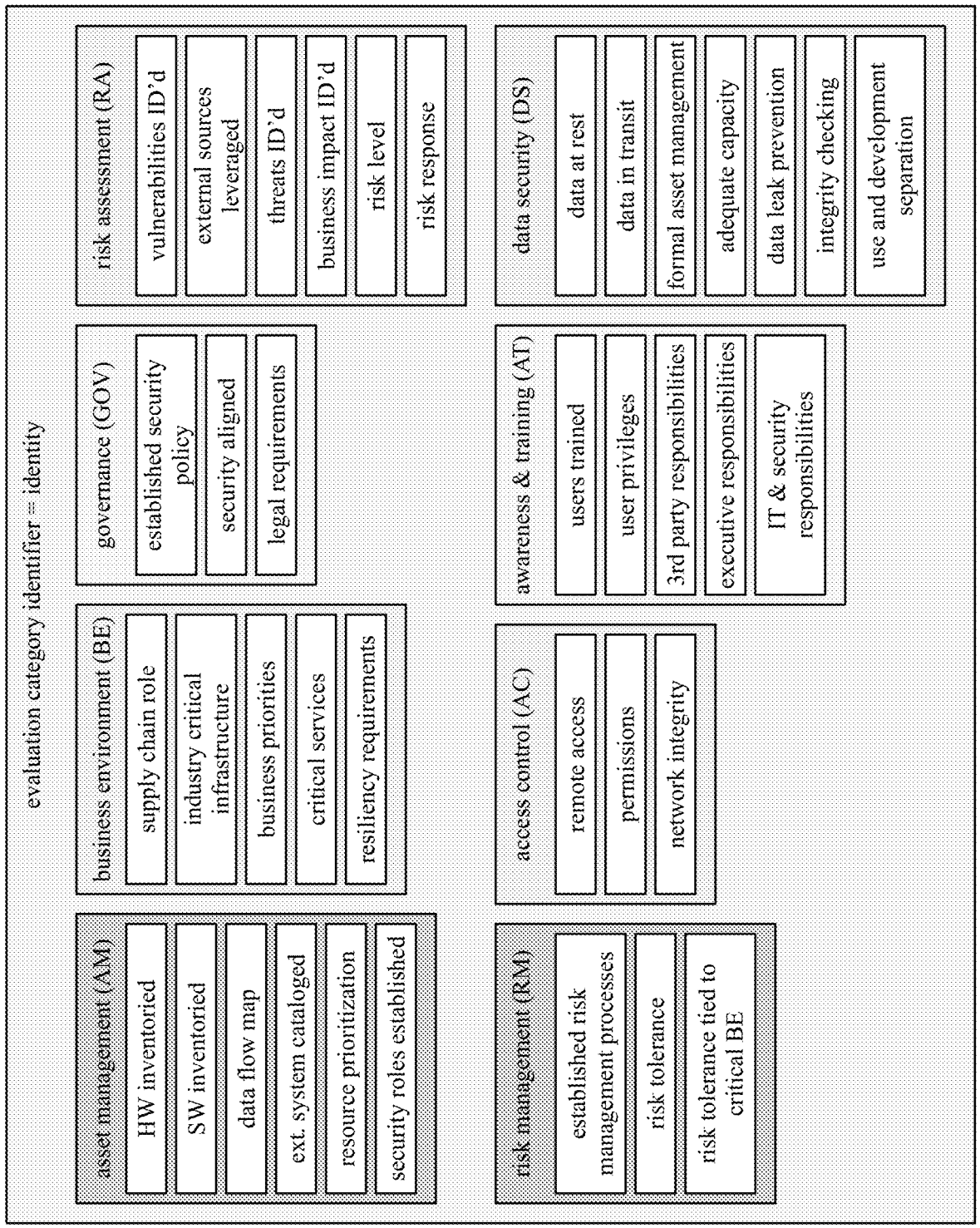
FIG. 45 is a diagram of an example of an identification evaluation category, sub-categories, and sub-sub-categories of the evaluation aspects and in accordance with the present disclosure.

FIG. 45 is a diagram of an example of an identification evaluation category that includes a plurality of sub-categories and each sub-category includes its own plurality of sub-sub-categories. The identify category includes the sub-categories of asset management, business environment, governance, risk management, access control, awareness & training, and data security.

The asset management sub-category includes the sub-sub categories of HW inventoried, SW inventoried, data flow mapped out, external systems cataloged, resources have been prioritized, and security roles have been established. The business environment sub-category includes the sub-sub categories of supply chain roles defined, industry critical infrastructure identified, business priorities established, critical services identified, and resiliency requirements identified.

The governance sub-category includes the sub-sub categories of security policies are established, security factors aligned, and legal requirements are identified. The risk assessment sub-category includes the sub-sub categories of vulnerabilities identified, external sources are leveraged, threats are identified, business impacts are identified, risk levels are identified, and risk responses are identified. The risk management sub-category includes the sub-sub categories of risk management processes are established, risk tolerances are established, and risk tolerances are tied to business environment.

The access control sub-category includes the sub-sub categories of remote access control is defined, permissions are defined, and network integrity is defined. The awareness & training sub-category includes the sub-sub categories of users are trained, user privileges are known, third party responsibilities are known, executive responsibilities are known, and IT and security responsibilities are known. The data security sub-category includes the sub-sub categories of data at rest protocols are established, data in transit protocols are established, formal asset management protocols are established, adequate capacity of the system is established, data leak prevention protocols are established, integrity checking protocols are established, and use and development separation protocols are established.

Figure 46:
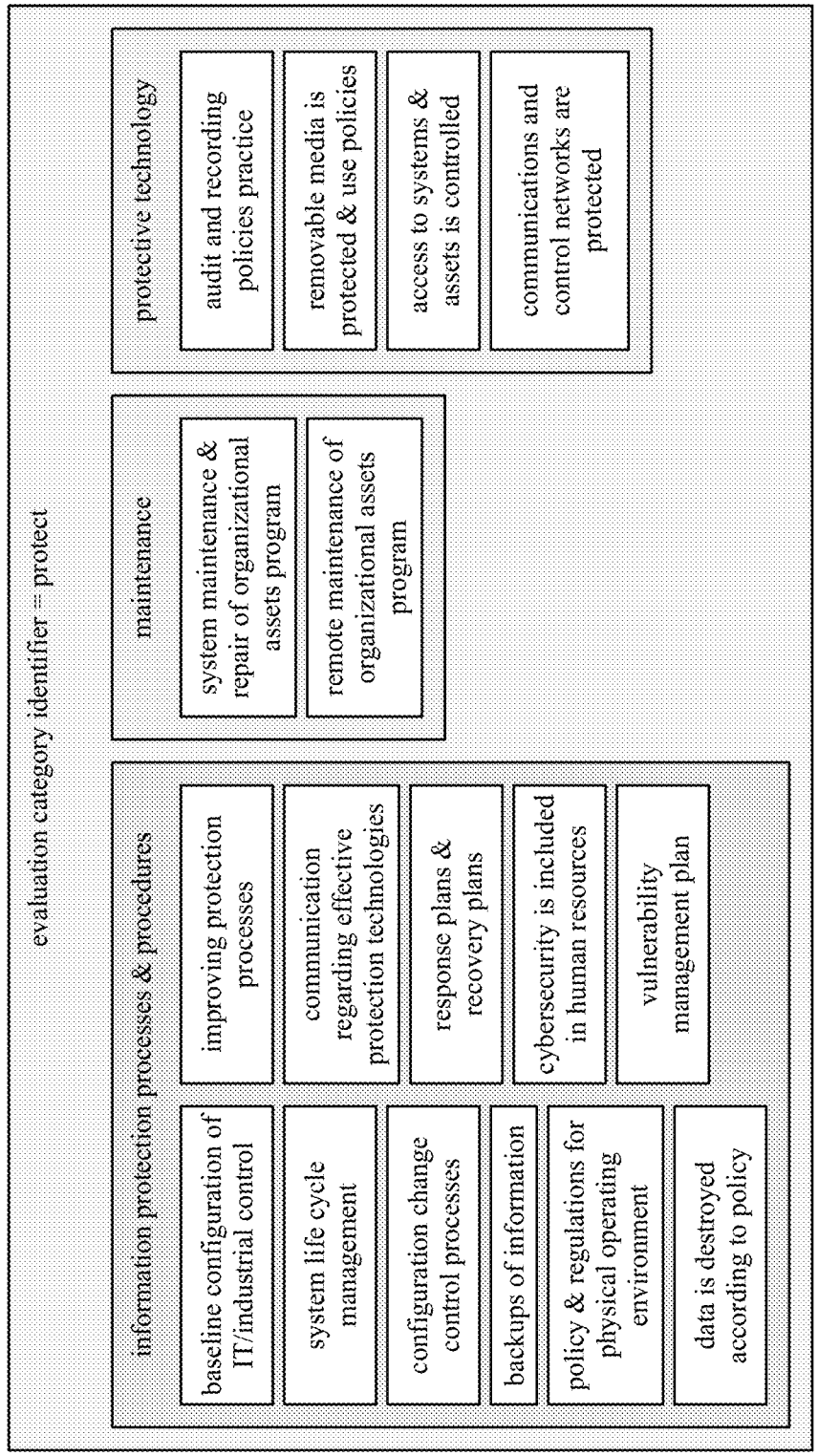
FIG. 46 is a diagram of an example of a protect evaluation category, sub-categories, and sub-sub-categories of the evaluation aspects and in accordance with the present disclosure.

FIG. 46 is a diagram of an example of a protect evaluation category that includes a plurality of sub-categories and each sub-category includes its own plurality of sub-sub-categories. The protect category includes the sub-categories of information protection processes and procedures, maintenance, and protective technology.

The information protection processes and procedures sub-category includes the sub-sub categories of baseline configuration of IT/industrial controls are established, system life cycle management is established, configuration control processes are established, backups of information are implemented, policy & regulations for physical operation environment are established, improving protection processes are established, communication regarding effective protection technologies is embraced, response and recovery plans are established, cybersecurity in is including in human resources, and vulnerability management plans are established.

The maintenance sub-category includes the sub-sub categories of system maintenance & repair of organizational assets programs are established and remote maintenance of organizational assets is established. The protective technology sub-category includes the sub-sub-categories of audit and recording policies are practiced, removable media is protected & use policies are established, access to systems and assets is controlled, and communications and control networks are protected.

Figure 47:
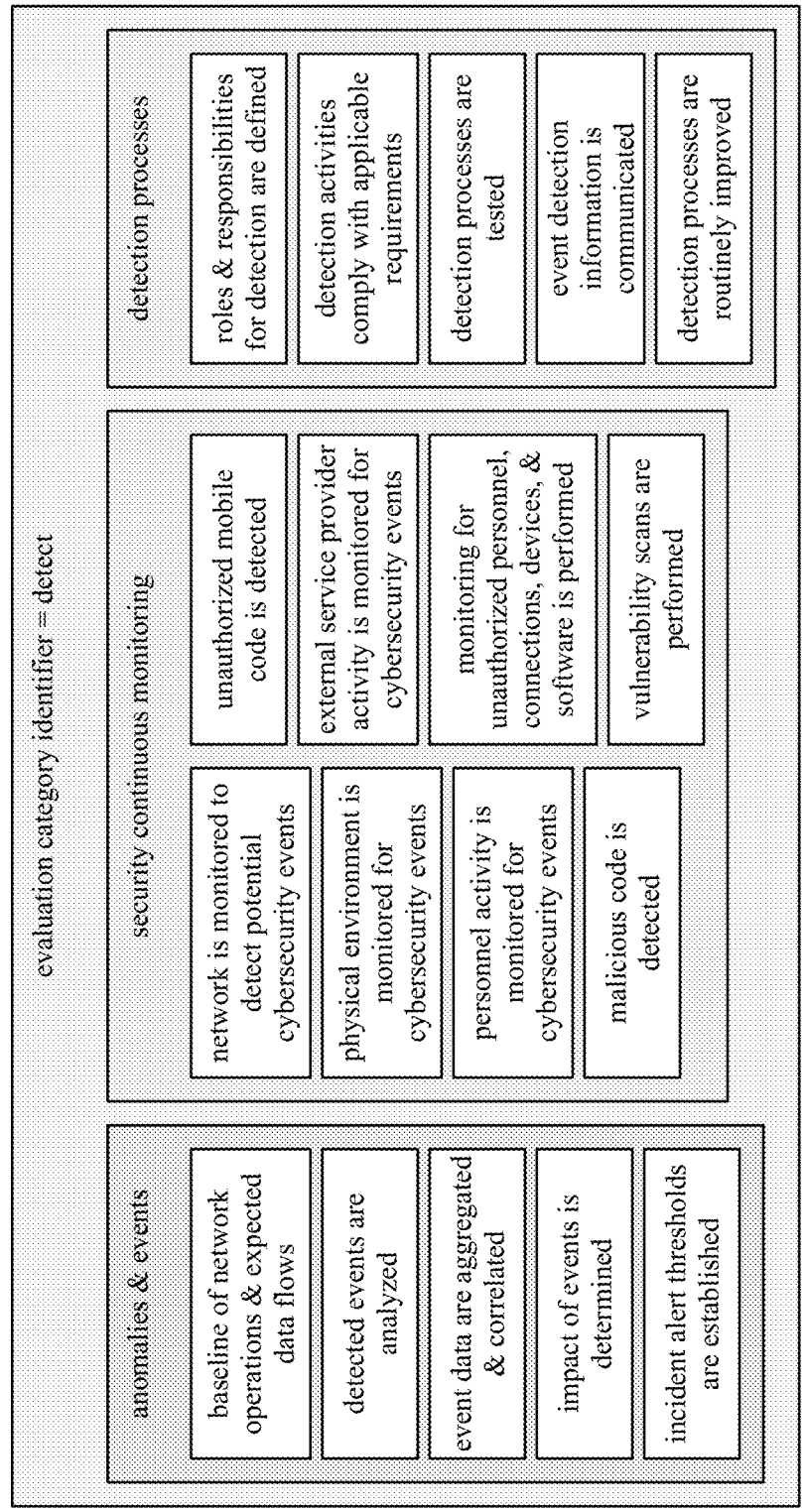
FIG. 47 is a diagram of an example of a detect evaluation category, sub-categories, and sub-sub-categories of the evaluation aspects and in accordance with the present disclosure.

FIG. 47 is a diagram of an example of a detect evaluation category that includes a plurality of sub-categories and each sub-category includes its own plurality of sub-sub-categories. The detect category includes the sub-categories of anomalies and events, security continuous monitoring, and detection processes.

The anomalies and events sub-category includes the sub-sub categories of baseline of network operations and expected data flows are monitored, detected events are analyzed, event data are aggregated and correlated, impact of events is determined, and incident alert thresholds are established. The security continuous monitoring sub-category includes the sub-sub categories of network is monitored to detect potential cybersecurity attacks, physical environment is monitored for cybersecurity events, personnel activity is monitored for cybersecurity events, malicious code is detected, unauthorized mobile codes is detected, external service provider activity is monitored for cybersecurity events, monitoring for unauthorized personnel, connections, devices, and software is performed, and vulnerability scans are performed. The detection processes sub-category includes the sub-sub categories of roles and responsibilities for detection are defined, detection activities comply with applicable requirements, detection processes are tested, event detection information is communicated, and detection processes are routinely improved.

Figure 48:
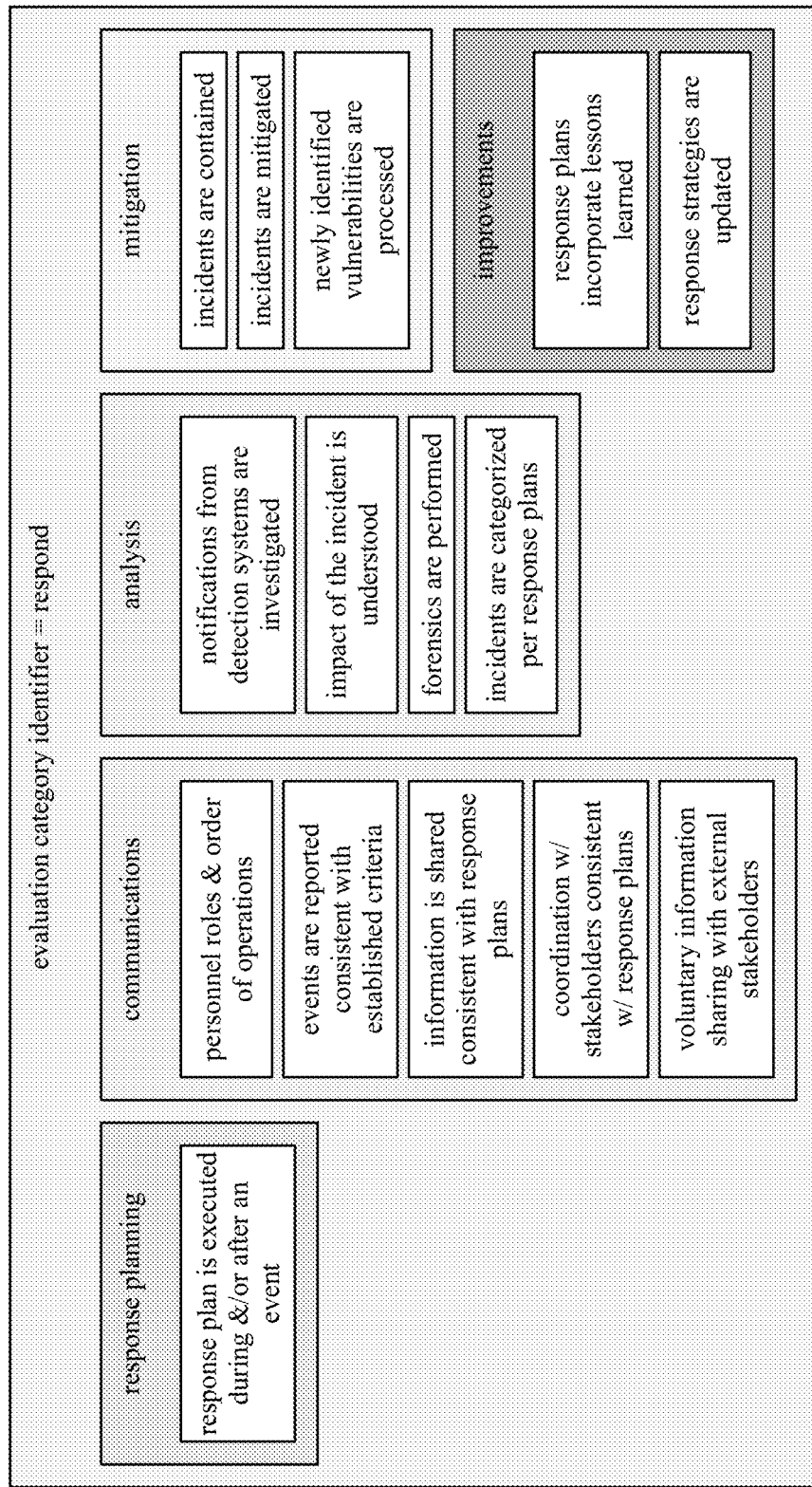
FIG. 48 is a diagram of an example of a respond evaluation category, sub-categories, and sub-sub-categories of the evaluation aspects and in accordance with the present disclosure.

FIG. 48 is a diagram of an example of a respond evaluation category that includes a plurality of sub-categories and each sub-category includes its own plurality of sub-sub-categories. The respond category includes the sub-categories of response planning, communications, analysis, mitigation, and improvements.

The response planning sub-category includes the sub-sub category of response plan is executed during and/or after an event. The communications sub-category includes the sub-sub category of personnel roles and order of operation are established, events are reported consistent with established criteria, information is shared consistently per the response plan, coordination with stakeholders is consistent with the response plan, and voluntary information is shared with external stakeholders.

The analysis sub-category includes the sub-sub categories of notifications form detection systems are investigated, impact of the incident is understood, forensics are performed, and incidents are categorized per response plan. The mitigation sub-category includes the sub-sub categories of incidents are contained, incidents are mitigated, and newly identified vulnerabilities are processed. The improvements sub-categories includes the sub-sub categories of response plans incorporate lessons learned, and response strategies are updated.

Figure 49:
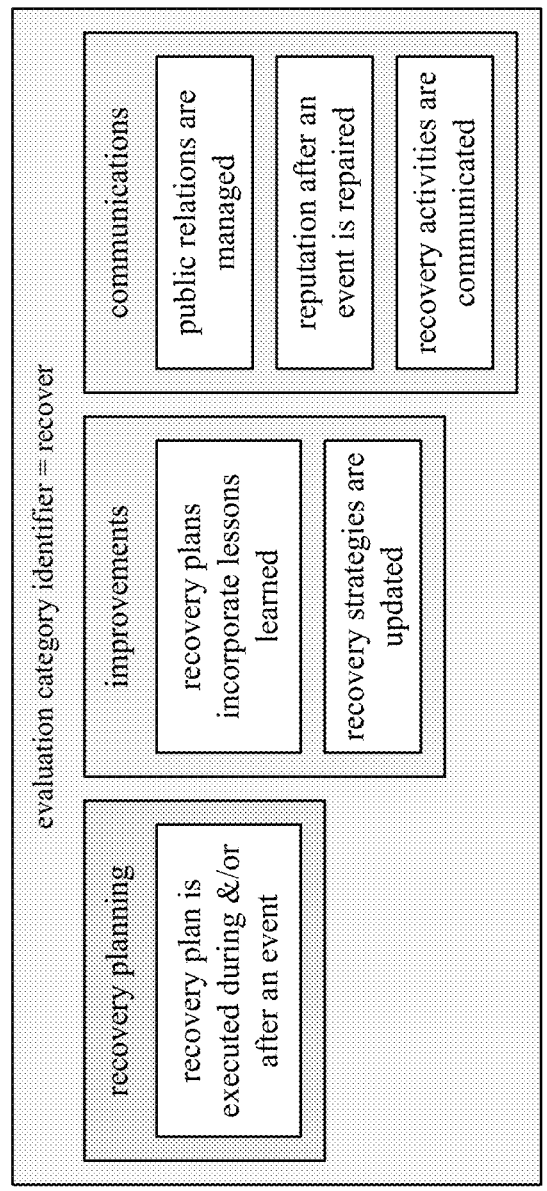
FIG. 49 is a diagram of an example of a recover evaluation category, sub-categories, and sub-sub-categories of the evaluation aspects and in accordance with the present disclosure.

FIG. 49 is a diagram of an example of a recover evaluation category that includes a plurality of sub-categories and each sub-category includes its own plurality of sub-sub-categories. The recover category includes the sub-categories of recovery plan, improvements, and communication. The recovery plan sub-category includes the sub-sub category of recovery plan is executed during and/or after an event.

The improvement sub-category includes the sub-sub categories of recovery plans incorporate lessons learned and recovery strategies are updated. The communications sub-category includes the sub-sub categories of public relations are managed, reputations after an event is repaired, and recovery activities are communicated.

Figure 50:
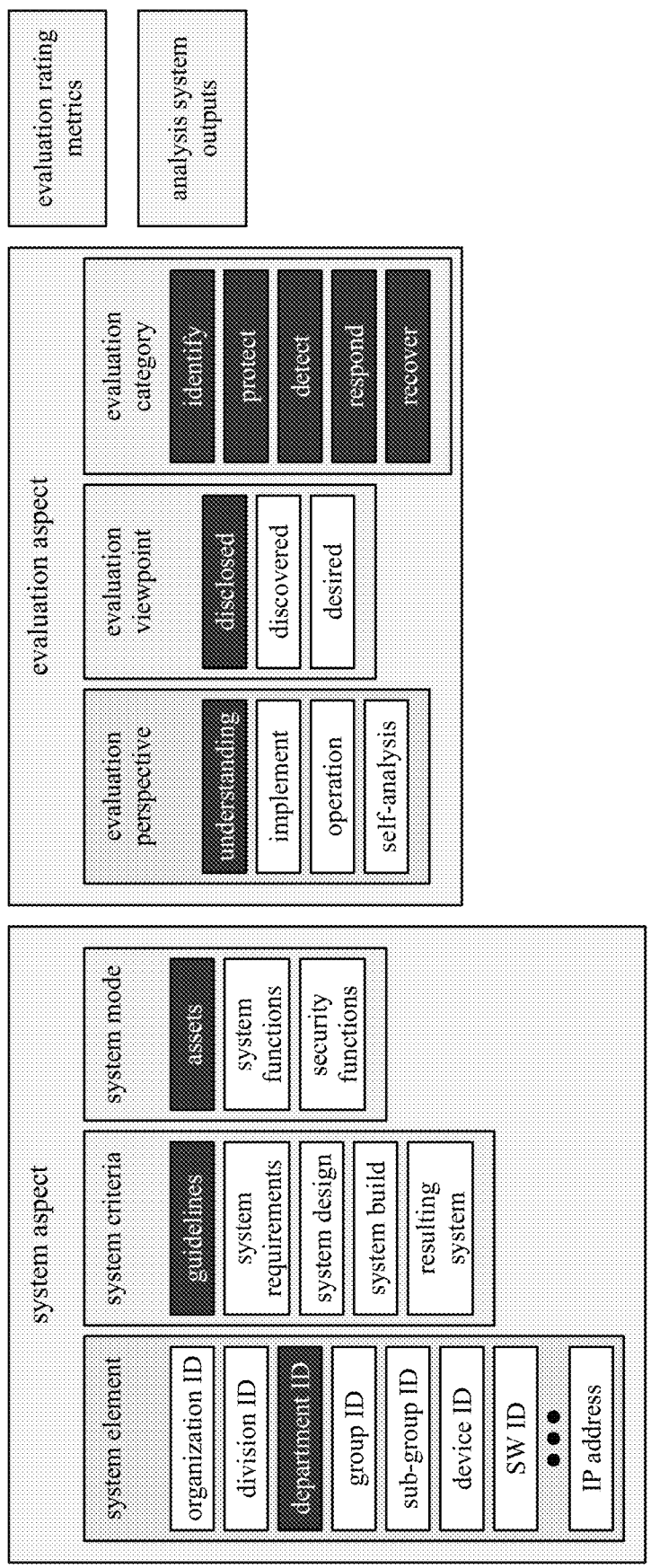
FIG. 50 is a diagram of a specific example of system aspects, evaluation aspects, evaluation rating metrics, and analysis system output options of an analysis system for analyzing a section of a system in accordance with the present disclosure.

FIG. 50 is a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines for identifying assets, protecting the assets from issues, detecting issues that may affect or are affecting the assets, responding to issues that may affect or are affecting the assets, and recovering from issues that affected the assets of a department based on disclosed data.

For this specific example, the analysis system 10 obtains disclosed data from the system regarding the guidelines associated with the assets of the department. From the disclosed data, the analysis system renders an evaluation rating for the understanding of the guidelines for identifying assets. The analysis system renders a second evaluation rating for the understanding of the guidelines regarding protection of the assets from issues. The analysis system renders a third evaluation rating for the understanding of the guidelines regarding detection of issues that may affect or are affecting the assets.

The analysis system renders a fourth evaluation rating for the understanding of the guidelines regarding responds to issues that may affect or are affecting the assets. The analysis system renders a fifth evaluation rating for the understanding of the guidelines regarding recovery from issues that affected the assets of a department based on disclosed data. The analysis system may render an overall evaluation rating for the understanding of the guidelines based on the first through fifth evaluation ratings.

As another example, the analysis system 11 evaluates the understanding of guidelines used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data. In this example, the analysis system renders an evaluation rating for the understanding of the guidelines regarding what assets should be in the department. The analysis system renders a second evaluation rating for the understanding of the guidelines regarding how the assets should be protected from issues. The analysis system renders a third evaluation rating for the understanding of the guidelines regarding how to detect issues that may affect or are affecting the assets.

The analysis system renders a fourth evaluation rating for the understanding of the guidelines regarding how to respond to issues that may affect or are affecting the assets. The analysis system renders a fifth evaluation rating for the understanding of the guidelines regarding how to recover from issues that affected the assets of a department based on disclosed data. The analysis system may render an overall evaluation rating for the understanding based on the first through fifth evaluation ratings.

Figure 51:
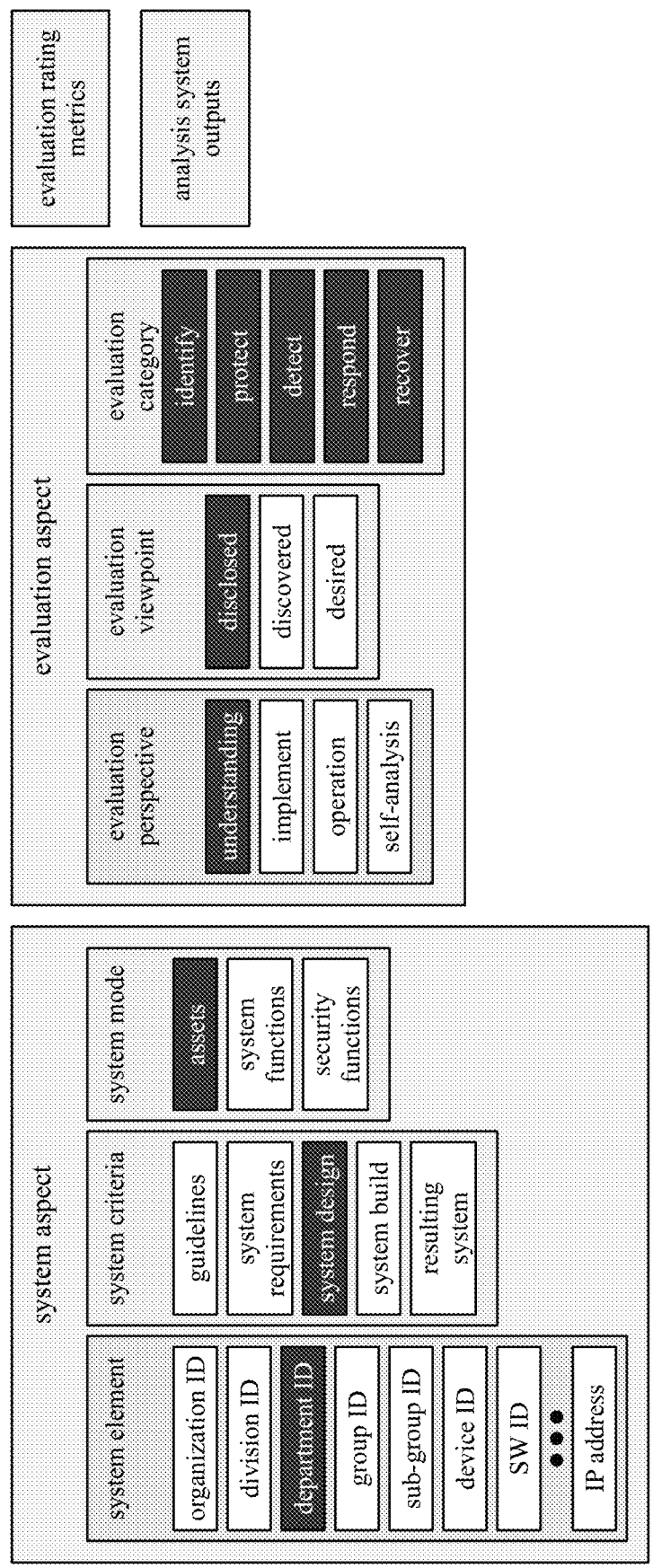
FIG. 51 is a diagram of another specific example of system aspects, evaluation aspects, evaluation rating metrics, and analysis system output options of an analysis system for analyzing a section of a system in accordance with the present disclosure.

FIG. 51 is a diagram of an example of system aspects, evaluation aspects, evaluation rating metrics, and analysis system output options of an analysis system 11 for analyzing a system 11, or portion thereof. For instance, analysis system 11 is evaluating the understanding of the system design for identifying assets, protecting the assets from issues, detecting issues that may affect or are affecting the assets, responding to issues that may affect or are affecting the assets, and recovering from issues that affected the assets of a department based on disclosed data.

For this specific example, the analysis system 10 obtains disclosed data from the system regarding the system design associated with the assets of the department. From the disclosed data, the analysis system renders an evaluation rating for the understanding of the system design for identifying assets. The analysis system renders a second evaluation rating for the understanding of the system design regarding protection of the assets from issues. The analysis system renders a third evaluation rating for the understanding of the system design regarding detection of issues that may affect or are affecting the assets.

The analysis system renders a fourth evaluation rating for the understanding of the system design regarding responds to issues that may affect or are affecting the assets. The analysis system renders a fifth evaluation rating for the understanding of the system design regarding recovery from issues that affected the assets of a department based on disclosed data. The analysis system may render an overall evaluation rating for the understanding based on the first through fifth evaluation ratings.

As another example, the analysis system 11 evaluates the understanding of system design used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data. In this example, the analysis system renders an evaluation rating for the understanding of the system design regarding what assets should be in the department. The analysis system renders a second evaluation rating for the understanding of the system design regarding how the assets should be protected from issues. The analysis system renders a third evaluation rating for the understanding of the system design regarding how to detect issues that may affect or are affecting the assets.

The analysis system renders a fourth evaluation rating for the understanding of the system design regarding how to respond to issues that may affect or are affecting the assets. The analysis system renders a fifth evaluation rating for the understanding of the system design regarding how to recover from issues that affected the assets of a department based on disclosed data. The analysis system may render an overall evaluation rating for the understanding based on the first through fifth evaluation ratings.

Figure 52:
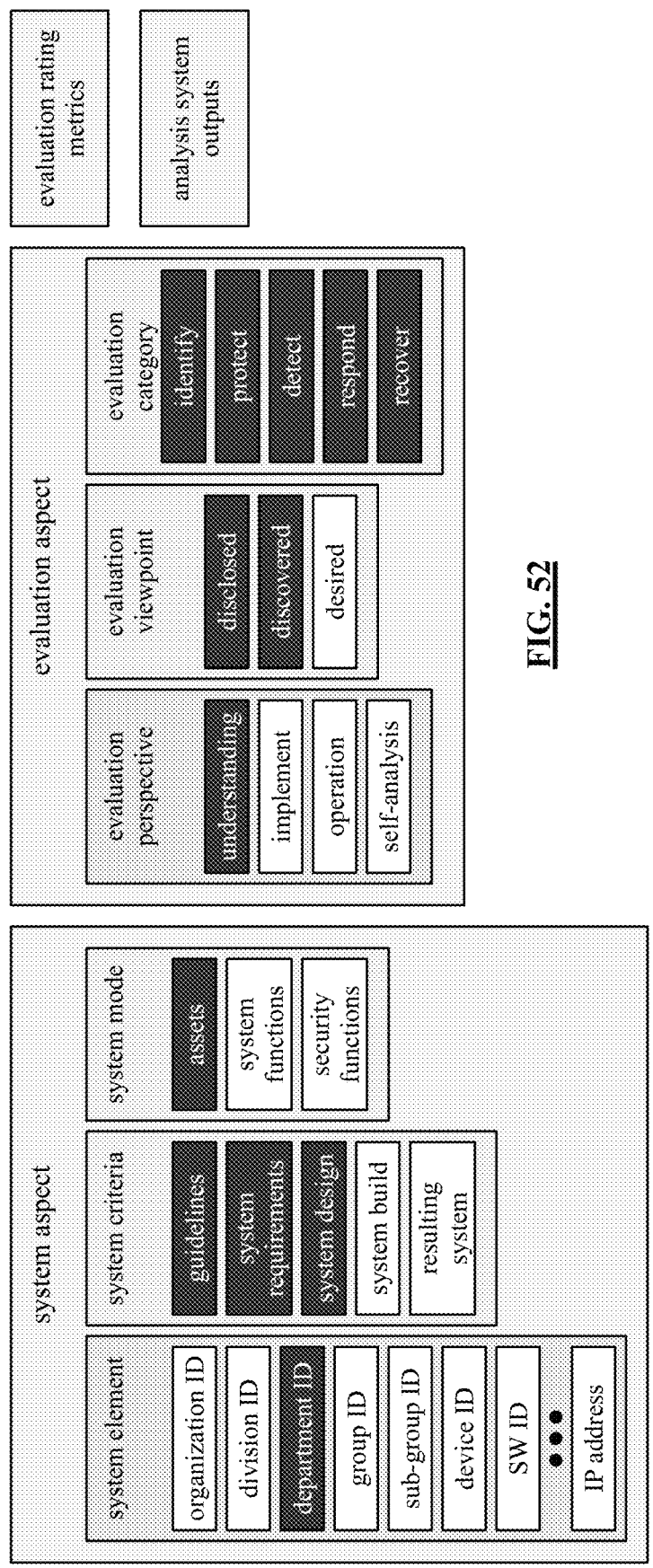
FIG. 52 is a diagram of another specific example of system aspects, evaluation aspects, evaluation rating metrics, and analysis system output options of an analysis system for analyzing a section of a system in accordance with the present disclosure.

FIG. 52 is a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines, system requirements, and system design for identifying assets, protecting the assets from issues, detecting issues that may affect or are affecting the assets, responding to issues that may affect or are affecting the assets, and recovering from issues that affected the assets of a department based on disclosed data and discovered data.

For this specific example, the analysis system 10 obtains disclosed data and discovered from the system regarding guidelines, system requirements, and system design associated with the assets of the department. From the disclosed data and discovered data, the analysis system renders one or more first evaluation ratings (e.g., one for each of guidelines, system requirements, and system design, or one for all three) for the understanding of the guidelines, system requirements, and system design for identifying assets. The analysis system renders one or more second evaluation ratings for the understanding of the guidelines, system requirements, and system design regarding protection of the assets from issues. The analysis system renders one or more third evaluation ratings for the understanding of the guidelines, system requirements, and system design regarding detection of issues that may affect or are affecting the assets.

The analysis system renders one or more fourth evaluation ratings for the understanding of the guidelines, system requirements, and system design regarding responds to issues that may affect or are affecting the assets. The analysis system renders one or more fifth evaluation ratings for the understanding of the guidelines, system requirements, and system design regarding recovery from issues that affected the assets of a department based on disclosed data. The analysis system may render an overall evaluation rating for the understanding based on the one or more first through one or more fifth evaluation ratings.

The analysis system 11 may further render an understanding evaluation rating regarding how well the discovered data correlates with the disclosed data. In other words, evaluate the knowledge level of the system. In this example, the analysis system compares the disclosed data with the discovered data. If they substantially match, the understanding of the system would receive a relatively high evaluation rating. The more the disclosed data differs from the discovered data, the lower the understanding evaluation rating will be.

As another example, the analysis system 11 evaluates the understanding of guidelines, system requirements, and system design used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data and discovered data. In this example, the analysis system renders one or more first evaluation ratings for the understanding of the guidelines, system requirements, and system design regarding what assets should be in the department. The analysis system renders one or more second evaluation ratings for the understanding of the guidelines, system requirements, and system design regarding how the assets should be protected from issues. The analysis system renders one or more third evaluation ratings for the understanding of the guidelines, system requirements, and system design regarding how to detect issues that may affect or are affecting the assets.

The analysis system renders one or more fourth evaluation ratings for the understanding of the guidelines, system requirements, and system design regarding how to respond to issues that may affect or are affecting the assets. The analysis system renders one or more fifth evaluation ratings for the understanding of the guidelines, system requirements, and system design regarding how to recover from issues that affected the assets of a department based on disclosed data. The analysis system may render an overall evaluation rating for the understanding of the guidelines, system requirements, and system design based on the one or more first through the one or more fifth evaluation ratings.

Figure 53:
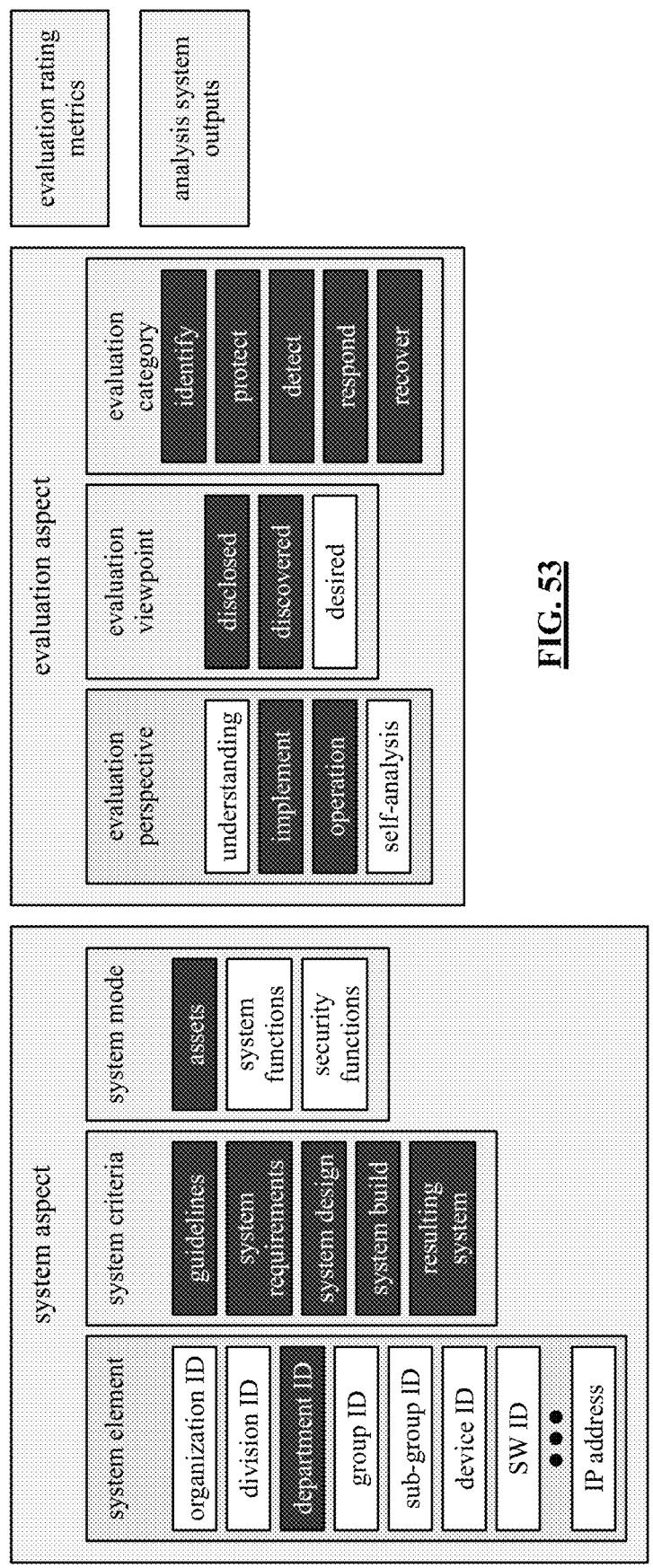
FIG. 53 is a diagram of another specific example of system aspects, evaluation aspects, evaluation rating metrics, and analysis system output options of an analysis system for analyzing a section of a system in accordance with the present disclosure.

FIG. 53 is a diagram of an example of system aspects, evaluation aspects, evaluation rating metrics, and analysis system output options of an analysis system 11 for analyzing a system 11, or portion thereof. For instance, analysis system 11 is evaluating the implementation for and operation of identifying assets of a department, protecting the assets from issues, detecting issues that may affect or are affecting the assets, responding to issues that may affect or are affecting the assets, and recovering from issues that affected the assets per the guidelines, system requirements, system design, system build, and resulting system based on disclosed data and discovered data.

For this specific example, the analysis system 10 obtains disclosed data and discovered data from the system regarding the guidelines, system requirements, system design, system build, and resulting system associated with the assets of the department. From the disclosed data and discovered data, the analysis system renders one or more first evaluation ratings (e.g., one for each of guidelines, system requirements, system design, system build, resulting system with respect to each of implementation and operation or one for all of them) for the implementation and operation of identifying the assets per the guidelines, system requirements, system design, system build, and resulting system. The analysis system renders one or more second evaluation ratings for the implementation and operation of protecting the assets from issues per the guidelines, system requirements, system design, system build, and resulting system.

The analysis system renders one or more third evaluation ratings for the implementation and operation of detecting issues that may affect or are affecting the assets per the guidelines, system requirements, system design, system build, and resulting system. The analysis system renders one or more fourth evaluation ratings for the implementation and operation of responding to issues that may affect or are affecting the assets per the guidelines, system requirements, system design, system build, and resulting system.

The analysis system renders one or more fifth evaluation ratings for the implementation and operation of recovering from issues that may affect or are affecting the assets per the guidelines, system requirements, system design, system build, and resulting system. The analysis system may render an overall evaluation rating for the implementation and/or performance based on the one or more first through one or more fifth evaluation ratings.

Figure 54:
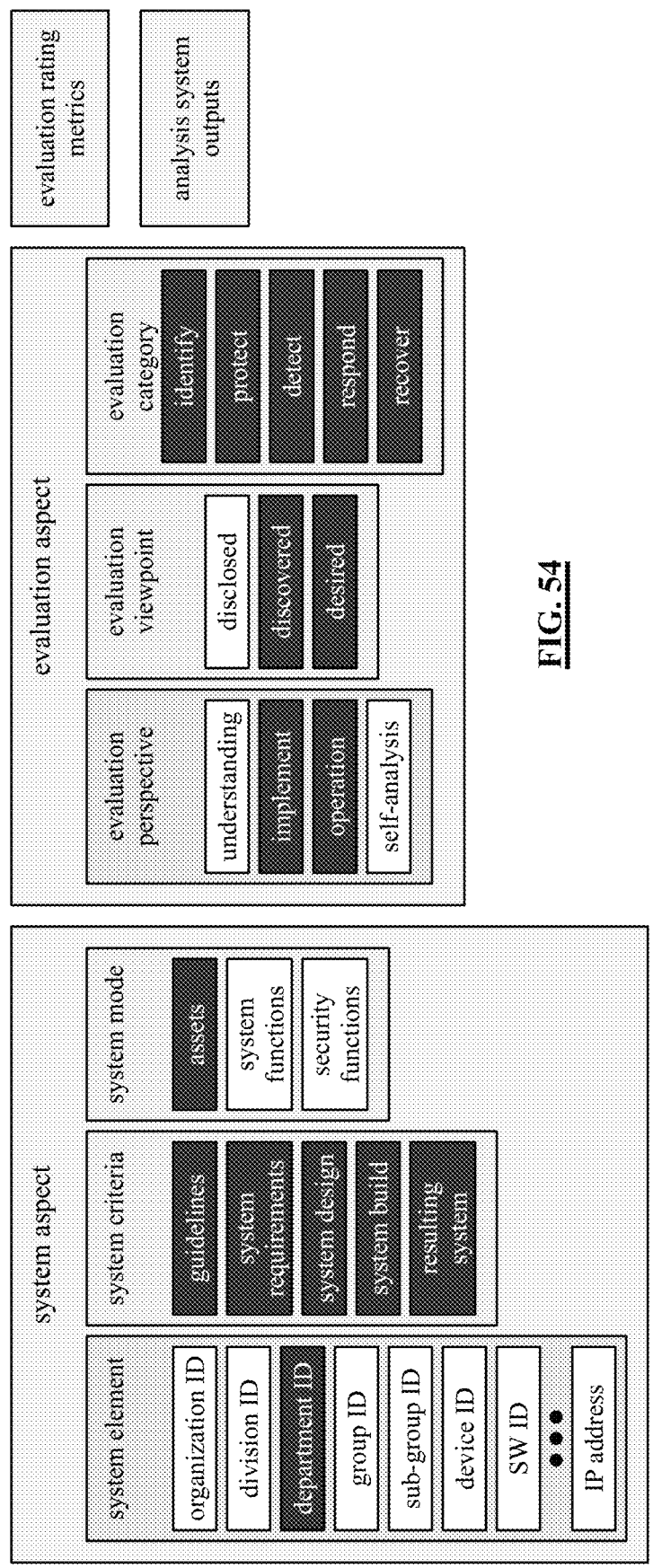
FIG. 54 is a diagram of another specific example of system aspects, evaluation aspects, evaluation rating metrics, and analysis system output options of an analysis system for analyzing a section of a system in accordance with the present disclosure.

FIG. 54 is a diagram of an example of system aspects, evaluation aspects, evaluation rating metrics, and analysis system output options of an analysis system 11 for analyzing a system 11, or portion thereof. For instance, analysis system 11 is evaluating the implementation for and operation of identifying assets of a department, protecting the assets from issues, detecting issues that may affect or are affecting the assets, responding to issues that may affect or are affecting the assets, and recovering from issues that affected the assets per the guidelines, system requirements, system design, system build, and resulting system based on discovered data and desired data.

For this specific example, the analysis system 10 obtains disclosed data and discovered from the system regarding the guidelines, system requirements, system design, system build, and resulting system associated with the assets of the department. From the discovered data and desired data, the analysis system renders one or more first evaluation ratings (e.g., one for each of guidelines, system requirements, system design, system build, resulting system with respect to each of implementation and operation or one for all of them) for the implementation and operation of identifying the assets per the guidelines, system requirements, system design, system build, and resulting system. The analysis system renders one or more second evaluation ratings for the implementation and operation of protecting the assets from issues per the guidelines, system requirements, system design, system build, and resulting system.

The analysis system renders one or more third evaluation ratings for the implementation and operation of detecting issues that may affect or are affecting the assets per the guidelines, system requirements, system design, system build, and resulting system. The analysis system renders one or more fourth evaluation ratings for the implementation and operation of responding to issues that may affect or are affecting the assets per the guidelines, system requirements, system design, system build, and resulting system.

The analysis system renders one or more fifth evaluation ratings for the implementation and operation of recovering from issues that may affect or are affecting the assets per the guidelines, system requirements, system design, system build, and resulting system. The analysis system may render an overall evaluation rating for the implementation and/or performance based on the one or more first through one or more fifth evaluation ratings.

The analysis system 11 may further render an implementation and/or operation evaluation rating regarding how well the discovered data correlates with the desired data. In other words, evaluate the level implementation and operation of the system. In this example, the analysis system compares the disclosed data with the desired data. If they substantially match, the implementation and/or operation of the system would receive a relatively high evaluation rating. The more the discovered data differs from the desired data, the lower the implementation and/or operation evaluation rating will be.

Figure 55:
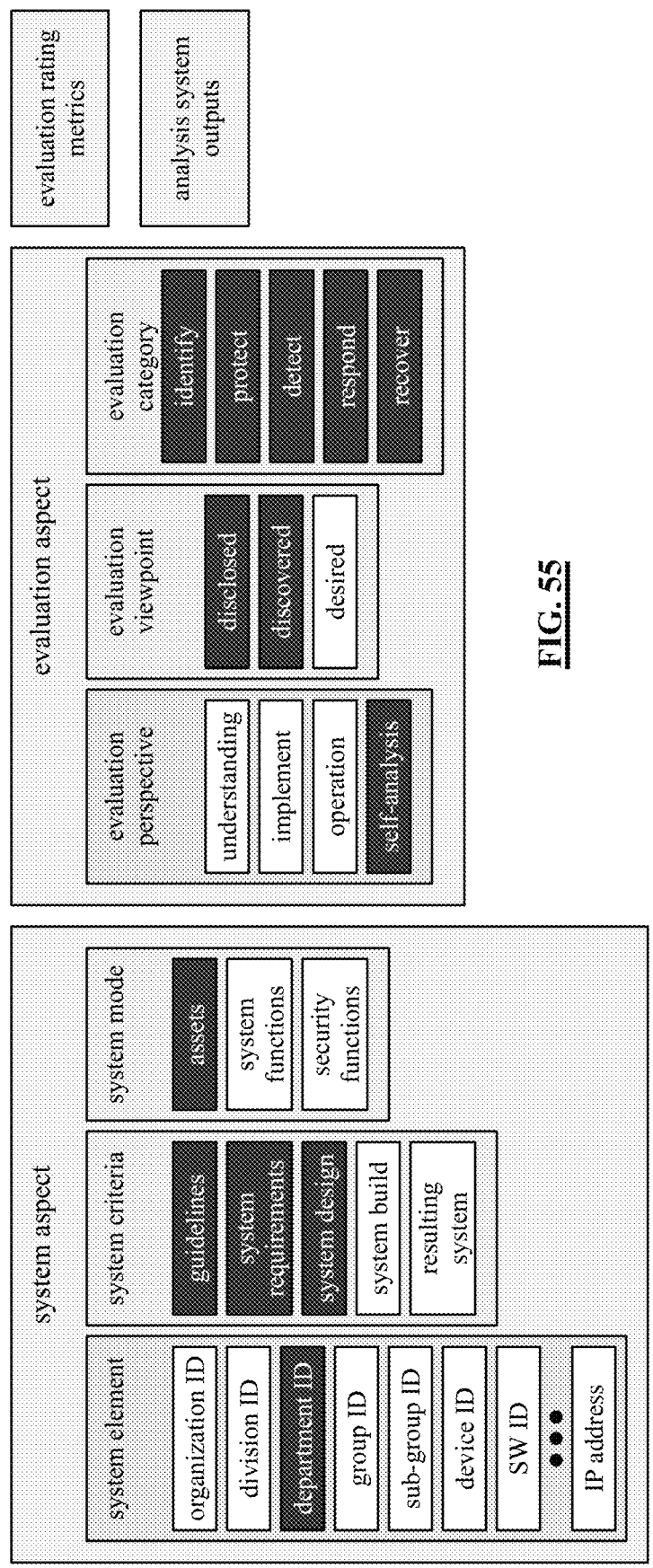
FIG. 55 is a diagram of another specific example of system aspects, evaluation aspects, evaluation rating metrics, and analysis system output options of an analysis system for analyzing a section of a system in accordance with the present disclosure.

FIG. 55 is a diagram of an example of system aspects, evaluation aspects, evaluation rating metrics, and analysis system output options of an analysis system 11 for analyzing a system 11, or portion thereof. For instance, analysis system 11 is evaluating the system's self-evaluation for identifying assets, protecting the assets from issues, detecting issues that may affect or are affecting the assets, responding to issues that may affect or are affecting the assets, and recovering from issues that affected the assets of a department based on disclosed data and discovered data per the guidelines, system requirements, and system design.

For this specific example, the analysis system 10 obtains disclosed data and discovered from the system regarding the guidelines, system requirements, and system design associated with the assets of the department. From the disclosed data and discovered, the analysis system renders one or more first evaluation ratings (e.g., one for each of guidelines, system requirements, and system design, or one for all three)

for the self-evaluation of identifying assets per the guidelines, system requirements, and system design. For instance, what resources does the system have with respect to its guidelines, system requirements, and/or system design for self-identifying of assets.

The analysis system renders one or more second evaluation ratings for the self-evaluation of protecting the assets from issues per the guidelines, system requirements, and system design regarding. The analysis system renders one or more third evaluation ratings for the self-evaluation of detecting issues that may affect or are affecting the assets per the guidelines, system requirements, and system design regarding detection.

The analysis system renders one or more fourth evaluation ratings for the self-evaluation of responding to issues that may affect or are affecting the assets per the guidelines, system requirements, and system design. The analysis system renders one or more fifth evaluation ratings for the self-evaluation of recovering from issues that affected the assets per the guidelines, system requirements, and system design. The analysis system may render an overall evaluation rating for the self-evaluation based on the one or more first through one or more fifth evaluation ratings.

Figure 56:
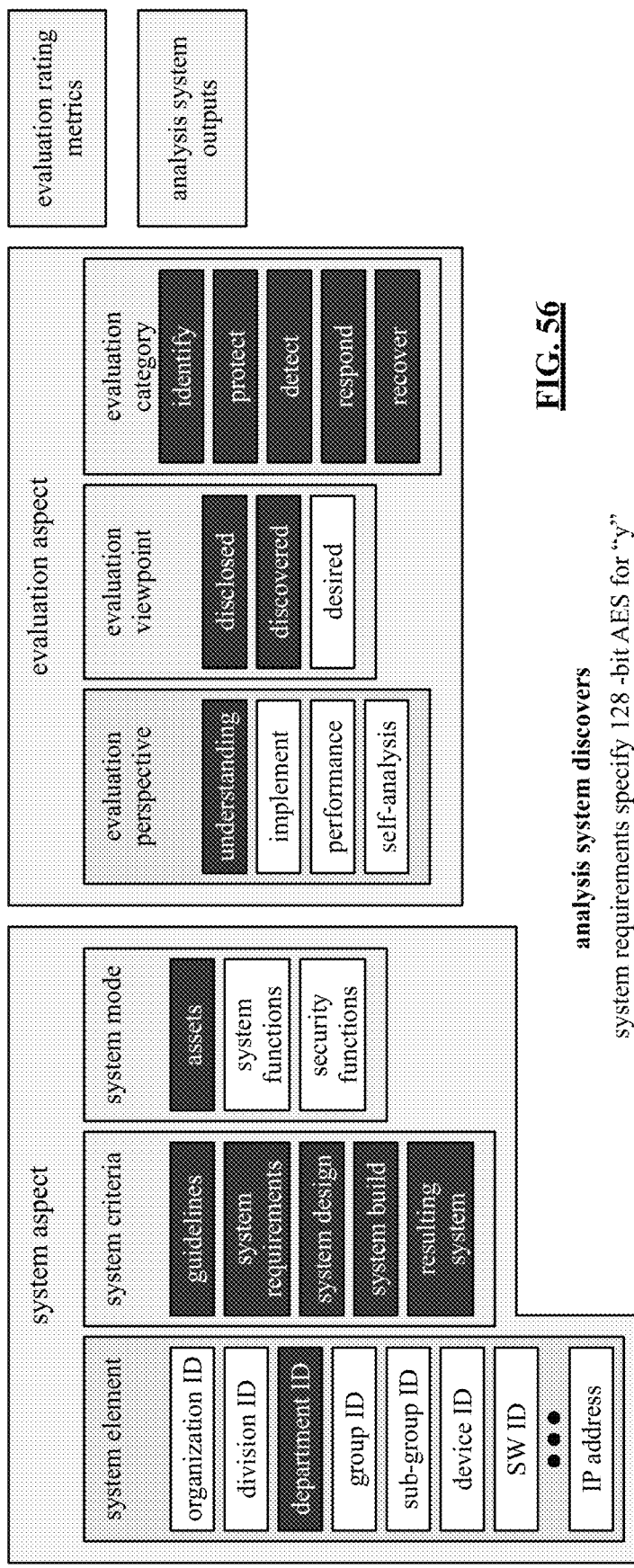

FIGS. 56 and 56A are a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines, system requirements, system design, system build, and resulting system for identifying assets, protecting the assets from issues, detecting issues that may affect or are affecting the assets, responding to issues that may affect or are affecting the assets, and recovering from issues that affected the assets of a department based on disclosed data and discovered data.

For this specific example, the analysis system 10 obtains disclosed data and discovered data from the system regarding guidelines, system requirements, system design, system build, and resulting system associated with the assets of the department. As a specific example, the disclosed data includes guidelines that certain types of data shall be encrypted; a system requirement that specifies 128-bit Advanced Encryption Standard (AES) for "y" types of documents; a system design that includes 12 "x" type computers that are to be loaded with 128-bit AES software by company "M", version 2.0 or newer; and a system build and resulting system that includes 12 "x" type computers that have 128-bit AES software by company "M", version 2.1.

For this specific example, the discovered data includes the same guideline as the disclosed data; a first system requirement that specifies 128-bit Advanced Encryption Standard (AES) for "y" types of documents and a second system requirement that specifies 256-bit Advanced Encryption Standard (AES) for "A" types of documents; a system design that includes 12 "x" type computers that are to be loaded with 128-bit AES software by company "M", version 2.0 or newer, and 3 "z" type computers that are to be loaded with 256-bit AES software by company "N" version 3.0 or newer; and a system build and resulting system that includes 10 "x" type computers that have 128-bit AES software by company "M" version 2.1, 2 "x" type computers that have 128-bit AES software by company "M" version 1.3, 2 "z" type computers that have 256-bit AES software by company "N" version 3.1, and 1 "z" type computer that has 256-bit AES software by company "K" version 0.1.

From just the disclosed data, the analysis system would render a relatively high evaluation rating for the understanding of the guidelines, system requirements, system design, system build, and resulting system associated with the assets of the department. The relatively high evaluation rating would be warranted since the system build and resulting system included what was in the system design (e.g., 12 "x" type computers that have 128-bit AES software by company "M", version 2.1). Further, the system design is consistent with the system reequipments (e.g., 128-bit Advanced Encryption Standard (AES) for "y" types of documents), which is consistent with the guidelines (e.g., certain types of data shall be encrypted).

From the discovered data, however, the analysis system would render a relatively low evaluation rating for the understanding of the guidelines, system requirements, system design, system build, and resulting system associated with the assets of the department. The relatively low evaluation rating would be warranted since the system build and resulting system is not consistent with the system design (e.g., is missing 2 "x" type computers with the right encryption software, only has 2 "z" type computers with the right software, and has a "z" type computer with the wrong software).

The analysis system would also process the evaluation ratings from the disclosed data and from the discovered data to produce an overall evaluation rating for the understanding of the guidelines, system requirements, system design, system build, and resulting system associated with the assets of the department. In this instance, the disclosed data does not substantially match the discovered data, which indicates a lack of understanding of what's really in the system (i.e., knowledge of the system). Further, since the evaluation rating from the discovered data was low, the analysis system would produce a low overall evaluation rating for the understanding.

Figure 57:
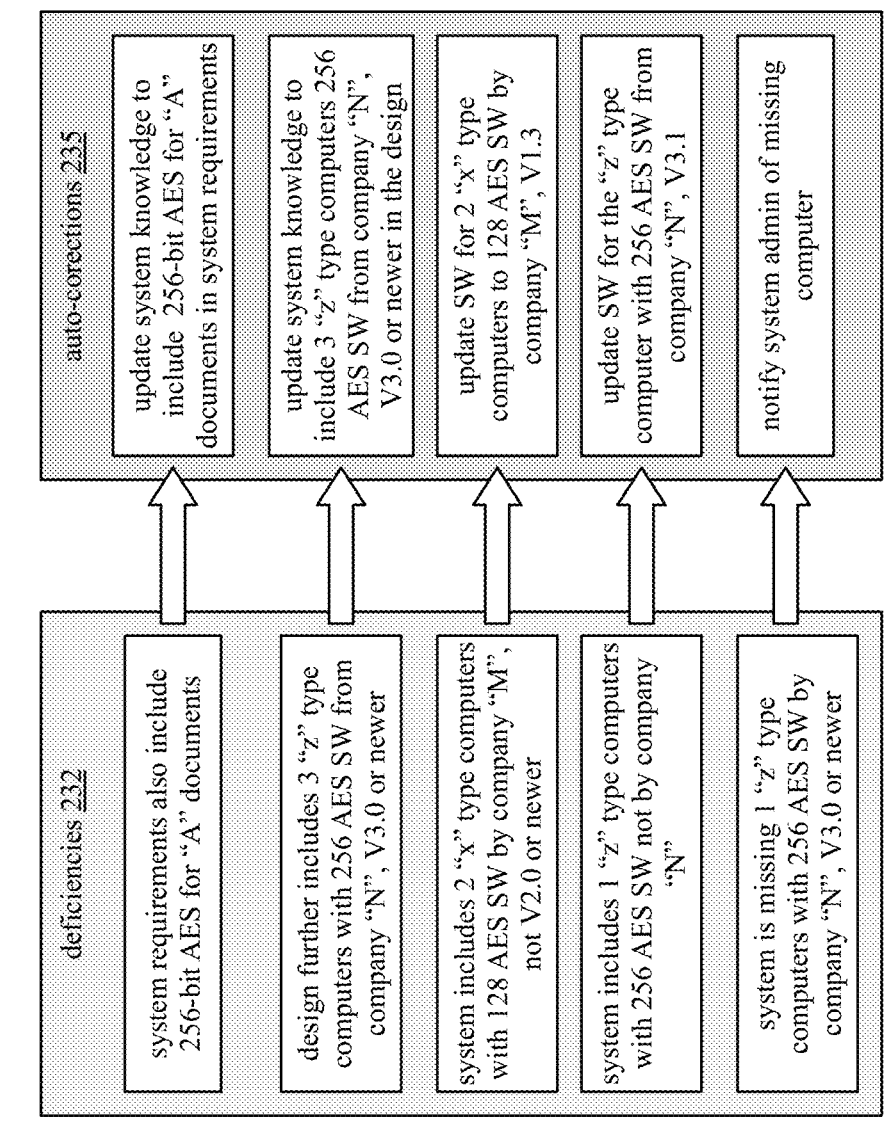

FIGS. 57 and 57A are a diagram of an extension of the example of FIG. 56. In this example, the analysis system processes the data and/or evaluation ratings to identify deficiencies and/or auto-corrections of at least some of the deficiencies. As shown, the disclosed data includes:
  guidelines that certain types of data shall be encrypted;
  a system requirement that specifies 128-bit Advanced Encryption Standard (AES) for "y" types of documents;
  a system design that includes 12 "x" type computers that are to be loaded with 128-bit AES software by company "M", version 2.0 or newer; and
  a system build and resulting system that includes 12 "x" type computers that have 128-bit AES software by company "M", version 2.1.
As is also shown, the discovered data includes:
  the same guideline as the disclosed data;
  a first system requirement that specifies 128-bit Advanced Encryption Standard (AES) for "y" types of documents and a second system requirement that specifies 256-bit Advanced Encryption Standard (AES) for "A" types of documents;
  a system design that includes 12 "x" type computers that are to be loaded with 128-bit AES software by company "M", version 2.0 or newer, and 3 "z" type computers that are to be loaded with 256-bit AES software by company "N", version 3.0 or newer; and
  a system build and resulting system that includes:
    10 "x" type computers that have 128-bit AES software by company "M", version 2.1;

2 "x" type computers that have 128-bit AES software by company "M", version 1.3;

2 "z" type computers that have 256-bit AES software by company "N", version 3.1; and 1 "z" type computer that has 256-bit AES software by company "K", version 0.1.

From this data, the analysis system identifies deficiencies 232 and, when possible, provides auto-corrections 235. For example, the analysis system determines that the system requirements also included a requirement for 256-bit AES for "A" type documents. The analysis system can auto-correct this deficiency by updating the knowledge of the system to include the missing requirement. This may include updating one or more policies, one or more processes, one or more procedures, and/or updating documentation.

As another example, the analysis system identifies the deficiency of the design further included 3 "z" type computers that are to be loaded with 256-bit AES software by company "N", version 3.0 or newer. The analysis system can auto-correct this deficiency by updating the knowledge of the system to includes the thee "z" type computers with the correct software. Again, this may include updating one or more policies, one or more processes, one or more procedures, and/or updating documentation.

As another example, the analysis system identifies the deficiency of 2 "x" type computers having old versions of the encryption software (e.g., have version 1.3 of company M's 128-bit AES software instead of a version 2.0 or newer). The analysis system can auto-correct this deficiency by updating the version of software for the two computers.

As another example, the analysis system identifies the deficiency of 1 "z" type computer has the wrong encryption software (e.g., it has version 0.1 from company K and not version 3.0 or newer from company N). The analysis system can auto-correct this deficiency by replacing the wrong encryption software with the correct encryption software.

As another example, the analysis system identifies the deficiency of 1 "z" type computer is missing from the system. The analysis system cannot auto-correct this deficiency since it is missing hardware. In this instance, the analysis system notifies a system admin of the missing computer.

Figure 58:
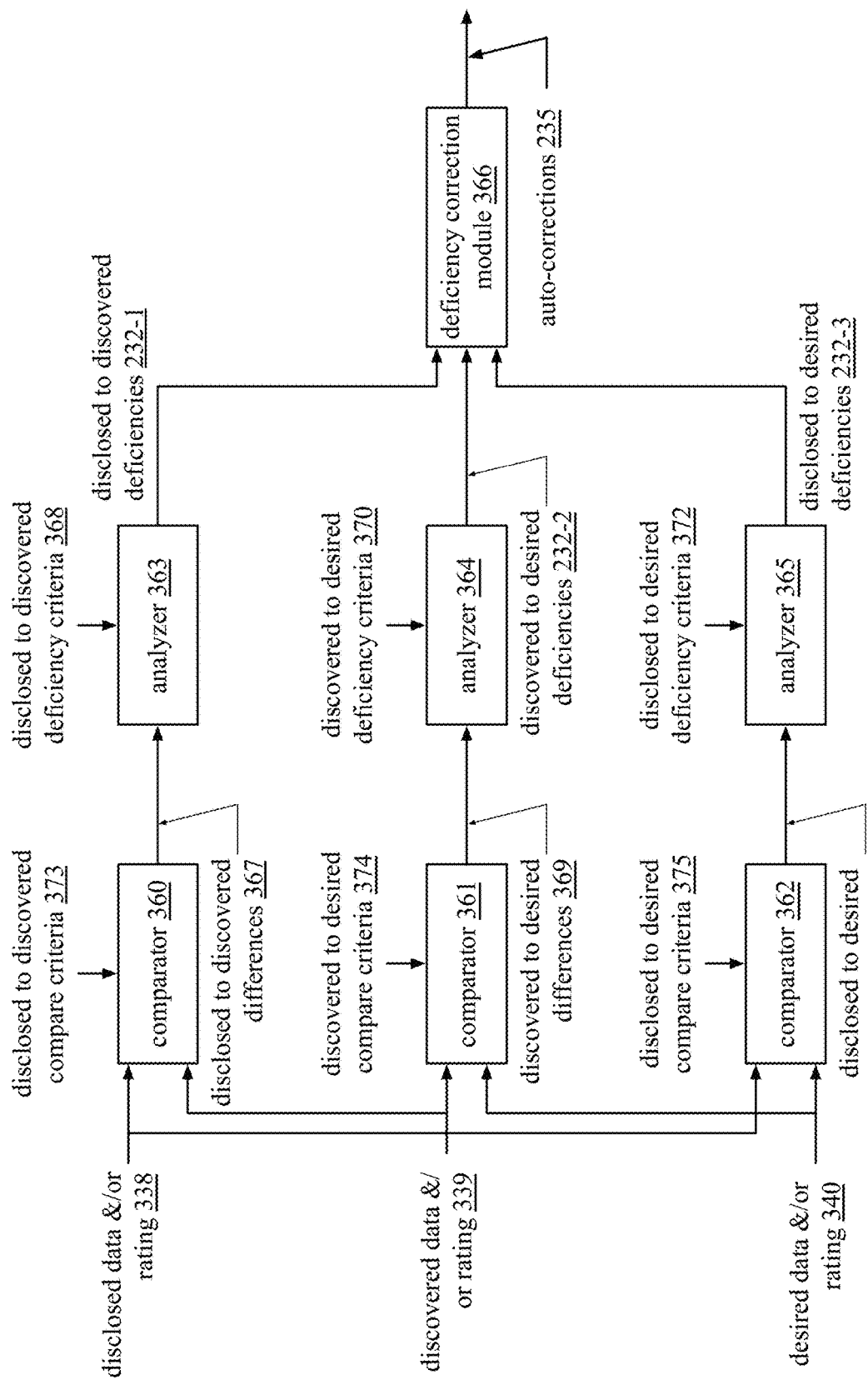
FIG. 58 is a schematic block diagram of an embodiment of an evaluation processing module of an analysis system in accordance with the present disclosure.

FIG. 58 is a schematic block diagram of an embodiment of an evaluation processing module 254 that includes a plurality of comparators 360-362, a plurality of analyzers 363-365, and a deficiency correction module 366. In general, the evaluation processing module 254 identifies deficiencies 232 and, when possible, determines auto-corrections 235 from the ratings 219 and/or inputted data (e.g., disclosed data, discovered data, and/or desired data) based on evaluation parameters 266 (e.g., disclosed to discovered deficiency criteria 368, discovered to desired deficiency criteria 370, disclosed to desired deficiency criteria 372, disclosed to discovered compare criteria 373, discovered to desired compare criteria 374, and disclosed to desired compare criteria 375).

In an example, comparator 360 compares disclosed data and/or ratings 338 and discovered data and/or ratings 339 based on the disclosed to discovered compare criteria 373 to produce, if any, one or more disclosed to discovered differences 367. As a more specific example, the analysis system evaluates disclosed, discovered, and/or desired data to produce one or more evaluation ratings regarding the understanding of the guidelines, system requirements, system design, system build, and resulting system associated with identifying the assets of the department.

Each of the disclosed data, discovered data, and desired data includes data regarding the guidelines, system requirements, system design, system build, and/or resulting system associated with identifying the assets of the department and/or the assets of the department. Recall that disclosed data is the known data of the system at the outset of an analysis, which is typically supplied by a system administrator and/or is obtained from data files of the system. The discovered data is the data discovered about the system by the analysis system during the analysis. The desired data is the data obtained by the analysis system from system proficiency resources regarding desired guidelines, system requirements, system design, system build, and/or system operation.

For the understanding of the guidelines, system requirements, system design, system build, and resulting system associated with identifying the assets of the department, the analysis system may produce one or more evaluation ratings. For example, the analysis system produces an evaluation rating for:

understanding of the guidelines with respect to identifying assets of the department from the disclosed data;

understanding of the guidelines with respect to identifying assets of the department from the discovered data;

understanding of the guidelines with respect to identifying assets of the department from the desired data;

understanding of the system requirements with respect to identifying assets of the department from the disclosed data;

understanding of the system requirements with respect to identifying assets of the department from the discovered data;

understanding of the system requirements with respect to identifying assets of the department from the desired data;

understanding of the system design with respect to identifying assets of the department from the disclosed data;

understanding of the system design with respect to identifying assets of the department from the discovered data;

understanding of the system design with respect to identifying assets of the department from the desired data;

understanding of the system build with respect to identifying assets of the department from the disclosed data;

understanding of the system build with respect to identifying assets of the department from the discovered data;

understanding of the system build with respect to identifying assets of the department from the desired data;

understanding of the resulting system with respect to identifying assets of the department from the disclosed data;

understanding of the resulting system with respect to identifying assets of the department from the discovered data;

understanding of the resulting system with respect to identifying assets of the department from the desired data; and/or an overall understanding of identifying the assets of the department.

The disclosed to discovered compare criteria 373 specifies the evaluation ratings to be compared and/or which data of the disclosed data is to be compared to data of the discovered data. For example, the disclosed to discovered compare criteria 373 indicates that the "understanding of the guidelines with respect to system design of the department from the disclosed data" is to be compared to the "understanding of the system design with respect to identifying assets of the department from the discovered data". As another example, the disclosed to discovered compare criteria 373 indicates that data regarding system design of the disclosed data is to be compared with the data regarding the system design of the discovered data.

In accordance with the disclosed to discovered compare criteria 373 and for this specific example, the comparator 360 compares the "understanding of the guidelines with respect to system design of the department from the disclosed data" with the "understanding of the system design with respect to identifying assets of the department from the discovered data" to produce, if any, one or more understanding differences. The comparator 360 also compares the data regarding system design of the disclosed data with the data regarding the system design of the discovered data to produce, if any, one or more data differences. The comparator 360 outputs the one or more understanding differences and/or the one or more data differences as the disclosed to discovered differences 367.

The analyzer 363 analyzes the disclosed to discovered differences 267 in accordance with the disclosed to discovered deficiency criteria 368 to determine whether a difference 267 constitutes a deficiency. If so, the analyzer 363 includes it in the disclosed to discovered deficiencies 232-1. The disclosed to discovered deficiency criteria 368 correspond to the disclosed to discovered compare criteria 373 and specify how the differences 367 are to be analyzed to determine if they constitute deficiencies 232-1.

As an example, the disclosed to discovered deficiency criteria 368 specify a series of comparative thresholds based on the impact the differences have on the system. The range of impact is from none to significant with as many granular levels in between as desired. For differences that have a significant impact on the system, the comparative threshold is set to trigger a deficiency for virtually any difference. For example, if the difference is regarding system security, then then threshold is set that any difference is a deficiency.

As another example, if the difference is regarding is inconsequential information, then the threshold is set to not identify the difference as a deficiency. For example, the discovered data includes a PO date on Nov. 2, 2020 for a specific purchase order and the disclosed data didn't include a PO date, but the rest of the information regarding the PO is the same for the disclosed and discovered data. In this instance, the missing PO date is inconsequential and would not be identified as a deficiency.

The deficiency correction module 366 receives the disclosed to discovered deficiencies 232-1, if any, and determines whether one or more of the deficiencies 232-1 can be auto-corrected to produce an auto-correction 235. In many instances, software deficiencies are auto-correctable (e.g., wrong software, missing software, out-of-date software, etc.) while hardware deficiencies are not auto-correctable (e.g., wrong computing device, missing computing device, missing network connection, etc.).

The comparator 361 functions similarly to the comparator 360 to produce discovered to desired differences 369 based on the discovered data and/or rating 339 and the desired data and/or rating 340 in accordance with the discovered to desired compare criteria 374. The analyzer 364 functions similarly to the analyzer 363 to produce discovered to desired deficiencies 232-2 from the discovered to desired differences 369 in accordance with the discovered to desired deficiency criteria 370. The deficiency correction module 366 auto-corrects, when possible, the discovered to desired deficiencies 232-2 to produce auto-corrections 235.

The comparator 362 functions similarly to the comparator 360 to produce disclosed to desired differences 371 based on the disclosed data and/or rating 338 and the desired data and/or rating 340 in accordance with the disclosed to desired compare criteria 375. The analyzer 365 functions similarly to the analyzer 363 to produce disclosed to desired deficiencies 232-3 from the disclosed to desired differences 371 in accordance with the disclosed to desired deficiency criteria 372. The deficiency correction module 366 auto-corrects, when possible, the disclosed to desired deficiencies 232-3 to produce auto-corrections 235.

While the examples were for the understanding of the system with respect to identifying assets of the department, the evaluation processing module 254 processes any combination of system aspects, evaluation aspects, and evaluation metrics in a similar manner. For example, the evaluation processing module 254 processes the implementation of the system with respect to identifying assets of the department to identify deficiencies 232 and auto-corrections in the implementation. As another example, the evaluation processing module 254 processes the operation of the system with respect to identifying assets of the department to identify deficiencies 232 and auto-corrections in the operation of the system.

Figure 59:
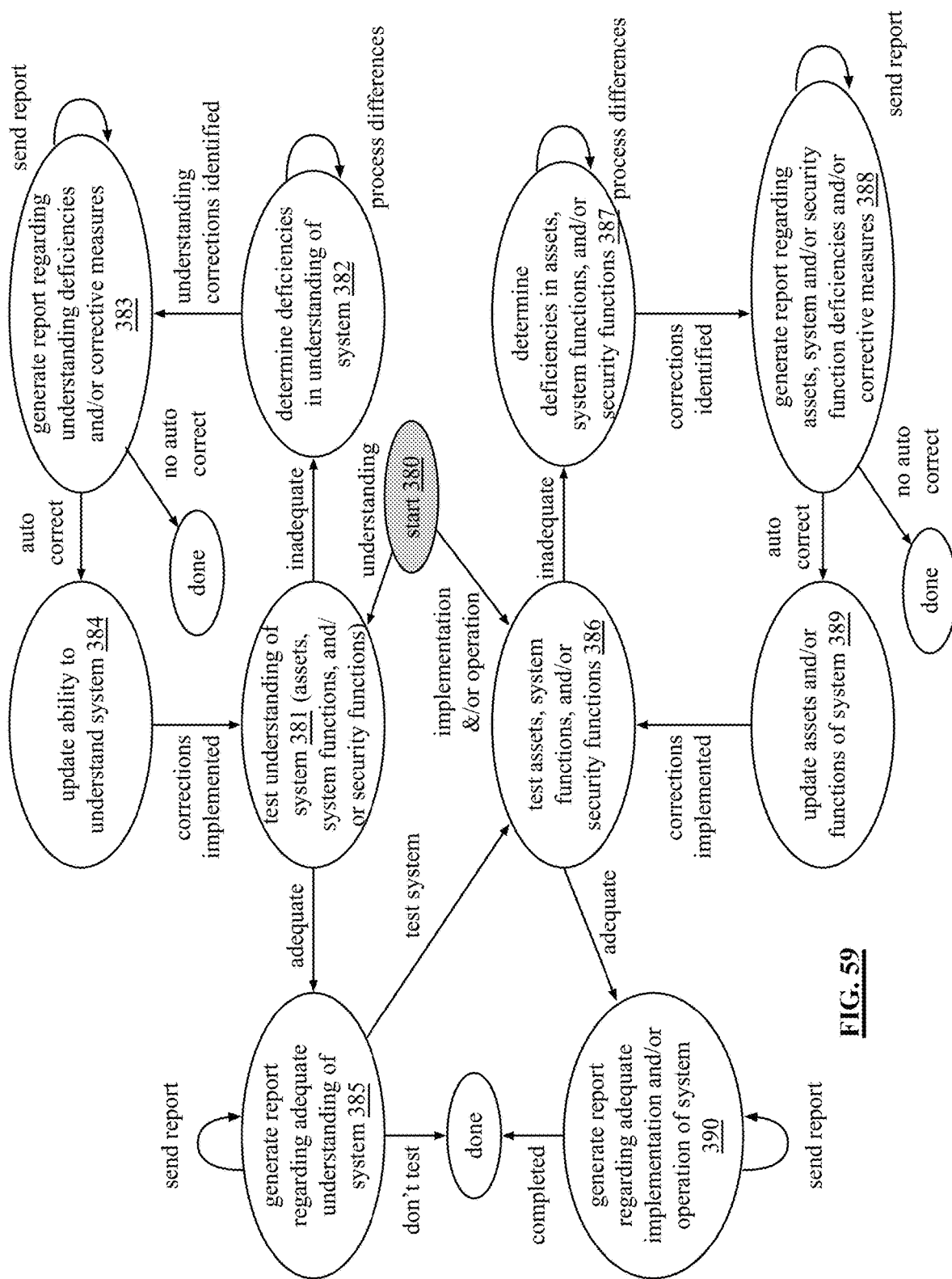
FIG. 59 is a state diagram of an example of an analysis system analyzing a section of a system in accordance with the present disclosure.

FIG. 59 is a state diagram of an example the analysis system analyzing a system. From a start state 380, the analysis proceeds to an understanding of the system state 38) or to a test operations of the assets system functions, and/or security functions of a system state 386 based on the desired analysis to be performed. For testing the understanding, the analysis proceeds to state 381 where the understanding of the assets, system functions, and/or security functions of the system are evaluated. This may be done via documentation of the system, policies of the supported business, based upon a question and answer session with personnel of the owner/operator of the system, and/or as discussed herein.

If the understanding of the system is inadequate, the analysis proceeds to the determine deficiencies in the understanding of the system state 382. In this state 382, the deficiencies in understanding are determined by processing differences and/or as discussed herein.

From state 382, corrections required in understanding the system are identified and operation proceeds to state 383 in which a report is generated regarding understanding deficiencies and/or corrective measures to be taken. In addition, a report is generated and sent to the owner/operator of the other system. If there are no understanding deficiencies and/or corrective measures, no auto correction is needed, and operations are complete at the done state.

If an autocorrect can be done, operation proceeds to state 384 where the analysis system updates a determined ability to understand the other system. Corrections are then implemented, and operation proceeds back to state 381. Note that corrections may be automatically performed for some deficiencies but not others, depending upon the nature of the deficiency.

From state 381, if the tested understanding of the system is adequate, operation proceeds to state 385 where a report is generated regarding an adequate understanding of the system and the report is sent. From state 385 if operation is complete, operations proceed to the done state. Alternately, from state 385 operation may proceed to state 386 where testing of the assets, system functions and/or security functions of the other system is performed. If testing of the assets, system functions, and/or security functions of the system results in an adequate test result, operation proceeds to state 390 where a report is generated indicating adequate implementation and/or operation of the system and the report is sent.

Alternately, at state 386 if the testing of the system results in an inadequate result, operations proceed to state 387 where deficiencies in the assets, system functions, and/or security functions of the system are tested. At state 387 differences are compared to identify deficiencies in the assets, system functions, and/or security functions. The analysis then proceeds from state 387 to state 388 where a report is generated regarding corrective measures to be taken in response to the assets, system functions, and/or security functions deficiencies. The report is then sent to the owner/operator. If there are no deficiencies and/or corrective measures, no auto correction is needed, and operations are complete at the done state. If autocorrect is required, operation proceeds to state 389 where the analysis system updates assets, system functions, and/or security functions of the system. Corrections are then implemented and the analysis proceeds to state 386. Note that corrections may be automatically performed for some deficiencies but not others, depending upon the nature of the deficiency.

Figure 60:
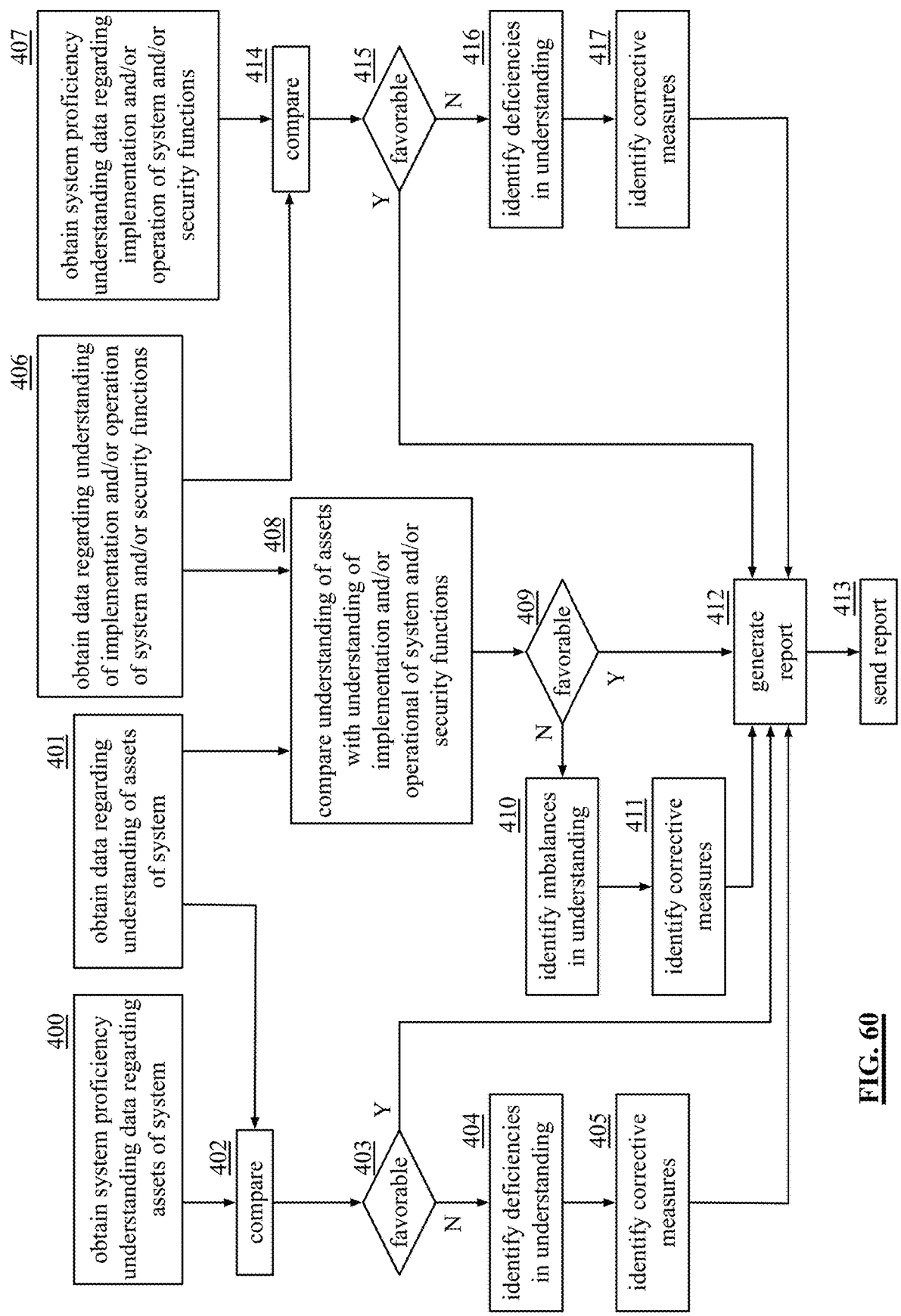
FIG. 60 is a logic diagram of an example of an analysis system analyzing a section of a system in accordance with the present disclosure.

FIG. 60 is a logic diagram of an example of an analysis system analyzing a system, or portion thereof. The method includes the analysis system obtaining system proficiency understanding data regarding the assets of the system (step 400) and obtaining data regarding the owner/operator's understanding of the assets (step 401). System proficiencies of step 400 include industry best practices and regulatory requirements, for example. The data obtained from the system at step 401 is based upon data received regarding the system or received by probing the system.

The data collected at steps 400 and 401 is then compared (step 402) and a determination is made regarding the comparison. If the comparison is favorable, as determined at step 403, meaning that the system proficiency understanding compares favorably to the data regarding understanding, operation is complete, a report is generated (step 412), and the report is sent (step 413). If the comparison is not favorable, as determined at step 403, operation continues with identifying deficiencies in the understanding of the system (step 404), identifying corrective measures (step 405), generating a corresponding report (step 412) and sending the report (step 413).

The method also includes the analysis system obtaining system proficiency understanding data of the system functions and/or security implementation and/or operation of the system (step 406) and obtaining data regarding the owner/operator's understanding of the system functions and/or security functions implementation and/or operation of the system (step 407). System proficiencies of step 406 include industry best practices and regulatory requirements, for example. The data obtained from the system at step 407 is based upon data received regarding the system or received by probing the system.

The data collected at steps 406 and 407 is then compared (step 414) and a determination is made regarding the comparison. If the comparison is favorable, as determined at step 415, meaning that the system proficiency understanding compares favorably to the data regarding understanding, operation is complete, a report is generated (step 412), and the report is sent (step 413). If the comparison is not favorable, as determined at step 415, operation continues with identifying deficiencies in the understanding of the system (step 416), identifying corrective measures (step 417), generating a corresponding report (step 412) and sending the report (step 413).

The method further includes the analysis system comparing the understanding of the physical structure (obtained at step 401) with the understanding of the system functions and/or security functions implementation and/or operation (obtained at step 406) at step 408. Step 408 essentially determines whether the understanding of the assets corresponds with the understanding of the system functions and/or security functions of the implementation and/or operation of the system. If the comparison is favorable, as determined at step 409, a report is generated (step 412), and the report is sent (step 413). If the comparison is not favorable, as determined at step 409, the method continues with identifying imbalances in the understanding (step 410), identifying corrective measures (step 410), generating a corresponding report (step 412), and sending the report (step 413).

Figure 61:
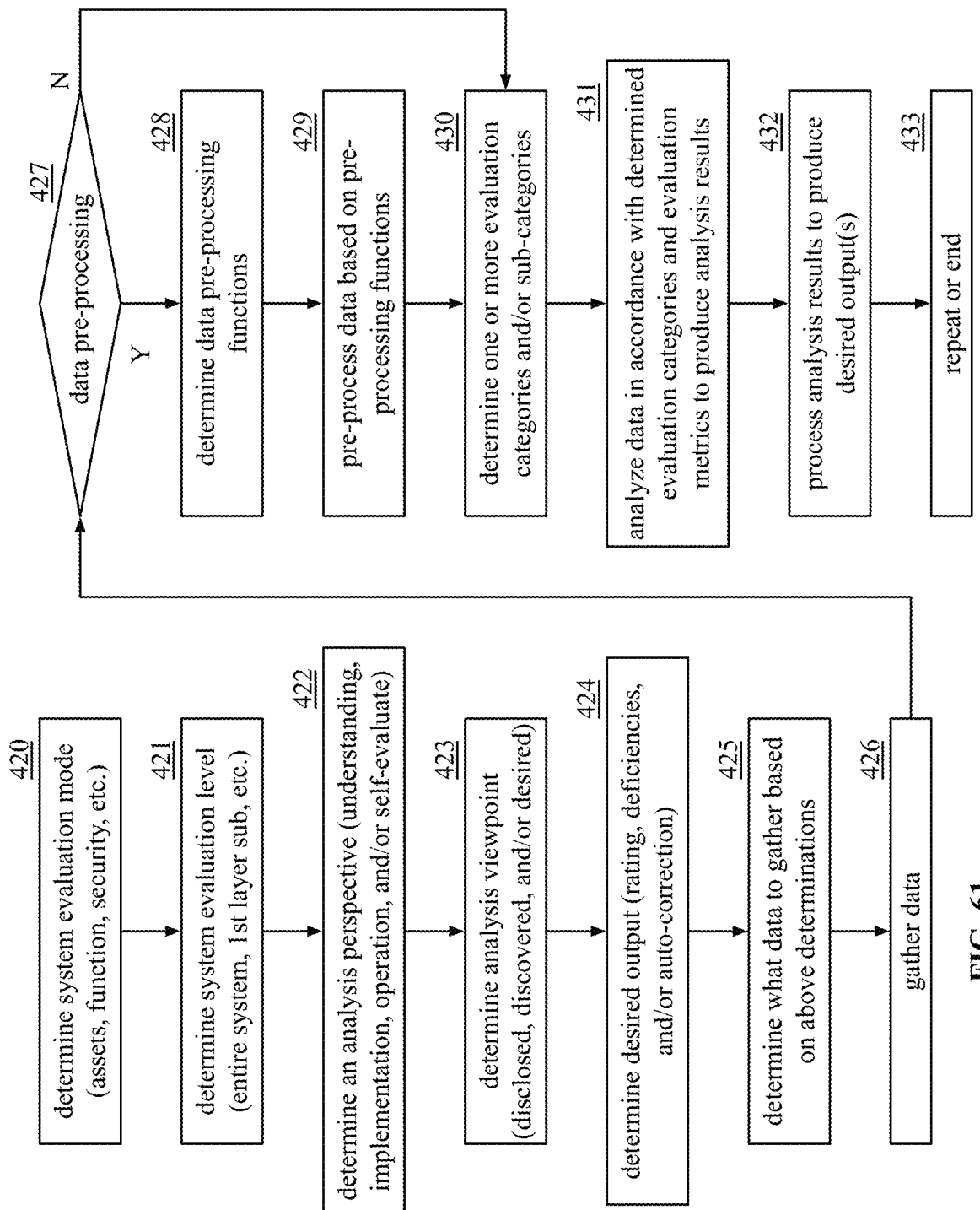
FIG. 61 is a logic diagram of another example of an analysis system analyzing a section of a system in accordance with the present disclosure.

FIG. 61 is a logic diagram of another example of an analysis system analyzing a system, or portion thereof. The method begins at step 420 where the analysis system determines a system evaluation mode (e.g., assets, system functions, and/or security functions) for analysis. The method continues at step 421 where the analysis system determines a system evaluation level (e.g., the system or a portion thereof). For instance, the analysis system identifies one or more system elements for evaluation.

The method continues at step 422 where the analysis system determines an analysis perspective (e.g., understanding, implementation, operation, and/or self-evaluate). The method continues at step 423 where the analysis system determines an analysis viewpoint (e.g., disclosed, discovered, and/or desired). The method continues at step 424 where the analysis system determines a desired output (e.g., evaluation rating, deficiencies, and/or auto-corrections).

The method continues at step 425 where the analysis system determines what data to gather based on the preceding determinations. The method continues at step 426 where the analysis system gathers data in accordance with the determination made in step 425. The method continues at step 427 where the analysis system determines whether the gathered data is to be pre-processed.

If yes, the method continues at step 428 where the analysis system determines data pre-processing functions (e.g., normalize, parse, tag, and/or de-duplicate). The method continues at step 429 where the analysis system pre-processes the data based on the pre-processing functions to produce pre-processed data. Whether the data is pre-processed or not, the method continues at step 430 where the analysis system determines one or more evaluation categories (e.g., identify, protect, detect, respond, and/or recover) and/or sub-categories for evaluation. Note that this may be done prior to step 425 and be part of determining the data to gather.

The method continues at step 431 where the analysis system analyzes the data in accordance with the determine evaluation categories and in accordance with a selected evaluation metric (e.g., process, policy, procedure, automation, certification, and/or documentation) to produce analysis results. The method continues at step 432 where the analysis system processes the analysis results to produce the desired output (e.g., evaluation rating, deficiencies, and/or auto-correct). The method continues at step 432 where the analysis system determines whether to end the method or repeat it for another analysis of the system.

Figure 62:
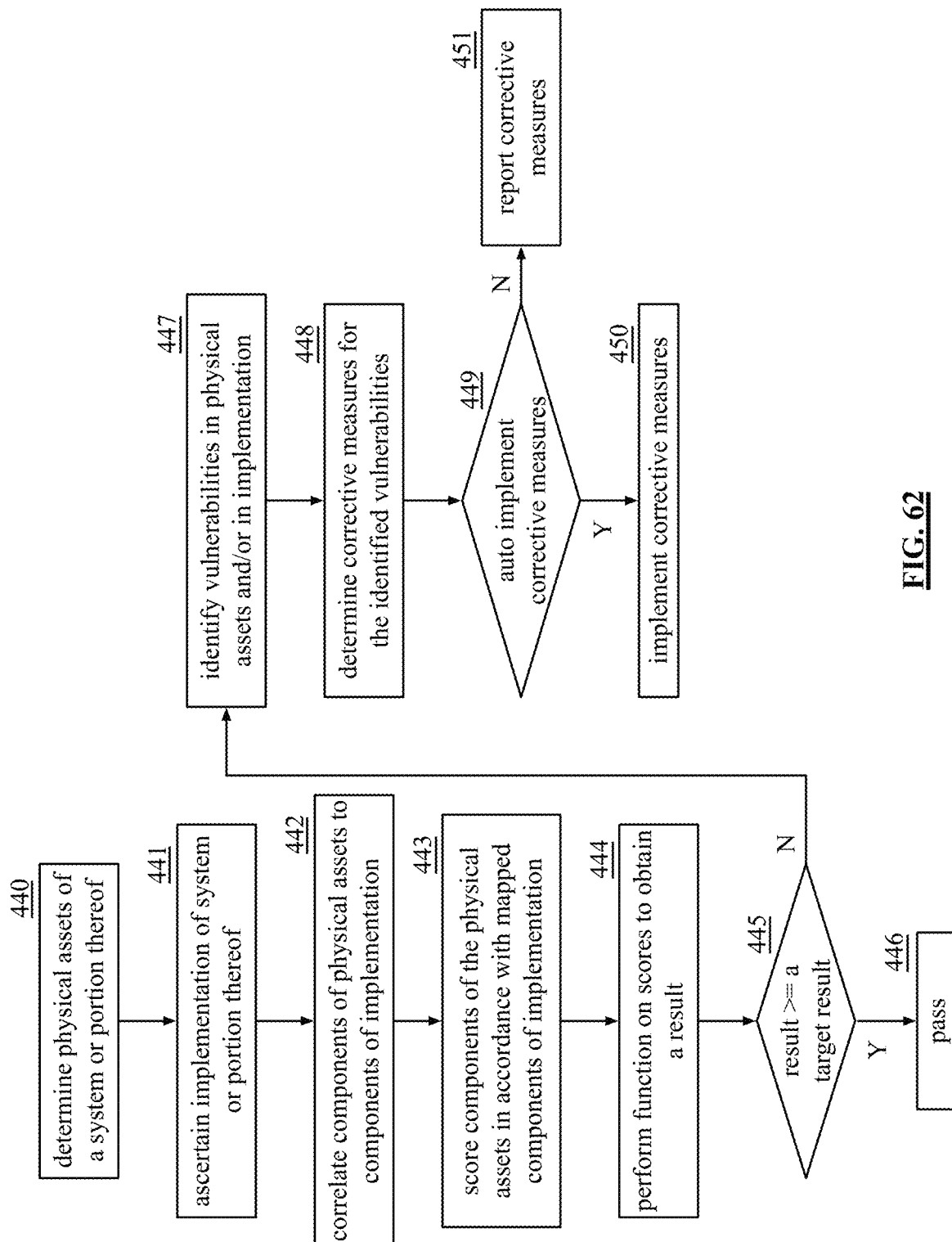
FIG. 62 is a logic diagram of another example of an analysis system analyzing a section of a system in accordance with the present disclosure.

FIG. 62 is a logic diagram of another example of an analysis system analyzing a system or portion thereof. The method begins at step 440 where the analysis system determines physical assets of the system, or portion thereof, to analyze (e.g., assets in the resulting system). Recall that a physical asset is a computing entity, a computing device, a user software application, a system software application (e.g., operating system, etc.), a software tool, a network software application, a security software application, a system monitoring software application, and the like.

The method continues at step 441 where the analysis system ascertains implementation of the system, or portion thereof (e.g., assets designed to be, and/or built, in the system). The method continues at step 442 where the analysis system correlates components of the assets to components of the implementation (e.g., do the assets of the actual system correlate with assets design/built to be in the system).

The method continues at step 443 where the analysis system scores the components of the physical assets in accordance with the mapped components of the implementation. For example, the analysis system scores how well the assets of the actual system correlate with assets design/built to be in the system. The scoring may be based on one or more evaluation metrics (e.g. process, policy, procedure, automation, certification, and/or documentation). The method continues at step 444 where the analysis system performs a function on the scores to obtain a result (e.g., an evaluation rating, identified deficiencies, and/or auto-correction of deficiencies).

The method continues at step 445 where the analysis system determines whether the result is equal or greater than a target result (e.g., the evaluation rating is a certain value). If yes, the method continues at step 446 where the analysis system indicates that the system, or portion thereof, passes this particular test. If the results are less than the target result, the method continues at step 447 where the analysis system identifies vulnerabilities in the physical assets and/or in the implementation. For example, the analysis system determines that a security software application is missing from several computing devices in the system, or portion thereof, being analyzed.

The method continues at step 448 where the analysis system determines, if possible, corrective measures of the identified vulnerabilities. The method continues at step 449 where the analysis system determines whether the corrective measures can be done automatically. If not, the method continues at step 451 where the analysis system reports the corrective measures. If yes, the method continues at step 450 where the analysis system auto-corrects the vulnerabilities.

Figure 63:
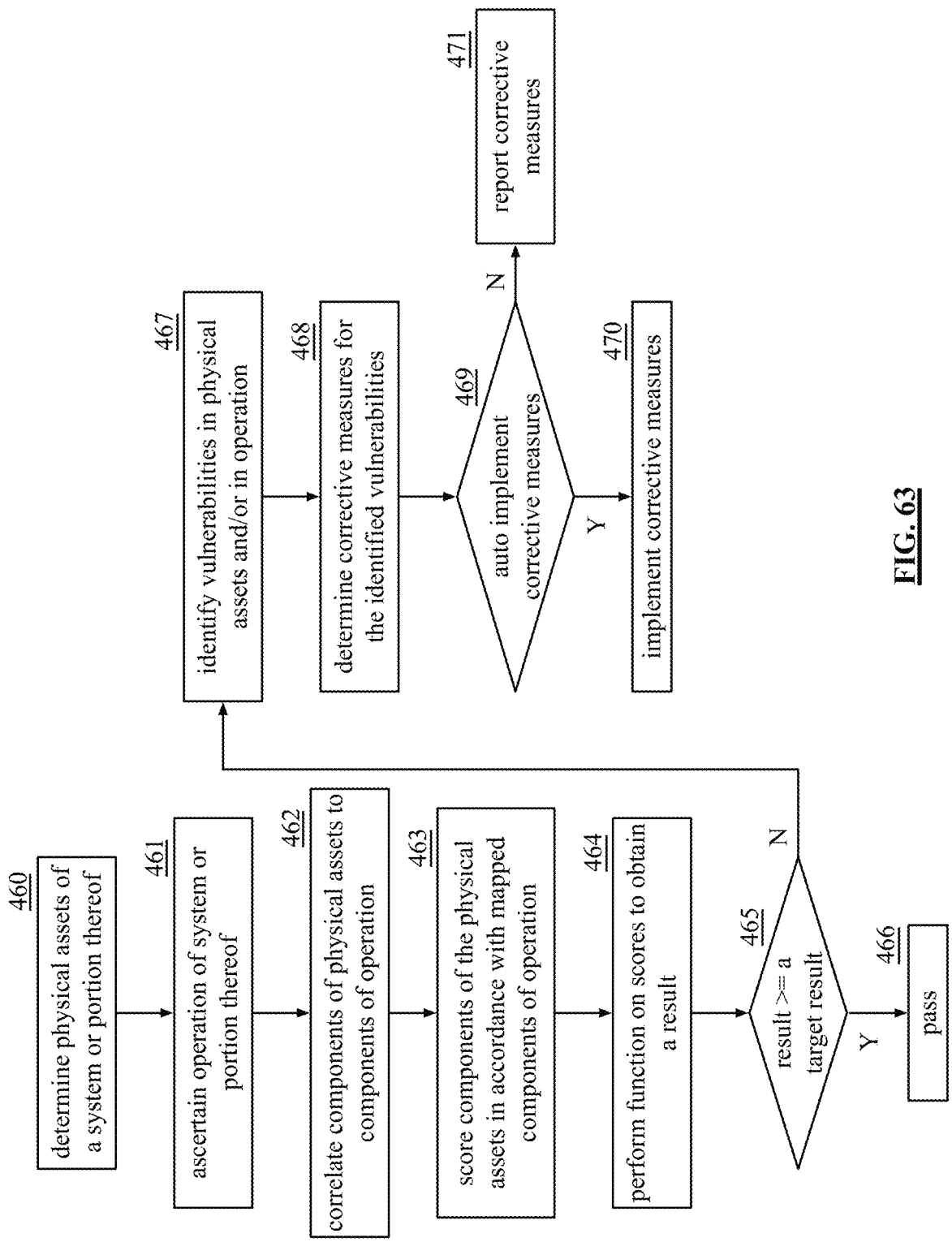
FIG. 63 is a logic diagram of another example of an analysis system analyzing a section of a system in accordance with the present disclosure.

FIG. 63 is a logic diagram of another example of an analysis system analyzing a system or portion thereof. The method begins at step 460 where the analysis system determines physical assets of the system, or portion thereof, to analyze (e.g., assets and their intended operation). The method continues at step 461 where the analysis system ascertains operation of the system, or portion thereof (e.g., the operations actually performed by the assets). The method continues at step 462 where the analysis system correlates components of the assets to components of operation (e.g., do the identified operations of the assets correlate with the operations actually performed by the assets).

The method continues at step 463 where the analysis system scores the components of the physical assets in accordance with the mapped components of the operation. For example, the analysis system scores how well the identified operations of the assets correlate with operations actually performed by the assets. The scoring may be based on one or more evaluation metrics (e.g. process, policy, procedure, automation, certification, and/or documentation). The method continues at step 464 where the analysis system performs a function on the scores to obtain a result (e.g., an evaluation rating, identified deficiencies, and/or auto-correction of deficiencies).

The method continues at step 465 where the analysis system determines whether the result is equal or greater than a target result (e.g., the evaluation rating is a certain value). If yes, the method continues at step 466 where the analysis system indicates that the system, or portion thereof, passes this particular test. If the results are less than the target result, the method continues at step 467 where the analysis system identifies vulnerabilities in the physical assets and/or in the operation.

The method continues at step 468 where the analysis system determines, if possible, corrective measures of the identified vulnerabilities. The method continues at step 469 where the analysis system determines whether the corrective measures can be done automatically. If not, the method continues at step 471 where the analysis system reports the corrective measures. If yes, the method continues at step 470 where the analysis system auto-corrects the vulnerabilities.

Figure 64:
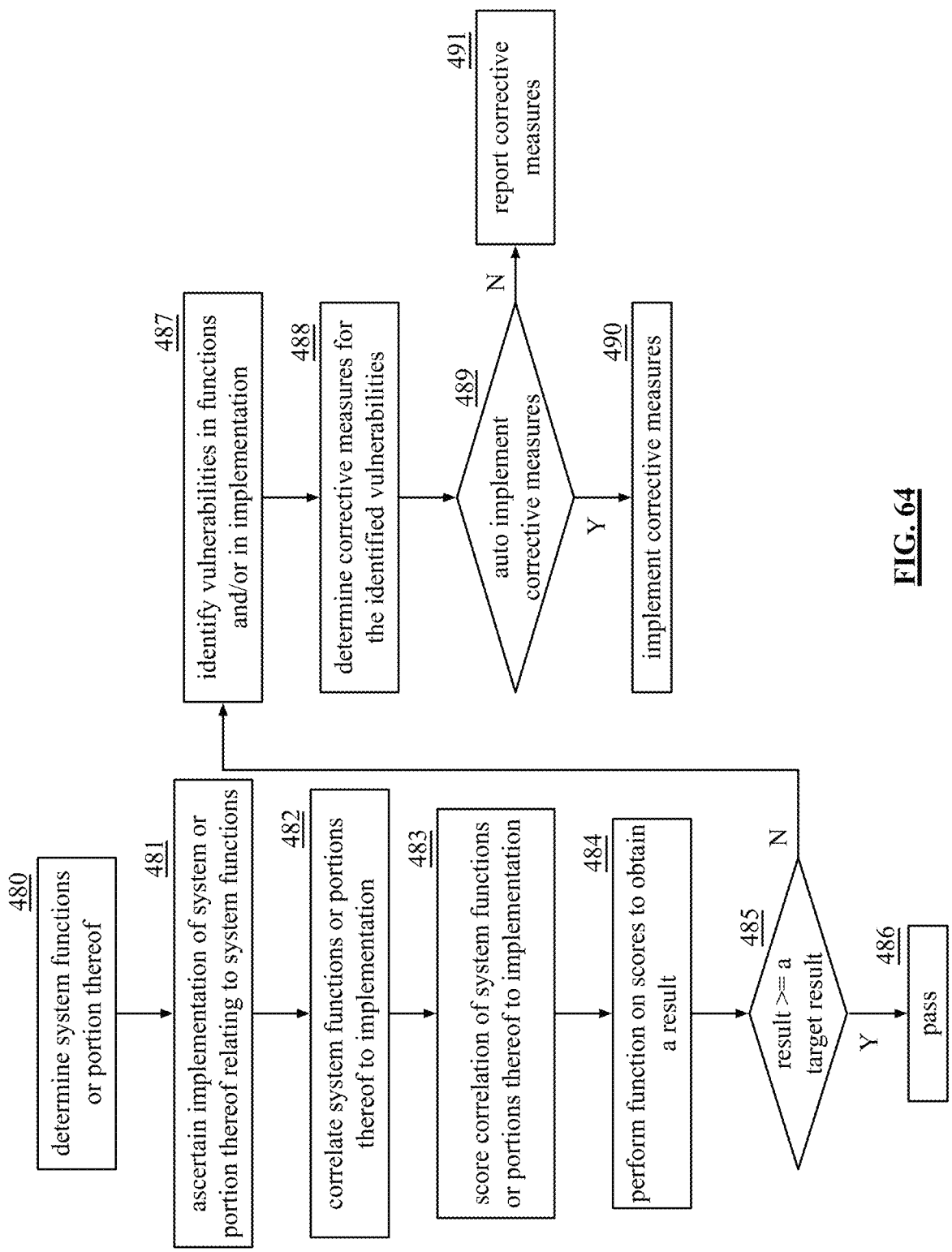
FIG. 64 is a logic diagram of another example of an analysis system analyzing a section of a system in accordance with the present disclosure.

FIG. 64 is a logic diagram of another example of an analysis system analyzing a system or portion thereof. The method begins at step 480 where the analysis system determines system functions of the system, or portion thereof, to analyze. The method continues at step 481 where the analysis system ascertains implementation of the system, or portion thereof (e.g., system functions designed to be, and/or built, in the system). The method continues at step 482 where the analysis system correlates components of the system functions to components of the implementation (e.g., do the system functions of the actual system correlate with system functions design/built to be in the system).

The method continues at step 483 where the analysis system scores the components of the system functions in accordance with the mapped components of the implementation. For example, the analysis system scores how well the system functions of the actual system correlate with system functions design/built to be in the system. The scoring may be based on one or more evaluation metrics (e.g. process, policy, procedure, automation, certification, and/or documentation). The method continues at step 484 where the analysis system performs a function on the scores to obtain a result (e.g., an evaluation rating, identified deficiencies, and/or auto-correction of deficiencies).

The method continues at step 485 where the analysis system determines whether the result is equal or greater than a target result (e.g., the evaluation rating is a certain value). If yes, the method continues at step 486 where the analysis system indicates that the system, or portion thereof, passes this particular test. If the results are less than the target result, the method continues at step 487 where the analysis system identifies vulnerabilities in the physical assets and/or in the implementation.

The method continues at step 488 where the analysis system determines, if possible, corrective measures of the identified vulnerabilities. The method continues at step 489 where the analysis system determines whether the corrective measures can be done automatically. If not, the method continues at step 491 where the analysis system reports the corrective measures. If yes, the method continues at step 490 where the analysis system auto-corrects the vulnerabilities.

Figure 65:
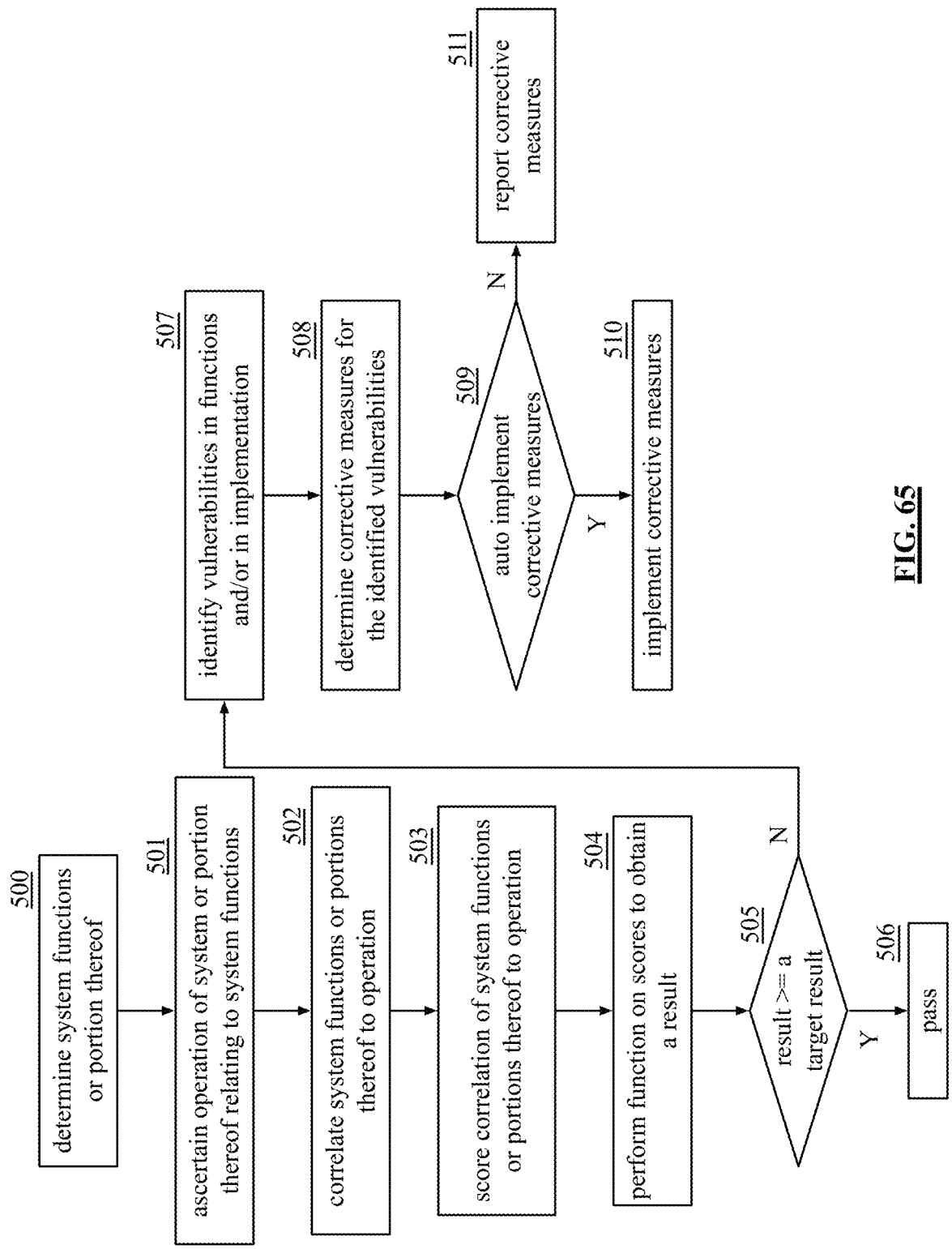
FIG. 65 is a logic diagram of another example of an analysis system analyzing a section of a system in accordance with the present disclosure.

FIG. 65 is a logic diagram of another example of an analysis system analyzing a system or portion thereof. The method begins at step 500 where the analysis system determines system functions of the system, or portion thereof, to analyze. The method continues at step 501 where the analysis system ascertains operation of the system, or portion thereof (e.g., the operations associated with the system functions). The method continues at step 502 where the analysis system correlates components of the system functions to components of operation (e.g., do the identified operations of the system functions correlate with the operations actually performed to provide the system functions).

The method continues at step 503 where the analysis system scores the components of the system functions in accordance with the mapped components of the operation. For example, the analysis system scores how well the identified operations to support the system functions correlate with operations actually performed to support the system functions. The scoring may be based on one or more evaluation metrics (e.g. process, policy, procedure, automation, certification, and/or documentation). The method continues at step 504 where the analysis system performs a function on the scores to obtain a result (e.g., an evaluation rating, identified deficiencies, and/or auto-correction of deficiencies).

The method continues at step 505 where the analysis system determines whether the result is equal or greater than a target result (e.g., the evaluation rating is a certain value). If yes, the method continues at step 506 where the analysis system indicates that the system, or portion thereof, passes this particular test. If the results are less than the target result, the method continues at step 507 where the analysis system identifies vulnerabilities in the physical assets and/or in the operation.

The method continues at step 508 where the analysis system determines, if possible, corrective measures of the identified vulnerabilities. The method continues at step 509 where the analysis system determines whether the corrective measures can be done automatically. If not, the method continues at step 511 where the analysis system reports the corrective measures. If yes, the method continues at step 510 where the analysis system auto-corrects the vulnerabilities.

Figure 66:
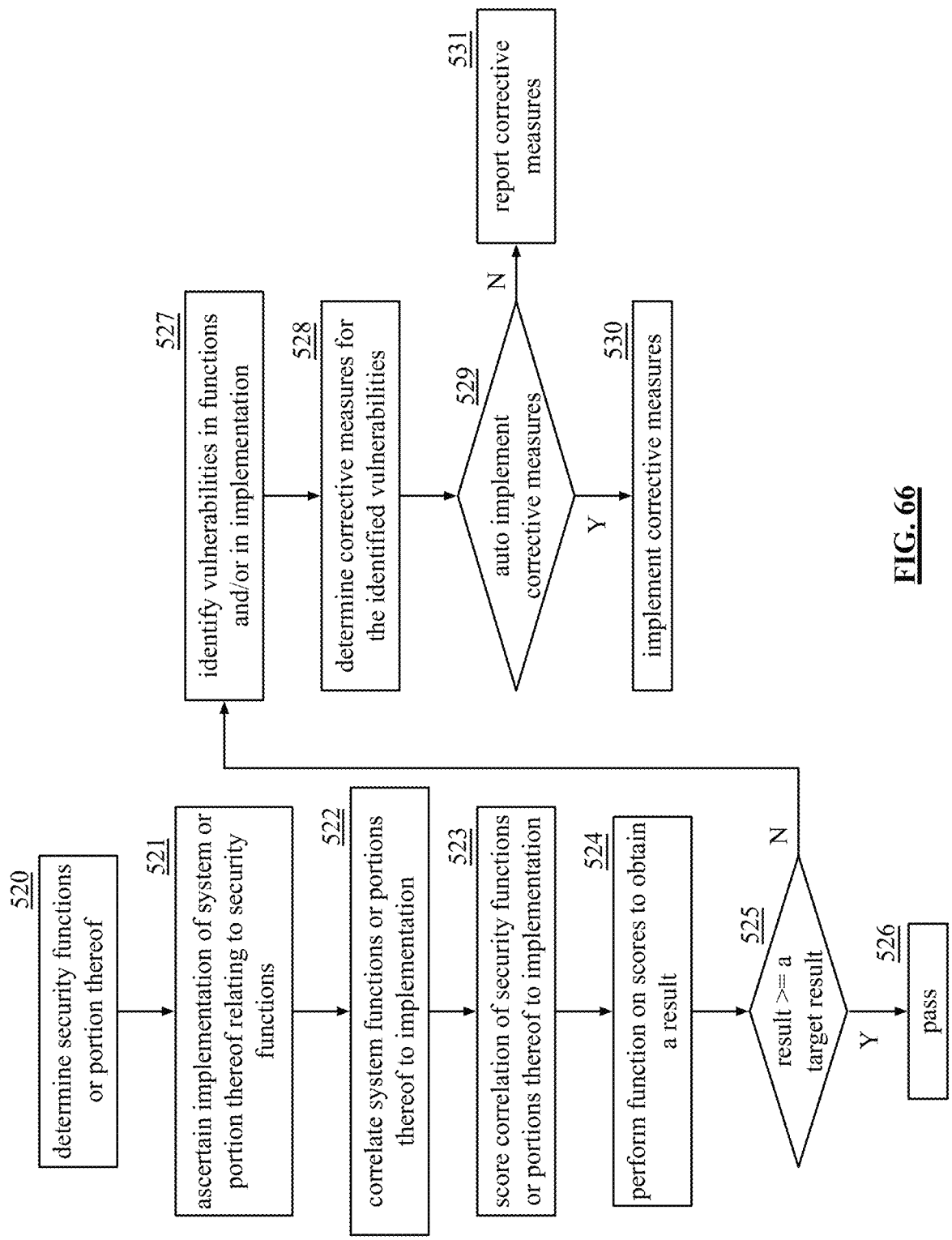
FIG. 66 is a logic diagram of another example of an analysis system analyzing a section of a system in accordance with the present disclosure.

FIG. 66 is a logic diagram of another example of an analysis system analyzing a system or portion thereof. The method begins at step 520 where the analysis system determines security functions of the system, or portion thereof, to analyze. The method continues at step 521 where the analysis system ascertains implementation of the system, or portion thereof (e.g., security functions designed to be, and/or built, in the system). The method continues at step 522 where the analysis system correlates components of the security functions to components of the implementation (e.g., do the security functions of the actual system correlate with security functions design/built to be in the system).

The method continues at step 523 where the analysis system scores the components of the security functions in accordance with the mapped components of the implementation. For example, the analysis system scores how well the security functions of the actual system correlate with security functions design/built to be in the system. The scoring may be based on one or more evaluation metrics (e.g. process, policy, procedure, automation, certification, and/or documentation). The method continues at step 524 where the analysis system performs a function on the scores to obtain a result (e.g., an evaluation rating, identified deficiencies, and/or auto-correction of deficiencies).

The method continues at step 525 where the analysis system determines whether the result is equal or greater than a target result (e.g., the evaluation rating is a certain value). If yes, the method continues at step 526 where the analysis system indicates that the system, or portion thereof, passes this particular test. If the results are less than the target result, the method continues at step 527 where the analysis system identifies vulnerabilities in the physical assets and/or in the implementation.

The method continues at step 528 where the analysis system determines, if possible, corrective measures of the identified vulnerabilities. The method continues at step 529 where the analysis system determines whether the corrective measures can be done automatically. If not, the method continues at step 531 where the analysis system reports the corrective measures. If yes, the method continues at step 530 where the analysis system auto-corrects the vulnerabilities.

Figure 67:
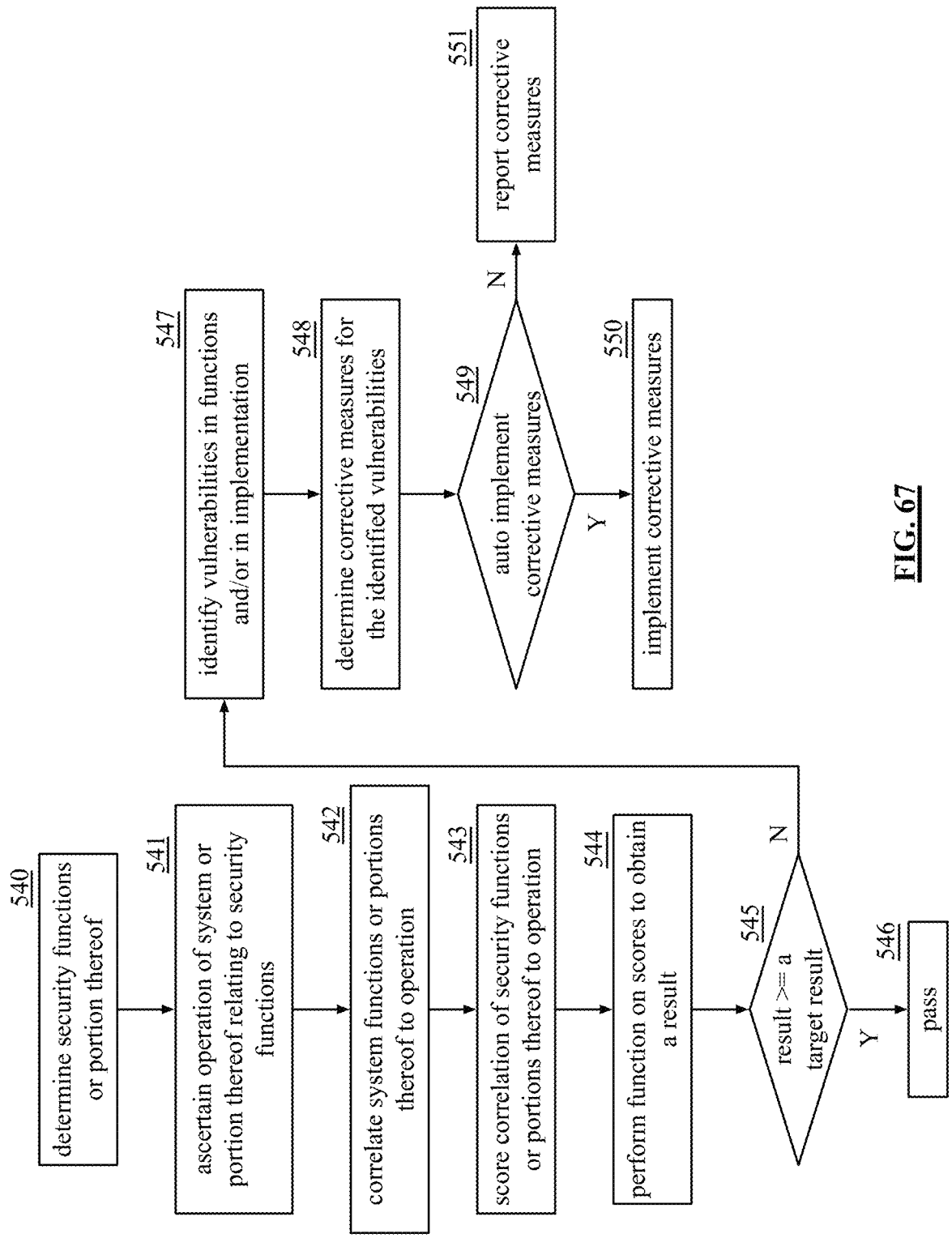
FIG. 67 is a logic diagram of another example of an analysis system analyzing a section of a system in accordance with the present disclosure.

FIG. 67 is a logic diagram of another example of an analysis system analyzing a system or portion thereof. The method begins at step 540 where the analysis system determines security functions of the system, or portion thereof, to analyze. The method continues at step 541 where the analysis system ascertains operation of the system, or portion thereof (e.g., the operations associated with the security functions). The method continues at step 542 where the analysis system correlates components of the security functions to components of operation (e.g., do the identified operations of the security functions correlate with the operations actually performed to provide the security functions).

The method continues at step 543 where the analysis system scores the components of the security functions in accordance with the mapped components of the operation. For example, the analysis system scores how well the identified operations to support the security functions correlate with operations actually performed to support the security functions. The scoring may be based on one or more evaluation metrics (e.g. process, policy, procedure, automation, certification, and/or documentation). The method continues at step 544 where the analysis system performs a function on the scores to obtain a result (e.g., an evaluation rating, identified deficiencies, and/or auto-correction of deficiencies).

The method continues at step 545 where the analysis system determines whether the result is equal or greater than a target result (e.g., the evaluation rating is a certain value). If yes, the method continues at step 546 where the analysis system indicates that the system, or portion thereof, passes this particular test. If the results are less than the target result, the method continues at step 547 where the analysis system identifies vulnerabilities in the physical assets and/or in the operation.

The method continues at step 548 where the analysis system determines, if possible, corrective measures of the identified vulnerabilities. The method continues at step 549 where the analysis system determines whether the corrective measures can be done automatically. If not, the method continues at step 551 where the analysis system reports the corrective measures. If yes, the method continues at step 550 where the analysis system auto-corrects the vulnerabilities.

FIG. 68 is a logic diagram of an example of an analysis system determining an issue recovery rating for a system, or portion thereof. Issue recovery rating is also referred to herein as recovery rating and/or recovery rating. An issue includes an event, incident, alert, anomalous activity and/or behavior, and any other system occurrence of interest. The method begins at step 560 where the analysis system determines a system aspect (see FIG. 69) of a system for an issue recovery evaluation. An issue recovery evaluation includes evaluating the system aspect's issue recovery planning, the system aspect's issue recovery improvements, and/or system aspect's issue recovery communications.

The method continues at step 561 where the analysis system determines at least one evaluation perspective for use in performing the issue recovery evaluation on the system aspect. An evaluation perspective is an understanding perspective, an implementation perspective, an operation (e.g., an operational performance) perspective, or a self-analysis perspective. An understanding perspective is with regard to how well the assets, system functions, and/or security functions are understood. An implementation perspective is with regard to how well the assets, system functions, and/or security functions are implemented. An operation perspective (also referred to herein as a performance perspective) is with regard to how well the assets, system functions, and/or security functions operate. A self-analysis (or self-evaluation) perspective is with regard to how well the system self-evaluates the understanding, implementation, and/or operation of assets, system functions, and/or security functions.

The method continues at step 562 where the analysis system determines at least one evaluation viewpoint for use in performing the issue recovery evaluation on the system aspect. An evaluation viewpoint is a disclosed viewpoint, a discovered viewpoint, or a desired viewpoint. A disclosed viewpoint is with regard to analyzing the system aspect based on the disclosed data. A discovered viewpoint is with regard to analyzing the system aspect based on the discovered data. A desired viewpoint is with regard to analyzing the system aspect based on the desired data.

The method continues at step 563 where the analysis system obtains issue recovery data regarding the system aspect in accordance with the at least one evaluation perspective and the at least one evaluation viewpoint. Issue recovery data is data obtained about the system aspect. The obtaining of issue recovery data will be discussed in greater detail with reference to FIGS. 72-78.

The method continues at step 564 where the analysis system calculates an issue recovery rating as a measure of system issue recovery maturity for the system aspect based on the issue recovery data, the at least one evaluation perspective, the at least one evaluation viewpoint, and at least one evaluation rating metric. An evaluation rating metric is a process rating metric, a policy rating metric, a procedure rating metric, a certification rating, a documentation rating metric, or an automation rating metric. The calculating of an issue recovery rating will be discussed in greater detail with reference to FIGS. 79-107. As used herein, maturity refers to level of development, level of operation reliability, level of operation predictability, level of operation repeatability, level of understanding, level of implementation, level of advanced technologies, level of operation efficiency, level of proficiency, and/or state-of-the-art level.

FIG. 69 is a logic diagram of a further example of an analysis system determining an issue recovery rating for a system, or portion thereof; in particular, for determining a system aspect. The method begins at step 565 where the analysis system determines at least one system element of the system. A system element includes one or more system assets which is a physical asset and/or a conceptual asset. For example, a physical asset is a computing entity, a computing device, a user software application, a system software application (e.g., operating system, etc.), a software tool, a network software application, a security software application, a system monitoring software application, and the like. A system element and/or system asset includes an organization identifier, a division identifier, a department identifier, a group identifier, a sub-group identifier, a device identifier, a software identifier, and/or an internet protocol address identifier.

The method continues at step 566 where the analysis system determines at least one system criteria of the system. A system criteria is system guidelines, system requirements, system design, system build, or resulting system. Evaluation based on system criteria assists with determining where a deficiency originated and/or how it might be corrected. For example, if the system requirements were lacking a requirement for responding to a particular type of threat, the lack of system requirements could be identified and corrected.

The method continues at step 567 where the analysis system determines at least one system mode of the system. A system mode is assets, system functions, or system security functions. The method continues at step 568 where the analysis system determines the system aspect based on the at least one system element, the at least one system criteria, and the at least one system mode. As an example, a system aspect is determined to be for assets with respect to system requirements of system elements in a particular division. As another example, a system aspect is determined to be for system functions with respect to system design and/or system build of system elements in a particular division. As yet another example, a system aspect is determined to be for assets, system functions, and security functions with respect to guidelines, system requirements, system design, system build, and resulting system of system elements in the organization (e.g., the entire system/enterprise).

Figure 70:
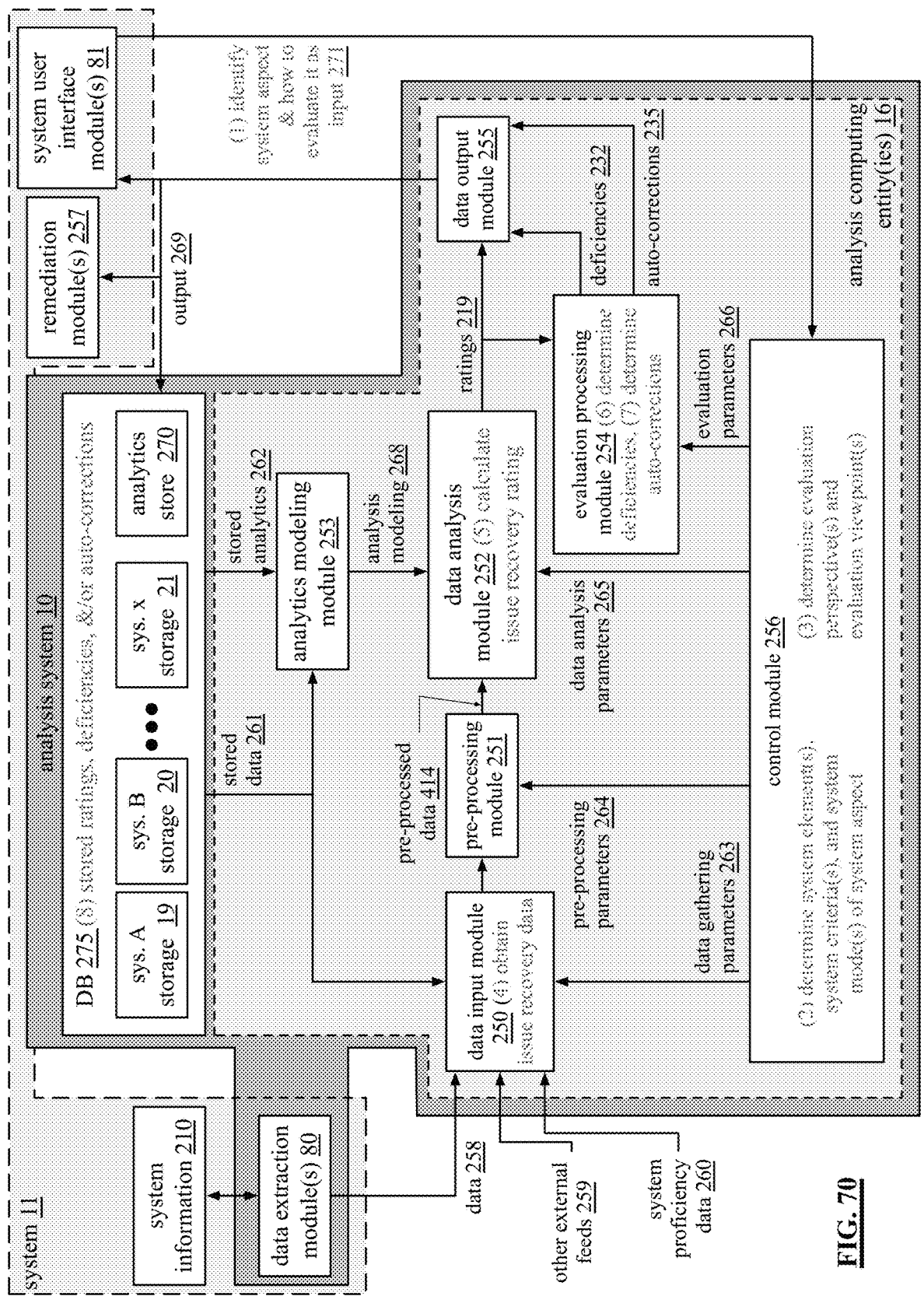
FIG. 70 is a schematic block diagram of an example of an analysis system determining an issue recovery rating for a section of a system in accordance with the present disclosure.

FIG. 70 is a schematic block diagram of an example of an analysis system 10 determining an issue recovery rating for a system, or portion thereof. In this example, the control module 256 receives an input 271 from the system user interface module 81 loaded on a system 11. The input 271 identifies the system aspect to be analyzed and how it is to be analyzed.

The control module 256 determines one or more system elements, one or more system criteria, and one or more system modes based on the system aspect. The control module 256 also determines one or more evaluation perspectives, one or more evaluation viewpoints, and/or one or more evaluation rating metrics from the input. As an example, the input 271 could specify the evaluation perspective(s), the evaluation viewpoint(s), the evaluation rating metric(s), and/or analysis output(s). As another example, the input 271 indicates a desired analysis output (e.g., an evaluation rating, deficiencies identified, and/or deficiencies auto-corrected). From this input, the control module 256 determines the evaluation perspective(s), the evaluation viewpoint(s), the evaluation rating metric(s) to fulfill the desired analysis output.

In addition, the control module 256 generates data gathering parameters 263, pre-processing parameters 264, data analysis parameters 265, and/or evaluation parameters 266 as discussed with reference to FIG. 35. The data input module 250 obtains issue recovery data in accordance with the data gathering parameters 263 from the data extraction module(s) 80 loaded on the system 11, other external feeds 258, and/or system proficiency data 260.

The pre-processing module 251 processes the issue recovery data in accordance with the pre-processing parameters 264 to produce pre-processed data 414. The issue recovery data and/or the pre-processed data 414 may be stored in the database 275. The data analysis module 252 calculates an issue recovery rating 219 based on the pre-processed data 414 in accordance with the data analysis parameters 265 and the analysis modeling 268.

If the requested analysis output was for an evaluation rating only, the data output module 255 outputs the issue recovery rating 219 as the output 269. The system user interface module 80 renders a graphical representation of the issue recovery rating and the database 275 stores it.

If the required analysis output included issue recovery deficiencies, then the evaluation processing module 254 evaluates the issue recovery rating 219 and may further evaluate the pre-processed data to identify one or more deficiencies 232. In addition, the evaluation processing module 254 determines whether a deficiency can be auto-corrected and, if so, determines the auto-correction 235. In this instance, the data output module 255 outputs the issue recovery rating 219, the deficiencies 232, and the auto-corrections 235 as output 269 to the database 275, the system user interface module 81, and the remediation module 257.

The system user interface module 80 renders a graphical representation of the issue recovery rating, the deficiencies, and/or the auto-corrections. The database 275 stores the issue recovery rating, the deficiencies, and/or the auto-corrections. The remediation module 257 processes the auto-corrections 235 within the system 11, verifies the auto-corrections, and then records the execution of the auto-correction and its verification.

Figure 71:
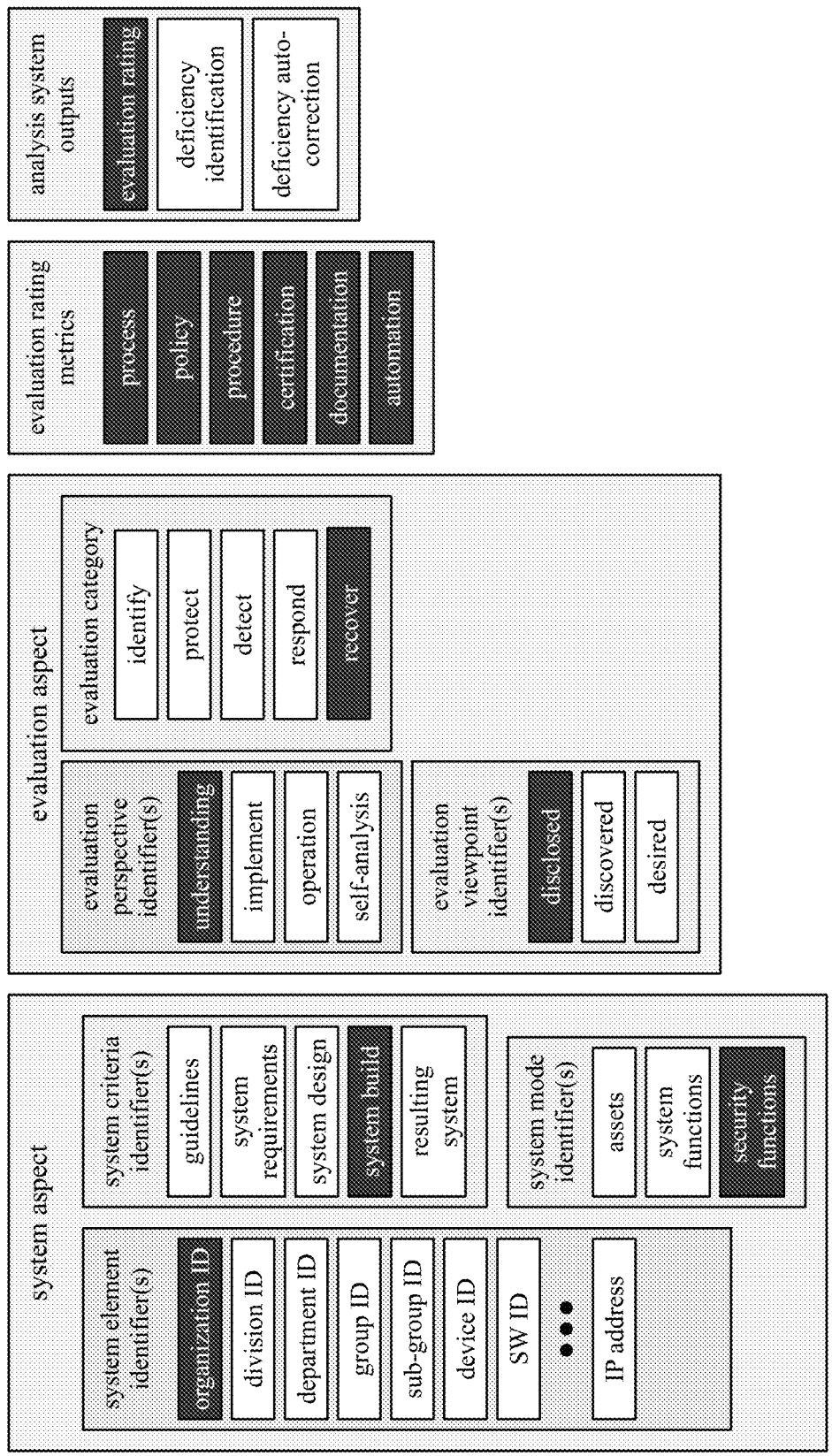
FIG. 71 is a diagram of an example of system aspects, evaluation aspects, evaluation rating metrics, and analysis system output options of an analysis system for generating an issue recovery rating for a section of a system in accordance with the present disclosure.

FIG. 71 is a diagram of an example of system aspects, evaluation aspects, evaluation rating metrics, and analysis system output options of an analysis system 11 for analyzing a system 11, or portion thereof. For instance, analysis system 11 is evaluating, with respect to process, policy, procedure, certification, documentation, and/or automation, the understanding of the system build for issue recovery (e.g., the "recover" evaluation category) security functions of the organization (e.g., the entire enterprise/system) based on disclosed data to produce an evaluation rating.

For this specific example, the analysis system 10 obtains disclosed data from the system regarding the system build associated with the issue recovery security functions of the organization. From the disclosed data, the analysis system renders a first evaluation rating for the understanding of the system build for issue recovery security functions with respect to an evaluation rating metric of process. The analysis system renders a second evaluation rating for the understanding of the system build for issue recovery security functions with respect to an evaluation rating metric of policy. The analysis system renders a third evaluation rating for the understanding of the system build for issue recovery security functions with respect to an evaluation rating metric of procedure. The analysis system renders a fourth evaluation rating for the understanding of the system build for issue recovery security functions with respect to an evaluation rating metric of certification. The analysis system renders a fifth evaluation rating for the understanding of the system build for issue recovery security functions with respect to an evaluation rating metric of documentation. The analysis system renders a sixth evaluation rating for the understanding of the system build for issue recovery security functions with respect to an evaluation rating metric of automation.

The analysis system 11 generates the issue recovery rating for the understanding of the system build for issue recovery security functions based on the six evaluation ratings. As example, each of the six evaluation rating metrics has a maximum potential rating (e.g., 50 for process, 20 for policy, 15 for procedure, 10 for certification, 20 for documentation, and 20 for automation), which has a maximum rating of 135. Continuing with this example, the first evaluation rating based on process is 35; the second evaluation rating based on policy is 10; the third evaluation rating based on procedure is 10; the fourth evaluation rating based on certification is 10; the fifth evaluation rating based on documentation is 15; and the sixth evaluation rating based on automation is 20, resulting in a cumulative score of 100 out of a possible 135. This rating indicates that there is room for improvement and provides a basis for identifying deficiencies.

Figure 72:
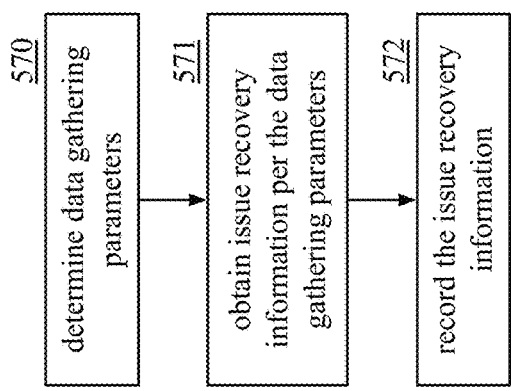
FIG. 72 is a logic diagram of a further example of an analysis system determining an issue recovery rating for a section of a system in accordance with the present disclosure.

FIG. 72 is a logic diagram of a further example of an analysis system determining an issue recovery rating for a system, or portion thereof; in particular, for obtaining issue recovery data, which is a collection of issue recovery information. The method begins at step 570 where the analysis system determines data gathering parameters regarding the system aspect in accordance with the at least one evaluation perspective, the at least one evaluation viewpoint, and the least one evaluation rating metric. The generation of data gathering parameters will be discussed in greater detail with reference to FIG. 74.

The method continues at step 571 where the analysis system identifies system elements of the system aspect based on the data gathering parameters and obtains issue recovery information from the system elements in accordance with the data gathering parameters. The obtaining of the issue recovery information is discussed in greater detail with reference to FIG. 73.

The method continues at step 572 where the analysis system records the issue recovery information from the system elements to produce the issue recovery data. As an example, the analysis system stores the issue recovery information in the database. As another example, the analysis system temporarily stores the issue recovery information in the data input module. As yet another example, the analysis system uses some form of retaining a record of the issue recovery information. Examples of issue recovery information are provided with reference to FIGS. 75-78.

Figure 73:
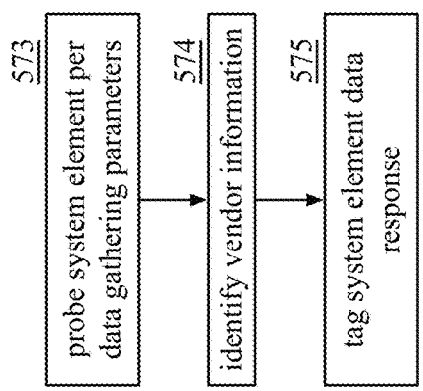
FIG. 73 is a logic diagram of a further example of an analysis system determining an issue recovery rating for a section of a system in accordance with the present disclosure.

FIG. 73 is a logic diagram of an analysis system determining an issue recovery rating for a system, or portion thereof; in particular, for obtaining the issue recovery information. The method begins at step 573 where the analysis system probes (e.g., push and/or pull information requests) a system element in accordance with the data gathering parameters to obtain a system element data response. The analysis system would do this for most, if not all of the system elements of the system aspect (e.g., the system, or portion of the system, being evaluated).

The method continues at step 574 where the analysis system identifies vendor information from the system element data response. For example, vendor information includes vendor name, a model name, a product name, a serial number, a purchase date, and/or other information to identify the system element. The method continues at step 575 where the analysis system tags the system element data response with the vendor information.

Figure 74:
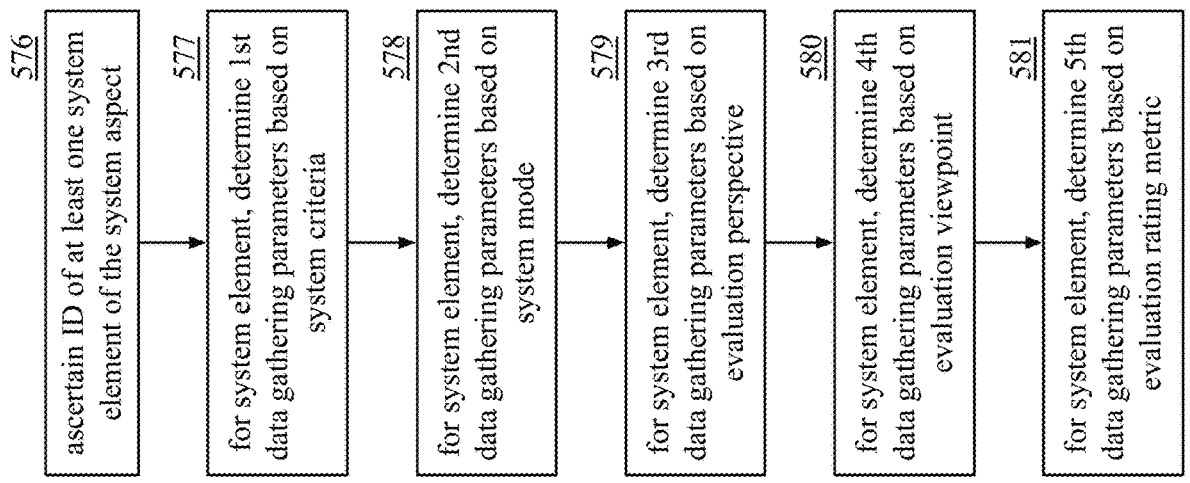
FIG. 74 is a logic diagram of a further example of an analysis system determining an issue recovery rating for a section of a system in accordance with the present disclosure.

FIG. 74 is a logic diagram of a further of an analysis system determining an issue recovery rating for a system, or portion thereof; in particular, for determining the data gathering parameters for the evaluation category of issue recovery (i.e., recover). The method begins at step 576 where the analysis system, for the system aspect, ascertains identity of one or more system elements of the system aspect. For a system element of the system aspect, the method continues at step 577 where the analysis system determines a first data gathering parameter based on at least one system criteria (e.g., guidelines, system requirements, system design, system build, and/or resulting system) of the system aspect. For example, if the determined selected criteria is system requirements, then the first data gathering parameter would be to search for system requirement information.

The method continues at step 578 where the analysis system determines a second data gathering parameter based on at least one system mode (e.g., assets, system functions, and/or security functions). For example, if the determined selected mode is system functions, then the second data gathering parameter would be to search for system function information.

The method continues at step 579 where the analysis system determines a third data gathering parameter based on the at least one evaluation perspective (e.g., understanding, implementation, operation, and/or self-evaluation). For example, if the determined selected evaluation perspective is operation, then the third data gathering parameter would be to search for information regarding operation of the system aspect.

The method continues at step 580 where the analysis system determines a fourth data gathering parameter based on the at least one evaluation viewpoint (e.g., disclosed data, discovered data, and/or desired data). For example, if the determined selected evaluation viewpoint is disclosed and discovered data, then the fourth data gathering parameter would be to obtain for disclosed data and to obtain discovered data.

The method continues at step 581 where the analysis system determines a fifth data gathering parameter based on the at least one evaluation rating metric (e.g., process, policy, procedure, certification, documentation, and/or automation). For example, if the determined selected evaluation rating metric is process, policy, procedure, certification, documentation, and automation, then the fifth data gathering parameter would be to search for data regarding process, policy, procedure, certification, documentation, and automation.

The analysis system generates the data gathering parameters from the first through fifth data gathering parameters. For example, the data gathering parameters include search for information regarding processes, policies, procedures, certifications, documentation, and/or automation (fifth parameter) pertaining to issue recovery (selected evaluation category) system requirements (first parameter) for system operation (third parameter) of system functions (second parameter) from disclosed and discovered data (fourth parameter).

Figure 75:
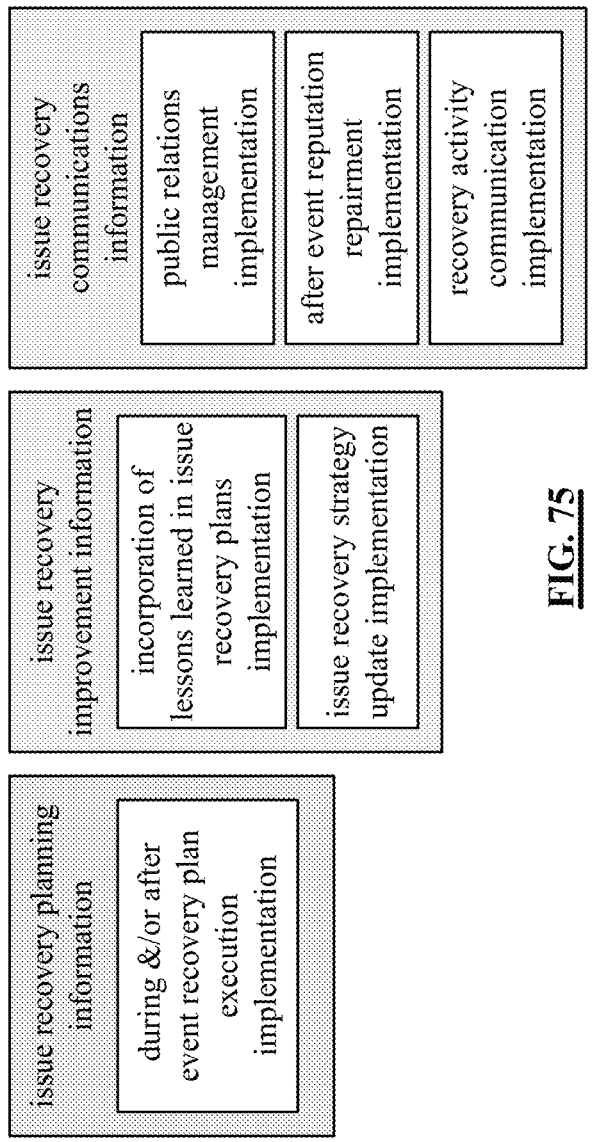
FIG. 75 is a diagram of an example of issue recovery data for use by an analysis system to generate an issue recovery rating for a section of a system in accordance with the present disclosure.

FIG. 75 is a diagram of an example of issue recovery data for use by an analysis system to generate an issue recovery rating for a system, or portion thereof. For the evaluation category of issue recovery (i.e., recover), the sub-categories and/or sub-sub categories are cues for determining what data to gather for an issue recovery evaluation. The sub-categories include issue recovery planning, issue recovery improvements, and issue recovery communications. As such, the issue recovery data may include a collection of issue recovery planning information, issue recovery improvements information, and issue recovery communications information.

The issue recovery planning sub-category includes the sub-sub categories of during and/or after event recovery plan execution. The issue recovery planning information includes information regarding how these sub-sub categories are implemented (e.g., understood to be implemented, actually implemented, etc.).

The issue recovery improvements sub-category includes the sub-sub categories of incorporation of lessons learned in recovery plans and recovery strategy updates. The issue recovery improvement information includes information regarding how these sub-sub categories are implemented (e.g., understood to be implemented, actually implemented, etc.).

The issue recovery communications sub-category includes the sub-sub categories of public relations management, after event reputation repairment, and recovery activity communication (e.g., with internal stakeholders, executive teams, management teams, etc.). A stakeholder is a party that has an interest in an enterprise and can either affect or be affected by the enterprise. For example, typical stakeholders include investors, employees, customers, suppliers, communities, governments, and/or trade associations. The issue recovery communications information includes information regarding how these sub-sub categories are implemented (e.g., understood to be implemented, actually implemented, etc.).

Figure 76:
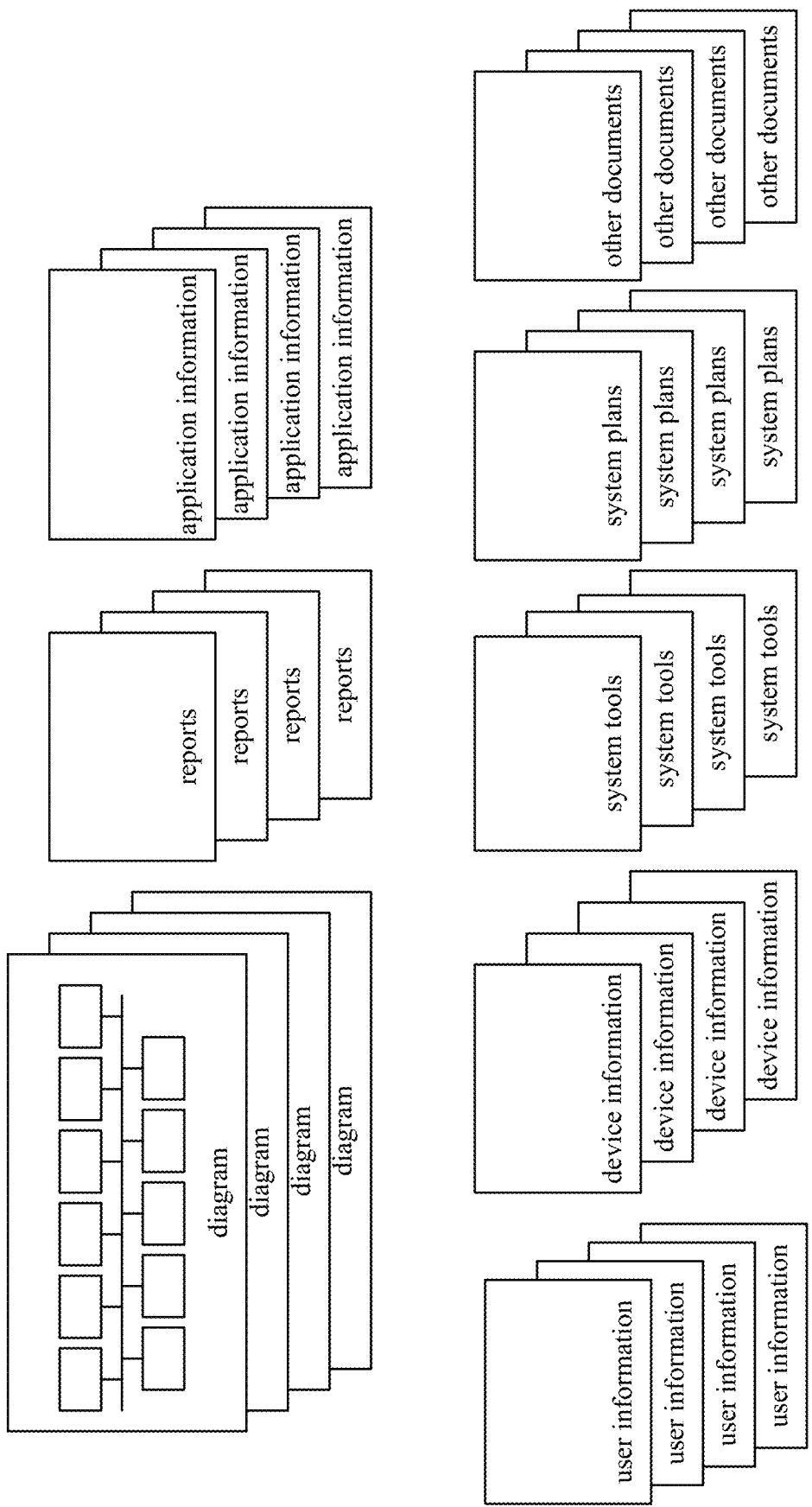
FIG. 76 is a diagram of another example of issue recovery data for use by an analysis system to generate an issue recovery rating for a section of a system in accordance with the present disclosure.

FIG. 76 is a diagram of another example of issue recovery data for use by an analysis system to generate an issue recovery rating for a system, or portion thereof. In this example, the issue recovery data includes one or more diagrams, one or more reports, one or more application information records, one or more user information records, one or more device information records, one or more system tool records, one or more system plans, and/or one or more other documents regarding a system aspect.

A diagram is a data flow diagram, an HLD diagram, an LLD diagram, a DLD diagram, an operation flowchart, a data flow diagram, a security operations center (SOC) processes diagram, a software architecture diagram, a hardware architecture diagram, and/or other diagram regarding the design, build, and/or operation of the system, or a portion thereof. A report may be a compliance report, a security report (e.g., risk assessment, user behavioral analysis, exchange traffic and use, recovery report, etc.), a sales report, a trend report, an inventory summary, or any kind of report generated by an aspect of the system and/or an outside source regarding the aspect of the system. For example, a compliance report is a report created to ensure system compliance with industry standards, laws, rules, and regulations set by government agencies and regulatory bodies. A compliance report may include information to ensure compliance with the Payment Card Industry Data Security Standard (PCI-DSS), Health Insurance Portability and Accountability Act (HIPPA), etc. A security report summarizes a system's weaknesses based on security scan results and/or other analytic tools.

An application information record is a record regarding one or more applications of the system. For example, an application information record includes a list of user applications and/or a list of system applications (e.g., operating systems) of the system or a portion thereof. A list of applications includes vendor information (e.g., name, address, contact person information, etc.), a serial number, a software description, a software model number, a version, a generation, a purchase date, an installation date, a service date, use and/or user information, and/or other mechanism for identifying applications.

A user information record is a record regarding one or more users of the system. For example, a user information record may include one or more lists of users and affiliations of users with the system, or portion thereof. As another example, a user information record include a log of use of the one or more assets by a user or others. A user information record may also include privileges and/or restrictions imposed on the use of the one or more assets (e.g., access control lists). A user information record may include roles and responsibilities of personnel (e.g., from a personnel handbook, access control list, data flow information, human resources documentation, and/or other system information).

A device information record is a record regarding one or more devices of the system. For example, a device information record may include a list of network devices (e.g., hardware and/or software), a list of user devices (e.g., hardware and/or software), a list of security devices (e.g., hardware and/or software), a list of servers (e.g., hardware and/or software), and/or a list of any other devices of the system or a portion thereof. Each list includes device information pertaining to the devices in the list.

The device information may include vendor information (e.g., name, address, contact person information, etc.), a serial number, a device description, a device model number, a version, a generation, a purchase date, an installation date, a service date, and/or other mechanism for identifying a device. The device information may also include purchases, installation notes, maintenance records, data use information, and age information. A purchase is a purchase order, a purchase fulfillment document, bill of laden, a quote, a receipt, and/or other information regarding purchases of assets of the system, or a portion thereof. An installation note is a record regarding the installation of an asset of the system, or portion thereof. A maintenance record is a record regarding each maintenance service performed on an asset of the system, or portion thereof.

As an example, a list of user devices and associated user device information may include (e.g., in tabular form) user ID, user level, user role, hardware (HW) information, IP address, user application software (SW) information, device application software (SW) information, device use information, and/or device maintenance information. A user ID may include an individual identifier of a user and may further include an organization ID, a division ID, a department ID, a group ID, and/or a sub-group ID associated with the user.

A user level (e.g., C-Level, director level, general level) includes options for data access privileges, data access restrictions, network access privileges, network access restrictions, server access privileges, server access restrictions, storage access privileges, storage access restrictions, required user applications, required device applications, and/or prohibited user applications.

A user role (e.g., project manager, engineer, quality control, administration) includes further options for data access privileges, data access restrictions, network access privileges, network access restrictions, server access privileges, server access restrictions, storage access privileges, storage access restrictions, required user applications, required device applications, and/or prohibited user applications.

The HW information field may store information regarding the hardware of the device. For example, the HW information includes information regarding a computing device such as vendor information, a serial number, a description of the computing device, a computing device model number, a version of the computing device, a generation of the computing device, and/or other mechanism for identifying a computing device. The HW information may further store information regarding the components of the computing device such as the motherboard, the processor, video graphics card, network card, connection ports, and/or memory.

The user application SW information field may store information regarding the user applications installed on the user's computing device. For example, the user application SW information includes information regarding a SW program (e.g., spreadsheet, word processing, database, email, etc.) such as vendor information, a serial number, a description of the program, a program model number, a version of the program, a generation of the program, and/or other mechanism for identifying a program. The device SW information may include similar information, but for device applications (e.g., operating system, drivers, security, etc.).

The device use data field may store data regarding the use of the device (e.g., use of the computing device and software running on it). For example, the device use data includes a log of use of a user application, or program (e.g., time of day, duration of use, date information, etc.). As another example, the device use data includes a log of data communications to and from the device. As yet another example, the device use data includes a log of network accesses. As a further example, the device use data includes a log of server access (e.g., local and/or remote servers). As still further example, the device use data includes a log of storage access (e.g., local and/or remote memory).

The maintenance field stores data regarding the maintenance of the device and/or its components. As an example, the maintenance data includes a purchase date, purchase information, an installation date, installation notes, a service date, services notes, and/or other maintenance data of the device and/or its components.

Note that, when device information records include application information, the application information records may include at least a portion of the device information records and vice versa.

A system tool record is a record regarding one or more tools of the system. For example, a system tool record includes a list of system tools of the system or a portion thereof and information related to the system tools. System tools may include one or more security tools, one or more data segmentation tools, one or more boundary detection tools, one or more data protection tools, one or more infrastructure management tools, one or more encryption tools, one or more exploit protection tools, one or more malware protection tools, one or more identity management tools, one or more access management tools, one or more system monitoring tools, one or more verification tools, and/or one or more vulnerability management tools.

A system tool may also be an infrastructure management tool, a network monitoring tool, a network strategy and planning tool, a network managing tool, a Simple Network Management Protocol (SNMP) tool, a telephony monitoring tool, a firewall monitoring tool, a bandwidth monitoring tool, an IT asset inventory management tool, a network discovery tool, a network asset discovery tool, a software discovery tool, a security discovery tool, an infrastructure discovery tool, an intrusion detection tool, Security Information & Event Management (SIEM) tool, a data crawler tool, and/or other type of tool to assist in discovery of assets, functions, security issues, implementation of the system, and/or operation of the system.

System tool information may include vendor information (e.g., name, address, contact person information, etc.), a serial number, a system tool description, a system tool model number, a version, a generation, a purchase date, an installation date, a service date, and/or other mechanism for identifying a system tool. Note that the system tool may be implemented by one or more devices and/or applications included in one or more of the device information records and the application information records such that some overlap in system tool records, device information records, and application information records may occur.

System plans include business plans, operational plans, system security plans, system design specifications, etc. For example, a system security plan (SSP) is a document that identifies the functions and features of a system, including all its hardware and software installed on the system. System design specifications may include security specifications, hardware specifications, software specifications, data flow specifications, business operation specifications, build specifications, and/or other specifications regarding the system, or a portion thereof.

Other documents may include internal documents such as memos, calendar entries, notes, emails, training materials, user manuals, etc. Training materials may include at least a portion of a personnel handbook, presentation slides from a cybersecurity training session, links to videos and/or audio tutorials, handouts from a cybersecurity training session, training email communications, etc.

Figure 77:
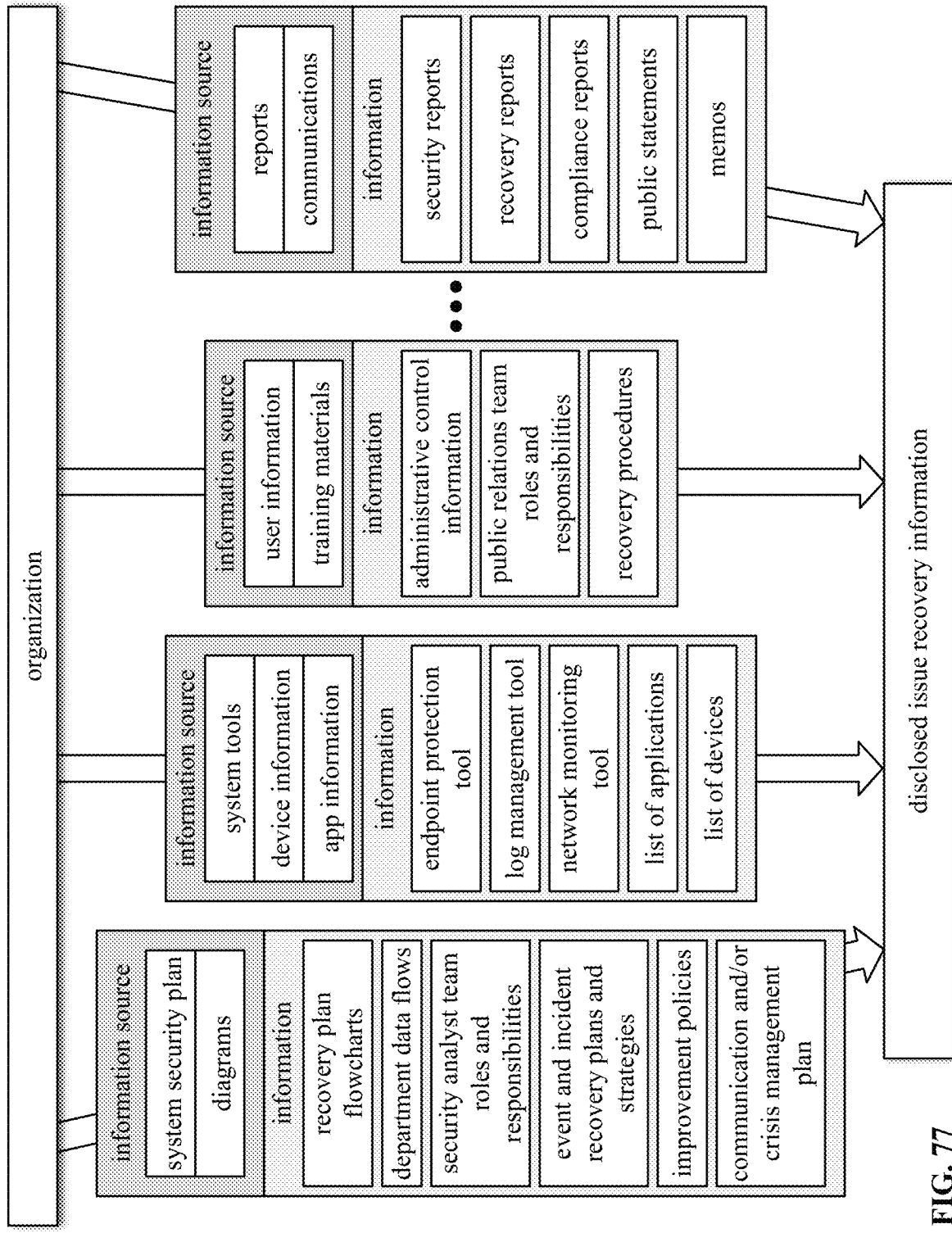
FIG. 77 is a diagram of another example of issue recovery data for use by an analysis system to generate an issue recovery rating for a section of a system in accordance with the present disclosure.

FIG. 77 is another example of issue recovery data for use by an analysis system to generate an issue recovery rating for a system, or portion thereof. FIG. 77 depicts an example of gathering disclosed issue recovery information from various disclosed data sources of an organization.

As shown, disclosed organization diagrams relevant to issue recovery information include recovery plan flowcharts and department data flow diagrams (e.g., IT department data flow relevant to issue recovery, etc.). Portions of the disclosed system security plan relevant to issue recovery include security analyst team roles and responsibilities as well as any specific processes, procedures, plans, data flows, policies, and requirements related to issue recovery. The security analyst team roles and responsibilities may include day to day activities of each team member, recovery plan roles and responsibilities of each team member, identification of an incident recovery coordinator, information sharing requirements, hierarchy of roles, user privileges and/or access information, and reporting requirements.

Portions of the disclosed system security plan relevant to issue recovery further include event and incident recovery plans and strategies, issue recovery improvement policies, and a communication and/or crisis management plan. An event is a change in the normal behavior of a given system, process, environment, or workflow. Events can be positive, neutral, or negative. An average organization experiences thousands of events every day (e.g., an email, update to firewalls, etc.). An incident is a change in a system (e.g., an event) that, as assessed by a security analyst team, security tool and/or security device violates a security policy, standard, or code of conduct, and/or threatens confidentiality, integrity, or availability of organization systems or data.

Incident and event definitions may be established by a variety of sources such as one or more of monitoring tools, the security analyst team, and external sources and services. Incident definitions may include incident categories such as high criticality, medium criticality, and low criticality. For example, high criticality incidents may include highly malicious incidents such as active and/or successful deployment of malware that poses a direct threat to the confidentiality, integrity, or availability of data or systems and highly suspicious incidents that are not directly attributable to malware but are indicative of an active threat or compromise.

As another example, medium criticality incidents may include medium malicious incidents such as identified malware that does not pose an immediate threat to the system and medium suspicious incidents that are not directly attributable to malware but are indicative of a security risk. As another example, low criticality incidents may include detected adware, riskware, and suspicious peer-to-peer networks.

Event and incident recovery plans includes a list of recovery plans to be implemented based on a type of event and/or incident, a corresponding level of severity, a recovery priority level, and an estimated level of system damage. In general, an event and/or incident recovery plan includes remediation actions such as post incident repair instructions, recovery communications, and recovery plan updating. Event and incident recovery plans may be included in an organization's business continuity and disaster recovery plan (BC/DR) (e.g., a section of the system security plan). Business continuity focuses on business operations and involves policies and procedures that ensure that essential business functions and processes are available during and after a disaster. A business continuity plan is organization-wide and gives instructions to each department about what is to be done when disaster strikes. For example, a business continuity plan can include replacement of staff, service availability issues, business impact analysis, and change management.

Disaster recovery focuses on how an organization will recover from a disaster from a system and data recovery standpoint. The processes within the disaster recovery plan can include server and network restoration, copying backup data, and provisioning backup systems. A disaster recovery plan may include recovery time objectives and recovery point objectives. Recovery time objectives state how quickly data should be restored from backups (e.g., how long a system aspect can afford to wait for recovery) and recovery point objectives indicates how recent a data backup should be (e.g., how much recent data the system aspect can afford to lose). Selection of data backup media should reflect these objectives while balancing desired recovery performance, data safety, and budgetary and organizational constraints.

Disclosed issue recovery improvement policies include policies regarding updating recovery plans and recovery strategies based on past and present cybersecurity issues. For example, an organization may have a dedicated task force to periodically test and evaluate an organization's recovery efforts. After an event and/or incident is recovered, the task force can address any vulnerabilities and issues with the recovery plans and strategies for more favorable results in the future. The issue recovery improvement policies can also include updating recovery plans and strategies based on issues that have affected similar organizations.

Disclosed communications and/or crisis management plans (e.g., included in a business continuity plan) cover items such as who handles recovery communications, management of the flow of information (e.g., to media, stakeholders, management, etc.), contact information for those involved, public relations team roles and responsibilities, and types of required communications involving issue recovery (e.g., reporting, email, formal documentation, etc.).

Disclosed system tools relevant to issue recovery include an endpoint protection tool, a log management tool, and a network monitoring tool. An endpoint protection tool monitors and records activity on system endpoints (e.g., laptops, desktops, mobile phones, tablets, servers, virtual environments, etc.), detects suspicious behavior and security risks, issues alerts, and responds to internal and external threats. An endpoint protection tool includes functionality such as antivirus, anti-malware, data encryption, personal firewalls, intrusion prevention system (IPS), and data loss protection (DLP).

A log management tool generally performs a variety of functions such as log collection, central aggregation, storage and retention of logs, log rotation, analysis, and log reporting. Logs create a record of events that happen on system components such as network devices (e.g., firewall, router, switch, load balancer, etc.), user applications, databases, servers, and operating systems. Logs include log files, event logs, transaction logs, message logs, etc. For example, a log file is a file that records events that occur in an operating system, other software, or between different users of communication software. A transaction log is a file of communications between a system and the users of that system, or a data collection method that automatically captures the type, content, or time transactions made by a person from a terminal with that system.

As another example, an event log provides information about network traffic, usage, and other conditions. For example, an event log may capture all logon sessions to a network, along with account lockouts, failed password attempts, application events, etc. An event log stores this data for retrieval by security professionals or automated security systems. As such, logs are a rich source for understanding what is going on in an organization's systems and network. Log analysis is used to determine what log information should be flagged for recovery.

A log management tool may be a Security Information & Event Management (SIEM) tool. A SIEM tool centrally collects data across an enterprise's infrastructure and implements a variety of security techniques such as log management, security event management, security information management, security event correlation, and compliance reporting capabilities. A security analyst team can use this data to detect, categorize, and analyze security incidents for an informed incident response and recovery.

A network monitoring tool may be a simple network management protocol (SNMP). In SNMP, monitored devices are installed with agent software and a network management system monitors each device and communicates information from those devices to an administrator. As another example, the network monitoring tool may include NetFlow monitoring and analysis. NetFlow is a standard for collecting network traffic statistics (e.g., IP addresses, ports, protocol, timestamp, number of bytes, packets, flags, etc.) from routers, switches, specialized network probes, and/or other network devices. With NetFlow monitoring, security teams can detect changes in network behavior to identify anomalies indicative of a security breach and understand where recovery needs to occur. A SIEM log management solution can be integrated with network threat detection via Netflow to produce a powerful incident response and recovery tool. Each of the disclosed tools detect system issues and provide alerts that are useful in determining an issue recovery plan.

Disclosed device information and application information relevant to issue recovery includes a list of devices (software and/or hardware) and a list of applications (e.g., a list of system applications (e.g., operating systems) and a list of user applications). For effective recovery, an organization needs to know what areas need to be recovered. Therefore, a detailed inventory of organization network devices, applications, operating systems, servers, databases, etc., is relevant to issue recovery because these items may require repair, generate logs and alerts, require software updates, and/or are monitored for suspicious activity.

One or more of the disclosed devices or applications may be associated with a system tool. For example, one or more log forwarding devices and a centralized log server may be required for a log management tool to collect and store data from various sources. As another example, a network packet collector is a security device that may be required to collect network traffic for input to a network monitoring tool.

Disclosed user information relevant to issue recovery may include a list of users of the organization, access control lists, and/or administrative control information (e.g., who has the ability to repair system aspects). User information may further include personnel roles and responsibilities (e.g., from personnel handbooks, HR documents, etc.) such as the public relations team roles and responsibilities relevant to issue recovery. For example, a senior member of the public relations team may be responsible for devising a plan to repair an organization's reputation after a breach. Disclosed training materials may reveal details regarding issue recovery procedures that were included in the system security plan. For example, the training materials may indicate who is aware of the recovery procedures, how often relevant staff receives training, etc.

Disclosed reports relevant to issue recovery include security reports generated by one or more of the system tools (e.g., the log management tool, the network monitoring tool, etc.), one or more security devices, and personnel (e.g., the security analyst team). As another example, disclosed recovery reports detailing past incident recovery actions are relevant to issue recovery information. Additionally, compliance reports may contain relevant information to issue recovery information such as summary of previous security issues and issue recoveries, application of remedies, mitigation techniques, and procedures to minimize future security risks. Disclosed communications may include released public statements regarding issue recovery efforts, memos regarding issue recovery tasks, etc. Numerous other pieces of disclosed issue recovery information may be gathered from various information sources of the organization. The above examples are far from exhaustive.

Figure 78:
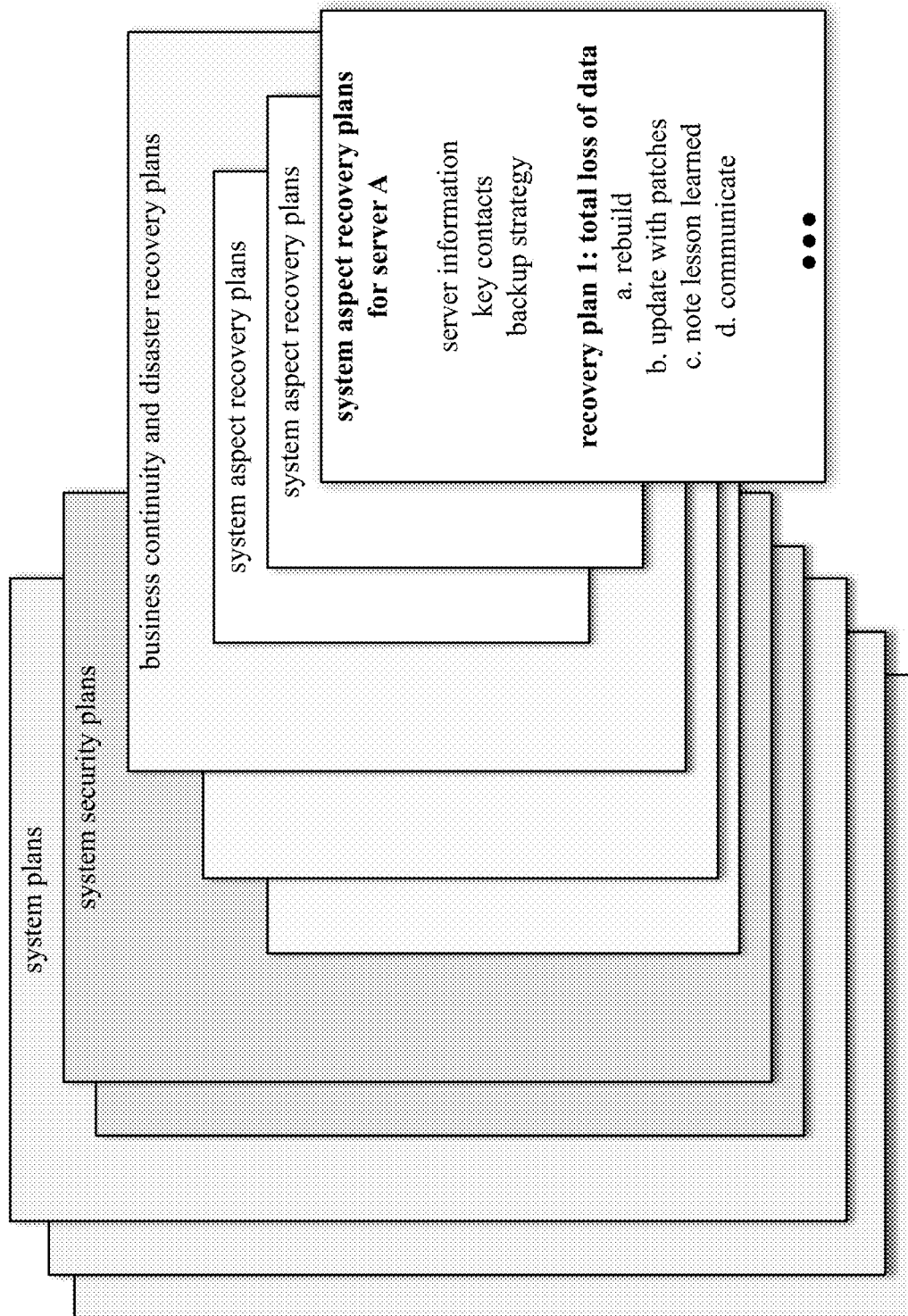
FIG. 78 is a diagram of another example of issue recovery data for use by an analysis system to generate an issue recovery rating for a section of a system in accordance with the present disclosure.

FIG. 78 is another example of issue recovery data for use by an analysis system to generate an issue recovery rating for a system, or portion thereof. This example depicts a collection of disclosed system plans that contains a collection of disclosed system security plans that contains a collection of disclosed business continuity and disaster recovery plans. The collection of disclosed business continuity and disaster recovery plans include a collection of recovery plans regarding various system aspects of an organization. For example, system aspect recovery plans for server A of the organization includes server information, key contacts, a backup strategy, and a list of recovery plans according to severity and type of issue.

Server information may include location, server model, operating system, CPUs, memory, total disk, system handle, system serial number, domain name system (DNS) entry, IP address, applications, associated devices, certificates, etc. Key contacts may include contact information for hardware vendors, system owners, database owners, application owners, software vendors, offsite storage, management teams, legal, anyone effected by a disruption, etc. Backup strategies may include full backup, copy backup, incremental backup, differential backup, disk space management, multiple storage devices and storage locations, backup rotation, backup monitoring, data restore trials, disk checks, RAM checks, deduplication, encryption, certificate management, and data retention plans. A backup strategy should allow for a backup to occur in a consistent and stable manner, without requiring downtime.

In this example, a recovery plan 1 for server A is shown that should be implemented when a total loss of data occurs. Recovery plan 1 includes rebuilding the server (e.g., restoring data from backup information, a recovery timeline and personnel involved, contact information for data restoration experts if IT department is unable to rebuild, etc.), ensuring the server is up to date with patches (e.g., via patch management software), note lessons learned (e.g., is more monitoring needed, did the recovery take too long, etc.), and communicate the recovery to required parties (e.g., legal department, management, public relations team, security analysts, etc.).

The analysis system is operable to evaluate the disclosed issue recovery information such as a collection of disclosed recovery plans to evaluate the organization's understanding of issue recovery security functions.

Figure 79:
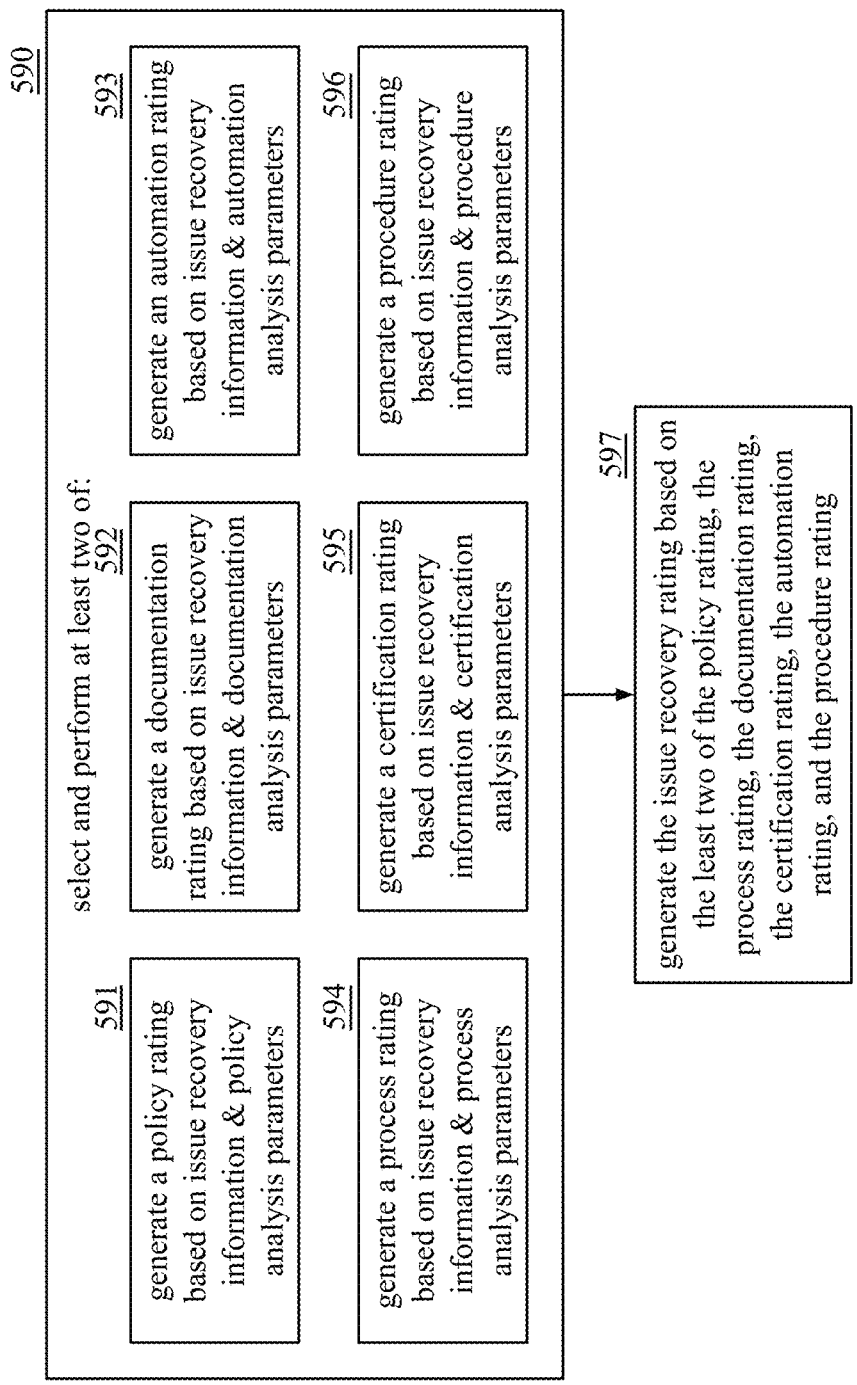
FIG. 79 is a logic diagram of a further example of an analysis system determining an issue recovery rating for a section of a system in accordance with the present disclosure.

FIG. 79 is a logic diagram of a further example of an analysis system determining an issue recovery rating for a system, or portion thereof; in particular, for calculating the issue recovery rating. The method begins at step 590 where the analysis system selects and performs at least two of steps 591-596. At step 591, the analysis system generates a policy rating for the system aspect based on the issue recovery data and policy analysis parameters and in accordance with the at least one evaluation perspective, the at least one evaluation viewpoint, and policy as the evaluation rating metric. At step 592, the analysis system generates a documentation rating for the system aspect based on the issue recovery data and documentation analysis parameters and in accordance with the at least one evaluation perspective, the at least one evaluation viewpoint, and documentation as the evaluation rating metric.

At step 593, the analysis system generates an automation rating for the system aspect based on the issue recovery data and automation analysis parameters and in accordance with the at least one evaluation perspective, the at least one evaluation viewpoint, and automation as the evaluation rating metric. At step 594, the analysis system generates a policy rating for the system aspect based on the issue recovery data and policy analysis parameters and in accordance with the at least one evaluation perspective, the at least one evaluation viewpoint, and policy as the evaluation rating metric.

At step 595, the analysis system generates a certification rating for the system aspect based on the issue recovery data and certification analysis parameters and in accordance with the at least one evaluation perspective, the at least one evaluation viewpoint, and certification as the evaluation rating metric. At step 596, the analysis system generates a procedure rating for the system aspect based on the issue recovery data and procedure analysis parameters and in accordance with the at least one evaluation perspective, the at least one evaluation viewpoint, and procedure as the evaluation rating metric.

The method continues at step 597 where the analysis system generates the issue recovery rating based on the selected and performed at least two of the process rating, the policy rating, the documentation rating, the automation rating, the procedure rating, and the certification rating. For example, the issue recovery rating is a summation of the at least individual evaluation metric ratings. As another example, the analysis system performs a mathematical and/or logical function (e.g., a weight average, standard deviation, statistical analysis, trending, etc.) on the at least two individual evaluation metric to produce the issue recovery rating.

Figure 80:
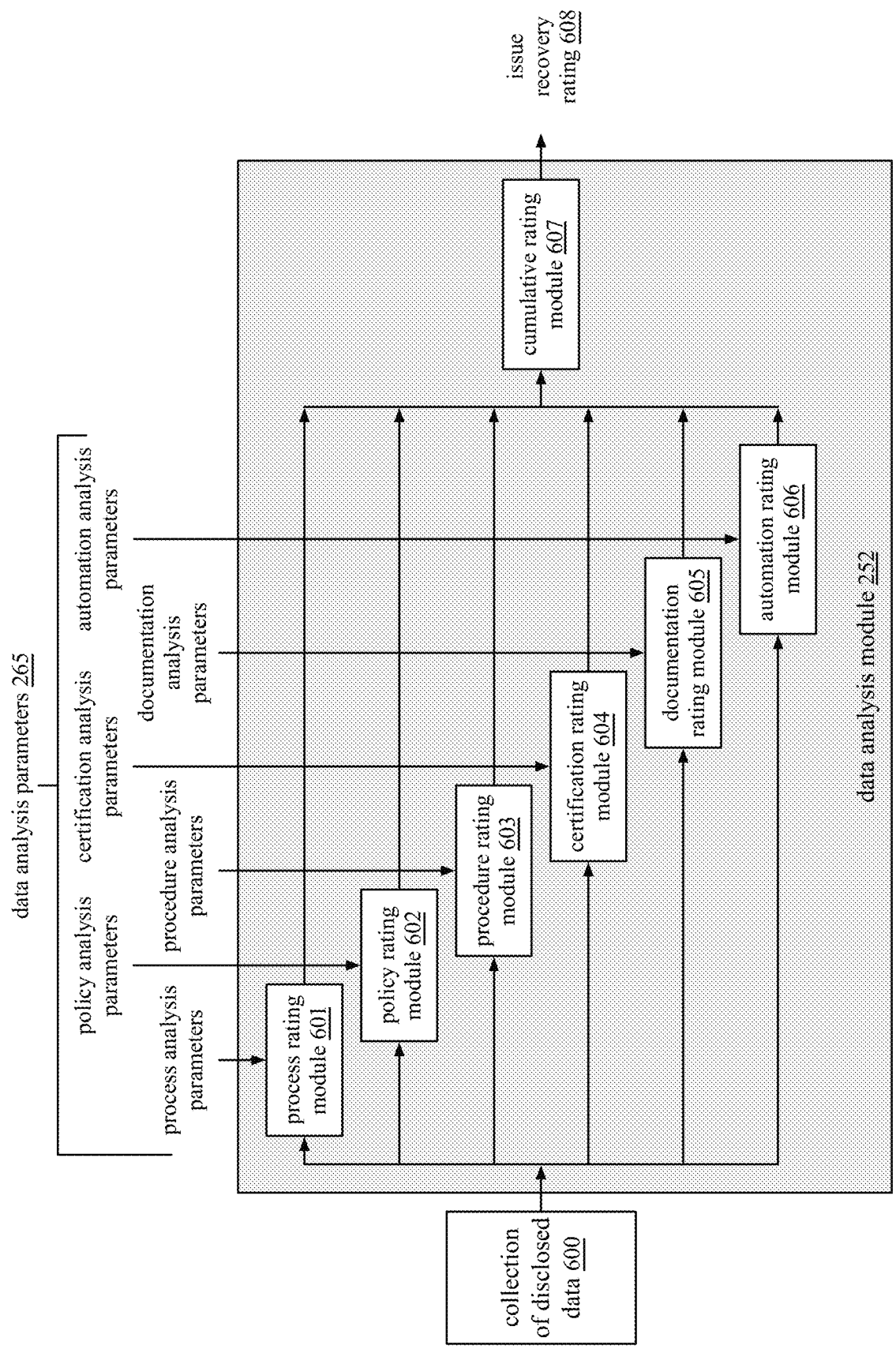
FIG. 80 is a schematic block diagram of an embodiment of a data analysis module of an analysis system in accordance with the present disclosure.

FIG. 80 is a schematic block diagram of an embodiment of a scoring module of the data analysis module 252 that includes a process rating module 601, a policy rating module 602, a procedure rating module 603, a certification rating module 604, a documentation rating module 605, an automation rating module 606, and a cumulative rating module 607. In general, the data scoring module generates an issue recovery rating 608 from a collection of data based on data analysis parameters 265.

The process rating module 601 evaluates the collection of data 600, or portion thereof, (e.g., pre-processed data of FIG. 35) to produce a process evaluation rating in accordance with process analysis parameters of the data analysis parameters 265. The process analysis parameters indicate how the collection of data is to be evaluated with respect to processes of the system, or portion thereof. As an example, the process analysis parameters include:

- an instruction to compare processes of the data 600 with a list of processes the system, or portion thereof, should have;
- an instruction to count the number of processes of data 600 and compare it with a quantity of processes the system, or portion thereof, should have;
- an instruction to determine last revisions of processes of data 600 and/or to determine an age of last revisions;
- an instruction to determine frequency of use of processes of data 600;
- an instruction to determine a volume of access of processes of data 600;
- an instruction to evaluate a process of data 600 with respect to a checklist regarding content of the process (e.g., what should be in the process);
- a scaling factor based on the size of the system, or portion thereof;
- a scaling factor based on the size of the organization;
- an instruction to compare a balance of local processes with respect to system-wide processes;
- an instruction to compare topics of the processes of data 600 with desired topics for processes (which may be at least partially derived from the evaluation category and/or sub-categories); and/or
- an instruction to evaluate language use within processes of data 600.

The process rating module 601 can rate the data 600 at three levels. The first level is that the system has processes, the system has the right number of processes, and/or the system has processes that address the right topics. The second level digs into the processes themselves to determine whether they are adequately cover the requirements of the system. The third level evaluates how well the processes are used and how well they are adhered to.

As an example, the process rating module 601 generates a process evaluation rating based on a comparison of the processes of the data 600 with a list of processes the system, or portion thereof, should have. If all of the processes on the list are found in the data 600, then the process evaluation rating is high. The fewer processes on the list that found in the data 600, the lower the process evaluation rating will be.

As another example, the process rating module 601 generates a process evaluation rating based on a determination of the last revisions of processes of data 600 and/or to determine an age of last revisions. As a specific example, if processes are revised at a rate that corresponds to a rate of revision in the industry, then a relatively high process evaluation rate would be produced. As another specific example, if processes are revised at a much lower rate that corresponds to a rate of revision in the industry, then a relatively low process evaluation rate would be produced (implies a lack of attention to the processes). As yet another specific example, if processes are revised at a much higher rate that corresponds to a rate of revision in the industry, then a relatively low process evaluation rate would be produced (implies processes are inaccurate, incomplete, and/or created with a lack of knowledge as to what's needed).

As another example, the process rating module 601 generates a process evaluation rating based on a determination of frequency of use of processes of data 600. As a specific example, if processes are used at a frequency (e.g., x times per week) that corresponds to a frequency of use in the industry, then a relatively high process evaluation rate would be produced. As another specific example, if processes are used at a much lower frequency that corresponds to a frequency of use in the industry, then a relatively low process evaluation rate would be produced (implies a lack of using and adhering to the processes). As yet another specific example, if processes are used at a much higher frequency that corresponds to a frequency of use in the industry, then a relatively low process evaluation rate would be produced (implies processes are inaccuracy, incompleteness, and/or difficult to use).

As another example, the process rating module 601 generates a process evaluation rating based on an evaluation of a process of data 600 with respect to a checklist regarding content of the policy (e.g., what should be in the policy, which may be based, at least in part, on an evaluation category, sub-category, and/or sub-sub category). As a specific example, the topics contained in the process of data 600 is compared to a checklist of desired topics for such a process. If all of the topics on the checklist are found in the process of data 600, then the process evaluation rating is high. The fewer topics on the checklist that found in the process of data 600, the lower the process evaluation rating will be.

As another example, the process rating module 601 generates a process evaluation rating based on a comparison of balance between local processes of data 600 and system-wide processes of data 600. As a specific example, most security processes should be system-wide. Thus, if there are a certain percentage (e.g., less than 10%) of security processes that are local, then a relatively high process evaluation rating will be generated. Conversely, the greater the percentage of local security processes, the lower the process evaluation rating will be.

As another example, the process rating module 601 generates a process evaluation rating based on evaluation of language use within processes of data 600. As a specific example, most security requirements are mandatory. Thus, if the policy includes too much use of the word "may" (which implies optionality) versus the word "shall (which implies must), the lower the process evaluation rating will be.

The process rating module 601 may perform a plurality of the above examples of process evaluation to produce a plurality of process evaluation ratings. The process rating module 601 may output the plurality of the process evaluation ratings to the cumulative rating module 607. Alternatively, the process rating module 601 may perform a function (e.g., a weight average, standard deviation, statistical analysis, etc.) on the plurality of process evaluation ratings to produce a process evaluation rating that's provided to the cumulative rating module 607.

The policy rating module 602 evaluates the collection of data 600, or portion thereof, (e.g., pre-processed data of FIG. 35) to produce a policy evaluation rating in accordance with policy analysis parameters of the data analysis parameters 265. The policy analysis parameters indicate how the collection of data is to be evaluated with respect to policies of the system, or portion thereof. As an example, the policy analysis parameters include:

- an instruction to compare policies of the data 600 with a list of policies the system, or portion thereof, should have;
- an instruction to count the number of policies of data 600 and compare it with a quantity of policies the system, or portion thereof, should have;
- an instruction to determine last revisions of policies of data 600 and/or to determine an age of last revisions;
- an instruction to determine frequency of use of policies of data 600;
- an instruction to determine a volume of access of policies of data 600;
- an instruction to evaluate a policy of data 600 with respect to a checklist regarding content of the policy (e.g., what should be in the policy);
- a scaling factor based on the size of the system, or portion thereof;
- a scaling factor based on the size of the organization;
- an instruction to compare a balance of local policies with respect to system-wide policies;
- an instruction to compare topics of the policies of data 600 with desired topics for policies (which may be at least partially derived from the evaluation category and/or sub-categories); and/or
- an instruction to evaluate language use within policies of data 600.

The policy rating module 602 can rate the data 600 at three levels. The first level is that the system has policies, the system has the right number of policies, and/or the system has policies that address the right topics. The second level digs into the policies themselves to determine whether they are adequately cover the requirements of the system. The third level evaluates how well the policies are used and how well they are adhered to.

The procedure rating module 603 evaluates the collection of data 600, or portion thereof, (e.g., pre-processed data of FIG. 35) to produce a procedure evaluation rating in accordance with procedure analysis parameters of the data analysis parameters 265. The procedure analysis parameters indicate how the collection of data is to be evaluated with respect to procedures of the system, or portion thereof. As an example, the procedure analysis parameters include:

- an instruction to compare procedures of the data 600 with a list of procedures the system, or portion thereof, should have;
- an instruction to count the number of procedures of data 600 and compare it with a quantity of procedures the system, or portion thereof, should have;
- an instruction to determine last revisions of procedures of data 600 and/or to determine an age of last revisions;
- an instruction to determine frequency of use of procedures of data 600;
- an instruction to determine a volume of access of procedures of data 600;
- an instruction to evaluate a procedure of data 600 with respect to a checklist regarding content of the procedure (e.g., what should be in the procedure);
- a scaling factor based on the size of the system, or portion thereof;
- a scaling factor based on the size of the organization;
- an instruction to compare a balance of local procedures with respect to system-wide procedures;
- an instruction to compare topics of the procedures of data 600 with desired topics for procedures (which may be at least partially derived from the evaluation category and/or sub-categories); and/or an instruction to evaluate language use within procedures of data 600.

The procedure rating module 603 can rate the data 600 at three levels. The first level is that the system has procedures, the system has the right number of procedures, and/or the system has procedures that address the right topics. The second level digs into the procedures themselves to determine whether they are adequately cover the requirements of the system. The third level evaluates how well the procedures are used and how well they are adhered to.

The certification rating module 604 evaluates the collection of data 600, or portion thereof, (e.g., pre-processed data of FIG. 35) to produce a certification evaluation rating in accordance with certification analysis parameters of the data analysis parameters 265. The certification analysis parameters indicate how the collection of data is to be evaluated with respect to certifications of the system, or portion thereof. As an example, the certification analysis parameters include:

an instruction to compare certifications of the data 600 with a list of certifications the system, or portion thereof, should have;

an instruction to count the number of certifications of data 600 and compare it with a quantity of certifications the system, or portion thereof, should have;

an instruction to determine last revisions of certifications of data 600 and/or to determine an age of last revisions;

an instruction to evaluate a certification of data 600 with respect to a checklist regarding content of the certification (e.g., what should be certified and/or how it should be certified);

a scaling factor based on the size of the system, or portion thereof;

a scaling factor based on the size of the organization; and an instruction to compare a balance of local certifications with respect to system-wide certifications.

The certification rating module 603 can rate the data 600 at three levels. The first level is that the system has certifications, the system has the right number of certifications, and/or the system has certifications that address the right topics. The second level digs into the certifications themselves to determine whether they are adequately cover the requirements of the system. The third level evaluates how well the certifications are maintained and updated.

The documentation rating module 603 evaluates the collection of data 600, or portion thereof, (e.g., pre-processed data of FIG. 35) to produce a documentation evaluation rating in accordance with documentation analysis parameters of the data analysis parameters 265. The documentation analysis parameters indicate how the collection of data is to be evaluated with respect to documentation of the system, or portion thereof. As an example, the documentation analysis parameters include:

an instruction to compare documentation of the data 600 with a list of documentation the system, or portion thereof, should have;

an instruction to count the number of documentation of data 600 and compare it with a quantity of documentation the system, or portion thereof, should have;

an instruction to determine last revisions of documentation of data 600 and/or to determine an age of last revisions;

an instruction to determine frequency of use and/or creation of documentation of data 600;

an instruction to determine a volume of access of documentation of data 600;

an instruction to evaluate a document of data 600 with respect to a checklist regarding content of the document (e.g., what should be in the document);

a scaling factor based on the size of the system, or portion thereof;

a scaling factor based on the size of the organization;

an instruction to compare a balance of local documents with respect to system-wide documents;

an instruction to compare topics of the documentation of data 600 with desired topics for documentation (which may be at least partially derived from the evaluation category and/or sub-categories); and/or an instruction to evaluate language use within documentation of data 600.

The documentation rating module 605 can rate the data 600 at three levels. The first level is that the system has documentation, the system has the right number of documents, and/or the system has documents that address the right topics. The second level digs into the documents themselves to determine whether they are adequately cover the requirements of the system. The third level evaluates how well the documentation is used and how well it is maintained.

The automation rating module 606 evaluates the collection of data 600, or portion thereof, (e.g., pre-processed data of FIG. 35) to produce an automation evaluation rating in accordance with automation analysis parameters of the data analysis parameters 265. The automation analysis parameters indicate how the collection of data is to be evaluated with respect to automation of the system, or portion thereof. As an example, the automation analysis parameters include:

an instruction to compare automation of the data 600 with a list of automation the system, or portion thereof, should have;

an instruction to count the number of automation of data 600 and compare it with a quantity of automation the system, or portion thereof, should have;

an instruction to determine last revisions of automation of data 600 and/or to determine an age of last revisions;

an instruction to determine frequency of use of automation of data 600;

an instruction to determine a volume of access of automation of data 600;

an instruction to evaluate an automation of data 600 with respect to a checklist regarding content of the automation (e.g., what the automation should do);

a scaling factor based on the size of the system, or portion thereof;

a scaling factor based on the size of the organization;

an instruction to compare a balance of local automation with respect to system-wide automation;

an instruction to compare topics of the automation of data 600 with desired topics for automation (which may be at least partially derived from the evaluation category and/or sub-categories); and/or an instruction to evaluate operation use of automation of data 600.

The automation rating module 606 can rate the data 600 at three levels. The first level is that the system has automation, the system has the right number of automation, and/or the system has automation that address the right topics. The second level digs into the automation themselves to determine whether they are adequately cover the requirements of the system. The third level evaluates how well the automations are used and how well they are adhered to.

The cumulative rating module 607 receives one or more process evaluation ratings, one or more policy evaluation ratings, one or more procedure evaluation ratings, one or more certification evaluation ratings, one or more documentation evaluation ratings, and/or one or more automation evaluation ratings. The cumulative rating module 607 may output the evaluation ratings it receives as the issue recovery rating 608. Alternatively, the cumulative rating module 607 performs a function (e.g., a weight average, standard deviation, statistical analysis, etc.) on the evaluation ratings it receives to produce the issue recovery rating 608.

Figure 81:
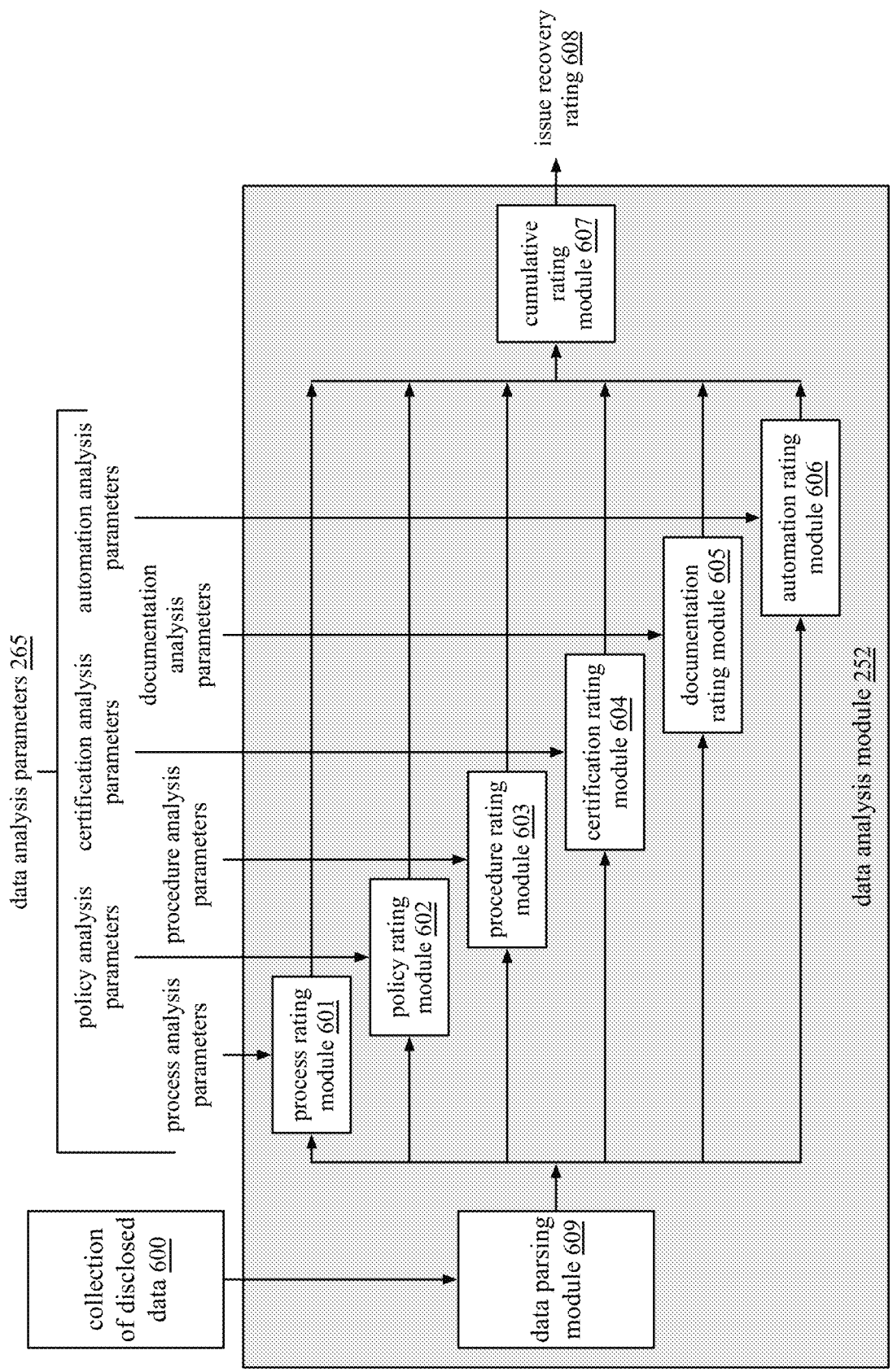
FIG. 81 is a schematic block diagram of another embodiment of a data analysis module of an analysis system in accordance with the present disclosure.

FIG. 81 is a schematic block diagram of another embodiment of a data analysis module 252 that is similar to the data analysis module of FIG. 80. In this embodiment, the data analysis module 252 includes a data parsing module 609, which parses the data 600 into process data, policy data, procedure data, certification data, documentation data, and/or automation data.

FIG. 82 is a logic diagram of a further example of an analysis system determining an issue recovery rating for a system, or portion thereof; in particular generating a process rating. The method begins at step 610 where the analysis system generates a first process rating based on a first combination of a system criteria (e.g., system requirements), of a system mode (e.g., system functions), of an evaluation perspective (e.g., implementation), and of an evaluation viewpoint (e.g., disclosed data).

The method continues at step 611 where the analysis system generates a second process rating based on a second combination of a system criteria (e.g., system design), of a system mode (e.g., system functions), of an evaluation perspective (e.g., implementation), and of an evaluation viewpoint (e.g., disclosed data). The method continues at step 612 where the analysis system generates the process rating based on the first and second process ratings.

FIG. 83 is a logic diagram of a further example of generating a process rating for understanding of system build for issue recovery security functions of an organization. The method begins at step 613 where the analysis system identifies processes regarding issue recovery security functions from the data. The method continues at step 614 where the analysis system generates a process rating from the data. Examples of this were discussed with reference to FIG. 80.

The method also continues at step 615 where the analysis system determines use of the issue recovery processes. The method continues at step 616 where the analysis system generates a process rating based on use. Examples of this were discussed with reference to FIG. 80.

The method also continues at step 617 where the analysis system determines consistency of applying the issue recovery processes. The method continues at step 618 where the analysis system generates a process rating based on consistency of use. Examples of this were discussed with reference to FIG. 80. The method continues at step 619 where the analysis system generates the process rating based on the process rating from the data, the process rating based on use, and the process rating based on consistency of use.

FIG. 84 is a logic diagram of a further example of generating a process rating for understanding of verifying issue recovery security functions of an organization. The method begins at step 620 where the analysis system identifies processes to verify issue recovery security functions from the data. The method continues at step 621 where the analysis system generates a process rating from the data. Examples of this were discussed with reference to FIG. 81.

The method also continues at step 622 where the analysis system determines use of the processes to verify the issue recovery security functions. The method continues at step 623 where the analysis system generates a process rating based on use of the verify processes. Examples of this were discussed with reference to FIG. 80.

The method also continues at step 624 where the analysis system determines consistency of applying the verifying processes to issue recovery security functions. The method continues at step 625 where the analysis system generates a process rating based on consistency of use. Examples of this were discussed with reference to FIG. 80. The method continues at step 626 where the analysis system generates the process rating based on the process rating from the data, the process rating based on use, and the process rating based on consistency of use.

Figure 85:
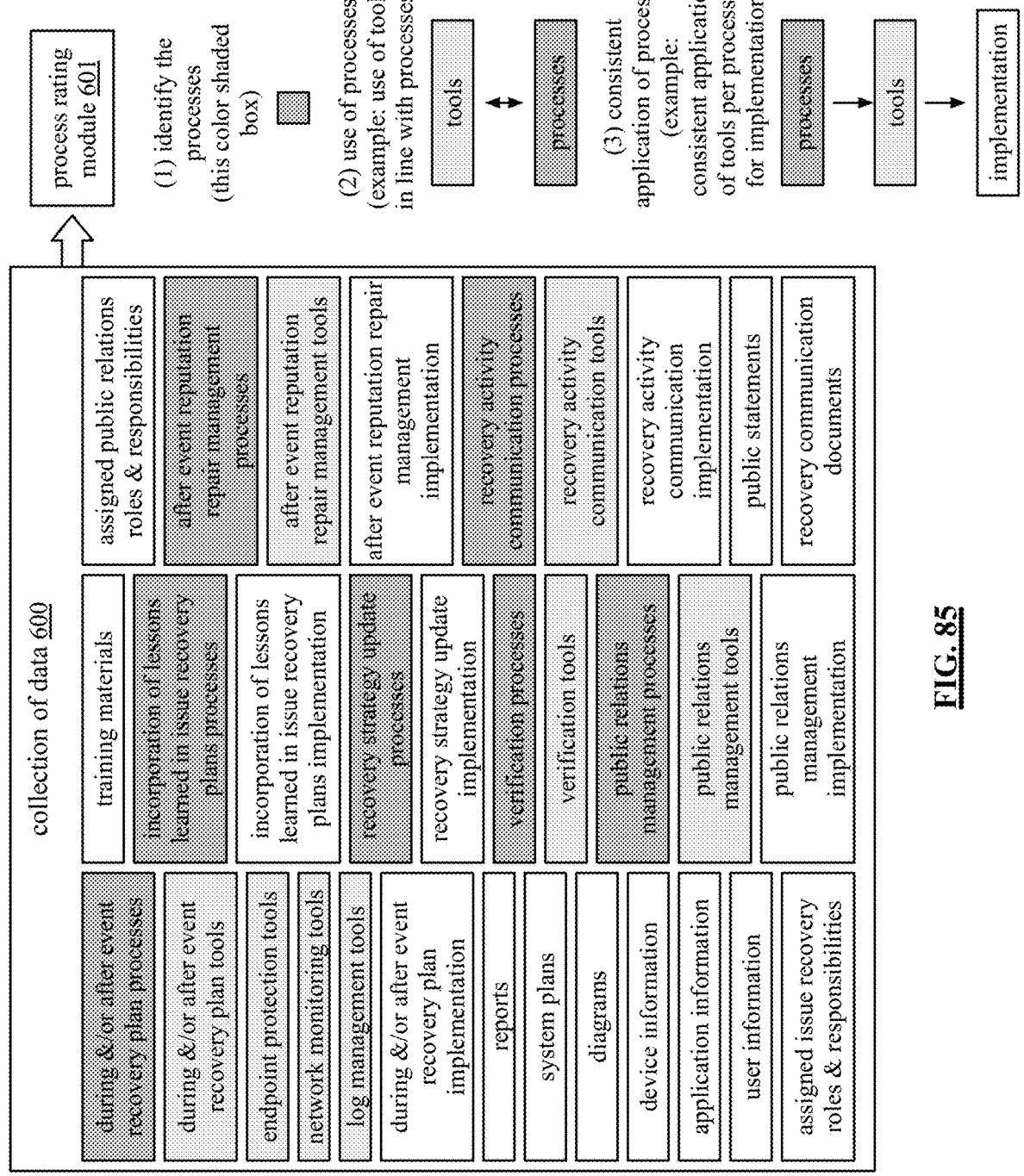
FIG. 85 is a diagram of an example of issue recovery data for use by an analysis system to generate an issue recovery rating for a section of a system in accordance with the present disclosure.

FIG. 85 is a diagram of an example of issue recovery data for use by an analysis system to generate an issue recovery rating for a system, or portion thereof. The issue recovery data includes a collection of data 600, which includes disclosed data, discovered data, and/or desired data.

For example, data 600 includes one or more during and/or after event recovery plan processes, one or more during and/or after event recovery plan tools, one or more endpoint protection tools, one or more network monitoring tools, one or more log management tools, during and/or after event recovery plan processes implementation, one or more reports, one or more system plans, one or more diagrams, device information, application information, user information, assigned issue recovery roles and responsibilities, one or more training materials, one or more incorporation of lessons learned in issue recovery plans processes, incorporation of lessons learned in issue recovery plans implementation, one or more recovery strategy update processes, recovery strategy update implementation, one or more verification processes, one or more verification tools, one or more public relations management processes, one or more public relations management tools, public relations management implementation, assigned public relations roles and responsibilities, one or more after event reputation repair management processes, one or more after event reputation repair management tools, after event reputation repair management implementation, one or more recovery activity communication processes, one or more recovery activity communication tools, and recovery activity communication implementation.

The data 600 may further include one or more during and/or after event recovery plan policies, one or more incorporation of lessons learned in issue recovery plans policies, one or more recovery strategy update policies, one or more verification policies, one or more public relations management policies, one or more after event reputation repair management policies, and one or more recovery activity communication policies.

The data 600 may further include one or more during and/or after event recovery plan procedures, one or more incorporation of lessons learned in issue recovery plans procedures, one or more recovery strategy update procedures, one or more verification procedures, one or more public relations management procedures, one or more after event reputation repair management procedures, and one or more recovery activity communication procedures.

The data 600 may further include one or more during and/or after event recovery plan documents, one or more incorporation of lessons learned in issue recovery plans documents, one or more recovery strategy update documents, one or more verification documents, one or more public relations management documents, one or more after event reputation repair management documents, and one or more recovery activity communication documents.

The data 600 may further include one or more during and/or after event recovery plan certifications, one or more incorporation of lessons learned in issue recovery plans certifications, one or more recovery strategy update certifications, one or more verification certifications, one or more public relations management certifications, one or more after event reputation repair management certifications, and one or more recovery activity communication certifications.

The data 600 may further include one or more during and/or after event recovery plan automations, one or more incorporation of lessons learned in issue recovery plans automations, one or more recovery strategy update automations, one or more verification automations, one or more public relations management automations, one or more after event reputation repair management automations, and one or more recovery activity communication automations.

In this example the blue shaded boxes (e.g., during and/or after event recovery plan processes, incorporation of lessons learned in issue recovery plans processes, etc.) are data that is directly relevant to the process rating module 601. The light green shaded boxes (e.g., endpoint protection tools, network monitoring tools, etc.) are data that may be relevant to the process rating module 601. Implementations (e.g., during and/or after event recovery plan implementation, incorporation of lessons learned in issue recovery plan implementation, etc.) refer to how a particular process is performed within the system aspect. Other data (e.g., diagrams, reports, etc.) provides information regarding one or more of the processes, tools, and implementations. The data listed is exemplary and not intended to be an exhaustive list.

There may be overlap and/or redundancies with respect to the processes, tools, and implementations listed. For example, a security information event management (SIEM) tool may include a combination of tools such as log management, during and/or after event recovery plan execution, recovery activity communication etc. Tools may be shared across processes. For example, while endpoint protection tools are listed near during and/or after event recovery plan processes, several other processes may rely on endpoint protection tools such as recovery strategy update processes and verification processes.

In one embodiment, the process rating module 601 rates how well processes are used for identified tasks. For example, the process rating module 601 rates how well the during and/or after event recovery plan tools (e.g., including endpoint protection tools, log management tools, network monitoring tools, etc.) are used in accordance with the during and/or after event recovery plan processes.

In another embodiment, the process rating module 601 rates the consistency of application of processes in implementation. For example, the process rating module rates the consistency of use of the during and/or after event recovery plan processes to use the during and/or after event recovery plan tools in the during and/or after event recovery plan implementation (e.g., to execute event recovery plans within the system).

Figure 86:
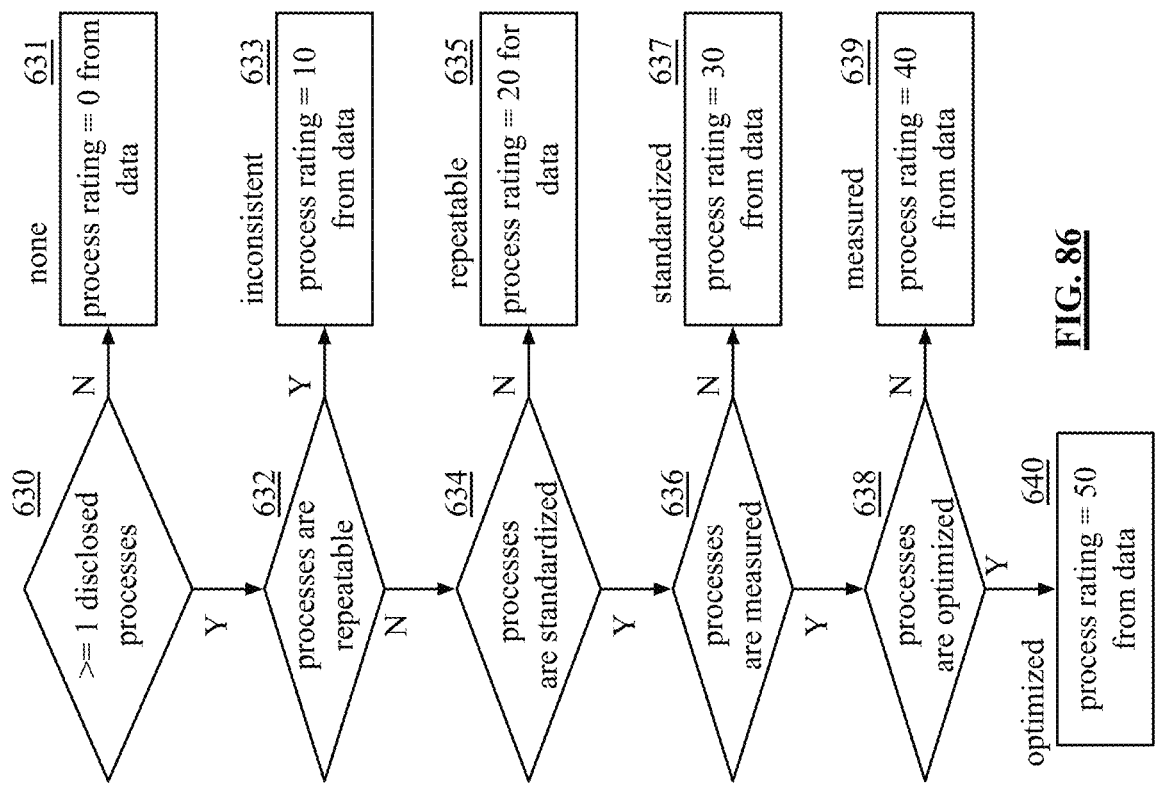
FIG. 86 is a logic diagram of an example of generating a process rating by the analysis system in accordance with the present disclosure.

FIG. 86 is a logic diagram of an example of generating a process rating by the analysis system; in particular the process rating module generating a process rating based on data. The method begins at step 620 where the analysis system determines whether there is at least one process in the collection of data. Note that the threshold number in this step could be greater than one. If there are no processes, the method continues at step 631 where the analysis system generates a process rating of 0 (and/or a word rating of "none").

If there is at least one process, the method continues at step 632 where the analysis system determines whether the processes are repeatable. In this instance, repeatable processes produce consistent results, include variations from process to process, are not routinely reviewed in an organized manner, and/or are not all regulated. For example, when the number of processes is below a desired number of processes, the analysis system determines that the processes are not repeatable (e.g., with too few processes cannot get repeatable outcomes). As another example, when the processes of the data 600 does not include one or more processes on a list of processes the system should have, the analysis system determines that the processes are not repeatable (e.g., with missing processes cannot get repeatable outcomes).

If the processes are not repeatable, the method continues at step 633 where the analysis system generates a process rating of 10 (and/or a word rating of "inconsistent"). If, however, the processes are at least repeatable, the method continues at step 634 where the analysis system determines whether the processes are standardized. In this instance, standardized includes repeatable plus there are no appreciable variations in the processes from process to process, and/or the processes are regulated.

If the processes are not standardized, the method continues at step 635 where the analysis system generates a process rating of 20 (and/or a word rating of "repeatable"). If, however, the processes are at least standardized, the method continues at step 636 where the analysis system determines whether the processes are measured. In this instance, measured includes standardized plus precise, exact, and/or calculated to specific needs, concerns, and/or functioning of the system.

If the processes are not measured, the method continues at step 637 where the analysis system generates a process rating of 30 (and/or a word rating of "standardized"). If, however, the processes are at least measured, the method continues at step 638 where the analysis system determines whether the processes are optimized. In this instance, optimized includes measured plus processes are up-to-date and/or process improvement assessed on a regular basis as part of system protocols.

If the processes are not optimized, the method continues at step 639 where the analysis system generates a process rating of 40 (and/or a word rating of "measured"). If the processes are optimized, the method continues at step 640 where the analysis system generates a process rating of 50 (and/or a word rating of "optimized"). Note that the numerical ratings are example values and could be other values. Further note that the number of level of process rating may be more or less than the six shown.

For this method, distinguishing between repeatable, standardized, measured, and optimized is interpretative based on the manner in which the data 600 was analyzed. As an example, weighting factors on certain types of analysis affect the level. As a specific example, weighting factors for analysis to determine last revisions of processes, age of last revisions, content verification of processes with respect to a checklist, balance of local processes and system-wide processes, topic verification of the processes with respect to desired topics, and/or process language evaluation will affect the resulting level.

Figure 87:
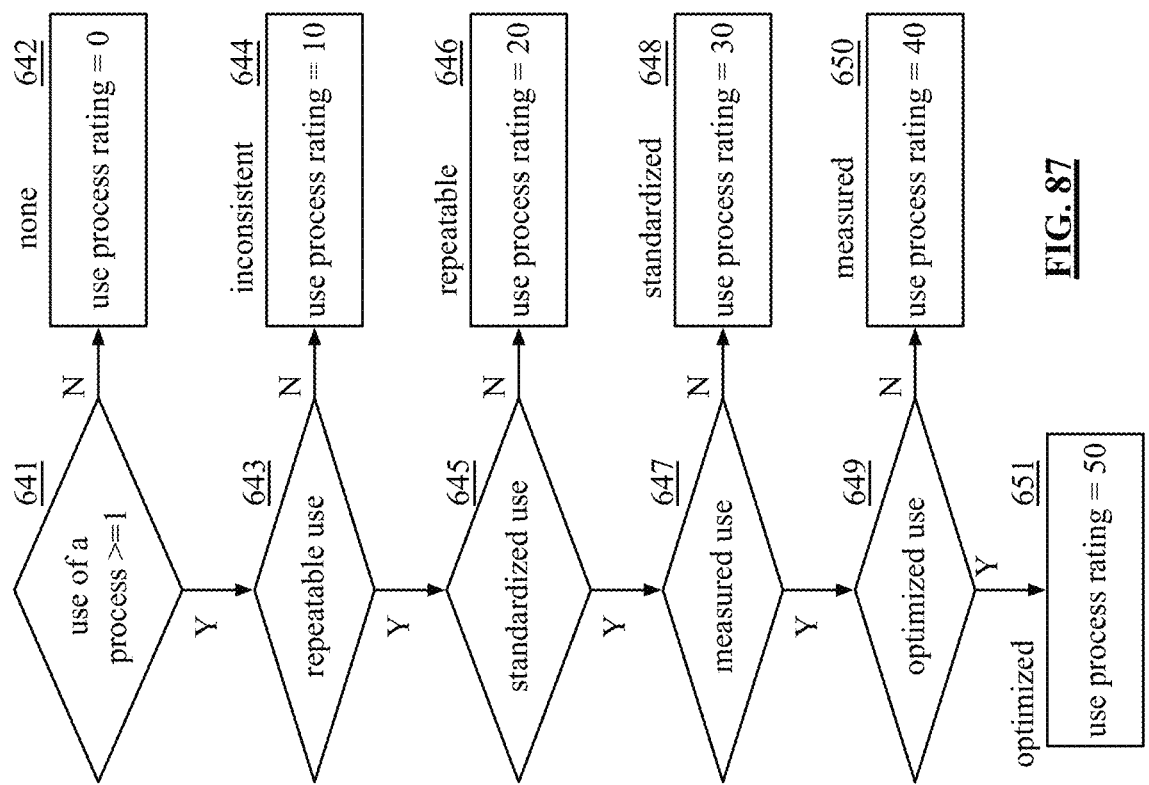
FIG. 87 is a logic diagram of an example of generating a process rating by the analysis system in accordance with the present disclosure.

FIG. 87 is a logic diagram of an example of generating a process rating by the analysis system; in particular the process rating module generating a process rating based on use of processes. The method begins at step 641 where the analysis system determines whether at least one process in the collection of data has been used. Note that the threshold number in this step could be greater than one. If no processes have been used, the method continues at step 642 where the analysis system generates a process rating of 0 (and/or a word rating of "none").

If at least one process is used, the method continues at step 643 where the analysis system determines whether the use of the processes is repeatable. In this instance, repeatable use of processes is consistent use, but with variations from process to process, use is not routinely reviewed or verified in an organized manner, and/or use is not regulated.

If the use of processes is not repeatable, the method continues at step 644 where the analysis system generates a process rating of 10 (and/or a word rating of "inconsistent"). If, however, the use of processes is at least repeatable, the method continues at step 645 where the analysis system determines whether the use of processes is standardized. In this instance, standardized includes repeatable plus there are no appreciable variations in the use of processes from process to process, and/or the use of processes is regulated.

If the use of processes is not standardized, the method continues at step 646 where the analysis system generates a process rating of 20 (and/or a word rating of "repeatable"). If, however, the use of processes is at least standardized, the method continues at step 647 where the analysis system determines whether the use of processes is measured. In this instance, measured includes standardized plus use is precise, exact, and/or calculated to specific needs, concerns, and/or functioning of the system.

If the use of processes is not measured, the method continues at step 648 where the analysis system generates a process rating of 30 (and/or a word rating of "standardized"). If, however, the use of processes is at least measured, the method continues at step 649 where the analysis system determines whether the use of processes is optimized. In this instance, optimized includes measured plus use of processes are up-to-date and/or improving use of processes is assessed on a regular basis as part of system protocols.

If the use of processes is not optimized, the method continues at step 650 where the analysis system generates a process rating of 40 (and/or a word rating of "measured"). If the use of processes is optimized, the method continues at step 651 where the analysis system generates a process rating of 50 (and/or a word rating of "optimized"). Note that the numerical ratings are example values and could be other values. Further note that the number of level of process rating may be more or less than the six shown.

Figure 88:
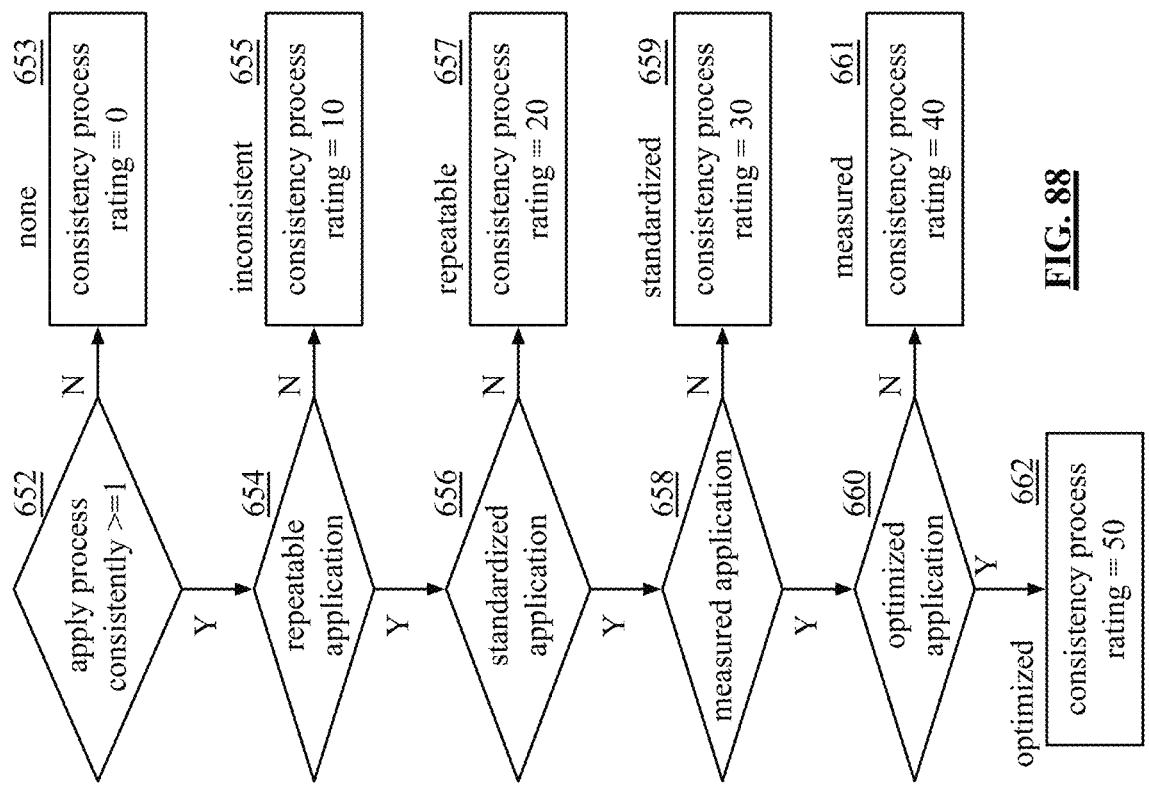
FIG. 88 is a logic diagram of an example of generating a process rating by the analysis system in accordance with the present disclosure.

FIG. 88 is a logic diagram of an example of generating a process rating by the analysis system; in particular the process rating module generating a process rating based on consistency of application of processes. The method begins at step 652 where the analysis system determines whether at least one process in the collection of data has been consistently applied. Note that the threshold number in this step could be greater than one. If there no processes have been consistently applied, the method continues at step 653 where the analysis system generates a process rating of 0 (and/or a word rating of "none").

If at least one process has been consistently applied, the method continues at step 654 where the analysis system determines whether the consistent application of processes is repeatable. In this instance, repeatable consistency of application of processes is a process is consistently applied for a given circumstance of the system (e.g., determining software applications for like devices in a department), but with variations from process to process, application of processes is not routinely reviewed or verified in an organized manner, and/or application of processes is not regulated.

If the consistency of application of processes is not repeatable, the method continues at step 655 where the analysis system generates a process rating of 10 (and/or a word rating of "inconsistent"). If, however, the consistency of application of processes is at least repeatable, the method continues at step 656 where the analysis system determines whether the consistency of application of processes is standardized. In this instance, standardized includes repeatable plus there are no appreciable variations in the application of processes from process to process, and/or the application of processes is regulated.

If the consistency of application of processes is not standardized, the method continues at step 657 where the analysis system generates a process rating of 20 (and/or a word rating of "repeatable"). If, however, the consistency of application of processes is at least standardized, the method continues at step 658 where the analysis system determines whether the consistency of application of processes is measured. In this instance, measured includes standardized plus application of processes is precise, exact, and/or calculated to specific needs, concerns, and/or functioning of the system.

If the consistency of application of processes is not measured, the method continues at step 659 where the analysis system generates a process rating of 30 (and/or a word rating of "standardized"). If, however, the consistency of application of processes is at least measured, the method continues at step 660 where the analysis system determines whether the consistency of application of processes is optimized. In this instance, optimized includes measured plus application of processes is up-to-date and/or improving application of processes is assessed on a regular basis as part of system protocols.

If the consistency of application of processes is not optimized, the method continues at step 661 where the analysis system generates a process rating of 40 (and/or a word rating of "measured"). If the consistency of application of processes is optimized, the method continues at step 662 where the analysis system generates a process rating of 50 (and/or a word rating of "optimized"). Note that the numerical ratings are example values and could be other values. Further note that the number of level of process rating may be more or less than the six shown.

FIG. 89 is a logic diagram of a further example of an analysis system determining an issue recovery rating for a system, or portion thereof; in particular generating a policy rating. The method begins at step 670 where the analysis system generates a first policy rating based on a first combination of a system criteria (e.g., system requirements), of a system mode (e.g., system functions), of an evaluation perspective (e.g., implementation), and of an evaluation viewpoint (e.g., disclosed data).

The method continues at step 671 where the analysis system generates a second policy rating based on a second combination of a system criteria (e.g., system design), of a system mode (e.g., system functions), of an evaluation perspective (e.g., implementation), and of an evaluation viewpoint (e.g., disclosed data). The method continues at step 672 where the analysis system generates the policy rating based on the first and second policy ratings.

FIG. 90 is a logic diagram of a further example of generating a policy rating for understanding of system build for issue recovery security functions of an organization. The method begins at step 673 where the analysis system identifies policies regarding issue recovery security functions from the data. The method continues at step 674 where the analysis system generates a policy rating from the data. Examples of this were discussed with reference to FIG. 80.

The method also continues at step 675 where the analysis system determines use of the policies for issue recovery. The method continues at step 676 where the analysis system generates a policy rating based on use. Examples of this were discussed with reference to FIG. 80.

The method also continues at step 677 where the analysis system determines consistency of applying the policies for issue recovery. The method continues at step 678 where the analysis system generates a policy rating based on consistency of use. Examples of this were discussed with reference to FIG. 80. The method continues at step 679 where the analysis system generates the policy rating based on the policy rating from the data, the policy rating based on use, and the policy rating based on consistency of use.

FIG. 91 is a logic diagram of a further example of generating a policy rating for understanding of verifying issue recovery security functions of an organization. The method begins at step 680 where the analysis system identifies policies to verify the issue recovery security functions from the data. The method continues at step 681 where the analysis system generates a policy rating from the data. Examples of this were discussed with reference to FIG. 80.

The method also continues at step 682 where the analysis system determines use of the policies to verify the issue recovery security functions. The method continues at step 683 where the analysis system generates a policy rating based on use of the verify policies. Examples of this were discussed with reference to FIG. 80.

The method also continues at step 684 where the analysis system determines consistency of applying the verifying policies to issue recovery security functions. The method continues at step 685 where the analysis system generates a policy rating based on consistency of use. Examples of this were discussed with reference to FIG. 80. The method continues at step 686 where the analysis system generates the policy rating based on the policy rating from the data, the policy rating based on use, and the policy rating based on consistency of use.

Figure 92:
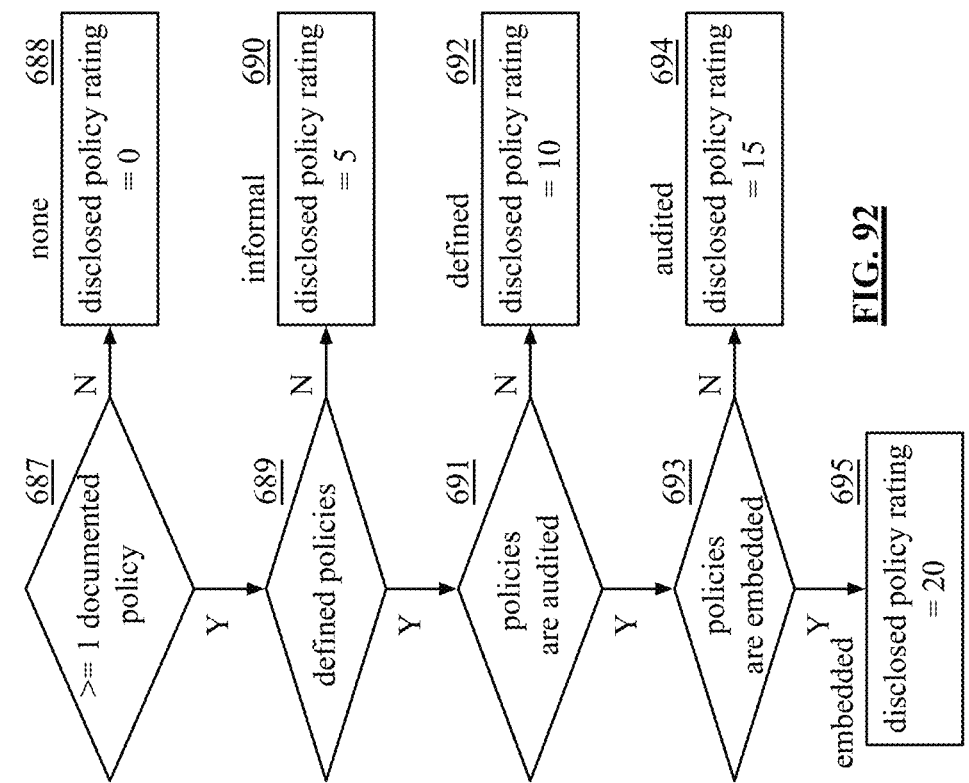
FIG. 92 is a logic diagram of an example of generating a policy rating by the analysis system in accordance with the present disclosure.

FIG. 92 is a logic diagram of an example of generating a policy rating by the analysis system; in particular the policy rating module generating a policy rating based on data 600. The method begins at step 687 where the analysis system determines whether there is at least one policy in the collection of data. Note that the threshold number in this step could be greater than one. If there are no policies, the method continues at step 688 where the analysis system generates a policy rating of 0 (and/or a word rating of "none").

If there is at least one policy, the method continues at step 689 where the analysis system determines whether the policies are defined. In this instance, defined policies include sufficient detail to produce consistent results, include variations from policy to policy, are not routinely reviewed in an organized manner, and/or are not all regulated. For example, when the number of policies is below a desired number of policies, the analysis system determines that the processes are not repeatable (e.g., with too few policies cannot get repeatable outcomes). As another example, when the policies of the data 600 does not include one or more policies on a list of policies the system should have, the analysis system determines that the policies are not repeatable (e.g., with missing policies cannot get repeatable outcomes).

If the policies are not defined, the method continues at step 690 where the analysis system generates a policy rating of 5 (and/or a word rating of "informal"). If, however, the policies are at least defined, the method continues at step 691 where the analysis system determines whether the policies are audited. In this instance, audited includes defined plus the policies are routinely reviewed, and/or the policies are regulated.

If the policies are not audited, the method continues at step 692 where the analysis system generates a policy rating of 10 (and/or a word rating of "defined"). If, however, the policies are at least audited, the method continues at step 693 where the analysis system determines whether the policies are embedded. In this instance, embedded includes audited plus are systematically rooted in most, if not all, aspects of the system.

If the policies are not embedded, the method continues at step 694 where the analysis system generates a policy rating of 15 (and/or a word rating of "audited"). If the policies are embedded, the method continues at step 695 where the analysis system generates a policy rating of 20 (and/or a word rating of "embedded"). Note that the numerical ratings are example values and could be other values. Further note that the number of level of policy rating may be more or less than the five shown.

For this method, distinguishing between defined, audited, and embedded is interpretative based on the manner in which the data 600 was analyzed. As an example, weighting factors on certain types of analysis affect the level. As a specific example, weighting factors for analysis to determine last revisions of policies, age of last revisions, content verification of policies with respect to a checklist, balance of local policies and system-wide policies, topic verification of the policies with respect to desired topics, and/or policy language evaluation will affect the resulting level.

Figure 93:
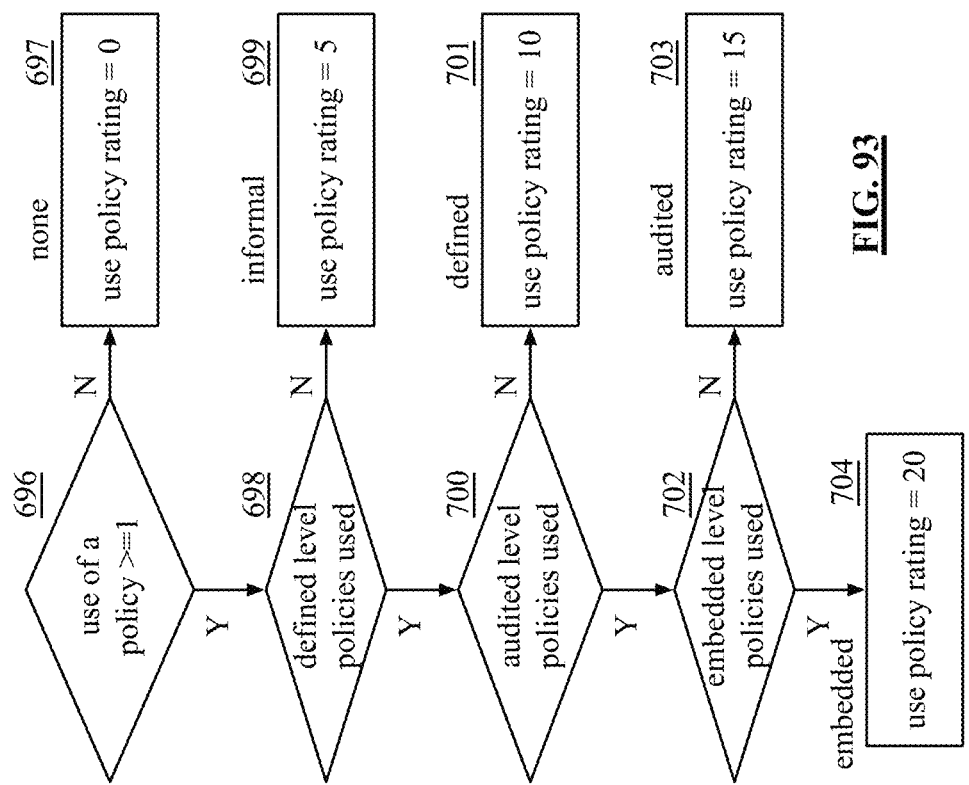
FIG. 93 is a logic diagram of an example of generating a policy rating by the analysis system in accordance with the present disclosure.

FIG. 93 is a logic diagram of an example of generating a policy rating by the analysis system; in particular the policy rating module generating a policy rating based on use of the polices. The method begins at step 696 where the analysis system determines whether there is at least one use of a policy. Note that the threshold number in this step could be greater than one. If there are no uses of policies, the method continues at step 697 where the analysis system generates a policy rating of 0 (and/or a word rating of "none").

If there is at least one use of a policy, the method continues at step 698 where the analysis system determines whether the use of policies is defined. In this instance, defined use of policies include sufficient detail on how and/or when to use a policy, include variations in use from policy to policy, use of policies is not routinely reviewed in an organized manner, and/or use of policies is not regulated.

If the use of policies is not defined, the method continues at step 699 where the analysis system generates a policy rating of 5 (and/or a word rating of "informal"). If, however, the use of policies is at least defined, the method continues at step 700 where the analysis system determines whether the use of policies is audited. In this instance, audited includes defined plus the use of policies is routinely reviewed, and/or the use of policies is regulated.

If the use of policies is not audited, the method continues at step 701 where the analysis system generates a policy rating of 10 (and/or a word rating of "defined"). If, however, the use of policies is at least audited, the method continues at step 702 where the analysis system determines whether the use of policies is embedded. In this instance, embedded includes audited plus use of policies is systematically rooted in most, if not all, aspects of the system.

If the use of policies is not embedded, the method continues at step 703 where the analysis system generates a policy rating of 15 (and/or a word rating of "audited"). If the use of policies is embedded, the method continues at step 704 where the analysis system generates a policy rating of 20 (and/or a word rating of "embedded"). Note that the numerical ratings are example values and could be other values. Further note that the number of level of policy rating may be more or less than the five shown.

Figure 94:
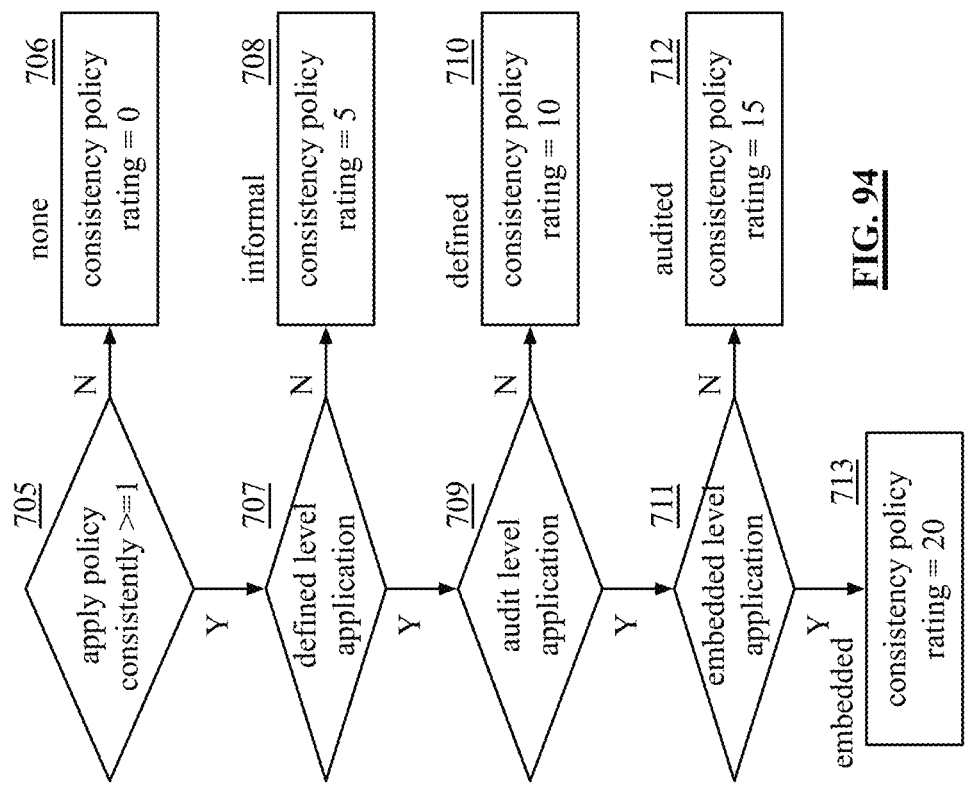
FIG. 94 is a logic diagram of an example of generating a policy rating by the analysis system in accordance with the present disclosure.

FIG. 94 is a logic diagram of an example of generating a policy rating by the analysis system; in particular the policy rating module generating a policy rating based on consistent application of polices. The method begins at step 705 where the analysis system determines whether there is at least one consistent application of a policy. Note that the threshold number in this step could be greater than one. If there are no consistent application of policies, the method continues at step 706 where the analysis system generates a policy rating of 0 (and/or a word rating of "none").

If there is at least one consistent application of a policy, the method continues at step 707 where the analysis system determines whether the consistent application of policies is defined. In this instance, defined application of policies include sufficient detail on when policies apply, includes application variations from policy to policy, application of policies is not routinely reviewed in an organized manner, and/or application of policies is not regulated.

If the application of policies is not defined, the method continues at step 708 where the analysis system generates a policy rating of 5 (and/or a word rating of "informal"). If, however, the application of policies is at least defined, the method continues at step 707 where the analysis system determines whether the application of policies is audited. In this instance, audited includes defined plus the application of policies is routinely reviewed, and/or the application of policies is regulated.

If the application of policies is not audited, the method continues at step 710 where the analysis system generates a policy rating of 10 (and/or a word rating of "defined"). If, however, the application of policies is at least audited, the method continues at step 711 where the analysis system determines whether the application of policies is embedded. In this instance, embedded includes audited plus application of policies is systematically rooted in most, if not all, aspects of the system.

If the application of policies is not embedded, the method continues at step 712 where the analysis system generates a policy rating of 15 (and/or a word rating of "audited"). If the application of policies is embedded, the method continues at step 713 where the analysis system generates a policy rating of 20 (and/or a word rating of "embedded"). Note that the numerical ratings are example values and could be other values. Further note that the number of level of policies may be more or less than the five shown.

FIG. 95 is a logic diagram of a further example of an analysis system determining an issue recovery rating for a system, or portion thereof; in particular generating a documentation rating. The method begins at step 720 where the analysis system generates a first documentation rating based on a first combination of a system criteria (e.g., system requirements), of a system mode (e.g., system functions), of an evaluation perspective (e.g., implementation), and of an evaluation viewpoint (e.g., disclosed data).

The method continues at step 721 where the analysis system generates a second documentation rating based on a second combination of a system criteria (e.g., system design), of a system mode (e.g., system functions), of an evaluation perspective (e.g., implementation), and of an evaluation viewpoint (e.g., disclosed data). The method continues at step 722 where the analysis system generates the documentation rating based on the first and second documentation ratings.

FIG. 96 is a logic diagram of a further example of generating a documentation rating for understanding of system build of issue recovery security functions of an organization. The method begins at step 723 where the analysis system identifies documentation regarding issue recovery security functions from the data. The method continues at step 724 where the analysis system generates a documentation rating from the data. Examples of this were discussed with reference to FIG. 80.

The method also continues at step 725 where the analysis system determines use of the documentation for issue recovery security functions. The method continues at step 726 where the analysis system generates a documentation rating based on use. Examples of this were discussed with reference to FIG. 80.

The method also continues at step 727 where the analysis system determines consistency of applying the documentation for issue recovery security functions. The method continues at step 728 where the analysis system generates a documentation rating based on consistency of use. Examples of this were discussed with reference to FIG. 81. The method continues at step 729 where the analysis system generates the documentation rating based on the documentation rating from the data, the documentation rating based on use, and the documentation rating based on consistency of use.

FIG. 97 is a logic diagram of a further example of generating a documentation rating for understanding of system build of issue recovery security functions of an organization. The method begins at step 730 where the analysis system identifies documentation to verify the issue recovery security functions from the data. The method continues at step 731 where the analysis system generates a documentation rating from the data. Examples of this were discussed with reference to FIG. 80.

The method also continues at step 732 where the analysis system determines use of the documentation to verify issue recovery security functions. The method continues at step 733 where the analysis system generates a documentation rating based on use of the verify documentation. Examples of this were discussed with reference to FIG. 80.

The method also continues at step 734 where the analysis system determines consistency of applying the verifying documentation for issue recovery security functions. The method continues at step 735 where the analysis system generates a documentation rating based on consistency of use. Examples of this were discussed with reference to FIG. 80. The method continues at step 736 where the analysis system generates the documentation rating based on the documentation rating from the data, the documentation rating based on use, and the documentation rating based on consistency of use.

Figure 98:
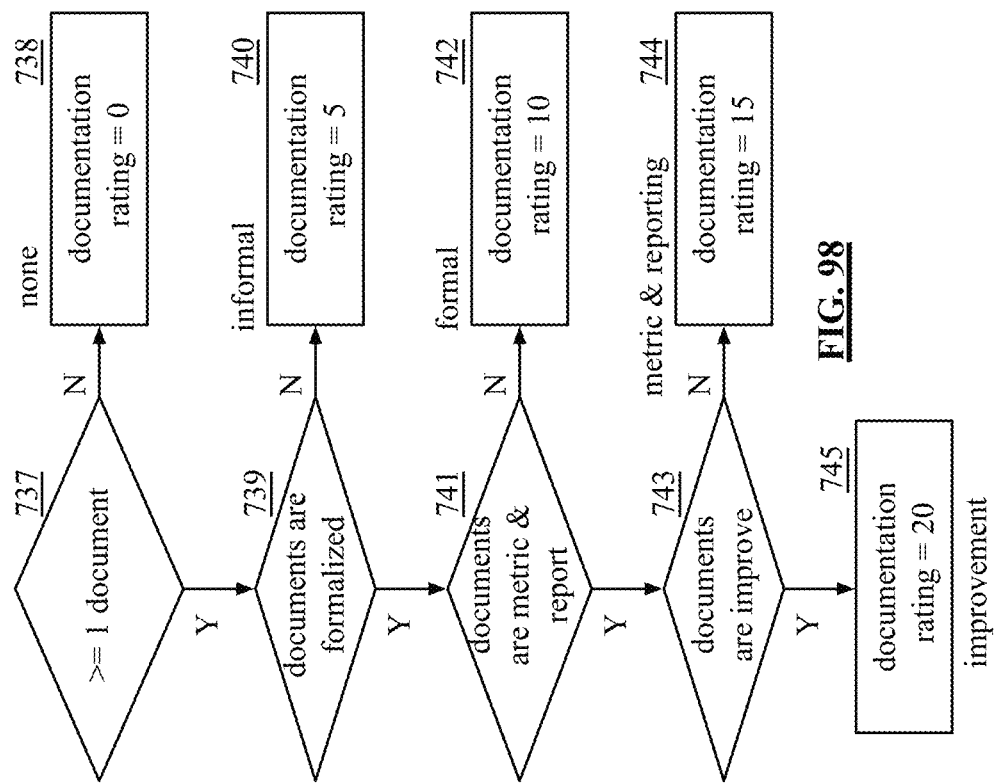
FIG. 98 is a logic diagram of an example of generating a documentation rating by the analysis system in accordance with the present disclosure.

FIG. 98 is a logic diagram of an example of generating a documentation rating by the analysis system; in particular the documentation rating module generating a documentation rating based on data 600. The method begins at step 737 where the analysis system determines whether there is at least one document in the collection of data. Note that the threshold number in this step could be greater than one. If there are no documents, the method continues at step 738 where the analysis system generates a documentation rating of 0 (and/or a word rating of "none").

If there is at least one document, the method continues at step 739 where the analysis system determines whether the documents are formalized. In this instance, formalized documents include sufficient detail to produce consistent documentation, include form variations from document to document, are not routinely reviewed in an organized manner, and/or formation of documents is not regulated.

If the documents are not formalized, the method continues at step 740 where the analysis system generates a documentation rating of 5 (and/or a word rating of "informal"). If, however, the documents are at least formalized, the method continues at step 741 where the analysis system determines whether the documents are metric & reporting. In this instance, metric & reporting includes formal plus the documents are routinely reviewed, and/or the formation of documents is regulated.

If the documents are not metric & reporting, the method continues at step 742 where the analysis system generates a documentation rating of 10 (and/or a word rating of "formal"). If, however, the documents are at least metric & reporting, the method continues at step 743 where the analysis system determines whether the documents are improved. In this instance, improve includes audited plus document formation is systematically rooted in most, if not all, aspects of the system.

If the documents are not improved, the method continues at step 744 where the analysis system generates a documentation rating of 15 (and/or a word rating of "metric & reporting"). If the documents are improved, the method continues at step 745 where the analysis system generates a documentation rating of 20 (and/or a word rating of "improvement"). Note that the numerical ratings are example values and could be other values. Further note that the number of level of documentation rating may be more or less than the five shown.

For this method, distinguishing between formalized, metric & reporting, and improvement is interpretative based on the manner in which the data 600 was analyzed. As an example, weighting factors on certain types of analysis affect the level. As a specific example, weighting factors for analysis to determine last revisions of documents, age of last revisions, content verification of documents with respect to a checklist, balance of local documents and system-wide documents, topic verification of the documents with respect to desired topics, and/or document language evaluation will affect the resulting level.

Figure 99:
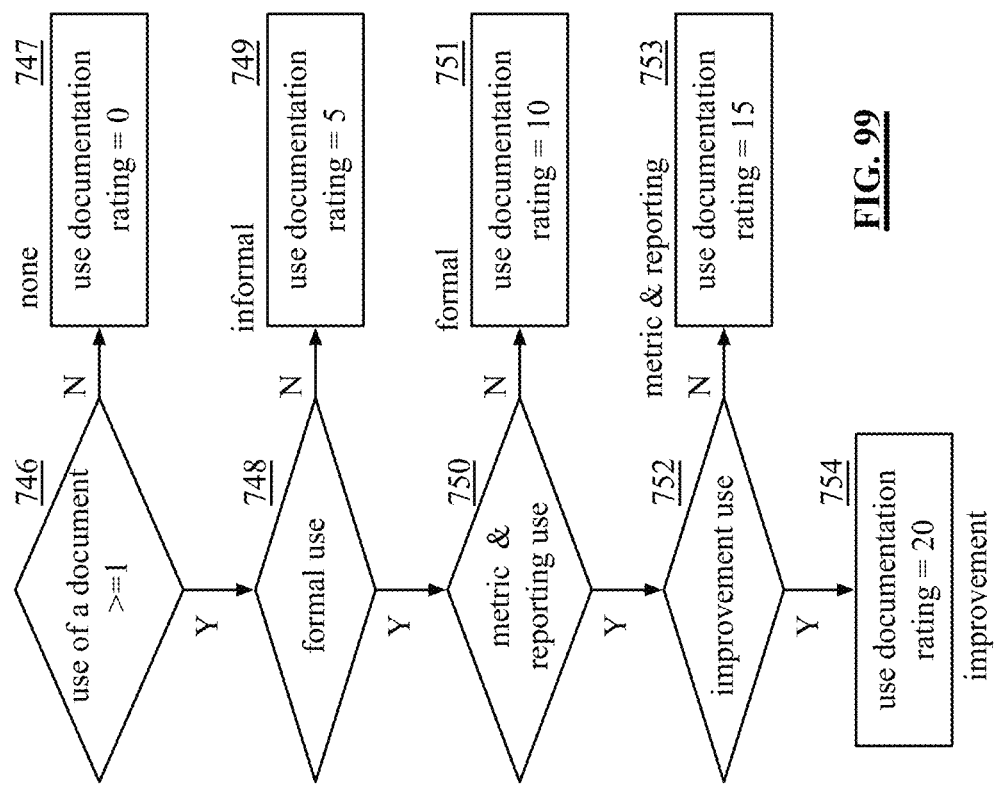
FIG. 99 is a logic diagram of an example of generating a documentation rating by the analysis system in accordance with the present disclosure.

FIG. 99 is a logic diagram of an example of generating a documentation rating by the analysis system; in particular the documentation rating module generating a documentation rating based on use of documents. The method begins at step 746 where the analysis system determines whether there is at least one use of a document. Note that the threshold number in this step could be greater than one. If there are no use of documents, the method continues at step 747 where the analysis system generates a documentation rating of 0 (and/or a word rating of "none").

If there is at least one use of a document, the method continues at step 748 where the analysis system determines whether the use of the documents is formalized In this instance, formalized use of documents include sufficient detail regarding how to use the documentation, include use variations from document to document, use of documents is not routinely reviewed in an organized manner, and/or use of documents is not regulated.

If the use of documents is not formalized, the method continues at step 749 where the analysis system generates a documentation rating of 5 (and/or a word rating of "informal"). If, however, the use of documents is at least formalized, the method continues at step 750 where the analysis system determines whether the use of the documents is metric & reporting. In this instance, metric & reporting includes formal plus use of documents is routinely reviewed, and/or the use of documents is regulated.

If the use of documents is not metric & reporting, the method continues at step 751 where the analysis system generates a documentation rating of 10 (and/or a word rating of "formal"). If, however, the use of documents is at least metric & reporting, the method continues at step 752 where the analysis system determines whether the use of documents is improved. In this instance, improve includes metric & reporting plus use of document is systematically rooted in most, if not all, aspects of the system.

If the use of documents is not improved, the method continues at step 753 where the analysis system generates a documentation rating of 15 (and/or a word rating of "metric & reporting"). If the use of documents is improved, the method continues at step 754 where the analysis system generates a documentation rating of 20 (and/or a word rating of "improvement"). Note that the numerical ratings are example values and could be other values. Further note that the number of level of documentation rating may be more or less than the five shown.

Figure 100:
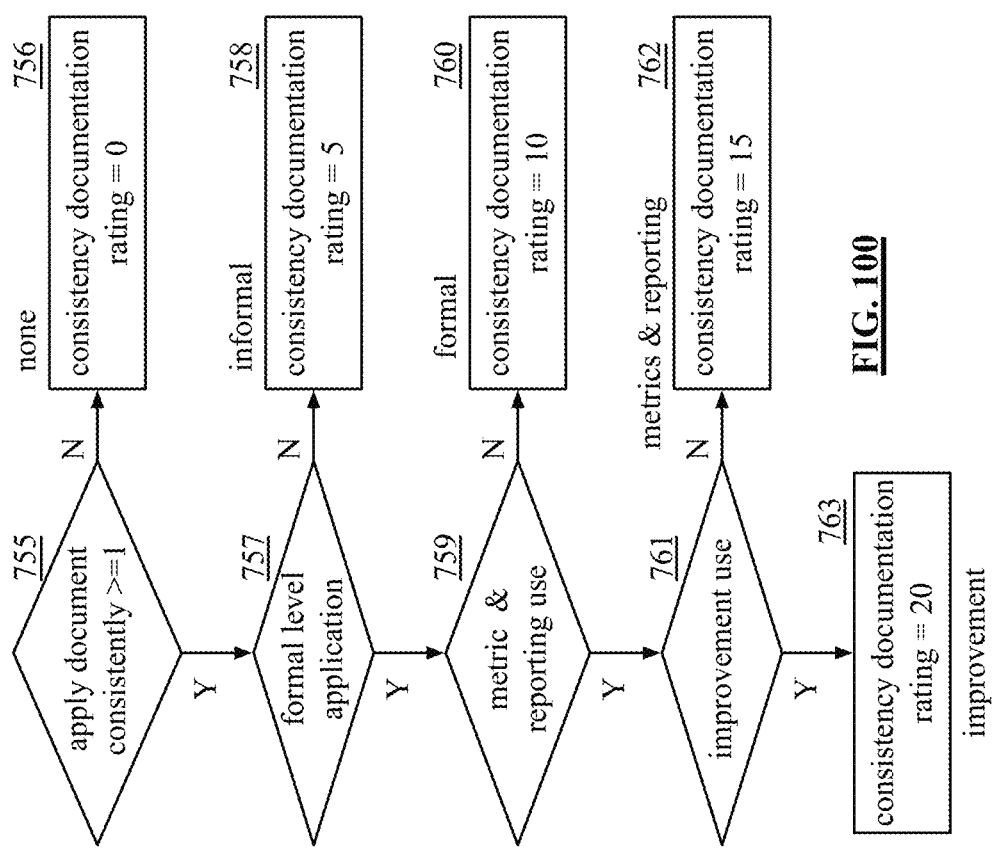
FIG. 100 is a logic diagram of an example of generating a documentation rating by the analysis system in accordance with the present disclosure.

FIG. 100 is a logic diagram of an example of generating a documentation rating by the analysis system; in particular the documentation rating module generating a documentation rating based on application of documents. The method begins at step 755 where the analysis system determines whether there is at least one application of a document. Note that the threshold number in this step could be greater than one. If there are no applications of documents, the method continues at step 756 where the analysis system generates a documentation rating of 0 (and/or a word rating of "none").

If there is at least one application of a document, the method continues at step 757 where the analysis system determines whether the application of the documents is formalized. In this instance, formalized application of documents include sufficient detail regarding how to apply the documentation, include application variations from document to document, application of documents is not routinely reviewed in an organized manner, and/or application of documents is not regulated.

If the application of documents is not formalized, the method continues at step 758 where the analysis system generates a documentation rating of 5 (and/or a word rating of "informal"). If, however, the application of documents is at least formalized, the method continues at step 759 where the analysis system determines whether the application of the documents is metric & reporting. In this instance, metric & reporting includes formal plus application of documents is routinely reviewed, and/or the application of documents is regulated.

If the application of documents is not metric & reporting, the method continues at step 760 where the analysis system generates a documentation rating of 10 (and/or a word rating of "formal"). If, however, the application of documents is at least metric & reporting, the method continues at step 761 where the analysis system determines whether the application of documents is improved. In this instance, improve includes metric & reporting plus use of document is systematically rooted in most, if not all, aspects of the system.

If the application of documents is not improved, the method continues at step 762 where the analysis system generates a documentation rating of 15 (and/or a word rating of "metric & reporting"). If the application of documents is improved, the method continues at step 763 where the analysis system generates a documentation rating of 20 (and/or a word rating of "improvement"). Note that the numerical ratings are example values and could be other values. Further note that the number of level of documentation may be more or less than the five shown.

Figure 101:
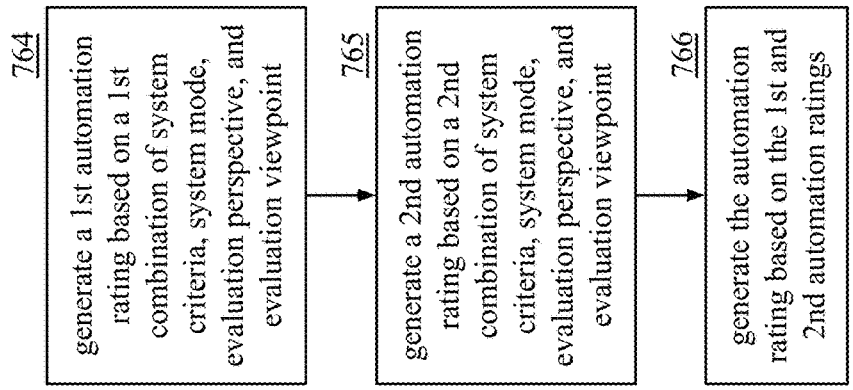
FIG. 101 is a logic diagram of a further example of an analysis system determining an issue recovery rating for a section of a system in accordance with the present disclosure.

FIG. 101 is a logic diagram of a further example of an analysis system determining an issue recovery rating for a system, or portion thereof; in particular generating an automation rating. The method begins at step 764 where the analysis system generates a first automation rating based on a first combination of a system criteria (e.g., system requirements), of a system mode (e.g., system functions), of an evaluation perspective (e.g., implementation), and of an evaluation viewpoint (e.g., disclosed data).

The method continues at step 765 where the analysis system generates a second automation rating based on a second combination of a system criteria (e.g., system design), of a system mode (e.g., system functions), of an evaluation perspective (e.g., implementation), and of an evaluation viewpoint (e.g., disclosed data). The method continues at step 766 where the analysis system generates the automation rating based on the first and second automation ratings.

Figure 102:
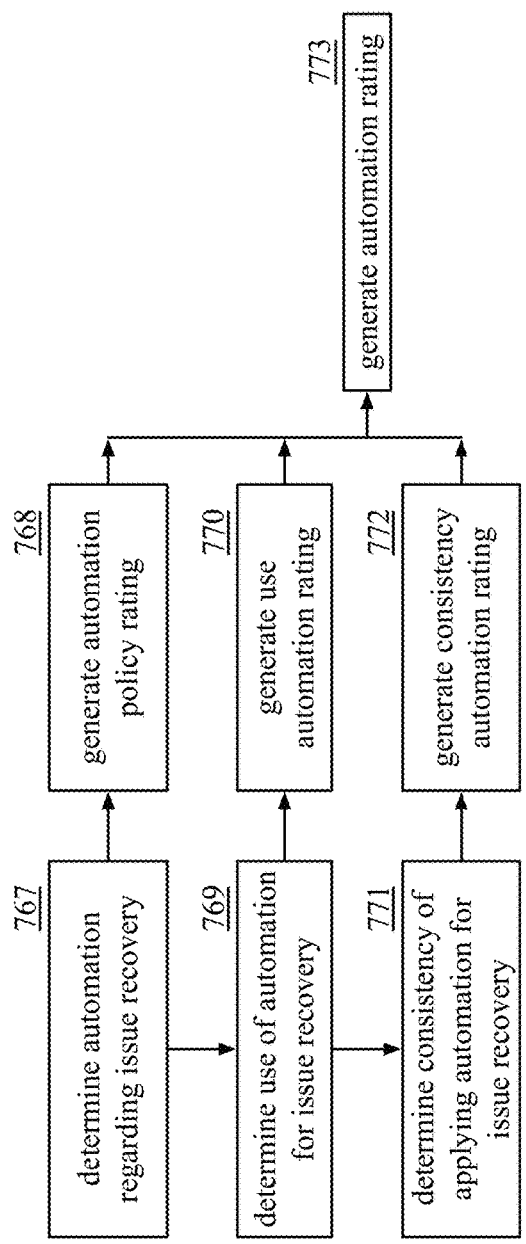
FIG. 102 is a logic diagram of a further example of generating an automation rating for understanding of system build of issue recovery security functions of an organization in accordance with the present disclosure.

FIG. 102 is a logic diagram of a further example of generating an automation rating for understanding of system build of issue recovery security functions of an organization. The method begins at step 767 where the analysis system identifies automation regarding issue recovery security functions from the data. The method continues at step 768 where the analysis system generates an automation rating from the data. Examples of this were discussed with reference to FIG. 80.

The method also continues at step 769 where the analysis system determines use of the automation for issue recovery security functions. The method continues at step 770 where the analysis system generates an automation rating based on use. Examples of this were discussed with reference to FIG. 80.

The method also continues at step 771 where the analysis system determines consistency of applying the automation for issue recovery security functions. The method continues at step 772 where the analysis system generates an automation rating based on consistency of use. Examples of this were discussed with reference to FIG. 80. The method continues at step 773 where the analysis system generates the automation rating based on the automation rating from the data, the automation rating based on use, and the automation rating based on application (i.e., consistency of use).

Figure 103:
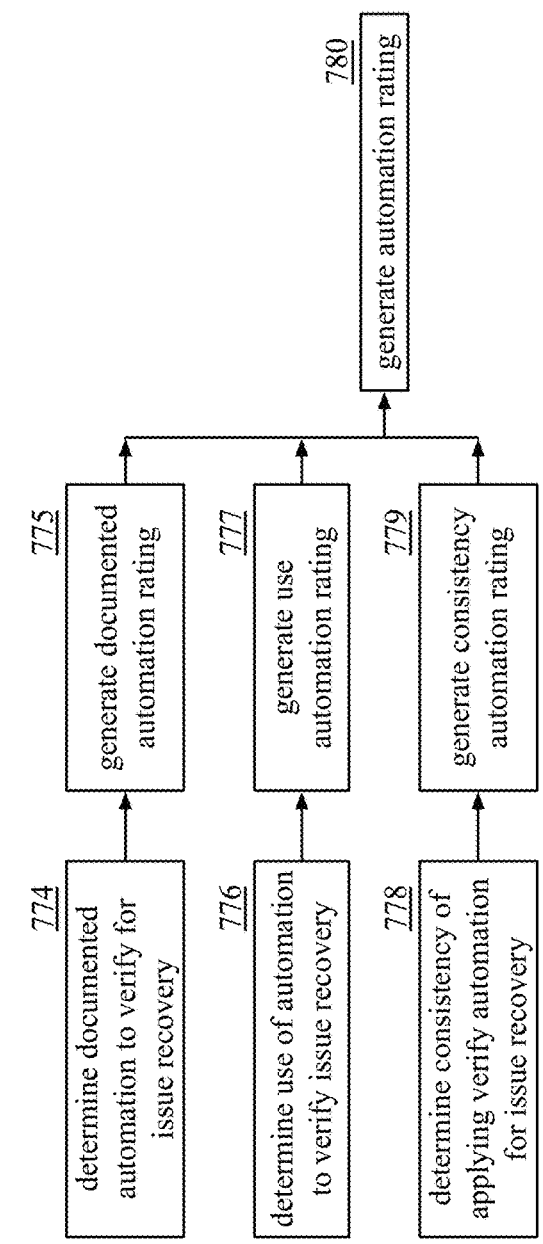
FIG. 103 is a logic diagram of a further example of generating an automation rating for understanding of system build of issue recovery security functions of an organization in accordance with the present disclosure.

FIG. 103 is a logic diagram of a further example of generating an automation rating for understanding of system build of issue recovery security functions of an organization. The method begins at step 774 where the analysis system identifies automation to verify issue recovery security functions from the data. The method continues at step 775 where the analysis system generates an automation rating from the data. Examples of this were discussed with reference to FIG. 80.

The method also continues at step 776 where the analysis system determines use of the automation for issue recovery security functions. The method continues at step 777 where the analysis system generates an automation rating based on use of the verify automation. Examples of this were discussed with reference to FIG. 80.

The method also continues at step 778 where the analysis system determines consistency of applying the verifying automation for issue recovery security functions. The method continues at step 779 where the analysis system generates an automation rating based on consistency of use. Examples of this were discussed with reference to FIG. 80. The method continues at step 780 where the analysis system generates the automation rating based on the automation rating from the data, the automation rating based on use, and the automation rating based on consistency of use.

Figure 104:
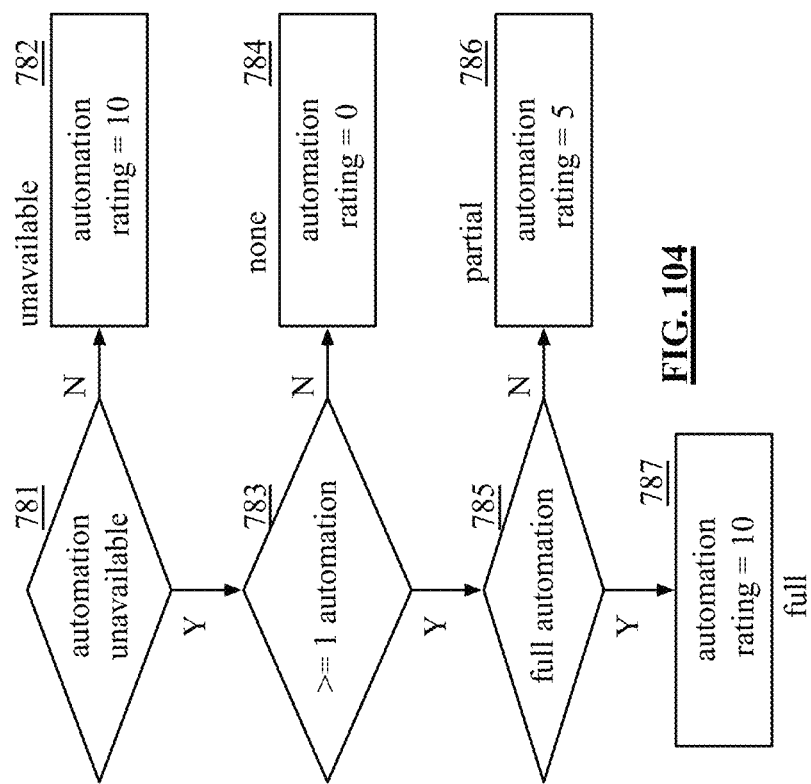
FIG. 104 is a logic diagram of an example of generating an automation rating by the analysis system in accordance with the present disclosure.

FIG. 104 is a logic diagram of an example of generating an automation rating by the analysis system; in particular the automation rating module generating an automation rating based on data 600. The method begins at step 781 where the analysis system determines whether there is available automation for a particular system aspect, system criteria, and/or system mode. If automation is not available, the method continues at step 782 where the analysis system generates an automation rating of 10 (and/or a word rating of "unavailable").

If automation is available, the method continues at step 783 where the analysis system determines whether there is at least one automation in the data. If not, the method continues at step 784 where the analysis system generates an automation rating of 0 (and/or a word rating of "none").

If there is at least one automation, the method continues at step 785 where the analysis system determines whether full automation is found in the data. In this instance, full automation refers to the automation techniques that are available for the system are in the data 600.

If the automation is not full, the method continues at step 786 where the analysis system generates an automation rating of 5 (and/or a word rating of "partial"). If, however, the automation is full, the method continues at step 787 where the analysis system generates an automation rating of 10 (and/or a word rating of "full"). Note that the numerical ratings are example values and could be other values. Further note that the number of level of automation may be more or less than the four shown.

Figure 105:
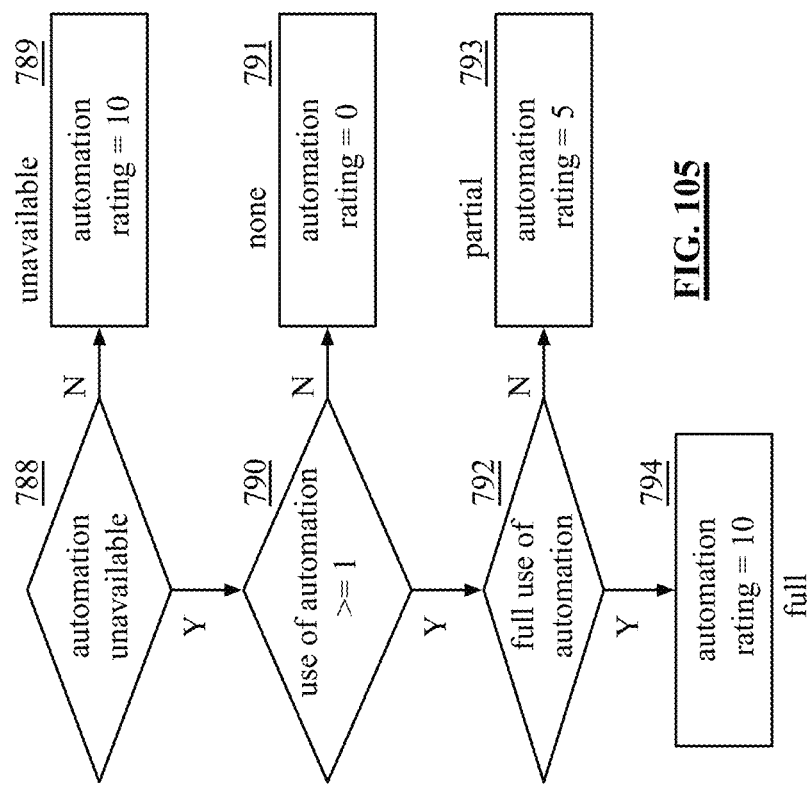
FIG. 105 is a logic diagram of an example of generating an automation rating by the analysis system in accordance with the present disclosure.

FIG. 105 is a logic diagram of an example of generating an automation rating by the analysis system; in particular the automation rating module generating an automation rating based on use. The method begins at step 788 where the analysis system determines whether there is available automation for a particular system aspect, system criteria, and/or system mode. If automation is not available, the method continues at step 789 where the analysis system generates an automation rating of 10 (and/or a word rating of "unavailable").

If automation is available, the method continues at step 790 where the analysis system determines whether there is at least one use of automation. If not, the method continues at step 791 where the analysis system generates an automation rating of 0 (and/or a word rating of "none").

If there is at least one use of automation, the method continues at step 792 where the analysis system determines whether automation is fully used. In this instance, full use of automation refers to the automation techniques that the system has are fully used.

If the use of automation is not full, the method continues at step 793 where the analysis system generates an automation rating of 5 (and/or a word rating of "partial"). If, however, the use of automation is full, the method continues at step 794 where the analysis system generates an automation rating of 10 (and/or a word rating of "full").

Figure 106:
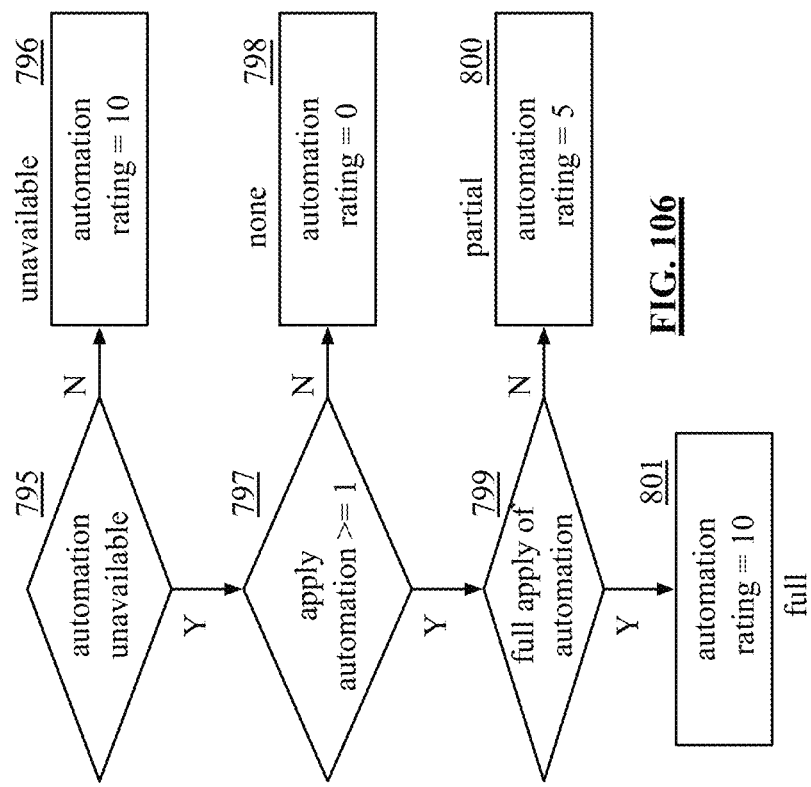
FIG. 106 is a logic diagram of an example of generating an automation rating by the analysis system in accordance with the present disclosure.

FIG. 106 is a logic diagram of an example of generating an automation rating by the analysis system; in particular the automation rating module generating an automation rating based on application of automation. The method begins at step 795 where the analysis system determines whether there is available automation for a particular system aspect, system criteria, and/or system mode. If automation is not available, the method continues at step 796 where the analysis system generates an automation rating of 10 (and/or a word rating of "unavailable").

If automation is available, the method continues at step 790 where the analysis system determines whether there is at least one application of automation. If not, the method continues at step 798 where the analysis system generates an automation rating of 0 (and/or a word rating of "none").

If there is at least one application of automation, the method continues at step 799 where the analysis system determines whether automation is fully applied. In this instance, full application of automation refers to the automation techniques of the system are applied to achieve consistent use.

If the application of automation is not full, the method continues at step 800 where the analysis system generates an automation rating of 5 (and/or a word rating of "partial"). If, however, the application of automation is full, the method continues at step 801 where the analysis system generates an automation rating of 10 (and/or a word rating of "full").

Figure 107:
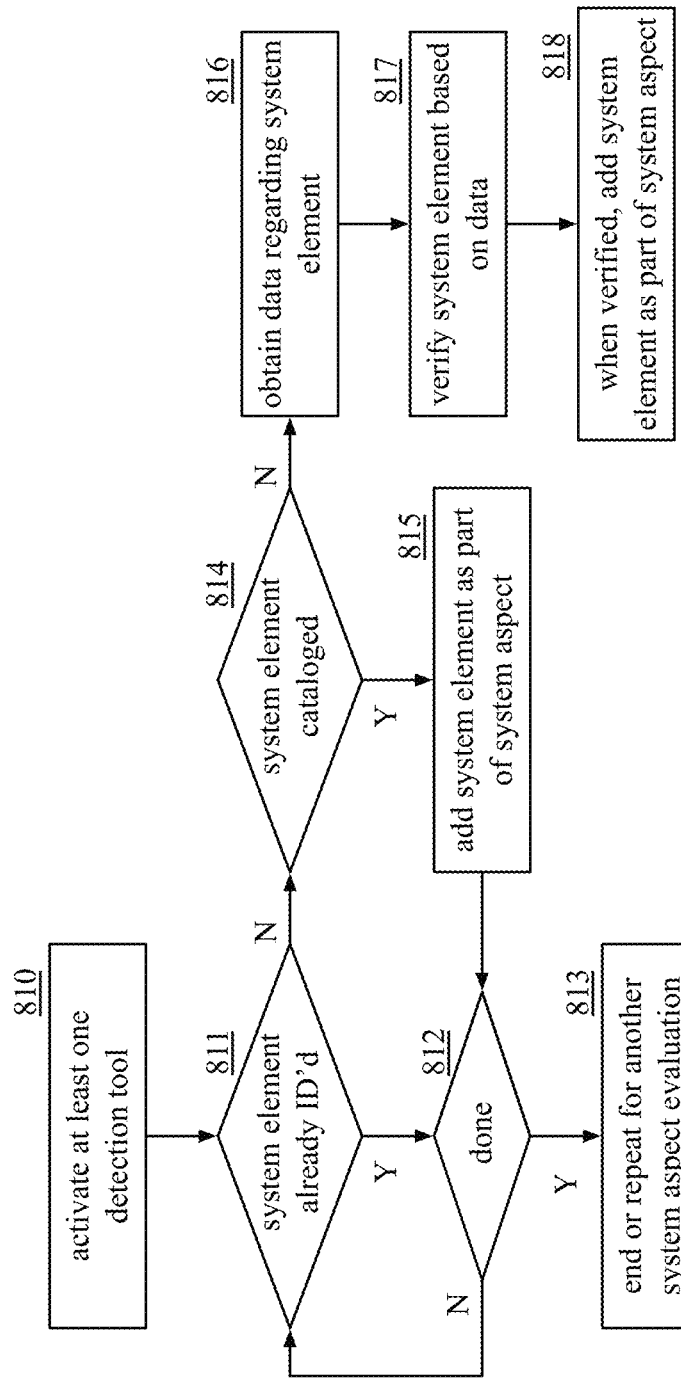
FIG. 107 is a logic diagram of a further example of an analysis system determining an issue recovery rating for a section of a system in accordance with the present disclosure.

FIG. 107 is a logic diagram of a further example of an analysis system determining an issue recovery rating for a system, or portion thereof; in particular the analysis system identifying system elements for use in the issue recovery evaluation. The method begins at step 810 where the analysis system activating at least one detection tool (e.g., cybersecurity tool, end point tool, network tool, IP address tool, hardware detection tool, software detection tool, etc.) based on the system aspect.

The method continues at step 811 where the analysis system determines whether an identified system element has already been identified for the system aspect (e.g., is already in the collection of data 600 and/or is part of the gathered data). If yes, the method continues at step 812 where the analysis system determines whether the identifying of system elements is done. If not, the method repeats at step 811. If the identifying of system elements is done, the method continues at step 813 where the analysis system determines whether to end the method or repeat it for another system aspect, or portion thereof.

If, at step 811, the identified system is element is not included in the collection of data, the method continues at step 814 where the analysis system determines whether the potential system element is already identified as being a part of the system aspect, but not included in the collection of data 600 (e.g., is it cataloged as being part of the system?). If yes, the method continues at step 815 where the analysis system adds the identified system element to the collection of data 600.

If, at step 814, the system element is not cataloged as being part of the system, the method continues at step 816 where the analysis system obtains data regarding the potential system element. For example, the analysis system obtains a device ID, a user ID, a device serial number, a device description, a software ID, a software serial number, a software description, vendor information and/or other data regarding the system element.

The method continues at step 816 where the analysis system verifies the potential system element based on the data. For example, the analysis system verifies one or more of a device ID, a user ID, a device serial number, a device description, a software ID, a software serial number, a software description, vendor information and/or other data regarding the system element to establish that the system element is a part of the system. When the potential system element is verified, the method continues at step 818 where the analysis system adds the system element as a part of the system aspect (e.g., catalogs it as part of the system and/or adds it to the collection of data 600).

Figure 108:
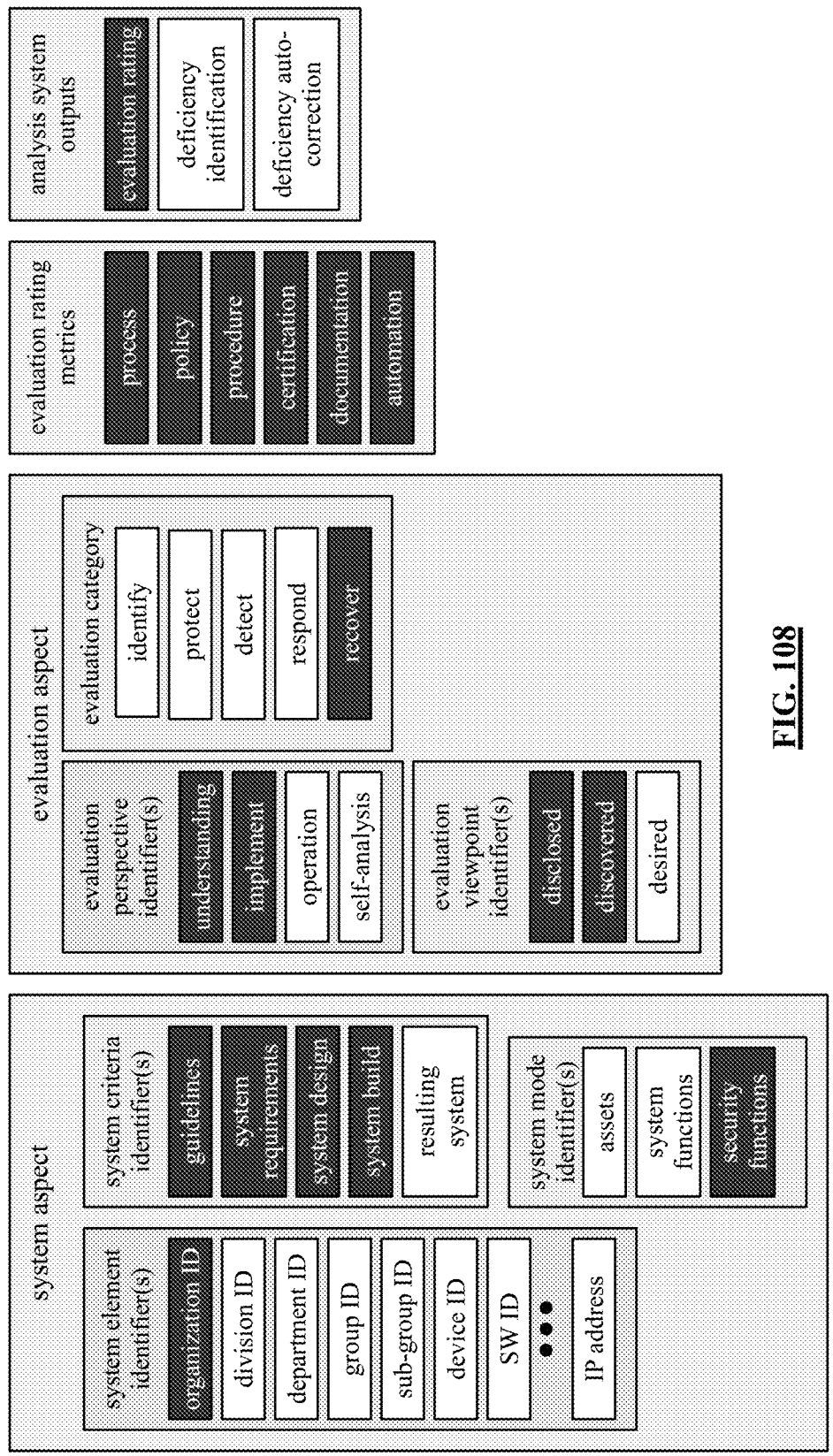
FIG. 108 is a diagram of another specific example of system aspects, evaluation aspects, evaluation rating metrics, and analysis system output options of an analysis system for generating an issue recovery rating for a section of a system in accordance with the present disclosure.

FIG. 108 is a diagram of an example of system aspects, evaluation aspects, evaluation rating metrics, and analysis system output options of an analysis system 11 for analyzing a system 11, or portion thereof. For instance, analysis system 11 is evaluating, with respect to process, policy, procedure, certification, documentation, and/or automation, the understanding and implementation of the guidelines, system requirements, system design, and/or system build for issue recovery security functions of an organization based on disclosed data and discovered data to produce an evaluation rating.

For this example, the analysis system 10 can generate one or a plurality of issue recovery evaluation ratings for implementation of the guidelines, system requirements, system design, and/or system build for issue recovery security functions of an organization based on disclosed data and discovered data in accordance with the evaluation rating metrics of process, policy, procedure, certification, documentation, and/or automation. A few, but far from exhaustive, examples are shown in FIGS. 111-115.

Figure 109:
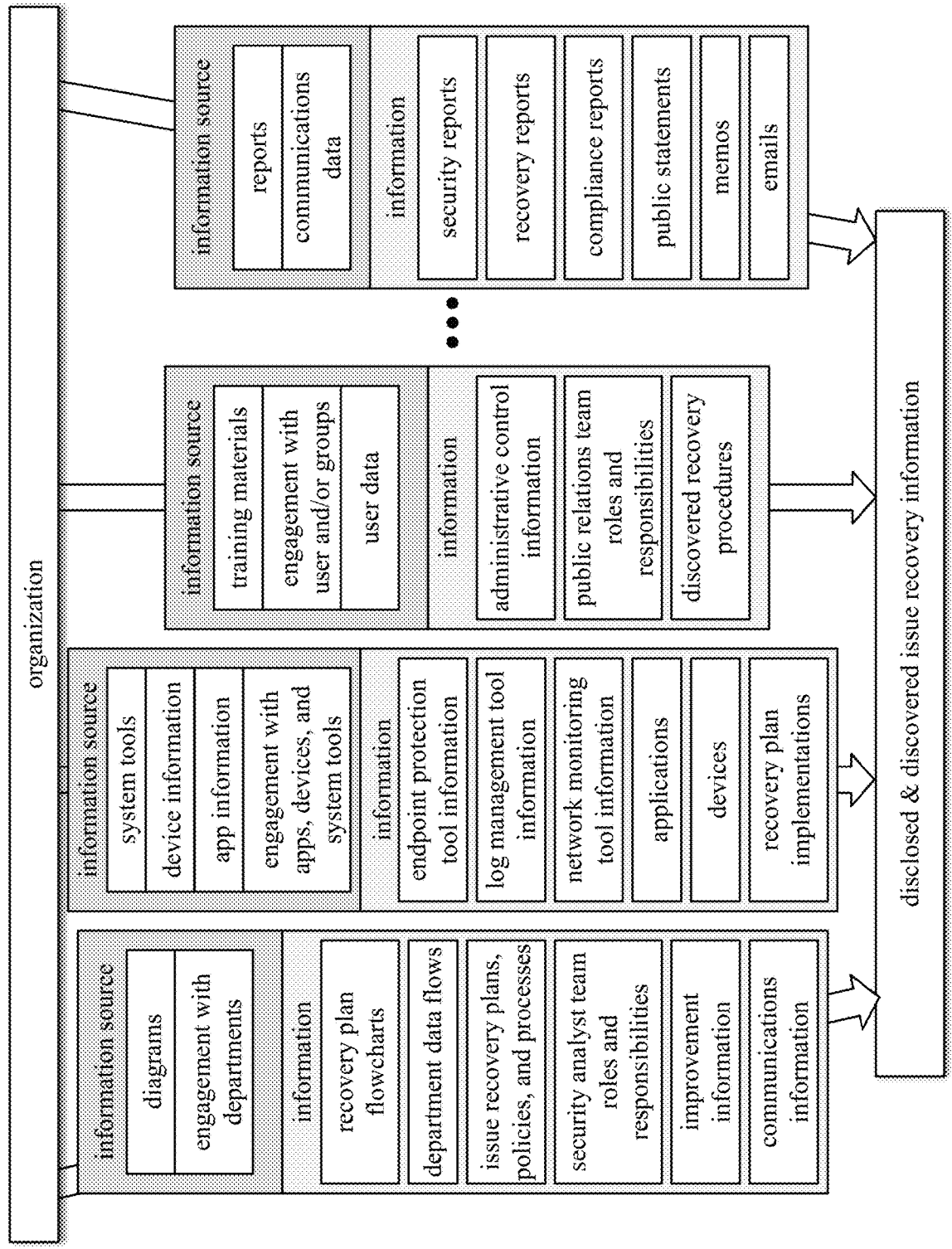
FIG. 109 is a diagram of another example of issue recovery data for use by an analysis system to generate an issue recovery rating for a section of a system in accordance with the present disclosure.

FIG. 109 is an example of issue recovery data for use by an analysis system to generate an issue recovery rating for a system, or portion thereof. FIG. 109 is similar to FIG. 77 except, in addition to disclosed information regarding system build of issue recovery security functions of an organization, here, the issue recovery information further includes discovered information regarding system build, system design, and implementation of issue recovery security functions of the organization. Discovered information is the information discovered about the system by the analysis system during the analysis.

The disclosed portion of the discovered and disclosed issue recovery information may include information obtained from the system security plan, disclosed diagrams, a list of system tools, disclosed device information, disclosed application information, disclosed user information, disclosed reports, and disclosed communications relevant to issue recovery as discussed with reference to FIG. 77.

The discovered portion of the of the discovered and disclosed issue recovery information is obtained from analyzing at least a portion of the disclosed information and from engagement with system devices, applications, networks, system tools, one or more departments (e.g., the IT department), one or more groups (e.g., the security analyst team), one or more users, etc.

For example, by engaging with the security analyst team of the IT department, the analysis system develops further understanding of recovery plan processes, IT department data flows, security analyst personnel roles and responsibilities, and any additional information related to issue recovery processes, policies, procedures, etc.

By engaging with various system tools, the analysis system can determine how well the system tools are working and if they are executing their intended purposes. For example, the analysis system can engage with the log management tool, gather logs from system components, and determine log management processes to assess the log management tool's capabilities. As an example, the analysis system may discover that the log management tool is not sending event alerts to the security analyst team in a timely manner making recovery times slow. As another example, the analysis system may discover that while the log management tool aggregates event data from various sources, the event analysis component of the log management tool is limited (e.g., the security analyst team is short staffed and unable to manage the data allowing system aspects to go too long without recovery). When the analysis system outputs include deficiency identification and/or auto-correction, the analysis system is operable to recommend or auto-install a SIEM tool or similar event aggregation and analysis tool to remedy the issue.

By engaging in a network analysis, the analysis system may discover devices connected to an organization's network that were not in the disclosed information. If the analysis system discovers network devices unknown to the organization, the analysis system may determine that the organization is vulnerable and unable to properly recover from security issues. By engaging with devices and/or applications of the organization, the analysis system is operable to analyze whether the devices have any hardware and/or software issues relevant to and/or necessary for issue recovery. For example, the analysis system may discover that one or more devices affected by a previous security incident were not properly remedied.

By engaging with various groups and users (e.g., discovered communications data such email content, memos, internal documents, text messages, etc.), etc., the analysis system develops an understanding of system data flow, network operations, personnel roles and responsibilities (e.g., public relations team roles and responsibilities), discovered administrative control information, and execution of disclosed issue recovery processes, policies, procedures, etc. For example, a disclosed issue recovery policy may require the security analyst team to alert the legal department when a system aspect is recovered. However, the analysis system discovers that there is no clear definition of what renders a system aspect recovered in the disclosed information and the issue recovery policy is flawed. Numerous other pieces of discovered and disclosed issue recovery information may be gathered from various information sources. The above examples are far from exhaustive.

Figure 110:
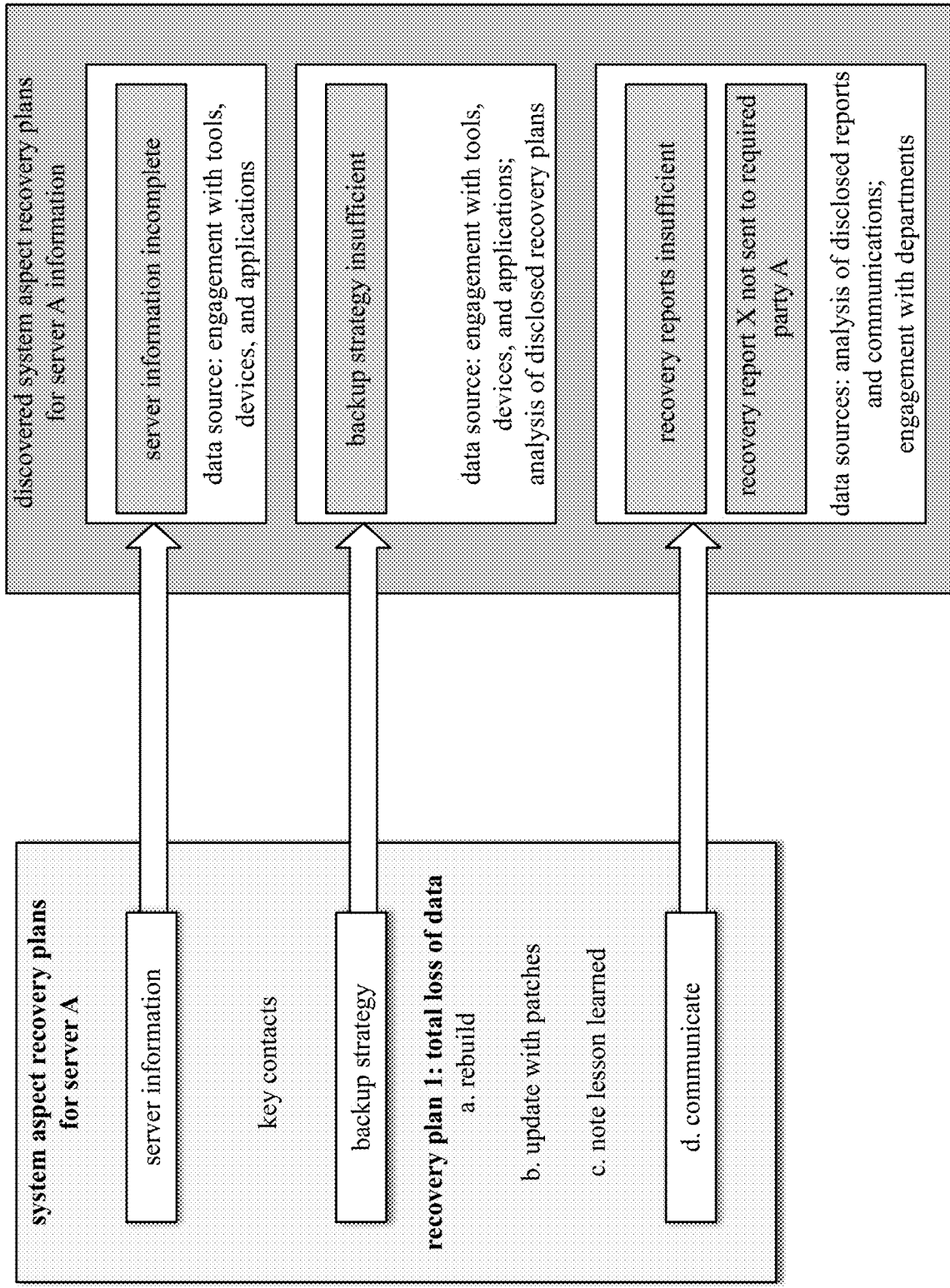
FIG. 110 is a diagram of another example of issue recovery data for use by an analysis system to generate an issue recovery rating for a section of a system in accordance with the present disclosure.

FIG. 110 is an example of issue recovery data for use by an analysis system to generate an issue recovery rating for a system, or portion thereof. As shown, FIG. 110 includes a disclosed system aspect recovery plans for a server A as described with reference to FIG. 78 as well as examples of discovered issue recovery information pertaining to the system aspect recovery plans for server A. The discovered system aspect recovery plans for server information includes a collection of information gathered from various sources of the organization and/or from an analysis of the disclosed issue recovery information.

For example, by engaging with system tools, networks, devices, and applications the analysis system discovers that the server information included in the recovery plan is incomplete. For example, the server information does not include available disk space or a full list of associated devices and/or applications that would be helpful in executing a recovery plan.

As another example, by engaging with system tools, devices, and applications and analyzing disclosed recovery plans and implementations, the analysis system determines that the server backup strategies are insufficient. For example, the server data backup is located in the same location as the server and there is only one backup source.

As another example, by analyzing one or more disclosed recovery reports and communications and by engaging with the departments, the analysis system discovers that the recovery plan communications are insufficient (e.g., in regard to details disclosed, parties involves, compliance requirements, etc.) and that a specific recovery report (e.g., recovery report X) was not sent to a required party (e.g., party A).

As depicted, the disclosed information extracted by the analysis system provides further insight into the organization's understanding and implementation of issue recovery security functions. The analysis system assesses this information as part of the organization's issue recovery rating and is further operable to make recommendations and remediations if desired.

Figure 111:
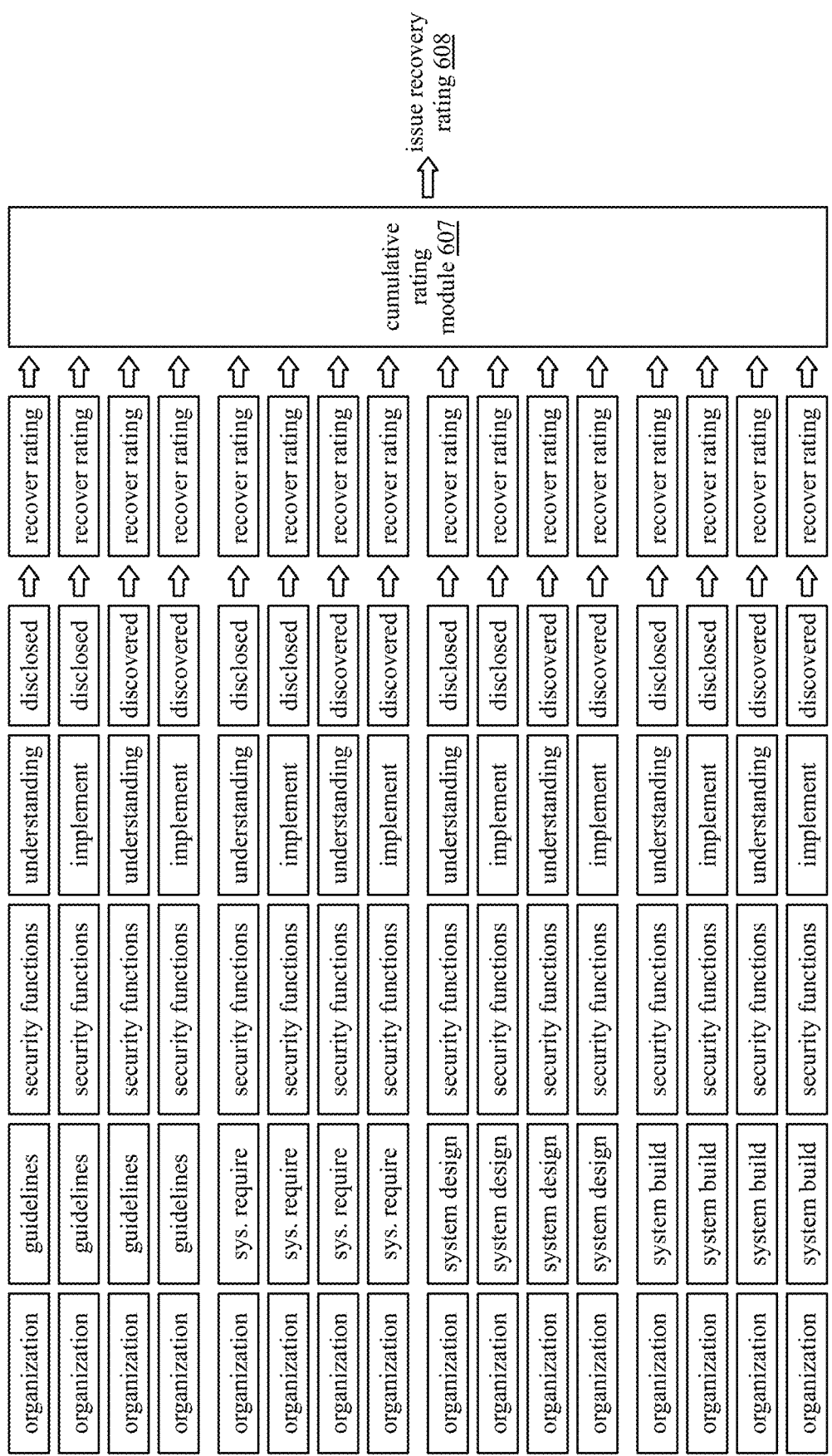
FIG. 111 is a diagram of an example of combining one or more individual issue recovery ratings into an issue recovery rating in accordance with the present disclosure.

FIG. 111 is a diagram of an example of producing a plurality of issue recovery ratings and combining them into one rating. In this example, sixteen individual ratings are generated and then, via the cumulative rating module 607, are combined into one issue recovery rating 608. A first individual issue recovery rating is generated from a combination of organization, guidelines, security functions, understanding, and disclosed data. A second individual issue recovery rating is generated from a combination of organization, guidelines, security functions, implementation, and disclosed data. A third individual issue recovery rating is generated from a combination of organization, guidelines, security functions, understanding, and discovered data. A fourth issue recovery rating is generated from a combination of organization, guidelines, security functions, implementation, and discovered data. The remaining twelve individual issue recovery ratings are generated from the combinations shown.

Figure 112:
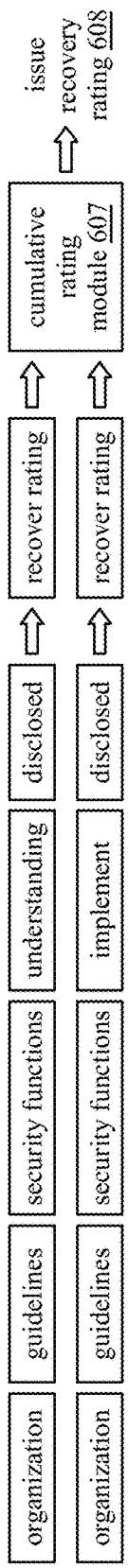
FIG. 112 is a diagram of another example of combining one or more individual issue recovery ratings into an issue recovery rating in accordance with the present disclosure.

FIG. 112 is a diagram of another example of producing a plurality of issue recovery ratings and combining them into one rating. In this example, two individual ratings are generated and then, via the cumulative rating module 607, are combined into one issue recovery rating 608. A first individual issue recovery rating is generated from a combination of organization, guidelines, security functions, understanding, and disclosed data. A second individual issue recovery rating is generated from a combination of organization, guidelines, security functions, implementation, and disclosed data. This allows for a comparison between the understanding of the issue recovery security functions of the organization from the guidelines of the disclosed data and the implementation of the issue recovery security functions of the organization from the guidelines of the disclosed data. This comparison provides a metric for determining how well the guidelines were understood and how well they were used and/or applied.

Figure 113:
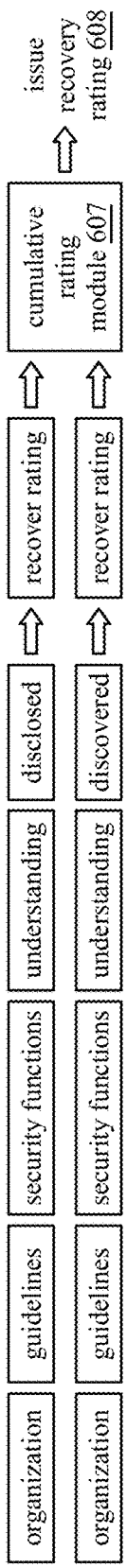
FIG. 113 is a diagram of another example of combining one or more individual issue recovery ratings into an issue recovery rating in accordance with the present disclosure.

FIG. 113 is a diagram of another example of producing a plurality of issue recovery ratings and combining them into one rating. In this example, two individual ratings are generated and then, via the cumulative rating module 607, are combined into one issue recovery rating 608. A first individual issue recovery rating is generated from a combination of organization, guidelines, security functions, understanding, and disclosed data. A second individual issue recovery rating is generated from a combination of organization, guidelines, security functions, understanding, and discovered data. This allows for a comparison between the understanding of the issue recovery security functions of the organization from the guidelines of the disclosed data and the understanding of the issue recovery security functions of the organization from the guidelines of the discovered data. This comparison provides a metric for determining how well the guidelines were believed to be understood and how well they were actually understood.

Figure 114:
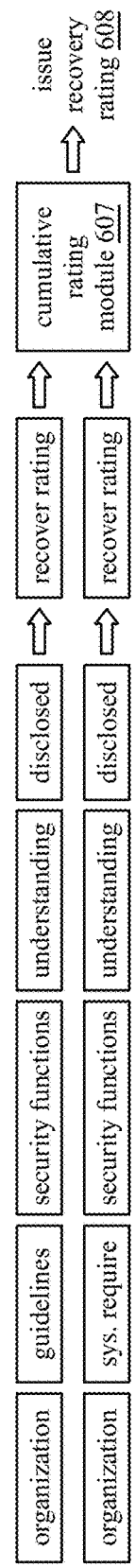
FIG. 114 is a diagram of another example of combining one or more individual issue recovery ratings into an issue recovery rating in accordance with the present disclosure.

FIG. 114 is a diagram of another example of producing a plurality of issue recovery ratings and combining them into one rating. In this example, two individual ratings are generated and then, via the cumulative rating module 607, are combined into one issue recovery rating 608. A first individual issue recovery rating is generated from a combination of organization, guidelines, security functions, understanding, and disclosed data. A second individual issue recovery rating is generated from a combination of organization, system requirements, security functions, understanding, and disclosed data. This allows for a comparison between the understanding of the issue recovery security functions of the organization from the guidelines of the disclosed data and the understanding of the issue recovery security functions of the organization from the system requirements of the disclosed data. This comparison provides a metric for determining how well the guidelines were converted into the system requirements.

Figure 115:
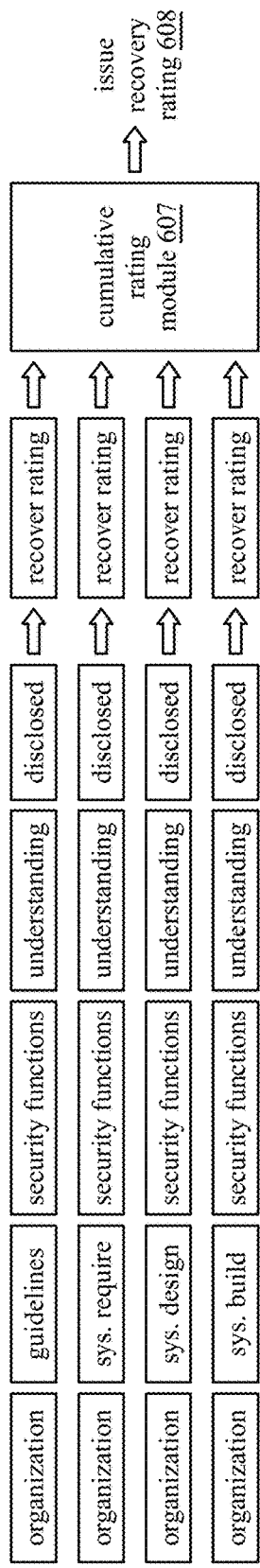
FIG. 115 is a diagram of another example of combining one or more individual issue recovery ratings into an issue recovery rating in accordance with the present disclosure.

FIG. 115 is a diagram of another example of producing a plurality of issue recovery ratings and combining them into one rating. In this example, four individual ratings are generated and then, via the cumulative rating module 607, are combined into one issue recovery rating 608. A first individual issue recovery rating is generated from a combination of organization, guidelines, security functions, understanding, and disclosed data. A second individual issue recovery rating is generated from a combination of organization, system requirements, security functions, understanding, and disclosed data. A third individual issue recovery rating is generated from a combination of organization, system design, security functions, understanding, and disclosed data. A fourth individual issue recovery rating is generated from a combination of organization, system build, security functions, understanding, and disclosed data.

This allows for a comparison between the understanding of the issue recovery security functions of the organization from the guidelines of the disclosed data, the understanding of the issue recovery security functions of the organization from the system requirements of the disclosed data, the understanding of the issue recovery security functions of the organization from the system design of the disclosed data, and the understanding of the issue recovery security functions of the organization from the system build of the disclosed data. This comparison provides a metric for determining how well the guidelines, system requirements, system design, and/or system build were understood with respect to each and how well they were used and/or applied.

FIG. 116 is a logic diagram of a further example of an analysis system determining an issue recovery rating for a system, or portion thereof, and determining deficiencies. The method includes one or more of steps 820-823. At step 820, the analysis system determines a system criteria deficiency (e.g., guidelines, system requirements, system design, system build, and/or resulting system) of the system aspect based on the issue recovery rating and the issue recovery data. Examples have been discussed with reference to one or more preceding figures.

At step 821, the analysis system determines a system mode deficiency (e.g., assets, system functions, and/or security functions) of the system aspect based on the issue recovery rating and the issue recovery data. At step 822, the analysis system determines an evaluation perspective deficiency (e.g., understanding, implementation, operation, and/or self-analysis) of the system aspect based on the issue recovery rating and the issue recovery data. At step 823, the analysis system determines an evaluation viewpoint deficiency (e.g., disclosed, discovered, and/or desired) of the system aspect based on the issue recovery rating and the issue recovery data. Examples have been discussed with reference to one or more preceding figures.

FIG. 117 is a logic diagram of a further example of an analysis system determining an issue recovery rating for a system, or portion thereof, and determining auto-corrections. The method begins at step 824 where the analysis system determines a deficiency of the system aspect based on the issue recovery rating and/or the issue recovery data as discussed with reference to FIG. 116. The method continues at step 825 where the analysis system determines whether the deficiency is auto-correctable. For example, is the deficiency regarding software and if so, can it be auto-corrected.

If the deficiency is not auto-correctable, the method continues at step 826 where the analysis system includes the identified deficiency in a report. If, however, the deficiency is auto-correctable, the method continues at step 827 where the analysis system auto-corrects the deficiency. The method continues at step 828 where the analysis system includes the identified deficiency and auto-correction in a report. Examples of auto-correction have been discussed with reference to one or more preceding Figures.

FIG. 118 is a logic diagram of another example of an analysis system determining an issue recovery rating for a system, or portion thereof. The method begins at step 830 where the analysis system selects a system, or portion thereof, to evaluate issue recovery of the system, or portion thereof, with respect to assets, system functions, and/or security functions. For example, the analysis system selects one or more system elements, one or more system criteria, and/or one or more system modes for the system, or portion thereof, to be evaluated. As another example, the analysis system selects one more evaluation perspective, one or more evaluation viewpoints, and/or respond as the for the evaluation category. The analysis system may further select one or more respond sub-categories and/or one or more sub-sub categories.

As another example of selecting the system or portion thereof, the analysis system selects the entire system (e.g., the organization/enterprise), selects a division of an organization operating the system, selects a department of a division, selects a group of a department, or selects a sub-group of a group. As another example selecting the system or portion thereof, the analysis system selects one or more physical assets and/or one or more conceptual assets.

The method continues at step 831 where the analysis system obtains issue recovery information regarding the system, or portion thereof. The issue recovery information includes information representative of an organization's understanding of issue recovery of the system, or portion thereof, with respect to the assets, the system functions, and/or the security functions. In an example, the analysis system obtains the issue recovery information (e.g., disclosed data from the system) by receiving it from a system admin computing entity. In another example, the analysis system obtains the issue recovery information by gathering it from one or more computing entities of the system.

The method continues at step 832 where the analysis system engages with the system, or portion thereof, to produce system issue recovery data (e.g., discovered data) regarding the system, or portion thereof, with respect to the assets, the system functions, and/or the security functions. Engaging the system, or portion thereof, will be discussed in greater detail with reference to FIG. 119.

The method continues at step 833 where the analysis system calculates an issue recovery rating regarding the issue recovery of the system, or portion thereof, based on the issue recovery information, the system issue recovery data, and issue recovery processes, issue recovery policies, issue recovery documentation, and/or issue recovery automation.

The issue recovery rating may be indicative of a variety of factors of the system, or portion thereof. For example, the issue recovery rating indicates how well the issue recovery information reflects an understanding of issue recovery with respect to security functions of the system, or portion thereof. As another example, the issue recovery rating indicates how well the issue recovery information reflects an understanding of issue recovery with respect to system functions of system, or portion thereof.

As another example, the issue recovery rating indicates how well the issue recovery information reflects an understanding of issue recovery with respect to assets the system, or portion thereof. As another example, the issue recovery rating indicates how well the issue recovery information reflects intended implementation of issue recovery with respect to assets of the system, or portion thereof. As another example, the issue recovery rating indicates how well the issue recovery information reflects intended operation of issue recovery with respect to assets of the system, or portion thereof.

As another example, the issue recovery rating indicates how well the issue recovery information reflects intended implementation of issue recovery with respect to system functions of the system, or portion thereof. As another example, the issue recovery rating indicates how well the issue recovery information reflects intended operation of issue recovery with respect to system functions of system, or portion thereof.

As another example, the issue recovery rating indicates how well the issue recovery information reflects intended implementation of issue recovery with respect to security functions of the system, or portion thereof. As another example, the issue recovery rating indicates how well the issue recovery information reflects intended operation of issue recovery with respect to security functions of the system, or portion thereof.

The method continues at step 834 where the analysis system gathers desired system issue recovery data from one or more system proficiency resources. The method continues at step 835 where the analysis system calculates a second issue recovery rating regarding a desired level of issue recovery of the system, or portion thereof, based on the issue recovery information, the issue recovery data, the desired issue recovery data, and the issue recovery processes, the issue recovery policies, the issue recovery documentation, and/or the issue recovery automation. The second issue recovery rating is regarding a comparison of desired data with the disclosed data and/or discovered data.

FIG. 119 is a logic diagram of a further example of an analysis system determining an issue recovery rating for system, or portion thereof; in particular engaging the system, or portion thereof to obtain data. The method begins at step 836 where the analysis system interprets the issue recovery information to identify components (e.g., computing device, HW, SW, server, etc.) of the system, or portion thereof. The method continues at step 837 where the analysis system queries a component regarding implementation, function, and/or operation of the component.

The method continues at step 838 where the analysis system evaluates a response from the component concurrence with a portion of the issue recovery information relevant to the component. The method continues at step 839 where the analysis system determines whether the response concurs with a portion of the issue recovery information. If the response concurs, the method continues at step 840 where the analysis system adds a data element (e.g., a record entry, a note, set a flag, etc.) to the system issue recovery data regarding the substantial concurrence of the response from the component with the portion of the issue recovery information relevant to the component.

If the response does not concur, the method continues at step 841 where the analysis system adds a data element (e.g., a record entry in a table, a note, set a flag, etc.) to the system issue recovery data regarding the response from the component not substantially concurring with the portion of the issue recovery information relevant to the component. The non-concurrence is indicative of a deviation in the implementation, function, and/or operation of the component as identified in the response from disclosed implementation, function, and/or operation of the component as contained in the issue recovery information. For example, the deviation is different HW, different SW, different network access, different data access, different data flow, coupled to different other components, and/or other differences.

Figure 120:
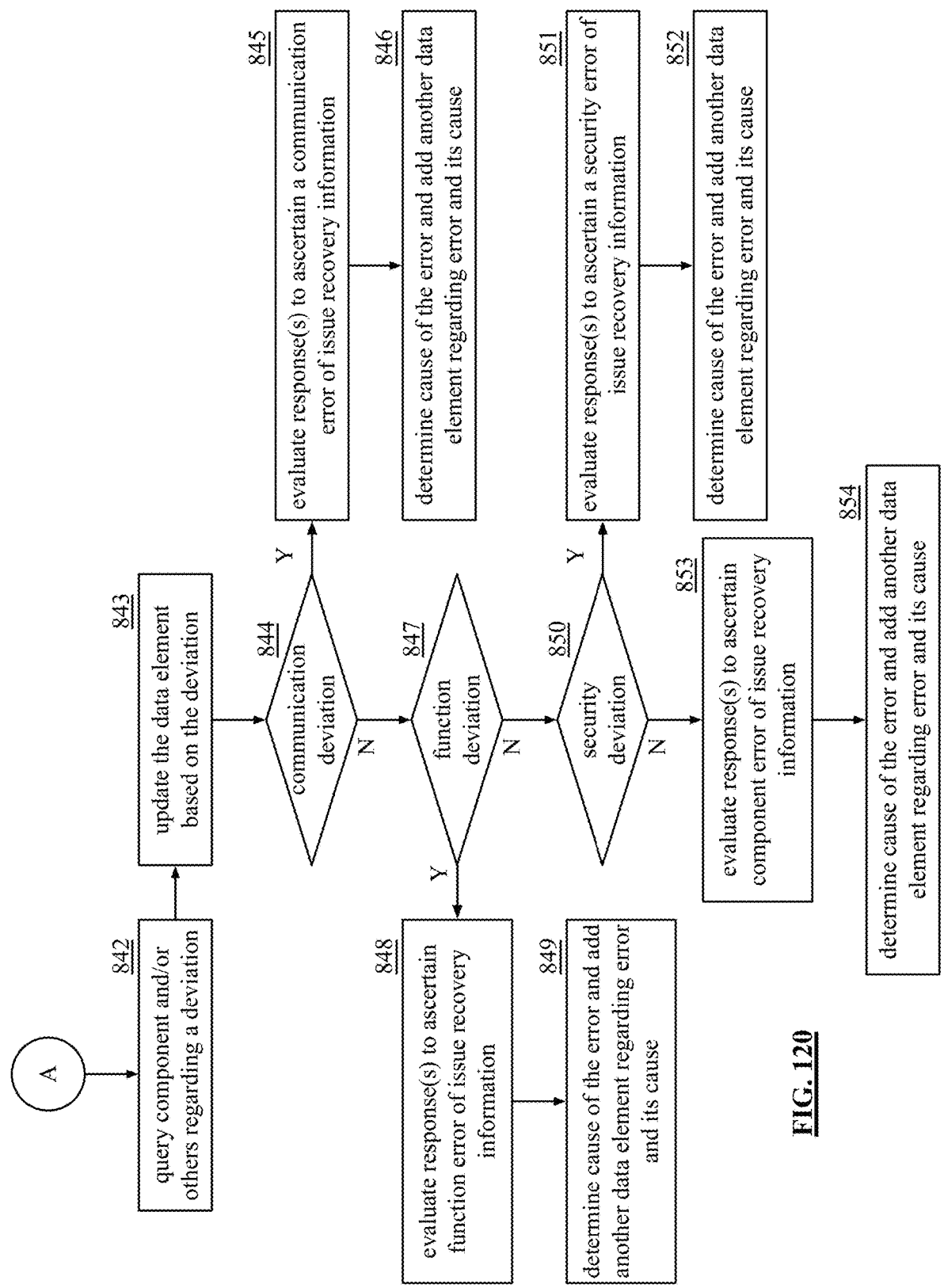
FIG. 120 is a logic diagram of a further example of an analysis system determining an issue recovery rating for a section of a system in accordance with the present disclosure.

The method continues in FIG. 120 at step 842 where the analysis system queries the component and/or another component regarding a cause for the deviation. The method continues at step 843 where the analysis system updates a data element to include an indication of the one or more causes for a deviation, wherein a cause for the deviation is based on responses from the component and/or the other component.

The method continues at step 844 where the analysis system determines whether the deviation is a communication deviation. If yes, the method continues at step 845 where the analysis system evaluate a response from the device to ascertain an error of the issue recovery information regarding the device and/or the communication between the device and the component. The method continues at step 846 where the analysis system determines one or more causes of the error of the communication deviation.

If the deviation is not a communication deviation, the method continues at step 847 where the analysis system determines whether the deviation is a system function deviation. If yes, the method continues at step 848 where the analysis system evaluate a response from the device to ascertain an error of the issue recovery information regarding the device and/or the system function of the device. The method continues at step 849 where the analysis system determines one or more causes of the error of the system function deviation.

If the deviation is not a system function deviation, the method continues at step 850 where the analysis system determines whether the deviation is a security function deviation. If yes, the method continues at step 851 where the analysis system evaluate a response from the device to ascertain an error of the issue recovery information regarding the device and/or the security function of the device. The method continues at step 852 where the analysis system determines one or more causes of the error of the security function deviation.

If the deviation is not a security function deviation, the method continues at step 853 where the analysis system evaluates a device response from the device to ascertain an error of the issue recovery information regarding the device and/or of the device. The method continues at step 854 where the analysis system determines one or more causes of the error of the information and/or of the device.

Figure 121:
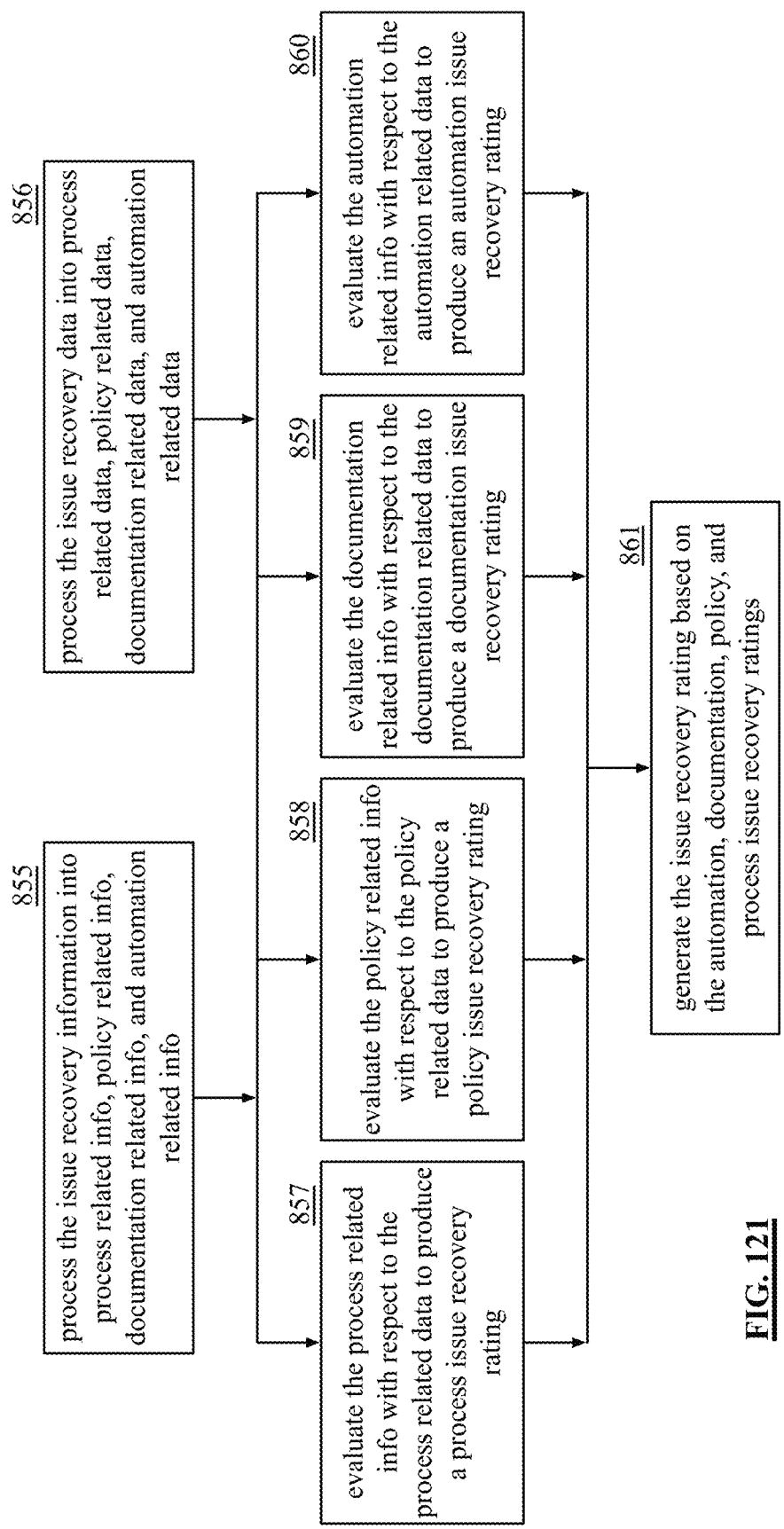
FIG. 121 is a logic diagram of a further example of an analysis system determining an issue recovery rating for a section of a system in accordance with the present disclosure.

FIG. 121 is a logic diagram of a further example of an analysis system determining an issue recovery rating for a system, or portion thereof, and in particular for calculating the issue recovery rating. The method begins at steps 851 and 856. At step 851, the analysis system processes the issue recovery information into policy related issue recovery information, process related issue recovery information, documentation related issue recovery information, and/or automation related issue recovery information. At step 856, the analysis system processes the system issue recovery data into policy related system issue recovery data, process related system issue recovery data, documentation related system issue recovery data, and/or automation related system issue recovery data.

The method continues at steps 857-860. At step 857, the analysis system evaluates the process related issue recovery information with respect to the process related system issue recovery data to produce a process issue recovery rating. At step 858, the analysis system evaluates the policy related issue recovery information with respect to the policy related system issue recovery data to produce a policy issue recovery rating. At step 859, the analysis system evaluates the documentation related issue recovery information with respect to the documentation related system issue recovery data to produce a documentation issue recovery rating. At step 860, the analysis system evaluates the automation related issue recovery information with respect to the automation related system issue recovery data to produce an automation issue recovery rating.

The method continues at step 861 where the analysis system generates an issue recovery rating based on the automation issue recovery rating, the documentation issue recovery rating, the process issue recovery rating, and the policy issue recovery rating. For example, the analysis system performs a function on the automation issue recovery rating, the documentation issue recovery rating, the process issue recovery rating, and the policy issue recovery rating to produce the issue recovery rating. The function is a weight average, standard deviation, statistical analysis, trending, and/or other mathematical function.

Figure 122:
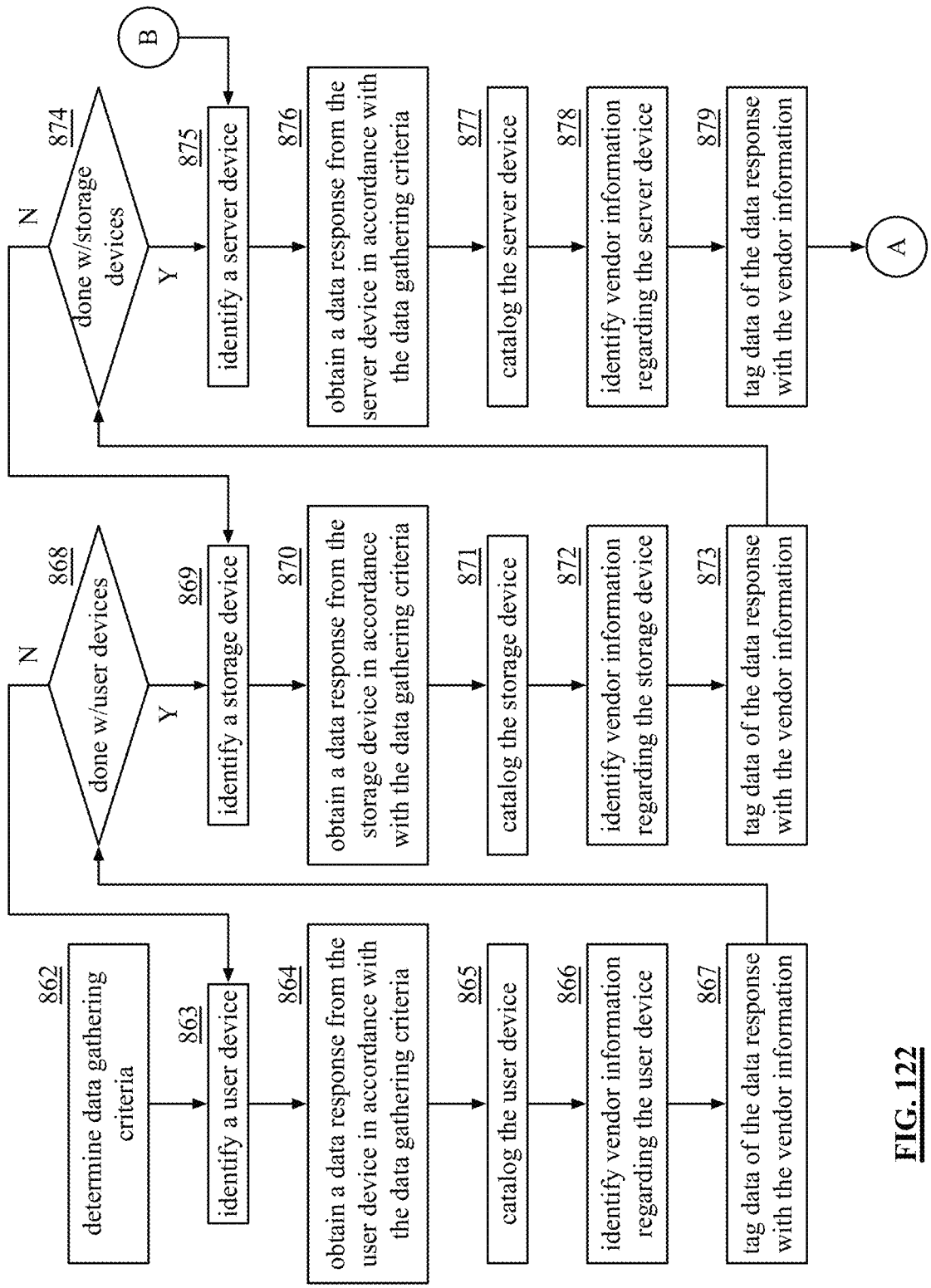
FIG. 122 is a logic diagram of a further example of an analysis system determining an issue recovery rating for a section of a system in accordance with the present disclosure.

FIG. 122 is a logic diagram of a further example of an analysis system determining an issue recovery rating for a system, or portion thereof, and in particular engaging the system to obtain issue recovery data. The method begins at step 862 where the analysis system determines data gathering criteria and/or parameters. The determining of data gathering parameters has been discussed with reference to one or more preceding Figures and one or more subsequent Figures.

The method continues at step 863 where the analysis system identifies a user device and queries it for data in accordance with the data gathering parameters. The method continues at step 864 where the analysis system obtains a data response from the user device. The data response includes data regarding the user device relevant to the data gathering parameters. An example of user device data was discussed with reference to FIG. 76.

The method continues at step 865 where the analysis system catalogs the user device (e.g., records it as being part of the system, or portion thereof, if not already cataloged). The method continues at step 866 where the analysis system identifies vendor information regarding the user device. The method continues at step 867 where the analysis system tags the data regarding the user device with the vendor information. This enables data to be sorted, searched, etc. based on vendor information.

The method continues at step 868 where the analysis system determines whether data has been received from all relevant user devices. If not, the method repeats at step 863. If yes, the method continues at step 869 where the analysis system identifies a storage device and queries it for data in accordance with the data gathering parameters. The method continues at step 870 where the analysis system obtains a data response from the storage device. The data response includes data regarding the storage device relevant to the data gathering parameters. An example of storage device data was discussed with reference to FIG. 76.

The method continues at step 871 where the analysis system catalogs the storage device (e.g., records it as being part of the system, or portion thereof, if not already cataloged) when the storage device responds. The method continues at step 872 where the analysis system identifies vendor information regarding the storage device. The method continues at step 873 where the analysis system tags the data regarding the storage device with the vendor information. The method continues at step 874 where the analysis system determines whether data has been received from all relevant storage devices. If not, the method repeats at step 869.

If yes, the method continues at step 875 where the analysis system identifies a server device and queries it for data in accordance with the data gathering parameters. The method continues at step 876 where the analysis system obtains a data response from the server device. The data response includes data regarding the server device relevant to the data gathering parameters. An example of server device data was discussed with reference to FIG. 76. The method continues at step 877 where the analysis system catalogs the server device (e.g., records it as being part of the system, or portion thereof, if not already cataloged) when the server device responds.

Figure 123:
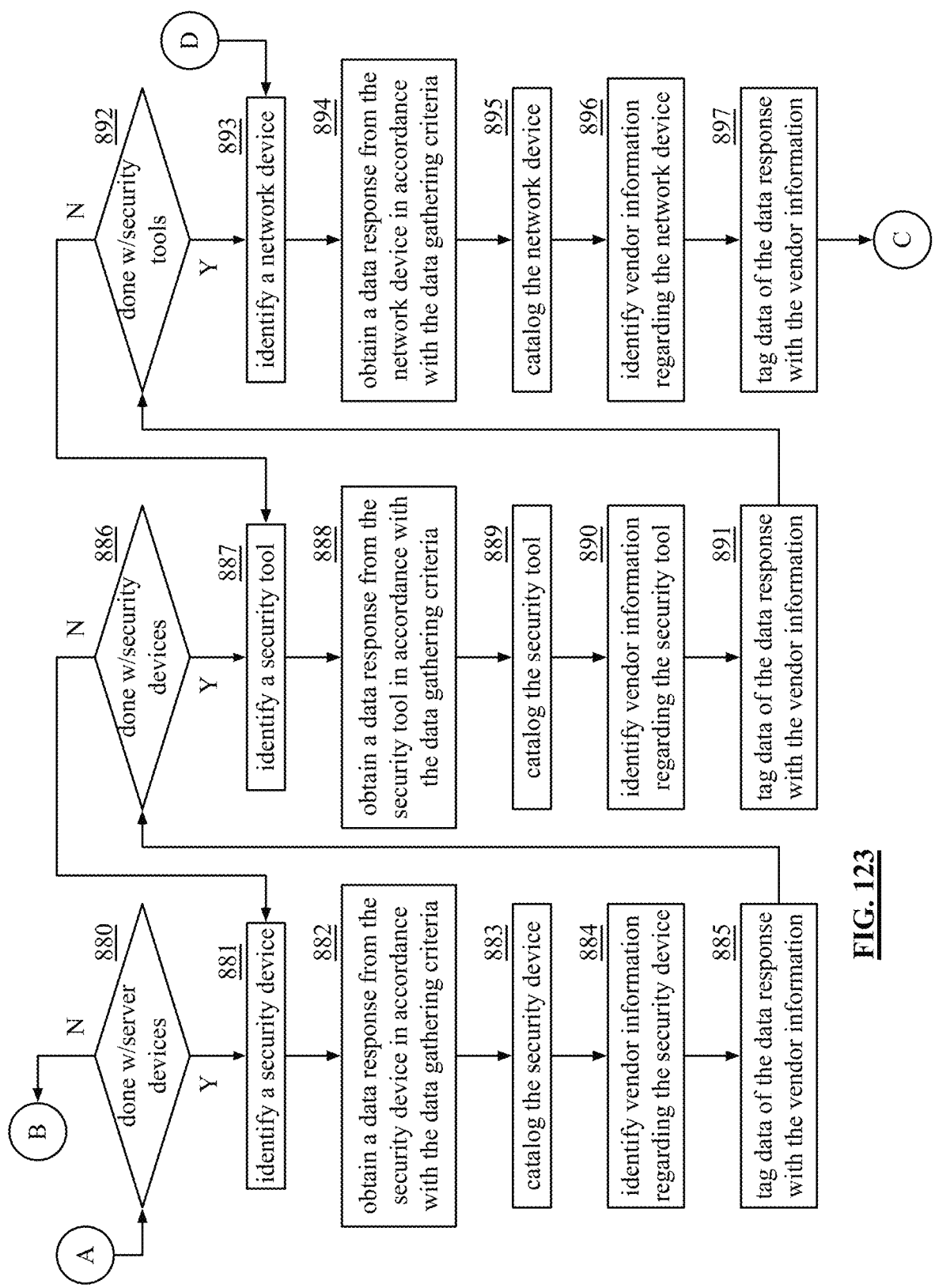
FIG. 123 is a logic diagram of a further example of an analysis system determining an issue recovery rating for a section of a system in accordance with the present disclosure.

The method continues at step 878 where the analysis system identifies vendor information regarding the server device. The method continues at step 879 where the analysis system tags the data regarding the server device with the vendor information. The method continues at step 880 of FIG. 123 where the analysis system determines whether data has been received from all relevant server devices. If not, the method repeats at step 875.

If yes, the method continues at step 881 where the analysis system identifies a security device and queries it for data in accordance with the data gathering parameters. The method continues at step 882 where the analysis system obtains a data response from the security device. The data response includes data regarding the security device relevant to the data gathering parameters. An example of security device data was discussed with reference to FIG. 76.

The method continues at step 883 where the analysis system catalogs the security device (e.g., records it as being part of the system, or portion thereof, if not already cataloged) when the security device responds. The method continues at step 884 where the analysis system identifies vendor information regarding the security device. The method continues at step 885 where the analysis system tags the data regarding the security device with the vendor information. The method continues at step 886 where the analysis system determines whether data has been received from all relevant security devices. If not, the method repeats at step 881.

If yes, the method continues at step 887 where the analysis system identifies a security tool and queries it for data in accordance with the data gathering parameters. The method continues at step 888 where the analysis system obtains a data response from the security tool. The data response includes data regarding the security tool relevant to the data gathering parameters. An example of security tool data was discussed with reference to FIG. 76.

The method continues at step 889 where the analysis system catalogs the security tool (e.g., records it as being part of the system, or portion thereof, if not already cataloged) when the security tool responds via hardware on which the tool operates.

The method continues at step 890 where the analysis system identifies vendor information regarding the security tool. The method continues at step 891 where the analysis system tags the data regarding the security tool with the vendor information. The method continues at step 892 where the analysis system determines whether data has been received from all relevant security tools. If not, the method repeats at step 887.

If yes, the method continues at step 893 where the analysis system identifies a network device and queries it for data in accordance with the data gathering parameters. The method continues at step 894 where the analysis system obtains a data response from the network device. The data response includes data regarding the network device relevant to the data gathering parameters. An example of network device data was discussed with reference to FIG. 76. The method continues at step 895 where the analysis system catalogs the network device (e.g., records it as being part of the system, or portion thereof, if not already cataloged) when the network device responds.

Figure 124:
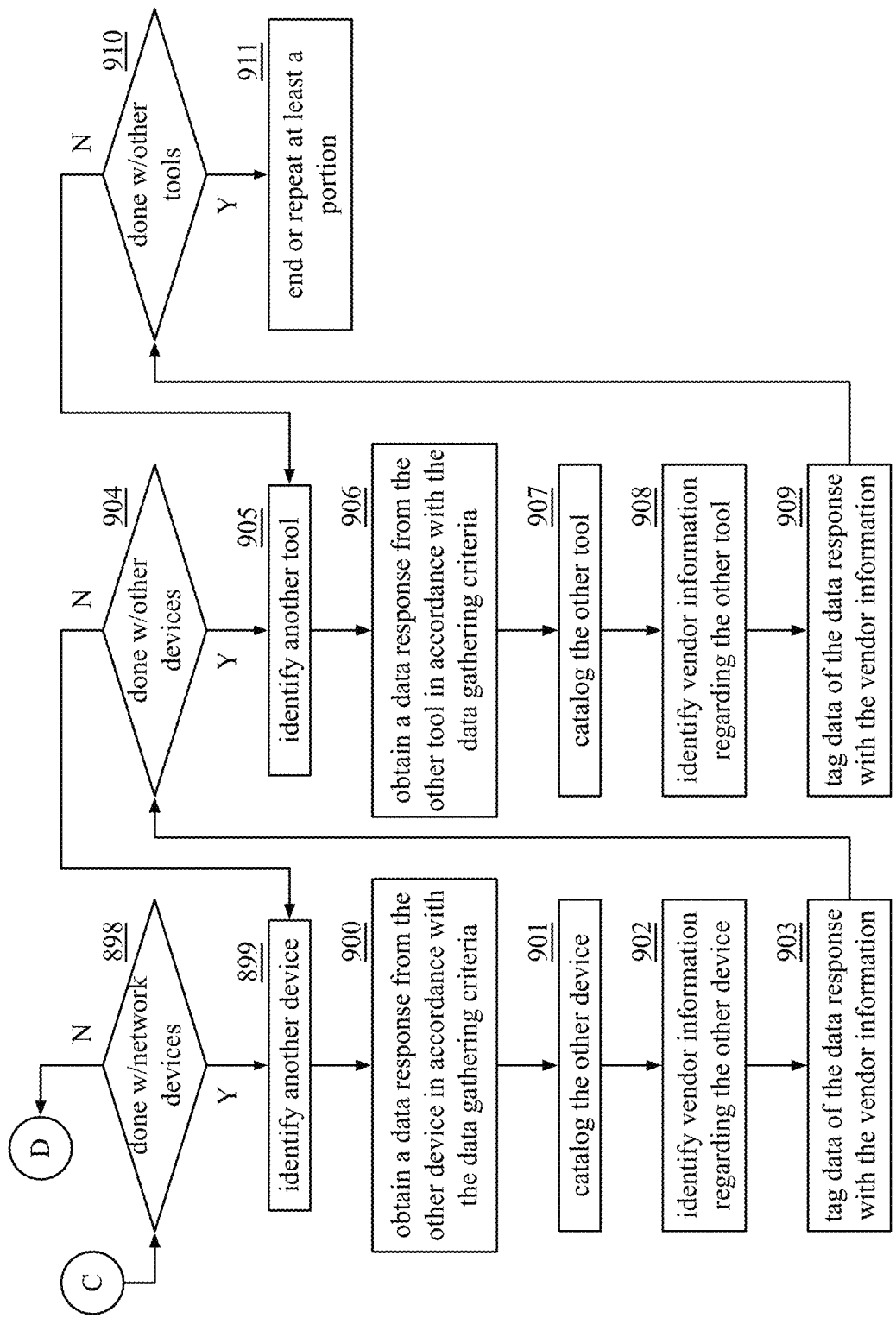
FIG. 124 is a logic diagram of a further example of an analysis system determining an issue recovery rating for a section of a system in accordance with the present disclosure.

The method continues at step 896 where the analysis system identifies vendor information regarding the network device. The method continues at step 897 where the analysis system tags the data regarding the network device with the vendor information. The method continues at step 898 of FIG. 124 where the analysis system determines whether data has been received from all relevant network devices. If not, the method repeats at step 893.

If yes, the method continues at step 899 where the analysis system identifies another device (e.g., any other device that is part of the system, interfaces with the system, uses the system, and/or supports the system) and queries it for data in accordance with the data gathering parameters. The method continues at step 900 where the analysis system obtains a data response from the other device. The data response includes data regarding the other device relevant to the data gathering parameters. An example of other device data was discussed with reference to FIG. 76.

The method continues at step 901 where the analysis system catalogs the other device (e.g., records it as being part of the system, or portion thereof, if not already cataloged) when the other device responds. The method continues at step 902 where the analysis system identifies vendor information regarding the other device. The method continues at step 903 where the analysis system tags the data regarding the other device with the vendor information. The method continues at step 904 where the analysis system determines whether data has been received from all relevant other devices. If not, the method repeats at step 899.

If yes, the method continues at step 905 where the analysis system identifies another tool (e.g., any other tool that is part of the system, interprets the system, monitors the system, and/or supports the system) and queries it for data in accordance with the data gathering parameters. The method continues at step 906 where the analysis system obtains a data response from the other tool. The data response includes data regarding the other tool relevant to the data gathering parameters. An example of other tool data was discussed with reference to FIG. 76. The method continues at step 907 where the analysis system catalogs the other tool (e.g., records it as being part of the system, or portion thereof, if not already cataloged) when the other tool responds via hardware on which the tool operates The method continues at step 908 where the analysis system identifies vendor information regarding the other tool. The method continues at step 909 where the analysis system tags the data regarding the other tool with the vendor information. The method continues at step 910 where the analysis system determines whether data has been received from all relevant other tools. If not, the method repeats at step 905. If yes, the method continues at step 911 where the analysis system ends the process or repeats it for another part of the system.

Figure 125:
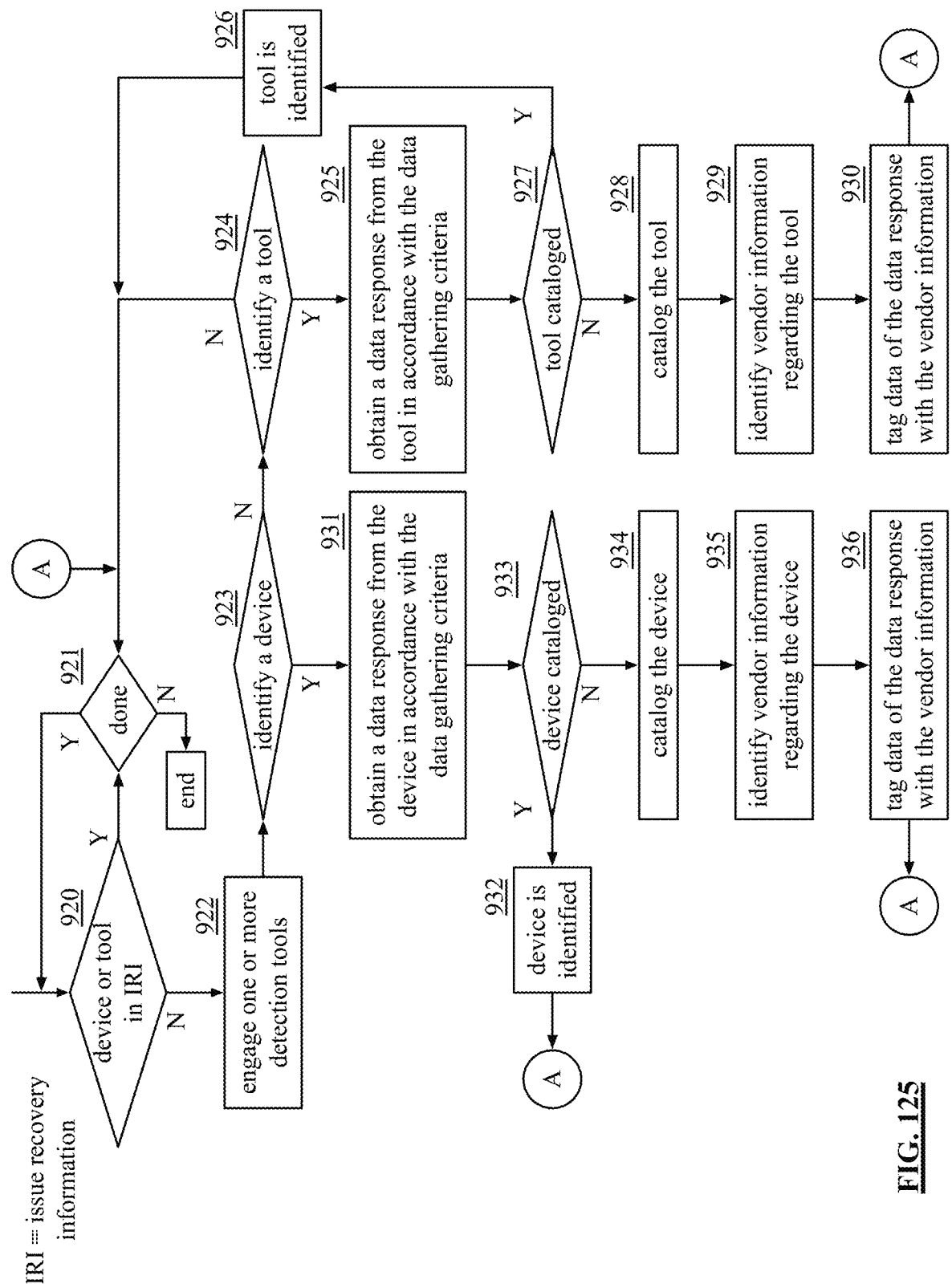
FIG. 125 is a logic diagram of a further example of an analysis system determining an issue recovery rating for a section of a system in accordance with the present disclosure.

FIG. 125 is a logic diagram of a further example of an analysis system determining an issue recovery rating for a system, or portion thereof and, in particular, identifying a device or a tool relevant to issue recovery. The method begins at step 920 where the analysis system determines whether a device (e.g., hardware and/or software) or tool is already included in the regarding the data gathering parameters information (e.g., the disclosed data for a particular analysis of the system, or portion thereof). If yes, the method continues at step 921 where the analysis module determines whether it's done with identifying devices or tools relevant to issue recovery. If yes, the method is ended. If not, the method repeats at step 920.

If the device or tool is not in the issue recovery information, the method continues at step 922 where the analysis system engages one or more detection (or discovery) tools to detect a device and/or a tool relevant to issue recovery. Examples of detection tools were discussed with reference to one or more preceding figures. The method continues at step 923 where the analysis system determines whether the detection tool(s) has identified a device (e.g., hardware and/or software). If not, the method continues at step 924 where the analysis system determines whether the detection tool(s) has identified a tool. If not, the method repeats at step 921.

If a tool is identified, the method continues at step 925 where the analysis system obtains a data response from the tool, via hardware on which the tool operates, in regard to a data gathering request. The data response includes data regarding the tool. Examples of the data regarding the tool were discussed with reference to FIG. 76.

The method continues with step 926 where the analysis system determines whether the tool is cataloged (e.g., is part of the system, but is not included in the issue recovery information for this particular evaluation). If yes, the method continues at step 926 where the analysis system adds the tool to the issue recovery information and the method continues at step 921.

If the tool is not cataloged, the method continues at step 928 where the analysis system verifies the tool as being part of the system and then catalogs it as part of the system. The method continues at step 929 where the analysis system identifies vendor information regarding the tool. The method continues at step 930 where the analysis system tags the data regarding the tool with the vendor information. The method repeats at step 921.

If, at step 923, a device is identified, the method continues at step 931 where the analysis system obtains a data response from the device in regard to a data gathering request. The data response includes data regarding the device. Examples of the data regarding the device were discussed with reference to FIG. 76.

The method continues with step 933 where the analysis system determines whether the device (e.g., hardware and/or software) is cataloged (e.g., is part of the system, but is not included in the issue recovery information for this particular evaluation). If yes, the method continues at step 932 where the analysis system adds the devices to the issue recovery information and the method continues at step 921.

If the device is not cataloged, the method continues at step 934 where the analysis system verifies the device as being part of the system and then catalogs it as part of the system. The method continues at step 935 where the analysis system identifies vendor information regarding the device. The method continues at step 936 where the analysis system tags the data regarding the device with the vendor information. The method repeats at step 921.

Figure 126:
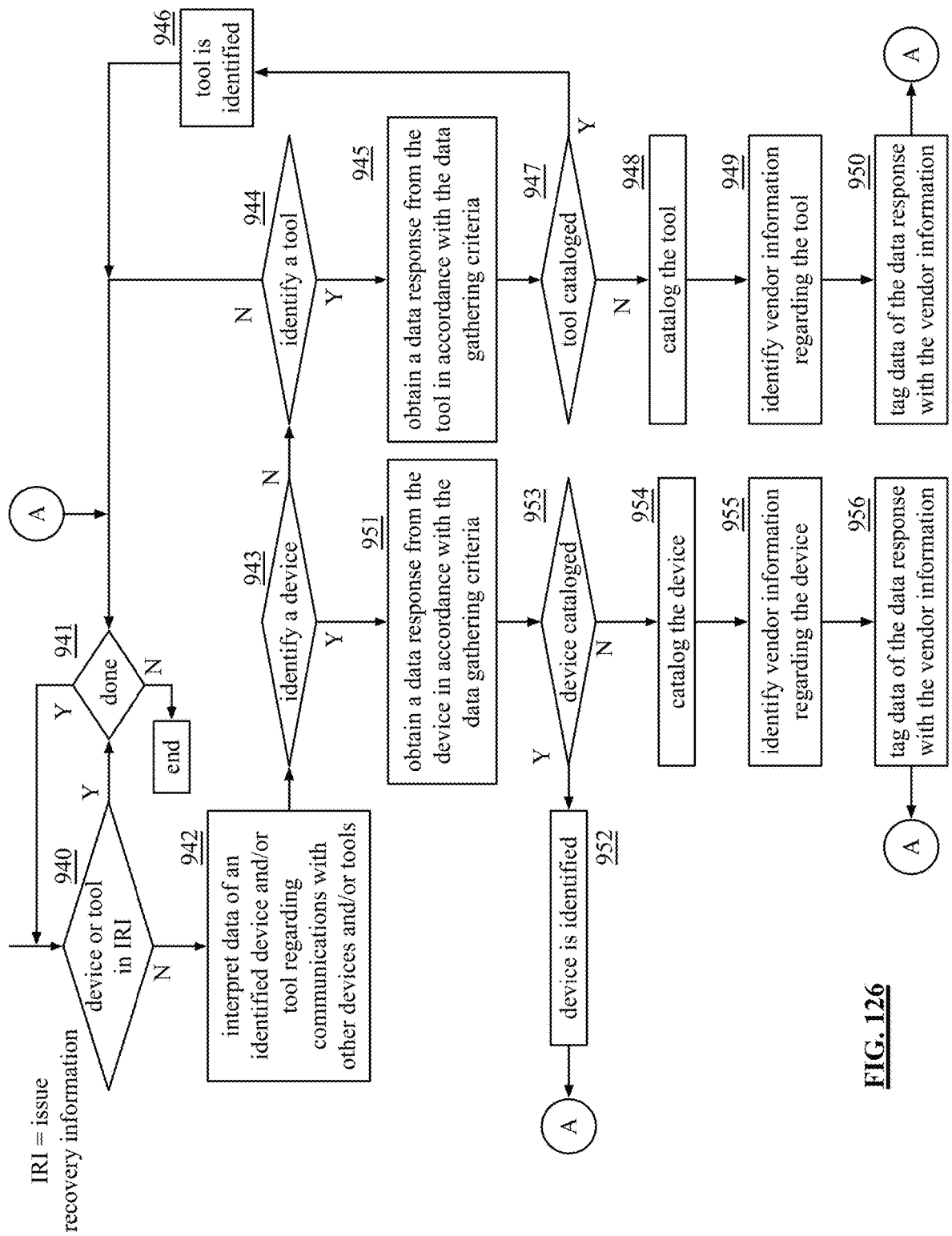
FIG. 126 is a logic diagram of a further example of an analysis system determining an issue recovery rating for a section of a system in accordance with the present disclosure.

FIG. 126 is a logic diagram of a further example of an analysis system determining an issue recovery rating for a system, or portion thereof and, in particular, identifying a device or a tool relevant to issue recovery. The method begins at step 940 where the analysis system determines whether a device (e.g., hardware and/or software) or tool is already included in the issue recovery information (e.g., the disclosed data for a particular analysis of the system, or portion thereof). If yes, the method continues at step 941 where the analysis module determines whether it's done with identifying devices or tools. If yes, the method is ended. If not, the method repeats at step 940.

If the device or tool is not in the issue recovery information, the method continues at step 942 where the analysis system interprets data from an identified device and/or tool (e.g., already in the issue recovery information) with regards to a device or tool. For example, the analysis system looks for data regarding an identified device exchanging data with the device being reviewed. As another example, the analysis system looks for data regarding a tool being used on the device under review to repair a software issue.

The method continues at step 943 where the analysis system determines whether the data has identified such a device (e.g., hardware and/or software). If not, the method continues at step 944 where the analysis system determines whether the detection tool(s) has identified such a tool. If not, the method repeats at step 941.

If a tool is identified, the method continues at step 945 where the analysis system obtains a data response from the tool, via hardware on which the tool operates, in regard to a data gathering request. The data response includes data regarding the tool. Examples of the data regarding the tool were discussed with reference to FIG. 76.

The method continues at step 947 where the analysis system determines whether the tool is cataloged (e.g., is part of the system, but is not included in the issue recovery information for this particular evaluation). If yes, the method continues at step 946 where the analysis system adds the tool to the issue detection information and the method continues at step 941.

If the tool is not cataloged, the method continues at step 948 where the analysis system verifies the tool as being part of the system and then catalogs it as part of the system. The method continues at step 949 where the analysis system identifies vendor information regarding the tool. The method continues at step 950 where the analysis system tags the data regarding the tool with the vendor information. The method repeats at step 921.

If, at step 943, a device is identified, the method continues at step 951 where the analysis system obtains a data response from the device in regard to a data gathering request. The data response includes data regarding the device. Examples of the data regarding the device were discussed with reference to FIG. 76.

The method continues with step 953 where the analysis system determines whether the device (e.g., hardware and/or software) is cataloged (e.g., is part of the system, but not included in the issue recovery information for this particular evaluation). If yes, the method continues at step 952 where the analysis system adds the devices to the issue recovery information and the method continues at step 941.

If the device is not cataloged, the method continues at step 954 where the analysis system verifies the device as being part of the system and then catalogs it as part of the system. The method continues at step 955 where the analysis system identifies vendor information regarding the device. The method continues at step 956 where the analysis system tags the data regarding the device with the vendor information. The method repeats at step 941.

Figure 127:
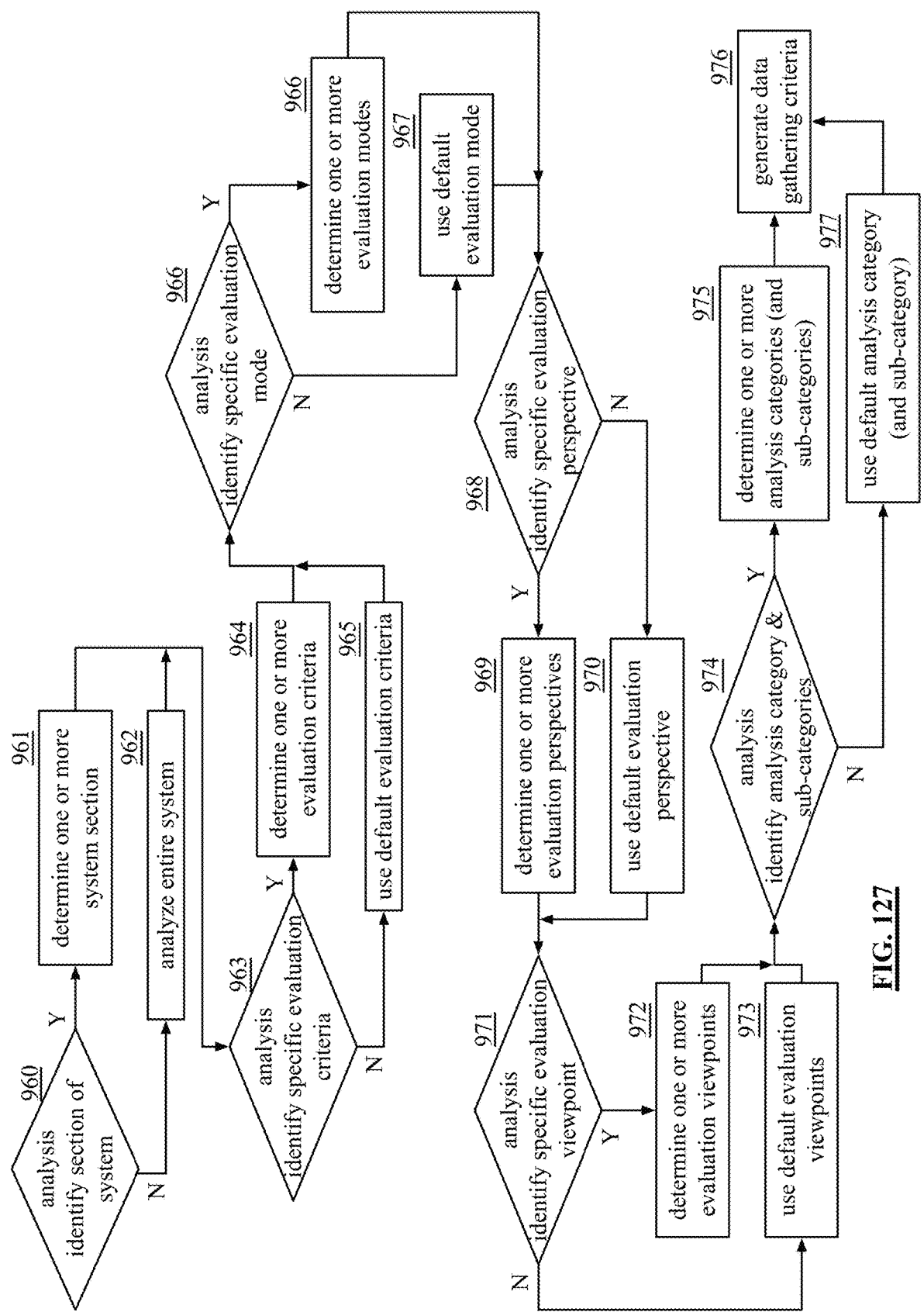
FIG. 127 is a logic diagram of a further example of an analysis system determining an issue recovery rating for a section of a system in accordance with the present disclosure.

FIG. 127 is a logic diagram of a further example of an analysis system determining an issue recovery rating for a system, or portion thereof, and in particular to generating data gathering criteria (or parameters). The method begins at step 960 where the analysis system determines whether the current analysis is for the entire system or a portion thereof. If the analysis is for the entire system, the method continues at step 962 where the analysis system prepares to analyze the entire system. If the analysis is for a portion of the system, the method continues at step 961 where the analysis system determines the particular section (e.g., identifies one or more system elements).

The method continues at step 963 where the analysis system determines whether the current analysis has identified evaluation criteria (e.g., guidelines, system requirements, system design, system build, and/or resulting system). If yes, the method continues at step 964 where the analysis system determines the specific evaluation criteria. If not, the method continues at step 965 where the analysis system determines a set of default evaluation criteria (e.g., one or more of the evaluation criteria).

The method continues at step 966 where the analysis system determines whether the current analysis has identified an evaluation mode (e.g., assets, system functions, and/or security functions). If yes, the method continues at step 966 where the analysis system determines the specific evaluation mode(s). If not, the method continues at step 967 where the analysis system determines a set of default evaluation modes (e.g., one or more of the evaluation modes).

The method continues at step 968 where the analysis system determines whether the current analysis has identified an evaluation perspective (e.g., understanding, implementation, and/or operation). If yes, the method continues at step 969 where the analysis system determines the specific evaluation perspective(s). If not, the method continues at step 970 where the analysis system determines a set of default evaluation perspectives (e.g., one or more of the evaluation perspectives).

The method continues at step 971 where the analysis system determines whether the current analysis has identified an evaluation viewpoint (e.g., disclosed, discovered, desired, and/or self-analysis). If yes, the method continues at step 972 where the analysis system determines the specific evaluation viewpoint(s). If not, the method continues at step 973 where the analysis system determines a set of default evaluation viewpoints (e.g., one or more of the evaluation viewpoints).

The method continues at step 974 where the analysis system determines whether the current analysis has identified an evaluation category, and/or sub-categories (e.g., categories include identify, protect, detect, respond, and/or recover). If yes, the method continues at step 975 where the analysis system determines one or more specific evaluation categories and/or sub-categories. If not, the method continues at step 977 where the analysis system determines a set of default evaluation categories and/or sub-categories (e.g., one or more of the evaluation categories and/or sub-categories). The method continues at step 976 where the analysis system determines the data gathering criteria (or parameters) based on the determination made in the previous steps.

FIG. 128 is a logic diagram of another example of an analysis system determining an issue recovery rating for a system, or portion thereof. The method begins at step 1000 where the analysis system selects a system, or portion thereof, to evaluate issue recovery planning of the system, or portion thereof. For example, the analysis system selects one or more system elements, one or more system criteria, and/or one or more system modes for the system, or portion thereof, to be evaluated. As another example, the analysis system selects one more evaluation perspective and/or one or more evaluation viewpoints. The analysis system may further select one or more sub-sub categories of the issue recovery planning sub-category of the issue recovery (e.g., recover) category.

As another example of selecting the system or portion thereof, the analysis system selects the entire system, selects a division of an organization operating the system, selects a department of a division, selects a group of a department, or selects a sub-group of a group. As another example of selecting the system or portion thereof, the analysis system selects one or more physical assets and/or one or more conceptual assets.

The method continues at step 1001 where the analysis system obtains issue recovery planning information regarding the system, or portion thereof. The issue recovery planning information includes information representative of an organization's understanding of the system, or portion thereof, with respect to during and/or after event recovery plan execution. In an example, the analysis system obtains the issue recovery planning information (e.g., disclosed data from the system) by receiving it from a system admin computing entity. In another example, the analysis system obtains the issue recovery planning information by gathering it from one or more computing entities of the system.

The method continues at step 1002 where the analysis system engages with the system, or portion thereof, to produce system issue recovery planning data (e.g., discovered data) regarding the system, or portion thereof, with respect to the during and/or after event recovery plan execution. Engaging the system, or portion thereof, was discussed with reference to FIG. 119.

The method continues at step 1003 where the analysis system calculates an issue recovery planning rating regarding the issue recovery planning of the system, or portion thereof, based on the issue recovery planning information, the system issue recovery planning data, and issue recovery planning processes, issue recovery policies, issue recovery planning documentation, and/or issue recovery planning automation. The issue recovery planning rating may be indicative of a variety of factors of the system, or portion thereof. For example, the issue recovery planning rating indicates how well the issue recovery planning information reflects an understanding of the issue recovery planning with respect to assets of the system, or portion thereof. As another example, the issue recovery planning rating indicates how well the issue recovery planning information reflects an understanding of the issue recovery planning with respect to system functions of system, or portion thereof.

As another example, the issue recovery planning rating indicates how well the issue recovery planning information reflects an understanding of the issue recovery planning with respect to the security functions of the system, or portion thereof. As another example, the issue recovery planning rating indicates how well the issue recovery planning information reflects intended implementation of the issue recovery planning with respect to the assets of the system, or portion thereof. As another example, the issue recovery planning rating indicates how well the issue recovery planning information reflects intended operation of the issue recovery planning with respect to the assets of the system, or portion thereof.

As another example, the issue recovery planning rating indicates how well the issue recovery planning information reflects intended implementation of the issue recovery planning with respect to the system functions of the system, or portion thereof. As another example, the issue recovery planning rating indicates how well the issue recovery planning information reflects intended operation of the issue recovery planning with respect to the system functions of system, or portion thereof.

As another example, the issue recovery planning rating indicates how well the issue recovery planning information reflects intended implementation of the issue recovery planning with respect to the security functions of the system, or portion thereof. As another example, the issue recovery planning rating indicates how well the issue recovery planning information reflects intended operation of the issue recovery planning with respect to the security functions of the system, or portion thereof.

The method continues at step 1004 where the analysis system gathers desired system issue recovery planning data from one or more system proficiency resources. The method continues at step 1005 where the analysis system calculates a second issue recovery planning rating regarding a desired level of issue recovery planning of the system, or portion thereof, based on the issue recovery planning information, the system issue recovery planning data, the desired issue recovery planning data, and the issue recovery planning processes, the issue recovery planning policies, the issue recovery planning documentation, and/or the issue recovery planning automation. The second issue recovery planning rating is regarding a comparison of desired data with the disclosed data and/or discovered data.

FIG. 129 is a logic diagram of an example of an analysis system determining an issue recovery planning evaluation rating for a system, or portion thereof. The method begins at step 1006 where the analysis system determines a system aspect (see FIG. 69) of a system for an issue recovery planning evaluation. An issue recovery planning evaluation includes evaluating the system's during and after event recovery plan execution.

The method continues at step 1007 where the analysis system determines at least one evaluation perspective for use in performing the issue recovery planning evaluation on the system aspect. An evaluation perspective is an understanding perspective, an implementation perspective, an operation perspective, or a self-analysis perspective. An understanding perspective is with regard to how well the assets, system functions, and/or security functions with respect to issue recovery planning are understood. An implementation perspective is with regard to how well the assets, system functions, and/or security functions with respect to issue recovery planning are implemented. An operation perspective is with regard to how well the assets, system functions, and/or security functions with respect to issue recovery planning operate. A self-analysis (or self-evaluation) perspective is with regard to how well the system self-evaluates the understanding, implementation, and/or operation of assets, system functions, and/or security functions with respect to issue recovery planning.

The method continues at step 1008 where the analysis system determines at least one evaluation viewpoint for use in performing the issue recovery planning evaluation on the system aspect. An evaluation viewpoint is disclosed viewpoint, a discovered viewpoint, or a desired viewpoint. A disclosed viewpoint is with regard to analyzing the system aspect based on the disclosed data. A discovered viewpoint is with regard to analyzing the system aspect based on the discovered data. A desired viewpoint is with regard to analyzing the system aspect based on the desired data.

The method continues at step 1009 where the analysis system obtains issue recovery planning data regarding the system aspect in accordance with the at least one evaluation perspective and the at least one evaluation viewpoint. Issue recovery planning data is data obtained that is regarding the system aspect.

The method continues at step 1010 where the analysis system calculates an issue recovery planning rating as a measure of system issue recovery planning maturity for the system aspect based on the issue recovery planning data, the at least one evaluation perspective, the at least one evaluation viewpoint, and at least one evaluation rating metric. An evaluation rating metric is a process rating metric, a policy rating metric, a procedure rating metric, a certification rating, a documentation rating metric, or an automation rating metric.

FIG. 130 is a logic diagram of another example of an analysis system determining an issue recovery rating for a system, or portion thereof. The method begins at step 1020 where the analysis system selects a system, or portion thereof, to evaluate issue recovery improvements of the system, or portion thereof. For example, the analysis system selects one or more system elements, one or more system criteria, and/or one or more system modes for the system, or portion thereof, to be evaluated. As another example, the analysis system selects one more evaluation perspective and/or one or more evaluation viewpoints. The analysis system may further select one or more sub-sub categories of the issue recovery improvements sub-category of the issue recovery (e.g., recover) category.

As another example of selecting the system or portion thereof, the analysis system selects the entire system, selects a division of an organization operating the system, selects a department of a division, selects a group of a department, or selects a sub-group of a group. As another example of selecting the system or portion thereof, the analysis system selects one or more physical assets and/or one or more conceptual assets.

The method continues at step 1021 where the analysis system obtains issue recovery improvements information regarding the system, or portion thereof. The issue recovery improvements information includes information representative of an organization's understanding of the system, or portion thereof, with respect to incorporation of lessons learned in recovery plans and the recovery strategy updates.

In an example, the analysis system obtains the issue recovery improvements information (e.g., disclosed data from the system) by receiving it from a system admin computing entity. In another example, the analysis system obtains the issue recovery improvements information by gathering it from one or more computing entities of the system.

The method continues at step 1022 where the analysis system engages with the system, or portion thereof, to produce system issue recovery improvements data (e.g., discovered data) regarding the system, or portion thereof, with respect to the incorporation of lessons learned in recovery plans and the recovery strategy updates. Engaging the system, or portion thereof, was discussed with reference to FIG. 119.

The method continues at step 1023 where the analysis system calculates an issue recovery improvements rating regarding the issue recovery improvements of the system, or portion thereof, based on the issue recovery improvements information, the system issue recovery improvements data, and issue recovery improvements processes, issue recovery improvements policies, issue recovery improvements documentation, and/or issue recovery improvements automation.

The issue recovery improvements rating may be indicative of a variety of factors of the system, or portion thereof. For example, the issue recovery improvements rating indicates how well the issue recovery improvements information reflects an understanding of the issue recovery improvements with respect to assets of the system, or portion thereof. As another example, the issue recovery improvements rating indicates how well the issue recovery improvements information reflects an understanding of the issue recovery improvements with respect to system functions of system, or portion thereof.

As another example, the issue recovery improvements rating indicates how well the issue recovery improvements information reflects an understanding of the issue recovery improvements with respect to the security functions of the system, or portion thereof. As another example, the issue recovery improvements rating indicates how well the issue recovery improvements information reflects intended implementation of the issue recovery improvements with respect to the assets of the system, or portion thereof. As another example, the issue recovery improvements rating indicates how well the issue recovery improvements information reflects intended operation of the issue recovery improvements with respect to the assets of the system, or portion thereof.

As another example, the issue recovery improvements rating indicates how well the issue recovery improvements information reflects intended implementation of the issue recovery improvements with respect to the system functions of the system, or portion thereof. As another example, the issue recovery improvements rating indicates how well the issue recovery improvements information reflects intended operation of the issue recovery improvements with respect to the system functions of system, or portion thereof.

As another example, the issue recovery improvements rating indicates how well the issue recovery improvements information reflects intended implementation of the issue recovery improvements with respect to the security functions of the system, or portion thereof. As another example, the issue recovery improvements rating indicates how well the issue recovery improvements information reflects intended operation of the issue recovery improvements with respect to the security functions of the system, or portion thereof.

The method continues at step 1024 where the analysis system gathers desired issue recovery improvements data from one or more system proficiency resources. The method continues at step 1025 where the analysis system calculates a second issue recovery improvements rating regarding a desired level of issue recovery improvements of the system, or portion thereof, based on the issue recovery improvements information, the system issue recovery improvements data, the desired issue recovery improvements data, and the issue recovery improvements processes, the issue recovery improvements policies, the issue recovery improvements documentation, and/or the issue recovery improvements automation. The issue recovery improvements rating is regarding a comparison of desired data with the disclosed data and/or discovered data.

FIG. 131 is a logic diagram of an example of an analysis system determining an issue recovery improvements evaluation rating for a system, or portion thereof. The method begins at step 1026 where the analysis system determines a system aspect (see FIG. 69) of a system for an issue recovery improvements evaluation. An issue recovery improvements evaluation includes evaluating the system's incorporation of lessons learned in recovery plans and the recovery strategy updates.

The method continues at step 1027 where the analysis system determines at least one evaluation perspective for use in performing the issue recovery improvements evaluation on the system aspect. An evaluation perspective is an understanding perspective, an implementation perspective, an operation perspective, or a self-analysis perspective. An understanding perspective is with regard to how well the assets, system functions, and/or security functions with respect to issue recovery improvements are understood. An implementation perspective is with regard to how well the assets, system functions, and/or security functions with respect to issue recovery improvements are implemented. An operation perspective is with regard to how well the assets, system functions, and/or security functions with respect to issue recovery improvements operate. A self-analysis (or self-evaluation) perspective is with regard to how well the system self-evaluates the understanding, implementation, and/or operation of assets, system functions, and/or security functions with respect to issue recovery improvements.

The method continues at step 1028 where the analysis system determines at least one evaluation viewpoint for use in performing the issue recovery improvements evaluation on the system aspect. An evaluation viewpoint is disclosed viewpoint, a discovered viewpoint, or a desired viewpoint. A disclosed viewpoint is with regard to analyzing the system aspect based on the disclosed data. A discovered viewpoint is with regard to analyzing the system aspect based on the discovered data. A desired viewpoint is with regard to analyzing the system aspect based on the desired data.

The method continues at step 1029 where the analysis system obtains issue recovery improvements data regarding the system aspect in accordance with the at least one evaluation perspective and the at least one evaluation viewpoint. Issue recovery improvements data is data obtained that is regarding the system aspect.

The method continues at step 1030 where the analysis system calculates an issue recovery improvements rating as a measure of system issue recovery improvements maturity for the system aspect based on the issue recovery improvements data, the at least one evaluation perspective, the at least one evaluation viewpoint, and at least one evaluation rating metric. An evaluation rating metric is a process rating metric, a policy rating metric, a procedure rating metric, a certification rating, a documentation rating metric, or an automation rating metric.

FIG. 132 is a logic diagram of another example of an analysis system determining an issue recovery rating for a system, or portion thereof. The method begins at step 1040 where the analysis system selects a system, or portion thereof, to evaluate issue recovery communications of the system, or portion thereof. For example, the analysis system selects one or more system elements, one or more system criteria, and/or one or more system modes for the system, or portion thereof, to be evaluated. As another example, the analysis system selects one more evaluation perspective and/or one or more evaluation viewpoints. The analysis system may further select one or more sub-sub categories of the issue recovery communications sub-category of the issue recovery (e.g., recover) category.

As another example of selecting the system or portion thereof, the analysis system selects the entire system, selects a division of an organization operating the system, selects a department of a division, selects a group of a department, or selects a sub-group of a group. As another example of selecting the system or portion thereof, the analysis system selects one or more physical assets and/or one or more conceptual assets.

The method continues at step 1041 where the analysis system obtains issue recovery communications information regarding the system, or portion thereof. The issue recovery communications information includes information representative of an organization's understanding of the system, or portion thereof, with respect to public relations management, after event reputation repairment, and recovery activity communication (e.g., with internal stakeholders, executive teams, management teams, etc.). In an example, the analysis system obtains the issue recovery communications information (e.g., disclosed data from the system) by receiving it from a system admin computing entity. In another example, the analysis system obtains the issue recovery communications information by gathering it from one or more computing entities of the system.

The method continues at step 1042 where the analysis system engages with the system, or portion thereof, to produce system issue recovery communications data (e.g., discovered data) regarding the system, or portion thereof, with respect to the public relations management, the after event reputation repairment, and the recovery activity communication. Engaging the system, or portion thereof, was discussed with reference to FIG. 119.

The method continues at step 1043 where the analysis system calculates an issue recovery communications rating regarding the issue recovery communications of the system, or portion thereof, based on the issue recovery communications information, the system issue recovery communications data, and issue recovery communications processes, issue recovery communications policies, issue recovery communications documentation, and/or issue recovery communications automation.

The issue recovery communications rating may be indicative of a variety of factors of the system, or portion thereof. For example, the issue recovery communications rating indicates how well the issue recovery communications information reflects an understanding of the issue recovery communications with respect to assets of the system, or portion thereof. As another example, the issue recovery communications rating indicates how well the issue recovery communications information reflects an understanding of the issue recovery communications with respect to system functions of system, or portion thereof.

As another example, the issue recovery communications rating indicates how well the issue recovery communications information reflects an understanding of the issue recovery communications with respect to the security functions of the system, or portion thereof. As another example, the issue recovery communications rating indicates how well the issue recovery communications information reflects intended implementation of the issue recovery communications with respect to the assets of the system, or portion thereof. As another example, the issue recovery communications rating indicates how well the issue recovery communications information reflects intended operation of the issue recovery communications with respect to the assets of the system, or portion thereof.

As another example, the issue recovery communications rating indicates how well the issue recovery communications information reflects intended implementation of the issue recovery communications with respect to the system functions of the system, or portion thereof. As another example, the issue recovery communications rating indicates how well the issue recovery communications information reflects intended operation of the issue recovery communications with respect to the system functions of system, or portion thereof.

As another example, the issue recovery communications rating indicates how well the issue recovery communications information reflects intended implementation of the issue recovery communications with respect to the security functions of the system, or portion thereof. As another example, the issue recovery communications rating indicates how well the issue recovery communications information reflects intended operation of the issue recovery communications with respect to the security functions of the system, or portion thereof.

The method continues at step 1044 where the analysis system gathers desired system issue recovery communications data from one or more system proficiency resources. The method continues at step 1045 where the analysis system calculates a second issue recovery communications rating regarding a desired level of issue recovery communications of the system, or portion thereof, based on the issue recovery communications information, the system issue recovery communications data, the desired issue recovery communications data, and the issue recovery communications processes, the issue recovery communications policies, the issue recovery communications documentation, and/or the issue recovery communications automation. The second issue recovery communications rating is regarding a comparison of desired data with the disclosed data and/or discovered data.

FIG. 133 is a logic diagram of an example of an analysis system determining an issue recovery communications rating for a system, or portion thereof. The method begins at step 1046 where the analysis system determines a system aspect (see FIG. 69) of a system for an issue recovery communications evaluation. An issue recovery communications evaluation includes evaluating the system's public relations management, after event reputation repairment, and recovery activity communication (e.g., with internal stakeholders, executive teams, management teams, etc.).

The method continues at step 1047 where the analysis system determines at least one evaluation perspective for use in performing the issue recovery communications evaluation on the system aspect. An evaluation perspective is an understanding perspective, an implementation perspective, an operation perspective, or a self-analysis perspective. An understanding perspective is with regard to how well the assets, system functions, and/or security functions with respect to issue recovery communications are understood. An implementation perspective is with regard to how well the assets, system functions, and/or security functions with respect to issue recovery communications are implemented. An operation perspective is with regard to how well the assets, system functions, and/or security functions with respect to issue recovery communications operate. A self-analysis (or self-evaluation) perspective is with regard to how well the system self-evaluates the understanding, implementation, and/or operation of assets, system functions, and/or security functions with respect to issue recovery communications.

The method continues at step 1048 where the analysis system determines at least one evaluation viewpoint for use in performing the issue recovery communications evaluation on the system aspect. An evaluation viewpoint is disclosed viewpoint, a discovered viewpoint, or a desired viewpoint. A disclosed viewpoint is with regard to analyzing the system aspect based on the disclosed data. A discovered viewpoint is with regard to analyzing the system aspect based on the discovered data. A desired viewpoint is with regard to analyzing the system aspect based on the desired data.

The method continues at step 1049 where the analysis system obtains issue recovery communications data regarding the system aspect in accordance with the at least one evaluation perspective and the at least one evaluation viewpoint. Issue recovery communications data is data obtained that is regarding the system aspect.

The method continues at step 1050 where the analysis system calculates an issue recovery communications rating as a measure of system issue recovery communications maturity for the system aspect based on the issue recovery communications data, the at least one evaluation perspective, the at least one evaluation viewpoint, and at least one evaluation rating metric. An evaluation rating metric is a process rating metric, a policy rating metric, a procedure rating metric, a certification rating, a documentation rating metric, or an automation rating metric.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited particular examples disclosed herein and expressly incorporates these other combinations.

What is claimed is:

1. A method comprises:
    determining, by an analysis system that includes one or more computing entities, a system aspect of a system for an issue recovery communications evaluation, wherein the system aspect includes at least one system element of the system, at least one system criteria of the system, and at least one system mode of the system;
    determining, by the analysis system, at least one evaluation perspective for use in performing the issue recovery communications evaluation on the system aspect;
    determining, by the analysis system, at least one evaluation viewpoint for use in performing the issue recovery communications evaluation on the system aspect;
    obtaining, by the analysis system, issue recovery communications data regarding the system aspect in accordance with the at least one evaluation perspective and the at least one evaluation viewpoint; and
    calculating, by the analysis system, an issue recovery communications rating as a measure of issue recovery communications maturity for the system aspect based on the issue recovery communications data, at least one evaluation perspective, the at least one evaluation viewpoint, and at least one evaluation rating metric.

2. The method of claim 1 further comprises:
    receiving, by the analysis system, an input, wherein the input identifies at least one of:
        the system aspect;
        the at least one evaluation perspective; and
        the at least one evaluation viewpoint.

3. The method of claim 1 further comprises:
    a system element of the at least one system element includes an enterprise identifier, an organization identifier, a division identifier, a department identifier, a group identifier, a sub-group identifier, a device identifier, a software identifier, or an internet protocol address identifier;
    a system criteria of the at least one system criteria being system guidelines, system requirements, system design, system build, or resulting system; and
    a system mode of the at least one system mode being assets, system functions, or security functions.

4. The method of claim 1 further comprises:
    an evaluation perspective of the at least one evaluation perspective being an understanding perspective, an implementation perspective, an operation perspective, or a self-analysis perspective.

5. The method of claim 1 further comprises:
    an evaluation viewpoint of the at least one evaluation viewpoint being a disclosed viewpoint, a discovered viewpoint, or a desired viewpoint.

6. The method of claim 1 further comprises:
    an evaluation rating metric of the at least one evaluation rating metric being a process rating metric, a policy rating metric, a procedure rating metric, a certification rating, a documentation rating metric, or an automation rating metric.

7. The method of claim 1, wherein the obtaining the issue recovery communications data comprises:
    determining data gathering parameters regarding the system aspect in accordance with the at least one evaluation perspective, the at least one evaluation viewpoint, and the least one evaluation rating metric;
    identifying the at least one system element of the system aspect based on the data gathering parameters;
    obtaining issue recovery communications information from the at least one system element in accordance with the data gathering parameters; and
    recording the issue recovery communications information from the at least one system element to produce the issue recovery communications data.

8. The method of claim 7, wherein the data gathering parameters is regarding at least one of:
    public relations management;
    after event reputation repairment; and
    recovery activity communication.

9. The method of claim 1, wherein the calculating the issue recovery communications rating comprises:
    selecting and performing at least two of:
        based on the issue recovery communications data and process analysis parameters, generating a process rating for the system aspect in accordance with the at least one evaluation perspective, the at least one evaluation viewpoint, and the at least one evaluation rating metric;

based on the issue recovery communications data and policy analysis parameters, generating a policy rating for the system aspect in accordance with the at least one evaluation perspective, the at least one evaluation viewpoint, and the at least one evaluation rating metric;

based on the issue recovery communications data and documentation analysis parameters, generating a documentation rating for the system aspect in accordance with the at least one evaluation perspective, the at least one evaluation viewpoint, and the at least one evaluation rating metric;

based on the issue recovery communications data and automation analysis parameters, generating an automation rating for the system aspect in accordance with the at least one evaluation perspective, the at least one evaluation viewpoint, and the at least one evaluation rating metric;

based on the issue recovery communications data and procedure analysis parameters, generating a procedure rating for the system aspect in accordance with the at least one evaluation perspective, the at least one evaluation viewpoint, and the at least one evaluation rating metric; and based on the issue recovery communications data and certification analysis parameters, generating a certification rating for the system aspect in accordance with the at least one evaluation perspective, the at least one evaluation viewpoint, and the at least one evaluation rating metric; and generating the issue recovery communications rating based on the selected and performed at least two of: the process rating, the policy rating, the documentation rating, the automation rating, the procedure rating, and the certification rating.

10. The method of claim 1 further comprises at least one of:

determining, by the analysis system, a system criteria deficiency of the system aspect based on the issue recovery communications rating and the issue recovery communications data;

determining, by the analysis system, a system mode deficiency of the system aspect based on the issue recovery communications rating and the issue recovery communications data;

determining, by the analysis system, an evaluation perspective deficiency of the system aspect based on the issue recovery communications rating and the issue recovery communications data; and determining, by the analysis system, an evaluation viewpoint deficiency of the system aspect based on the issue recovery communications rating and the issue recovery communications data.

11. The method of claim 1 further comprises:

determining, by the analysis system, a deficiency of the system aspect based on the issue recovery communications rating and the issue recovery communications data;

determining, by the analysis system, whether the deficiency is auto-correctable; and when the deficiency is auto-correctable, auto-correcting, by the analysis system, the deficiency.

12. A computer readable memory comprises:

a first memory section for storing operational instructions that, when executed by an analysis system, cause the analysis system to:

determine a system aspect of a system for an issue recovery communications evaluation wherein the system aspect includes at least one system element of the system, at least one system criteria of the system, and at least one system mode of the system;

determine at least one evaluation perspective for use in performing the issue recovery communications evaluation on the system aspect;

determine at least one evaluation viewpoint for use in performing the issue recovery communications evaluation on the system aspect;

a second memory section for storing operational instructions that, when executed by the analysis system, cause the analysis system to:

obtain issue recovery communications data regarding the system aspect in accordance with the at least one evaluation perspective and the at least one evaluation viewpoint; and a third memory section for storing operational instructions that, when executed by the analysis system, cause the analysis system to:

calculate an issue recovery communications rating as a measure of issue recovery communications maturity for the system aspect based on the issue recovery communications data, the at least one evaluation perspective, the at least one evaluation viewpoint, and at least one evaluation rating metric.

13. The computer readable memory of claim 12, wherein the first memory section further stores operational instructions that, when executed by the analysis system, cause the analysis system to:

receive an input, wherein the input identifies at least one of:

the system aspect;
the at least one evaluation perspective; and
the at least one evaluation viewpoint.

14. The computer readable memory of claim 12 further comprises:

a system element of the at least one system element includes an enterprise identifier, an organization identifier, a division identifier, a department identifier, a group identifier, a sub-group identifier, a device identifier, a software identifier, or an internet protocol address identifier;

a system criteria of the at least one system criteria being system guidelines, system requirements, system design, system build, or resulting system; and a system mode of the at least one system mode being assets, system functions, or system security.

15. The computer readable memory of claim 12 further comprises:

an evaluation perspective of the at least one evaluation perspective being an understanding perspective, an implementation perspective, an operation perspective, or a self-analysis perspective.

16. The computer readable memory of claim 12 further comprises:

an evaluation viewpoint of the at least one evaluation viewpoint being a disclosed viewpoint, a discovered viewpoint, or a desired viewpoint.

17. The computer readable memory of claim 12 further comprises:

an evaluation rating metric of the at least one evaluation rating metric being a process rating metric, a policy rating metric, a procedure rating metric, a certification rating, a documentation rating metric, or an automation rating metric.

18. The computer readable memory of claim 12, wherein the second memory section further stores operational instructions that, when executed by the analysis system, cause the analysis system to obtain the issue recovery communications data by:
- determining data gathering parameters regarding the system aspect in accordance with the at least one evaluation perspective, the at least one evaluation viewpoint, and the least one evaluation rating metric;
- identifying system elements of the system aspect based on the data gathering parameters;
- obtaining issue recovery communications information from the system elements in accordance with the data gathering parameters; and
- recording the issue recovery communications information from the system elements to produce the issue recovery communications data.

19. The computer readable memory of claim 18, wherein the data gathering parameters is regarding at least one of:
- public relations management;
- after event reputation repairment; and
- recovery activity communication.

20. The computer readable memory of claim 12, wherein the third memory section further stores operational instructions that, when executed by the analysis system, cause the analysis system to calculate the issue recovery communications rating by:
- selecting and performing at least two of:
  - based on the issue recovery communications data and process analysis parameters, generating a process rating for the system aspect in accordance with the at least one evaluation perspective, the at least one evaluation viewpoint, and process as the evaluation rating metric;
  - based on the issue recovery communications data and policy analysis parameters, generating a policy rating for the system aspect in accordance with the at least one evaluation perspective, the at least one evaluation viewpoint, and policy as the evaluation rating metric;
  - based on the issue recovery communications data and documentation analysis parameters, generating a documentation rating for the system aspect in accordance with the at least one evaluation perspective, the at least one evaluation viewpoint, and documentation as the evaluation rating metric;
  - based on the issue recovery communications data and automation analysis parameters, generating an automation rating for the system aspect in accordance with the at least one evaluation perspective, the at least one evaluation viewpoint, and automation as the evaluation rating metric;
  - based on the issue recovery communications data and procedure analysis parameters, generating a procedure rating for the system aspect in accordance with the at least one evaluation perspective, the at least one evaluation viewpoint, and procedure as the evaluation rating metric; and
  - based on the issue recovery communications data and certification analysis parameters, generating a certification rating for the system aspect in accordance with the at least one evaluation perspective, the at least one evaluation viewpoint, and certification as the evaluation rating metric; and
- generating the issue recovery communications rating based on the selected and performed at least two of the process rating, the policy rating, the documentation rating, the automation rating, the procedure rating, and the certification rating.

21. The computer readable memory of claim 12, wherein a fourth memory section stores operational instructions that, when executed by the analysis system, cause the analysis system to perform at least one of:
- determine a system criteria deficiency of the system aspect based on the issue recovery communications rating and the issue recovery communications data;
- determine a system mode deficiency of the system aspect based on the issue recovery communications rating and the issue recovery communications data;
- determine an evaluation perspective deficiency of the system aspect based on the issue recovery communications rating and the issue recovery communications data; and
- determine an evaluation viewpoint deficiency of the system aspect based on the issue recovery communications and the issue recovery communications data.

22. The computer readable memory of claim 12, wherein a fourth memory section stores operational instructions that, when executed by the analysis system, cause the analysis system to:
- determine a deficiency of the system aspect based on the issue recovery communications rating and the issue recovery communications data;
- determine whether the deficiency is auto-correctable; and
- when the deficiency is auto-correctable, auto-correcting the deficiency.

* * * * *